(12) United States Patent
Holtzapple et al.

(10) Patent No.: US 7,186,101 B2
(45) Date of Patent: Mar. 6, 2007

(54) GEROTOR APPARATUS FOR A QUASI-ISOTHERMAL BRAYTON CYCLE ENGINE

(75) Inventors: Mark T. Holtzapple, College Station, TX (US); George A. Rabroker, College Station, TX (US)

(73) Assignee: The Texas A&M University System, College Station, TX (US)

( * ) Notice: Subject to any disclaimer, the term of this patent is extended or adjusted under 35 U.S.C. 154(b) by 258 days.

(21) Appl. No.: 10/359,487

(22) Filed: Jul. 25, 2003

(65) Prior Publication Data

US 2003/0228237 A1 Dec. 11, 2003

Related U.S. Application Data

(60) Continuation-in-part of application No. 10/346,024, filed on Jan. 17, 2003, which is a division of application No. 09/930,246, filed on Aug. 16, 2001, now Pat. No. 6,530,211, which is a division of application No. 09/363,818, filed on Jul. 30, 1999, now Pat. No. 6,336,317.

(60) Provisional application No. 60/094,920, filed on Jul. 31, 1998, provisional application No. 60/355,636, filed on Feb. 5, 2002, provisional application No. 60/358,681, filed on Feb. 21, 2002, provisional application No. 60/397,193, filed on Jul. 18, 2002.

(51) Int. Cl.
F03C 2/00 (2006.01)
F04C 18/00 (2006.01)

(52) U.S. Cl. .................. 418/168; 418/171; 60/384; 60/387

(58) Field of Classification Search ........ 418/166–171, 418/2, 91, 94, 99, 200, 210; 60/384, 387
See application file for complete search history.

(56) References Cited

U.S. PATENT DOCUMENTS

| 724,665 | A | * | 4/1903 | Cooley | ................ 418/166 |
| 1,501,051 | A | | 7/1924 | Hill | |
| 1,854,692 | A | | 4/1932 | Cooper | |
| 2,601,397 | A | * | 6/1952 | Hill et al. | ............... 418/169 |
| 3,214,087 | A | | 10/1965 | Lück | |

(Continued)

FOREIGN PATENT DOCUMENTS

| DE | 35 13348 A1 | 10/1986 |
| EP | 02207187 | 8/1990 |
| EP | 06330875 | 11/1994 |
| EP | 1 197 634 A1 | 4/2002 |
| FR | 2 812 041 A1 | 7/2000 |
| JP | 02207187 | 8/1990 |
| JP | 06330875 | 11/1994 |

OTHER PUBLICATIONS

PCT Written Opinion for International Application No. PCT/US03/03549; filed Feb. 5, 2003 (5 pages).
PCT International Search Report dated May 28, 2003 for PCT/US03/03549 filed Feb. 5, 2003.
Declaration of Mark Holtzapple, dated May 10, 2005 (6 pages).

*Primary Examiner*—Theresa Trieu
(74) *Attorney, Agent, or Firm*—Baker Botts L.L.P.

(57) ABSTRACT

According to one embodiment of the invention, a gerotor apparatus includes an outer gerotor having an outer gerotor chamber, an inner gerotor, at least a portion of which is disposed within the outer gerotor chamber, and a synchronizing apparatus operable to control the rotation of the inner gerotor relative to the outer gerotor. The inner gerotor includes one or more entrance passages operable to communicate a lubricant into the outer gerotor chamber.

18 Claims, 97 Drawing Sheets

U.S. PATENT DOCUMENTS

| | | |
|---|---|---|
| 4,028,023 A | 6/1977 | Labus |
| 4,127,364 A | 11/1978 | Eiermann et al. |
| 4,145,167 A | 3/1979 | Baatrup |
| 4,392,797 A | 7/1983 | Ruf |
| 4,457,677 A | 7/1984 | Todd |
| 4,674,960 A * | 6/1987 | Rando et al. ............... 418/179 |
| 4,801,255 A * | 1/1989 | Wankel ...................... 418/168 |
| 4,940,394 A | 7/1990 | Gibbons |
| 5,044,907 A * | 9/1991 | Hirosawa et al. ........... 418/168 |
| 6,174,151 B1 * | 1/2001 | Yarr ........................... 418/171 |
| 2003/0215345 A1 | 11/2003 | Holtzapple et al. |

* cited by examiner

376 PROXIMITY SENSOR

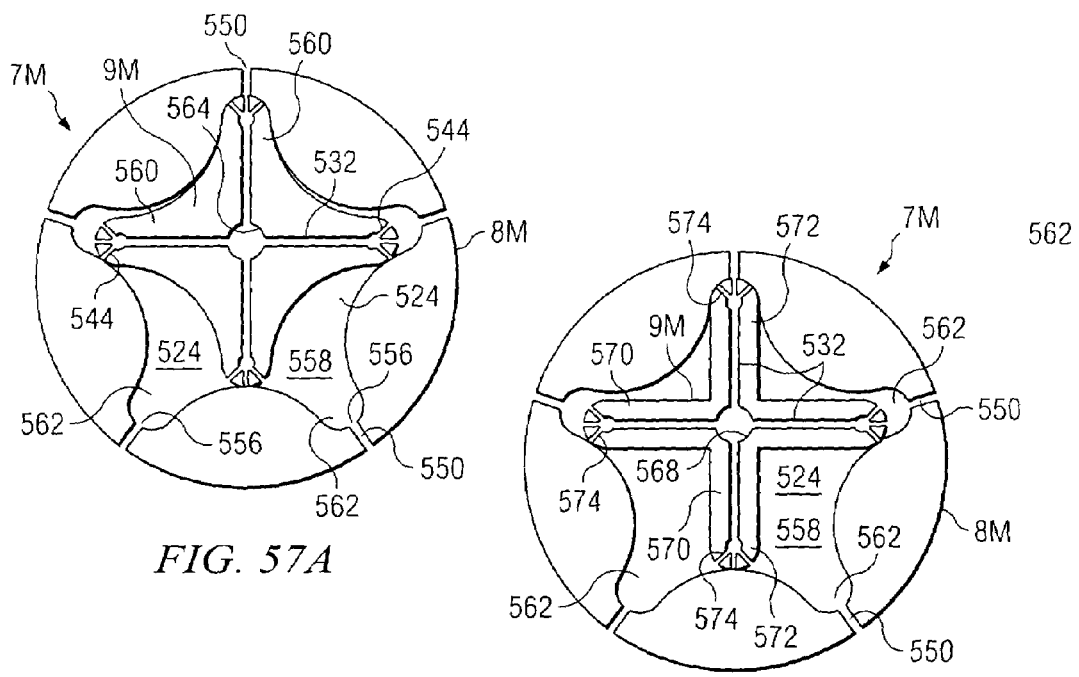
*FIG. 57A*
*FIG. 57B*
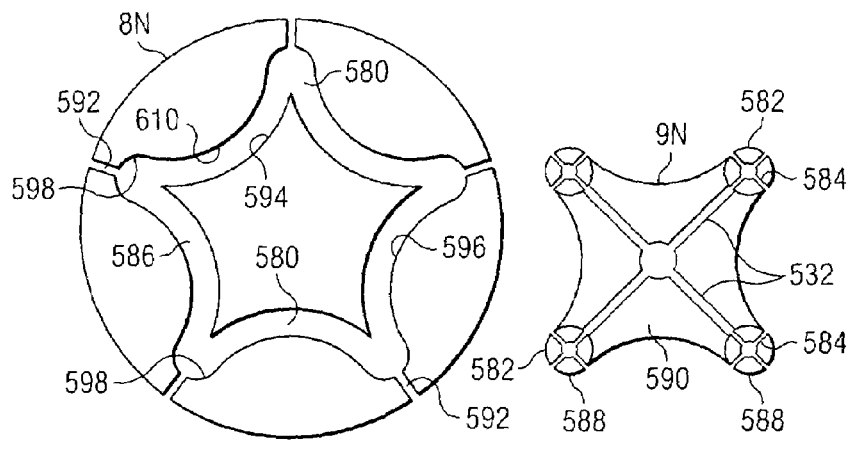
*FIG. 59A*
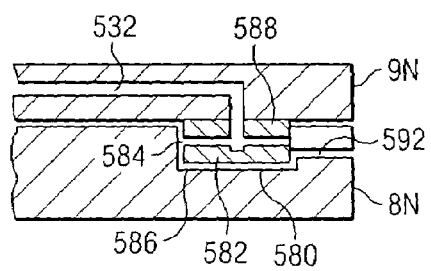
*FIG. 59B*

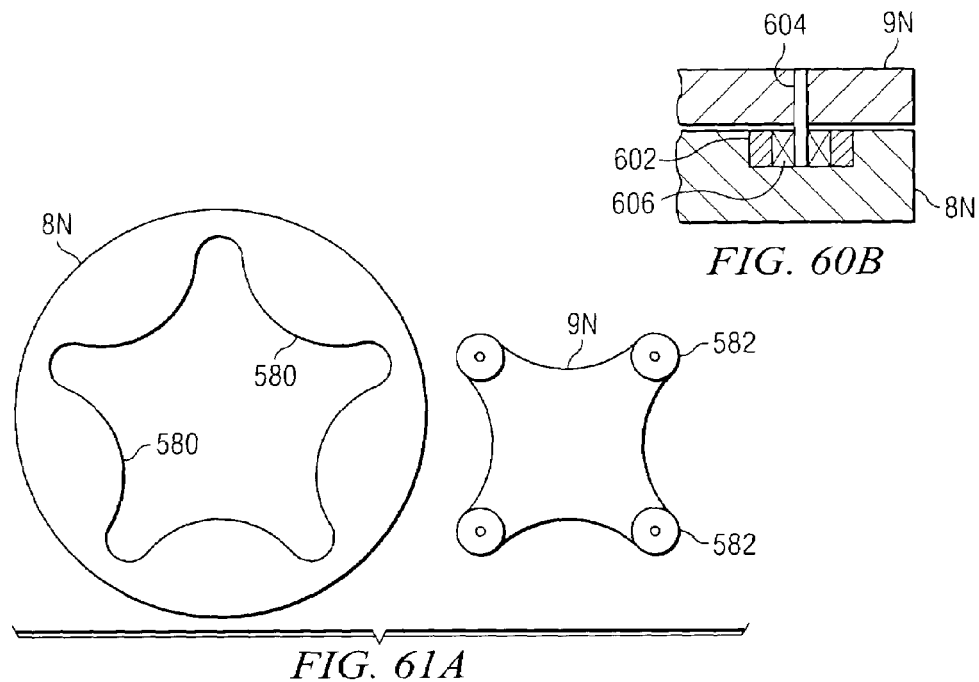
FIG. 60B
FIG. 61A
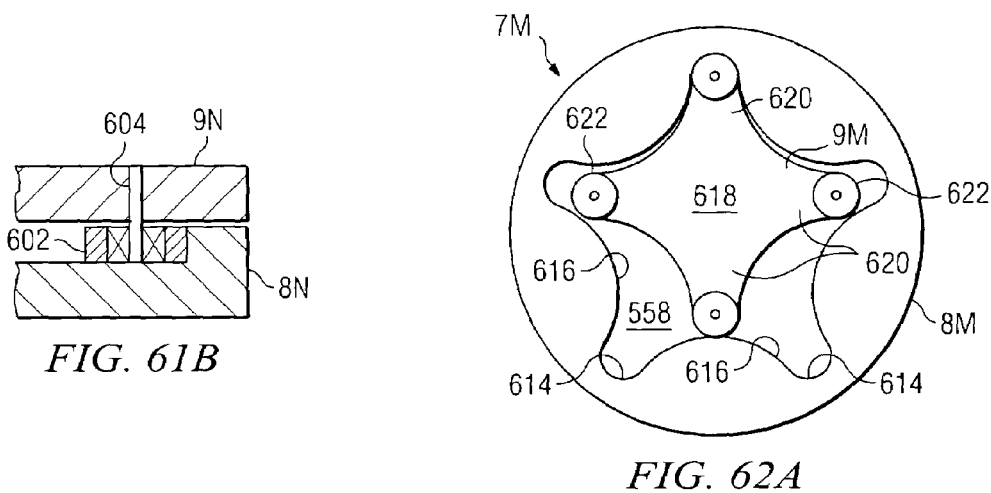
FIG. 61B
FIG. 62A
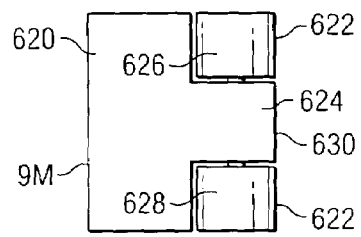
FIG. 62B
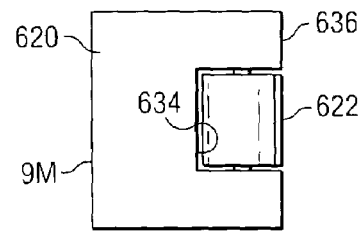
FIG. 62C

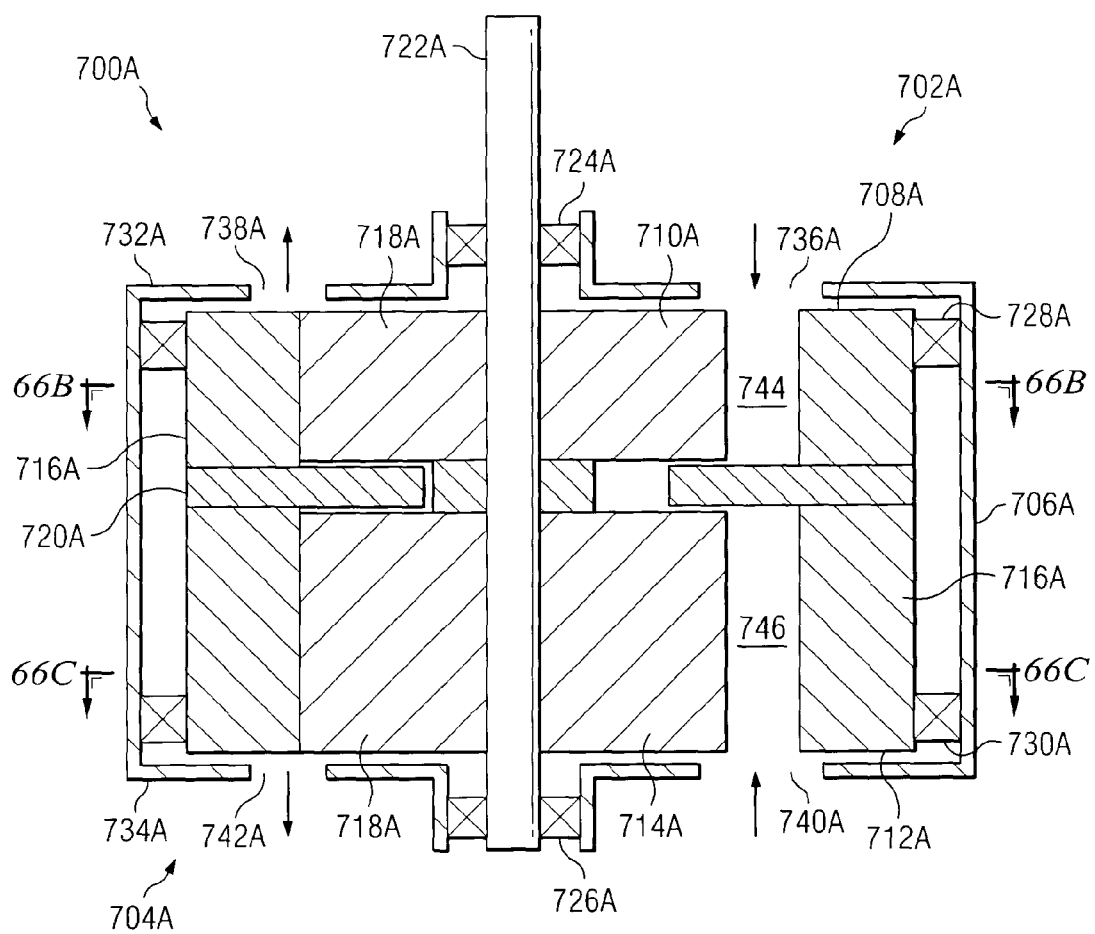
*FIG. 66A*
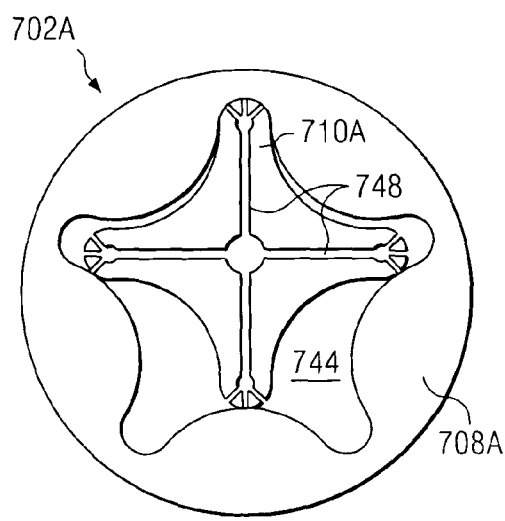 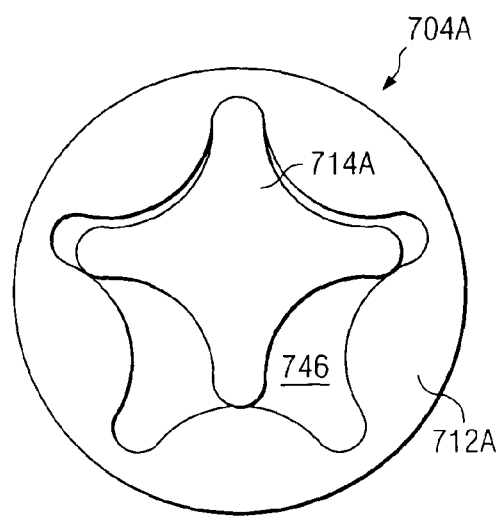
*FIG. 66B*  *FIG. 66C*

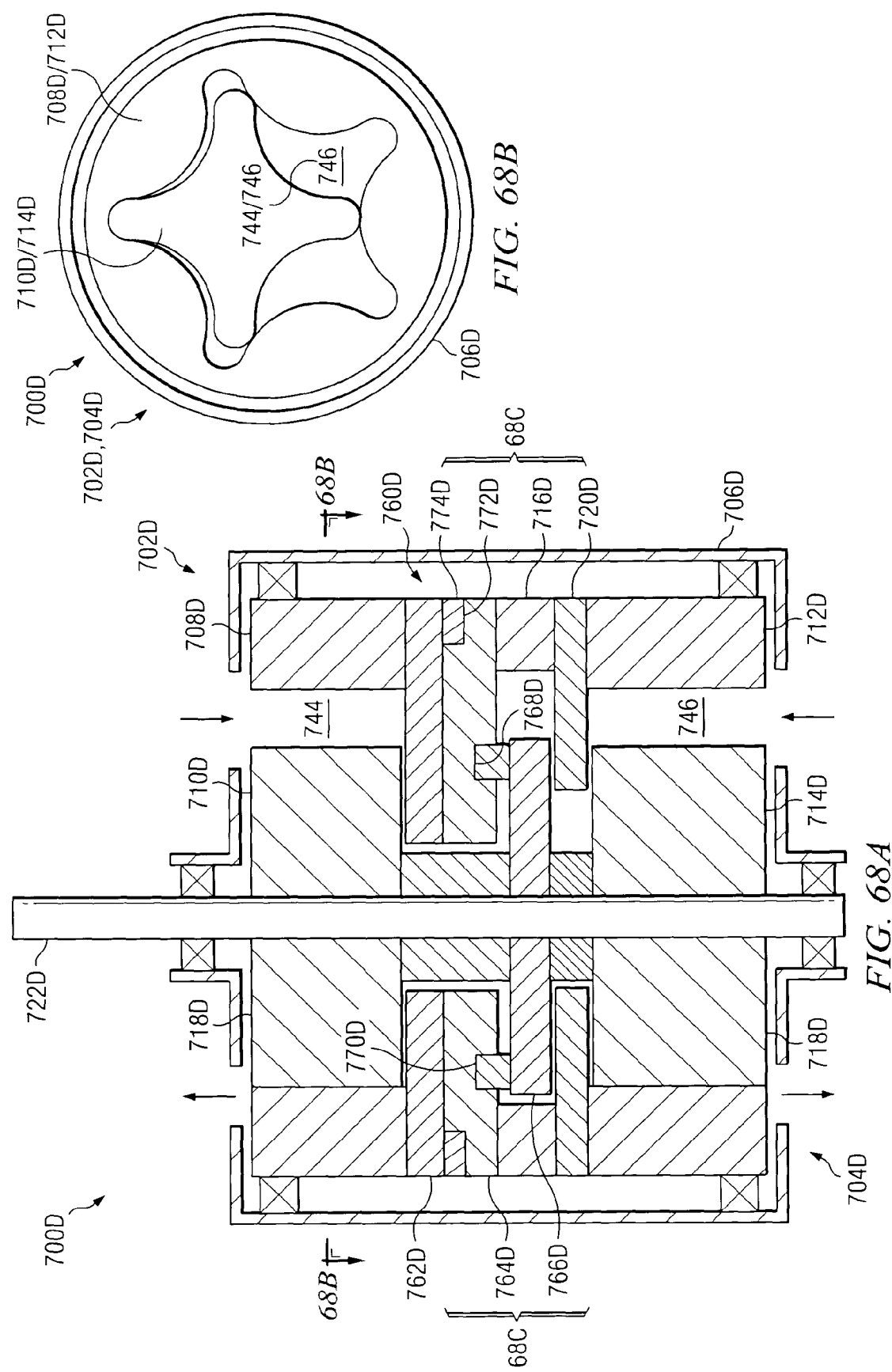

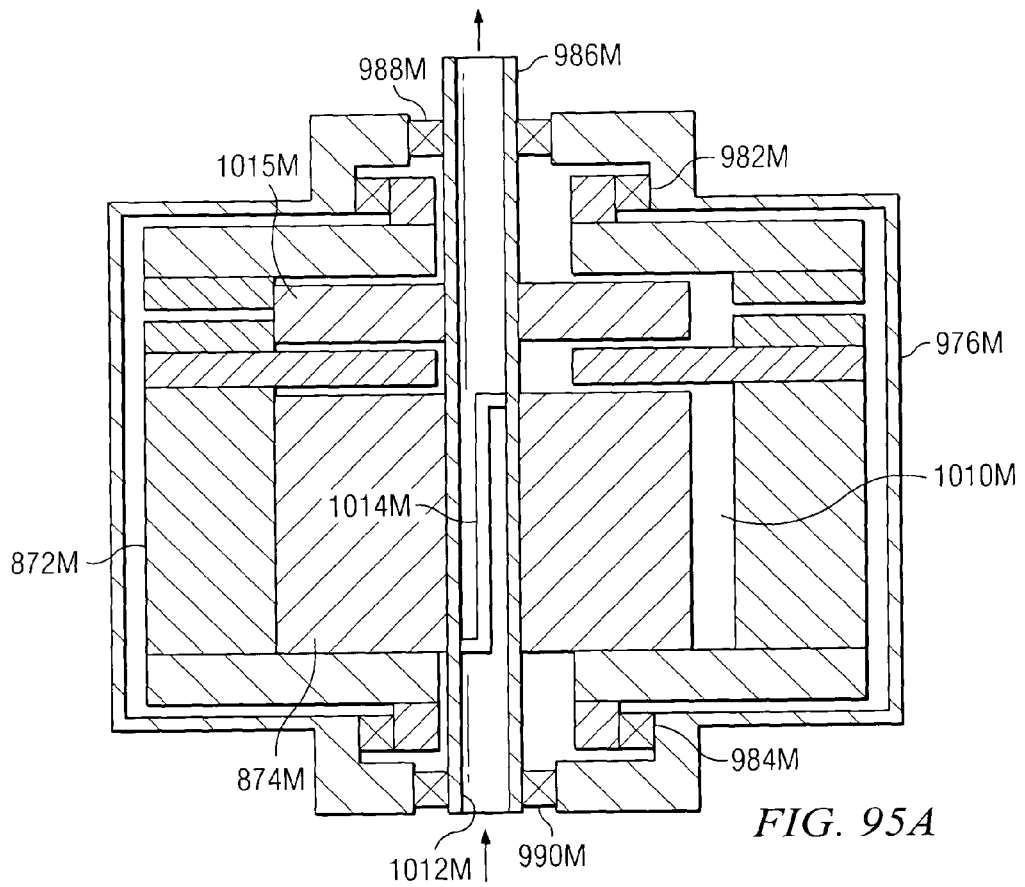
FIG. 95A
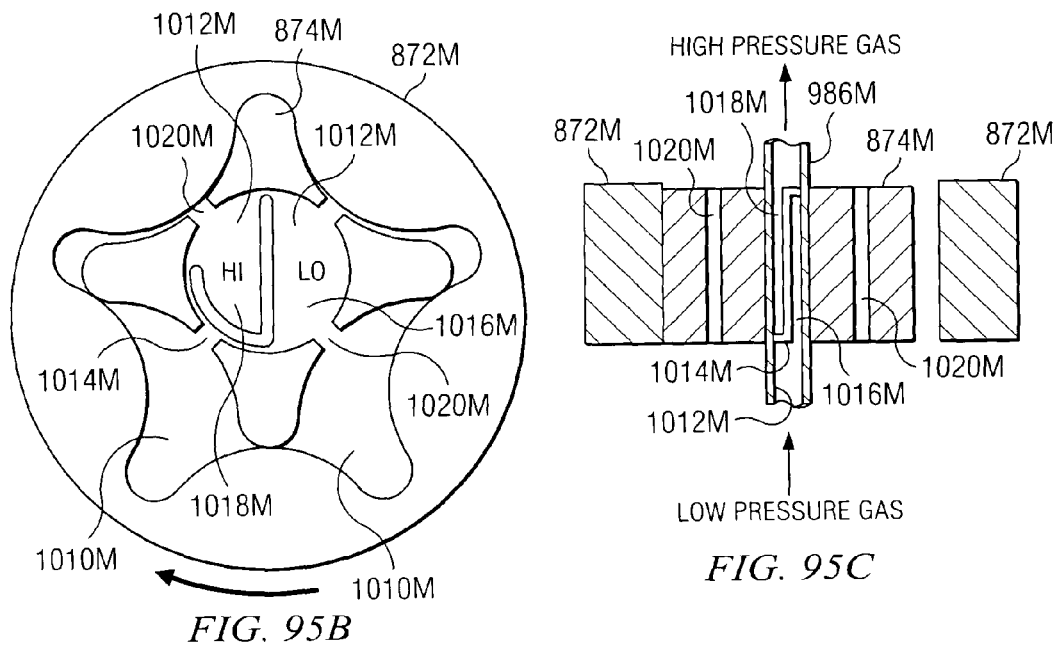
FIG. 95B
FIG. 95C

GEROTOR APPARATUS FOR A QUASI-ISOTHERMAL BRAYTON CYCLE ENGINE

RELATED APPLICATIONS

This application is a continuation-in-part of U.S. application Ser. No. 10/346,024, filed Jan. 17, 2003, and entitled "QUASI-ISOTHERMAL BRAYTON CYCLE ENGINE," which is a divisional of U.S. application Ser. No. 09/930,246, filed Aug. 16, 2001, now U.S. Pat. No. 6,530,211 and entitled "QUASI-ISOTHERMAL BRAYTON CYCLE ENGINE," which is a divisional of U.S. application Ser. No. 09/363,818, filed Jul. 30, 1999, entitled "QUASI-ISOTHERMAL BRAYTON CYCLE ENGINE," now U.S. Pat. No. 6,336,317, which claims priority from U.S. Provisional Application Ser. No. 60/094,920, entitled "Brayton Cycle Engine," filed on Jul. 31, 1998.

This application also claims benefit under 35 U.S.C. § 119(e) of U.S. Provisional Application Ser. No. 60/355,636, entitled "QUASI-ISOTHERMAL BRAYTON CYCLE ENGINE," filed Feb. 5, 2002, and U.S. Provisional Application Ser. No. 60/358,681, entitled "QUASI-ISOTHERMAL BRAYTON CYCLE ENGINE," filed Feb. 21, 2002, and U.S. Provisional Application Ser. No. 60/397,193, entitled "QUASI-ISOTHERMAL BRAYTON CYCLE ENGINE," filed Jul. 18, 2002.

TECHNICAL FIELD OF THE INVENTION

The present invention relates to a gerotor apparatus that functions as a compressor or expander. The gerotor apparatus may be applied generally to Brayton cycle engines and, more particularly, to a quasi-isothermal Brayton cycle engine.

BACKGROUND OF THE INVENTION

For mobile applications, such as an automobile or truck, it is generally desirable to use a heat engine that has the following characteristics: internal combustion to reduce the need for heat exchangers; complete expansion for improved efficiency; isothermal compression and expansion; high power density; high-temperature expansion for high efficiency; ability to efficiently "throttle" the engine for part-load conditions; high turn-down ratio (i.e., the ability to operate at widely ranging speeds and torques); low pollution; uses standard components with which the automotive industry is familiar; multifuel capability; and regenerative braking.

There are currently several types of heat engines, each with its own characteristics and cycles. These heat engines include the Otto Cycle engine, the Diesel Cycle engine, the Rankine Cycle engine, the Stirling Cycle engine, the Erickson Cycle engine, the Carnot Cycle engine, and the Brayton Cycle engine. A brief description of each engine is provided below.

The Otto Cycle engine is an inexpensive, internal combustion, low-compression engine with a fairly low efficiency. This engine is widely used to power automobiles.

The Diesel Cycle engine is a moderately expensive, internal combustion, high-compression engine with a high efficiency that is widely used to power trucks and trains.

The Rankine Cycle engine is an external combustion engine that is generally used in electric power plants. Water is the most common working fluid.

The Erickson Cycle engine uses isothermal compression and expansion with constant-pressure heat transfer. It may be implemented as either an external or internal combustion cycle. In practice, a perfect Erickson cycle is difficult to achieve because isothermal expansion and compression are not readily attained in large, industrial equipment.

The Carnot Cycle engine uses isothermal compression and expansion and adiabatic compression and expansion. The Carnot Cycle may be implemented as either an external or internal combustion cycle. It features low power density, mechanical complexity, and difficult-to-achieve constant-temperature compressor and expander.

The Stirling Cycle engine uses isothermal compression and expansion with constant-volume heat transfer. It is almost always implemented as an external combustion cycle. It has a higher power density than the Carnot cycle, but it is difficult to perform the heat exchange, and it is difficult to achieve constant-temperature compression and expansion.

The Stirling, Erickson, and Carnot cycles are as efficient as nature allows because heat is delivered at a uniformly high temperature, $T_{hot}$, during the isothermal expansion, and rejected at a uniformly low temperature, $T_{cold}$, during the isothermal compression. The maximum efficiency, $\eta_{max}$, of these three cycles is:

$$\eta_{max} = 1 - \frac{T_{cold}}{T_{hot}}$$

This efficiency is attainable only if the engine is "reversible," meaning that the engine is frictionless, and that there are no temperature or pressure gradients. In practice, real engines have "irreversibilities," or losses, associated with friction and temperature/pressure gradients.

The Brayton Cycle engine is an internal combustion engine that is generally implemented with turbines and is generally used to power aircraft and some electric power plants. The Brayton cycle features very high power density, normally does not use a heat exchanger, and has a lower efficiency than the other cycles. When a regenerator is added to the Brayton cycle, however, the cycle efficiency increases. Traditionally, the Brayton cycle is implemented using axial-flow, multi-stage compressors and expanders. These devices are generally suitable for aviation in which aircraft operate at fairly constant speeds; they are generally not suitable for most transportation applications, such as automobiles, buses, trucks, and trains, that must operate over widely varying speeds.

The Otto cycle, the Diesel cycle, the Brayton cycle, and the Rankine cycle all have efficiencies less than the maximum because they do not use isothermal compression and expansion steps. Further, the Otto and Diesel cycle engines lose efficiency because they do not completely expand high-pressure gases, and simply throttle the waste gases to the atmosphere.

Reducing the size and complexity, as well as the cost, of Brayton cycle engines is important. In addition, improving the efficiency of Brayton cycle engines and/or their components is important. Manufacturers of Brayton cycle engines are continually searching for better and more economical ways of producing Brayton cycle engines.

SUMMARY OF THE INVENTION

According to one embodiment of the invention, a gerotor apparatus includes a housing, an outer gerotor disposed within the housing, an inner gerotor disposed within the outer gerotor, and a valve plate rigidly coupled to the housing that has a first surface positioned adjacent an end of the outer gerotor. This gerotor apparatus may include many different features depending on its application and use. For example, the valve plate may include an inlet port, an exhaust port, and a compression control element slidably engaged with either the inlet port or exhaust port to control a compression ratio of the gerotor apparatus.

As another example, the gerotor apparatus may include a proximity sensor coupled to the valve plate to sense a gap between an end of the outer gerotor and the surface of the valve plate and means for adjusting the gap between the end of the outer gerotor and the valve plate. The gerotor apparatus may also include a sealing ring disposed around a perimeter of the first surface of the valve plate and an actuation system operable to control a gap between the sealing ring and the end of the outer gerotor to control leakage of gas into a lubricant.

As another example, the gerotor apparatus may include a seal plate having a circular hole formed therein rigidly coupled to the outer gerotor, a seal plug disposed within the circular hole of the seal plate, wherein the seal plug has a circular hole formed therein, and a first bearing disposed within the circular hole of the seal plug. The first bearing supports the outer gerotor.

As another example, the gerotor apparatus may include a gearing system operable to drive the outer and inner gerotors that is either external or internal. In one embodiment, a gear housing is disposed within the inner gerotor and houses at least one gear operable to synchronize a rotation of the outer gerotor with a rotation of the inner gerotor.

According to one embodiment of the invention, a gerotor apparatus includes an outer gerotor having an outer gerotor chamber, an inner gerotor, at least a portion of which is disposed within the outer gerotor chamber, and a synchronizing apparatus operable to control the rotation of the inner gerotor relative to the outer gerotor. The inner gerotor includes one or more entrance passages operable to communicate a lubricant into the outer gerotor chamber.

Embodiments of the invention provide a number of technical advantages. Embodiments of the invention may include all, some, or none of these advantages. One technical advantage is a more compact and lightweight Brayton cycle engine having simpler gas flow paths, less loads on bearings, and lower power consumption. Some embodiments have fewer parts then previous Brayton cycle engines. Another advantage is that some embodiments of the invention introduce a simpler method for regulating leakage from gaps. An additional advantage is that the oil path is completely separated from the high-pressure gas preventing heat transfer from the gas to the oil. A further advantage is that precision alignment between the inner and outer gerotors may be achieved through a single part (e.g., a rigid shaft). A still further advantage is that drive mechanisms disclosed herein have small backlash and low wear.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIGS. 54 through 58 illustrate various embodiments of a gerotor apparatus including a lubricant to reduce friction between an inner gerotor and an outer gerotor;

FIGS. 59 through 63 illustrate various embodiments of a gerotor apparatus including alignment guides and alignment members;

FIGS. 66 through 69 illustrate various embodiments of an engine system having an integral gerotor compressor and gerotor expander;

FIG. 95 illustrates a gerotor apparatus in which gases may flow into and out of the gerotor apparatus through an opening in a central shaft.

DETAILED DESCRIPTION OF EXAMPLE EMBODIMENTS OF THE INVENTION

Figure 1A:
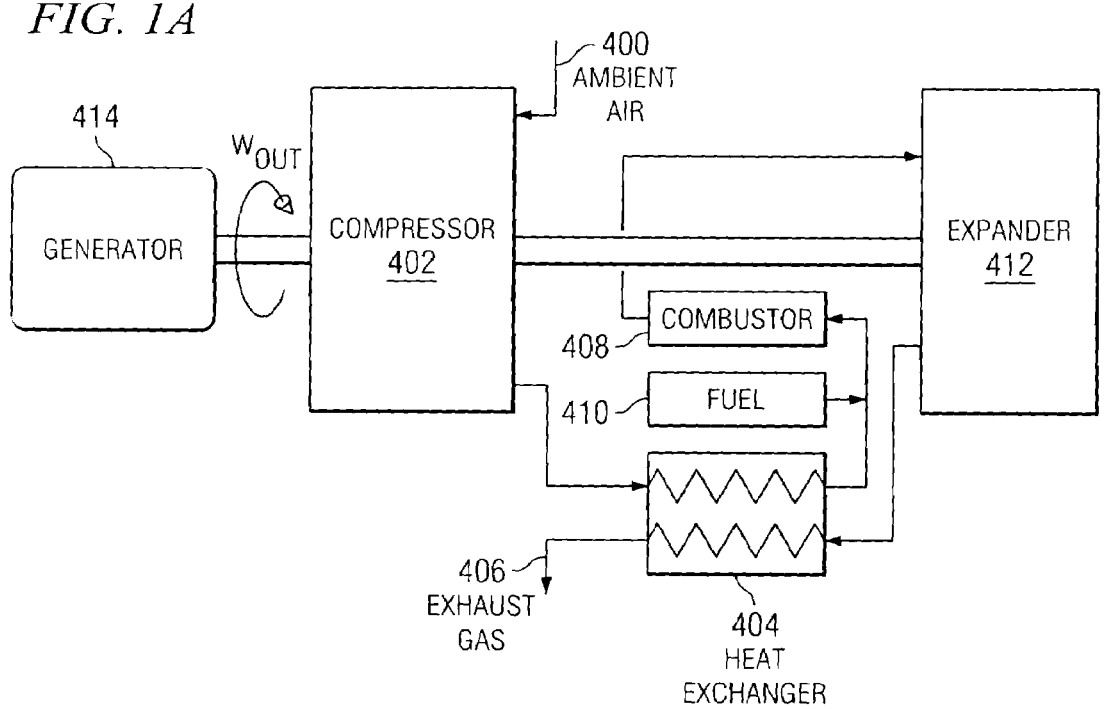
FIGS. 1 and 2 both illustrate block diagrams of various embodiments of a quasi-isothermal Brayton cycle engine.
Figure 1B:
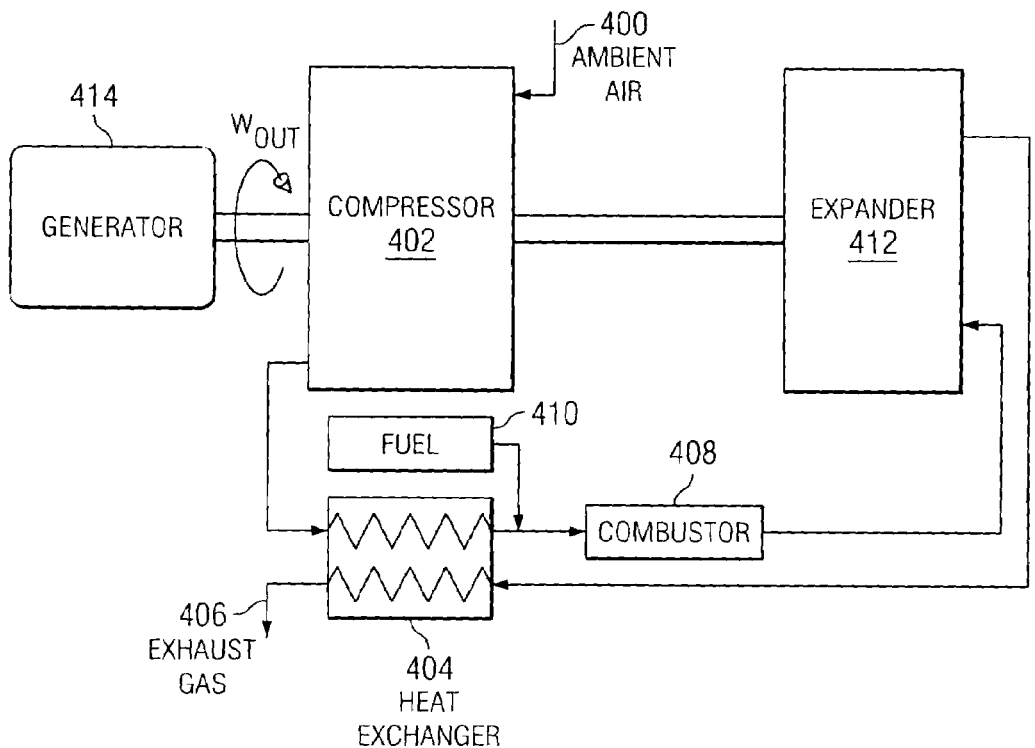
Figure 101:
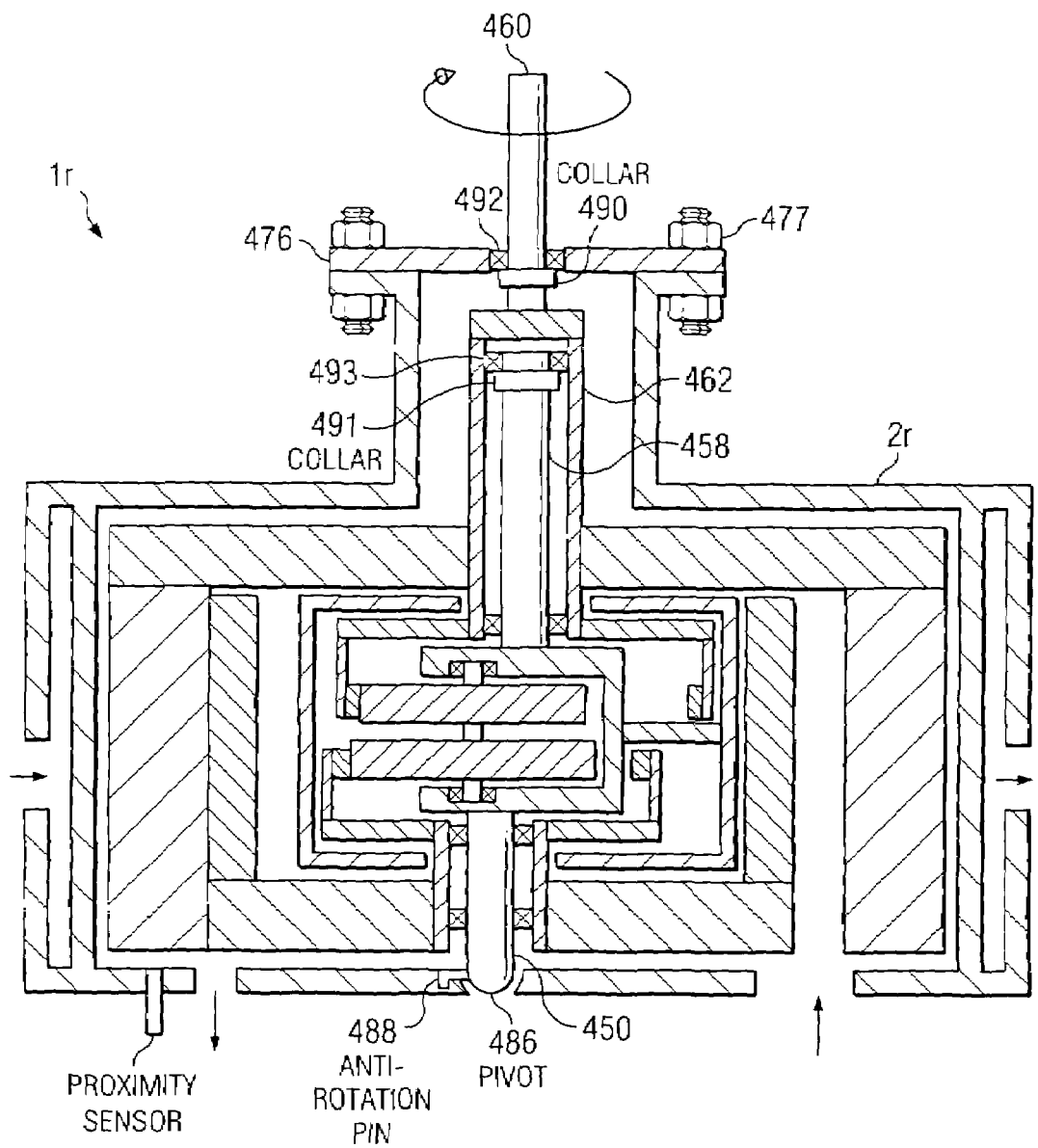

FIGS. 1 through 101 below illustrate example embodiments of a gerotor apparatus within the teachings of the present invention. Generally, the following detailed description describes gerotor apparatuses as being used in the context of a gerotor compressor; however, the following gerotor apparatuses may function equally as well as gerotor expanders or other suitable gerotor apparatuses. In addition, the present invention contemplates that the gerotor apparatuses described below may be utilized in any suitable application; however, the gerotor apparatuses described below are particularly suitable for a quasi-isothermal Brayton cycle engine, such as the one described in U.S. Pat. No. 6,336,317 B1 ("the '317 Patent") issued Jan. 8, 2002, and assigned to the Texas A&M University System. The '317 Patent, which is herein incorporated by reference, describes the general operation of a gerotor compressor and/or a gerotor expander. Hence, the operation of the gerotor apparatuses described below are not described in detail.

Figure 2A:
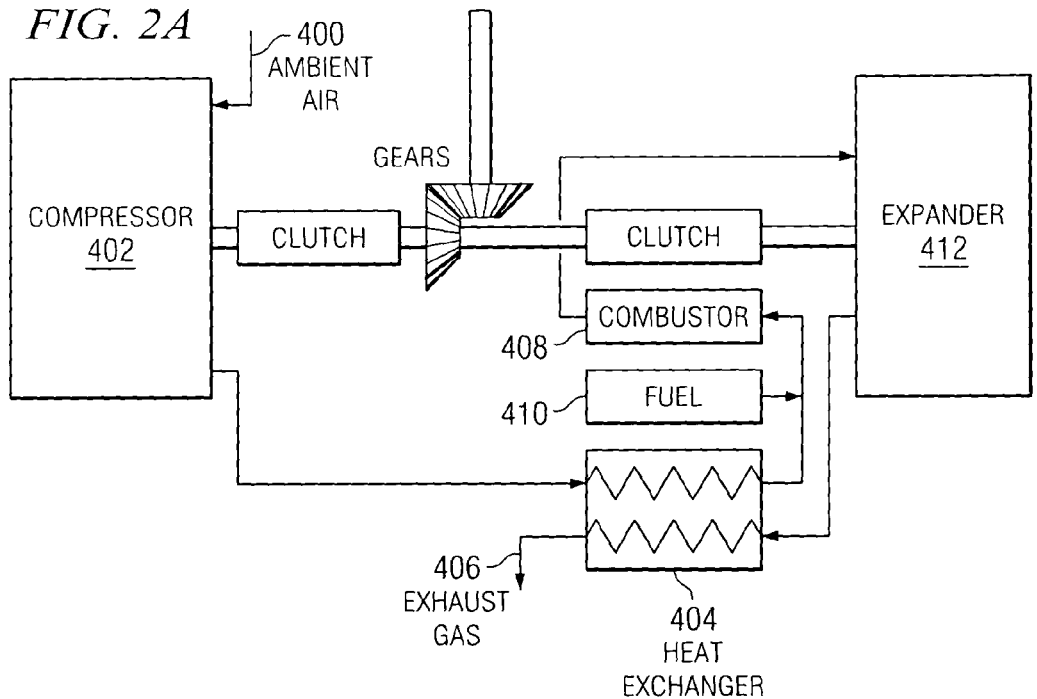
Figure 2B:
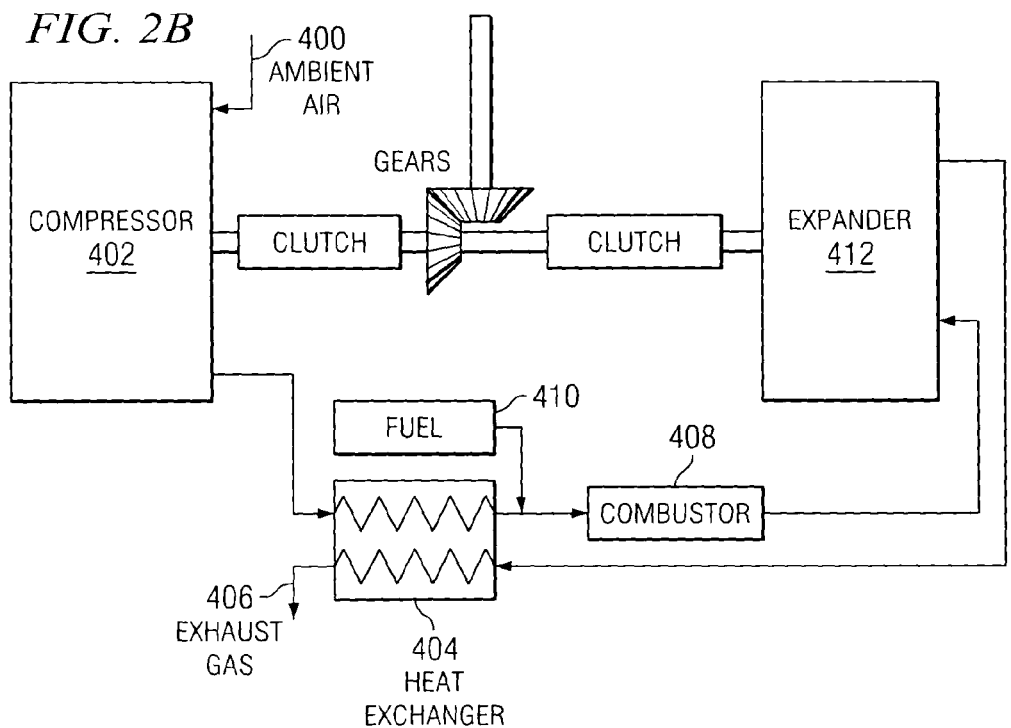

An example of an application in which the gerotor apparatuses described herein may be utilized is illustrated in FIGS. 1 and 2. FIGS. 1 and 2 both show block diagrams of quasi-isothermal brayton cycle engines. FIG. 1 illustrates two embodiments of a single shaft arrangement and FIG. 2 illustrates two embodiments of a split shaft arrangement. Referring to FIG. 1, ambient air 400 is received and compressed in a compressor 402. The compressed air is then countercurrently heated in a heat exchanger 404 using the thermal energy from exhaust gases 406. In a combustor 408, a fuel 410 is introduced into the prewarmed air and ignited. The high pressure combustion gases flow into an expander 412 where work is produced, as denoted by generator 414. After air expands in expander 412, the hot air flows through heat exchanger 404 and preheats the air flowing from compressor 402 before it reaches combustor 408. The air exits heat exchanger 404 as exhaust gas 406. To minimize work requirements for compressor 402, atomized liquid water may be sprayed into ambient air 400, cooling ambient air 400 during compression in compressor 402. The outlet temperature from compressor 402 is nearly the same as the inlet temperature. Thus, the compression is considered to be "quasi-isothermal." The operation as described above for FIG. 1 is substantially similar for the block diagrams of FIG. 2, except FIG. 2 includes clutches and gears to facilitate the split shaft arrangement.

Embodiments of the invention may provide a number of technical advantages, such as a more compact and lightweight design of a gerotor compressor or expander having simpler gas flow paths, less loads on bearings, and lower power consumption. In addition, some embodiments of the invention introduce a simpler method for regulating leakage from gaps, provide for precision alignment between the inner and outer gerotors, and introduce drive mechanisms that have small backlash and low wear. These technical advantages may be facilitated by all, some, or none of the embodiments described below.

Figure 3:
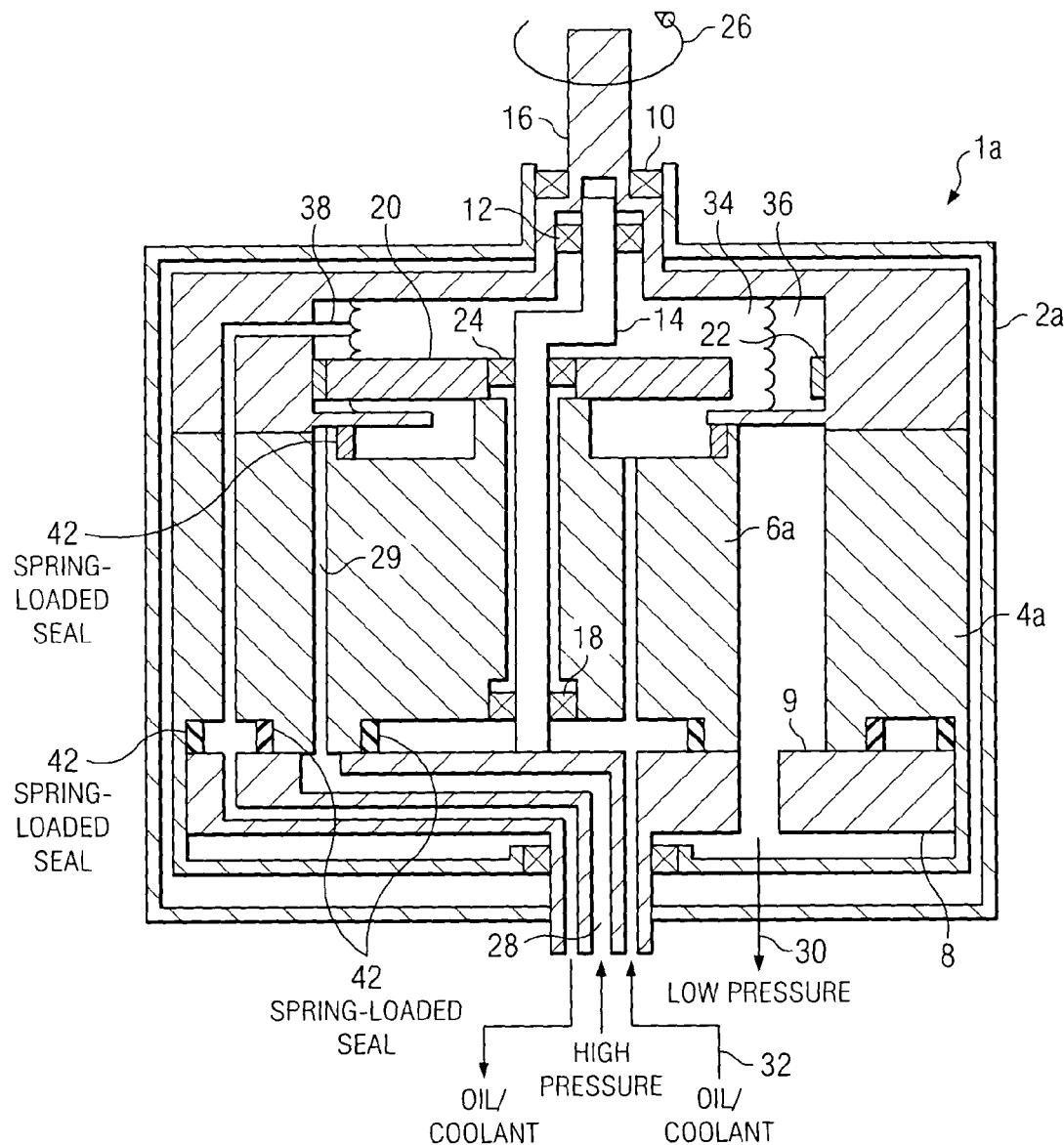
FIG. 3 shows a small-diameter gerotor apparatus using spring-loaded seals according to an embodiment of the invention.
Figure 4:
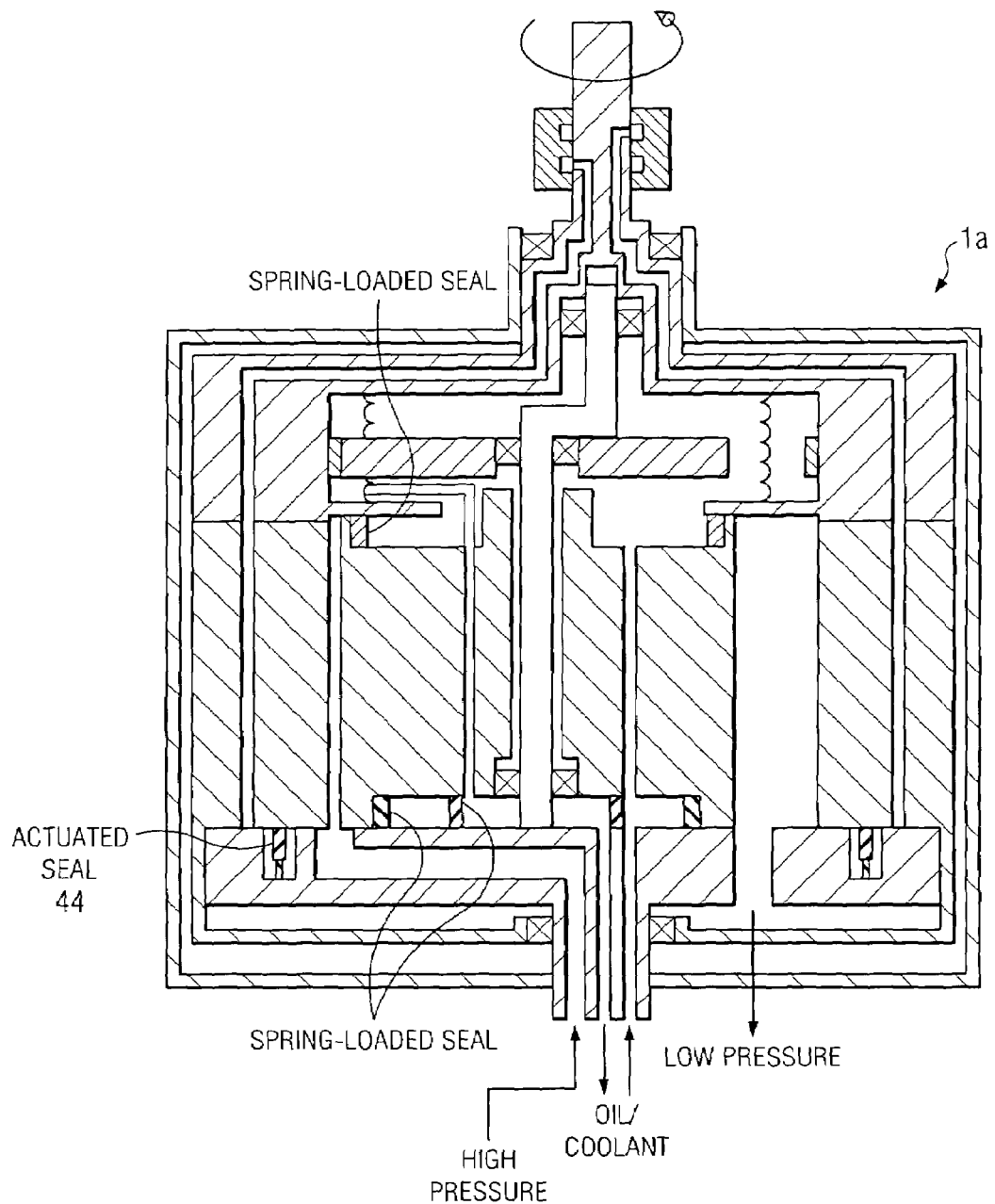
FIG. 4 shows a medium-diameter gerotor apparatus using spring-loaded seals on the inner diameter and sealing rings at the outer diameter according to an embodiment of the invention.
Figure 5:
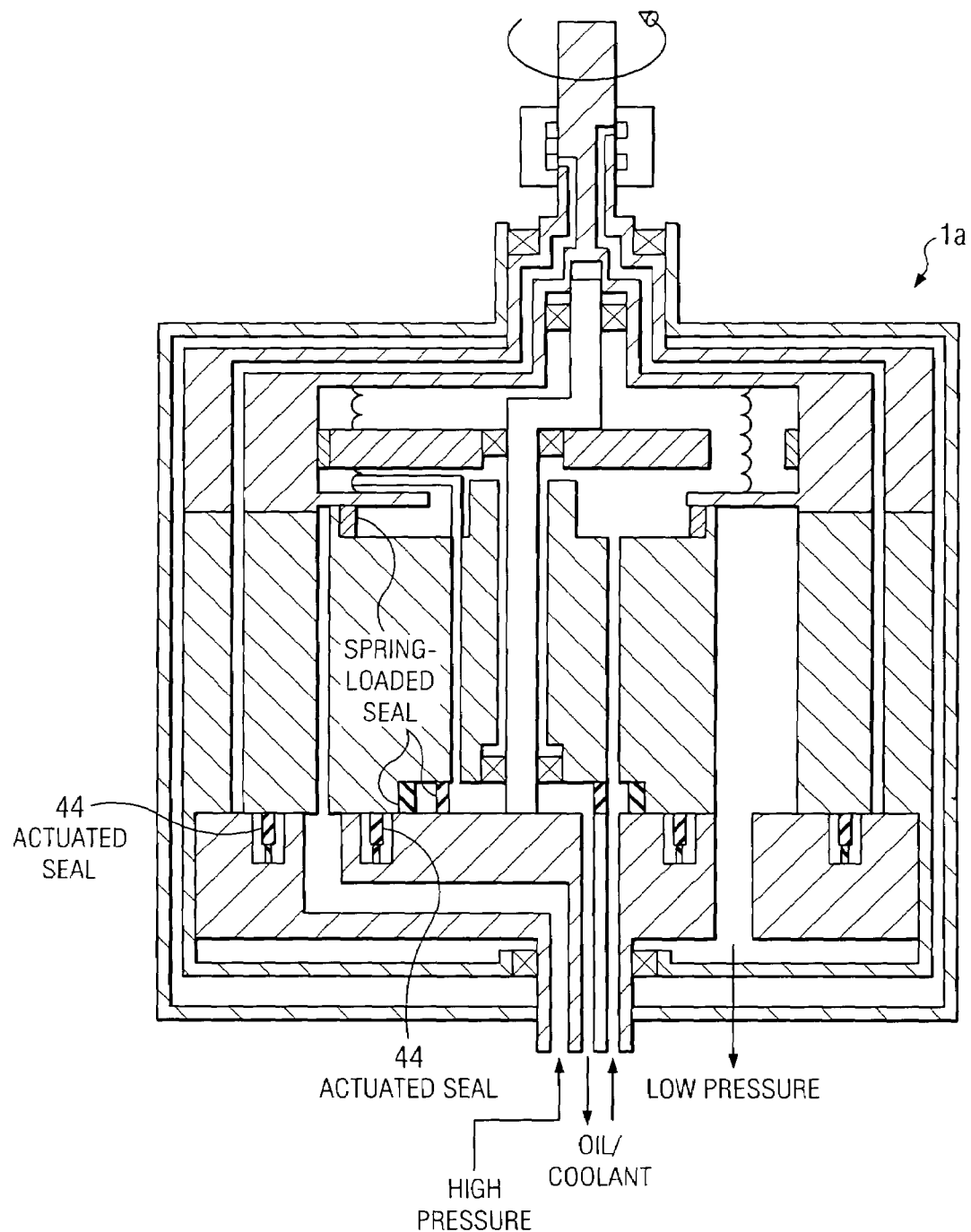
FIG. 5 shows a large-diameter gerotor apparatus using spring-loaded seals on the inner diameter and sealing rings on the middle and outer diameters according to an embodiment of the invention.

FIGS. 3 through 5 illustrate various embodiments of a gerotor apparatus 1a. FIG. 3 illustrates a relatively small diameter gerotor apparatus, FIG. 4 illustrates a relatively medium diameter gerotor apparatus, and FIG. 5 illustrates a relatively large diameter gerotor apparatus. Referring to FIG. 3, gerotor apparatus 1a includes a housing 2a, an outer gerotor 4a disposed within housing 2a, and an inner gerotor 6a disposed within outer gerotor 4a. In addition, a valve plate 8 is rigidly coupled to housing 2a and includes a first surface 9 positioned adjacent an end of outer gerotor 4a. Outer gerotor 4a is cantilevered at the top of housing 2a by a bearing 10, which allows outer gerotor 4a to be rotatably coupled to housing 2a. A bearing 12 also supports outer gerotor 4a. Bearing 12 is coupled to a shaft 14 that is rigidly coupled to valve plate 8 at a lower end and rotatably coupled to outer gerotor 4a by bearing 12 at its upper end. Inner gerotor 6a is rotatably coupled to shaft 14 with a bearing 18. Inner gerotor 6a includes an inner gear 20 coupled thereto that meshes with an outer gear 22 on outer gerotor 4a. Inner gear 20 is rotatably coupled to shaft 14 via a bearing 24.

In general, a rotation of shaft 16 (as denoted by arrow 26) rotates outer gerotor 4a within housing 2a. The rotation of outer gerotor 4a causes a rotation of inner gerotor 6a through outer gear 22 and inner gear 20. Since the embodiments illustrated in FIGS. 3 through 5 show gerotor apparatus 1a as an expander, high-pressure air enters gerotor apparatus 1a through a gas inlet 28 into a chamber 29 disposed between inner gerotor 6a and outer gerotor 4a and eventually exits a gas outlet (not explicitly shown), as denoted by reference numeral 30. Because of the moving parts associated with bearings and gears, an oil or other suitable lubricant is typically circulated through appropriate portions of gerotor apparatus 1a. As denoted by reference numeral 32, oil may be circulated into gerotor apparatus 1a. The oil works its way past bearing 18 and into a gear chamber 34 in order to lubricate gears 20 and 22 as well as bearing 24. Because of centrifugal forces the coolant will be located on an outer periphery of gear chamber 34, as denoted by reference numeral 36. A dip tube 38 or other suitable device transports the oil back down through the wall of outer gerotor 4 so that it may exit an exit port, as denoted by reference numeral 40.

To prevent any oil from leaking into the gas contained in chamber 29, seals are often utilized. In the embodiment illustrated in FIG. 3, spring loaded seals 42 are utilized. Spring loaded seals 42 may be any suitable spring loaded seals, such as standard face seals that are typically made of graphite or some other low friction solid. Face seals reduce the leakage of oil or other lubricant into the gas contained in chamber 29. As illustrated in FIG. 3, spring loaded seals 42 are used between inner gerotor 6a and outer gerotor 4a, between inner gerotor 6a and surface 9 of valve plate 8, and between outer gerotor 4a and surface 9 of valve plate 8. Spring loaded seals 42 may have any suitable shape; however, two example shapes are shown in FIGS. 6A and 6B.

Figure 6A:
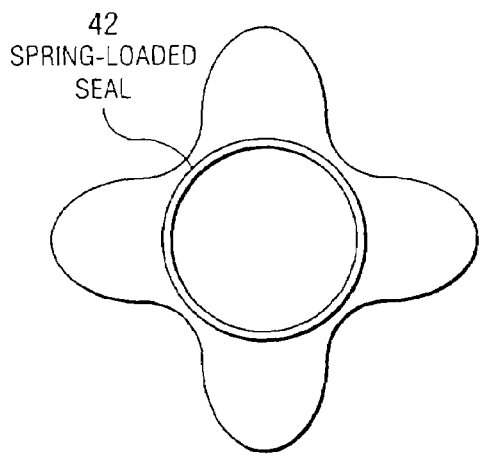
FIG. 6A shows one embodiment of a circular spring-loaded face seal.
Figure 6B:
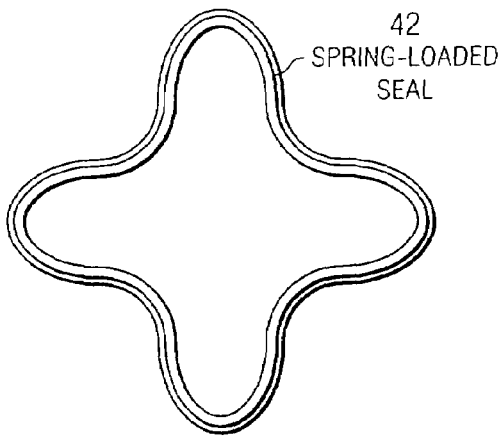
FIG. 6B shows a gerotor-shaped spring-loaded face seal.

A circular spring loaded seal 42 is illustrated in FIG. 6A, and a gerotor-shaped spring loaded seal 42 is illustrated in FIG. 6B. A gerotor-shaped spring loaded seal may be utilized where surface velocities are relatively low, such as between inner gerotor 6a and outer gerotor 4a or between inner gerotor 6a and surface 9 of valve plate 8. A circular spring loaded seal may also be used in these places in addition to being used between outer gerotor 4a and surface 9 of valve plate 8, which experiences greater surface velocities based on its distance from the center of gerotor apparatus 1a. Because gerotor apparatus 1a in FIG. 3 is a relatively small diameter gerotor apparatus, spring loaded seals 42 may be utilized where the surface velocities are higher. However, as the diameter of gerotor apparatus 1a increases, then a spring loaded seal 42 may not be adequate to provide proper sealing. In this case, a different type of sealing system may be needed.

Both FIGS. 4 and 5 illustrate a sealing ring 44 that may be utilized where surface velocities are high within gerotor apparatus 1a. The details of sealing ring 44 are described below in conjunction with FIG. 7. Sealing ring 44, in one embodiment, is associated with valve plate 8; however, in other embodiments sealing ring 44 may be located in other suitable locations.

Figure 7A:
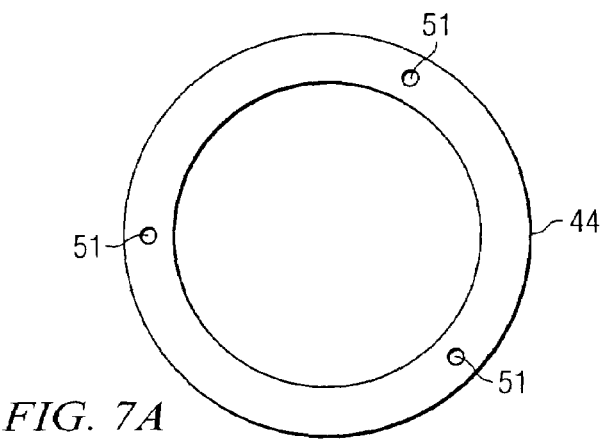
FIG. 7 shows a sealing ring according to an embodiment of the invention.
Figure 7B:
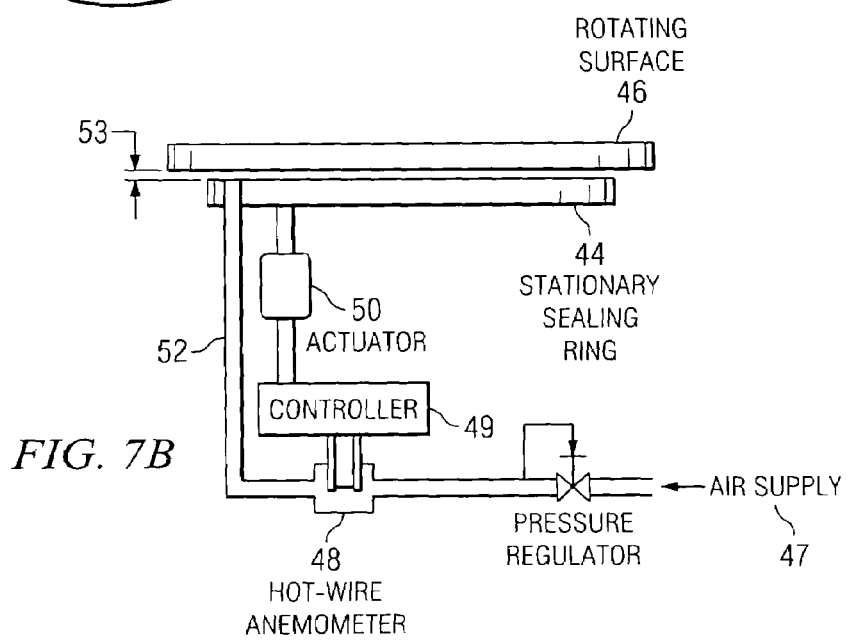

FIG. 7 illustrates an actuation system 45 that may be associated with sealing ring 44 according to one embodiment of the present invention. In the illustrated embodiment, actuation system 45 includes sealing ring 44, an air supply source 47, a hot wire anemometer 48, a controller 49, and an actuator 50.

Sealing ring 44 may be any suitable shape and formed from any suitable material; however, in one embodiment, sealing ring 44 is generally a circular seal formed from metal. Sealing ring 44 has a plurality of apertures 51 formed therein. Any suitable number of apertures 51 may be utilized and they may be spaced around sealing ring 44 in any suitable manner. Apertures 51 are coupled to air supply 47 via any suitable conduit 52. Air supply source 47 is operable to deliver air or other suitable gas through conduit 52, through apertures 51, and into a gap 53 existing between sealing ring 44 and a rotating surface 46, which in this case may be considered to be an end of outer gerotor 4a. In order to control gap 53, hot wire anemometer 48, which may be any suitable flow-measurement device, measures the rate of air being delivered into gap 53. Hot wire anemometer 48 is coupled to controller 49 and sends the measured rate to controller 49 so that controller 49 may control actuator 50 in order to translate sealing ring 44 either toward or away from rotating surface 46. Controller 49 may any suitable controller operable to energize actuator 50 and actuator 50 may be any suitable actuator operable to translate sealing ring 44. It is preferable that gap 53 be relatively small to minimize any leakage of oil or other lubricant into the gas being either compressed or expanded. Actuation system 45 is only one example of an actuation system that may be utilized to control gap 53. The present invention contemplates other actuation systems that are suitable to control gap 53.

Figure 8A:
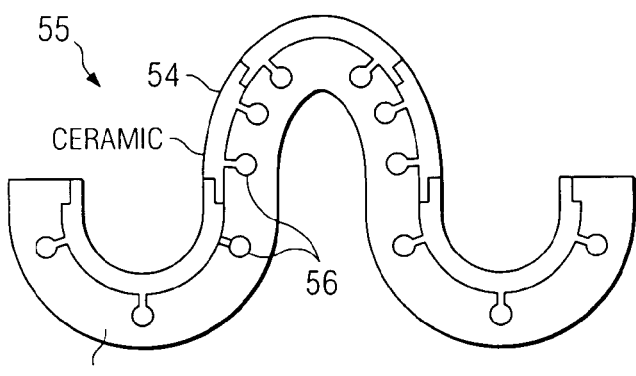
FIG. 8A shows a ceramic coating on the outer surface of gerotor teeth according to one embodiment of the invention.

It may also be important to control the gaps between the teeth of inner gerotor 6a and the inner surface of outer gerotor 4a. FIG. 8A illustrates one embodiment of a ceramic coating 54 applied to the outer surface of a tooth 55 of inner gerotor 6a. Materials other than ceramic having low coefficients of thermal expansion may also be utilized on the teeth of inner gerotor 6a. A low coefficient of thermal expansion is considered to be no more than approximately $2 \times 10^{-6}$ m/(m·K). Ceramic coating 54 may be coupled to the teeth of inner gerotor in any suitable manner. An illustrated embodiment, ceramic coating 54 is held in place by knobs 56. In addition, the ceramic coating 54 may also be segmented (as illustrated) to allow for different thermal expansion of coating 54 and the material used for inner gerotor 6a.

Figure 8B:
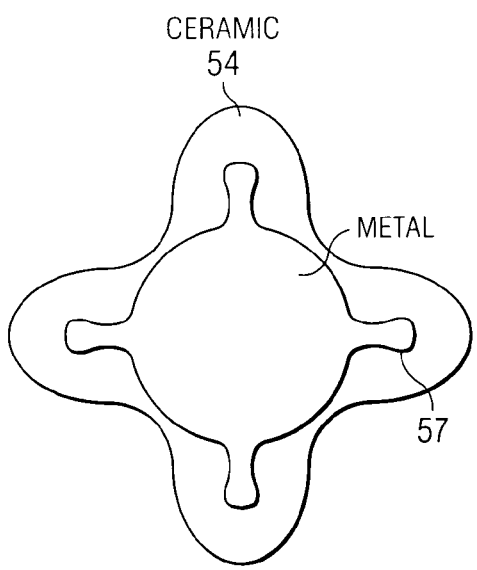
FIG. 8B shows a different embodiment for attaching a ceramic coating to gerotor teeth formed from metal.

FIG. 8B shows a different embodiment for attaching a ceramic coating 54 to the teeth of inner gerotor 6a. In this embodiment, the ceramic coating 54 forms the shape of the teeth while the bulk of inner gerotor 6a has protrusions 57 thereon that couple ceramic coating 54 thereto. In other embodiments, the entire inner gerotor 6a may be formed from a ceramic material or other suitable material having a low coefficient of thermal expansion.

Figure 9:
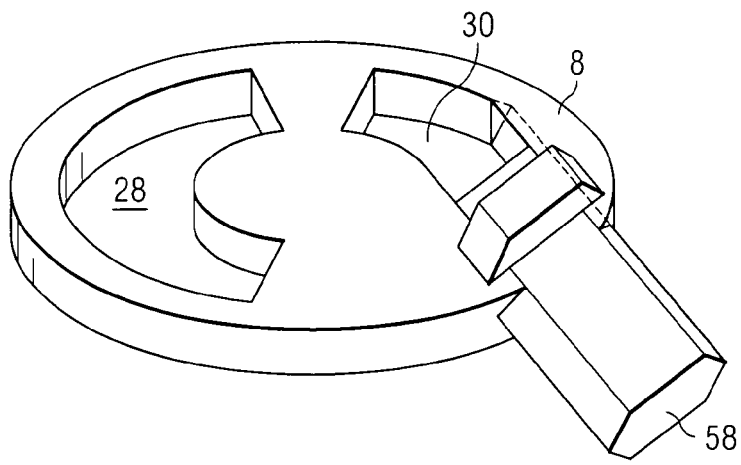
FIG. 9 illustrates a system for controlling the compression ratio of a gerotor compressor using a slider on the face plate according to one embodiment of the invention.
Figure 9:
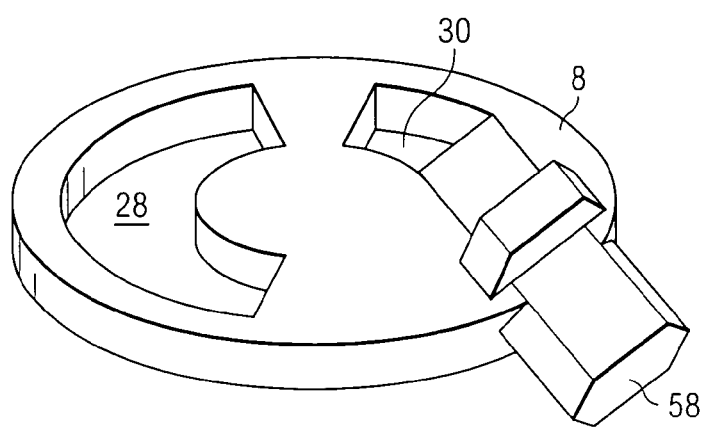

FIG. 9 illustrates a system for controlling the compression ratio of gerotor apparatus 1a using a compression control element 58 with valve plate 8 according to one embodiment of the present invention. As illustrated in FIG. 9, a compression control element 58 is associated with gas outlet 30 of valve plate 8. Also illustrated is gas inlet 28 of valve plate 8. As described above in conjunction with FIGS. 3 through 5, air or other suitable gas enters gerotor apparatus 1a through gas inlet 28 and eventually exits out of gerotor apparatus 1a through gas outlet 30. The shape and size of gas inlet 28 and gas outlet 30 may be formed in valve plate 8 in order to optimize the efficiency and operation of gerotor apparatus 1a. However, in the illustrated embodiment, the shape and size of gas outlet 30 may be changed by compression control element 58. For example, compression control element 58 may be slidably engaged with valve plate 8 in any suitable manner. This allows compression control element 58 to control the compression ratio of gerotor apparatus 1a based on its position within gas outlet 30. As illustrated in the upper figure, gas outlet 30 has a greater area than gas outlet 30 in the lower figure, which means that the gas exiting gerotor apparatus 1a through gas outlet 30 in the lower figure is compressed more than the gas flowing out of gerotor apparatus 1a in the upper figure.

Figure 10:
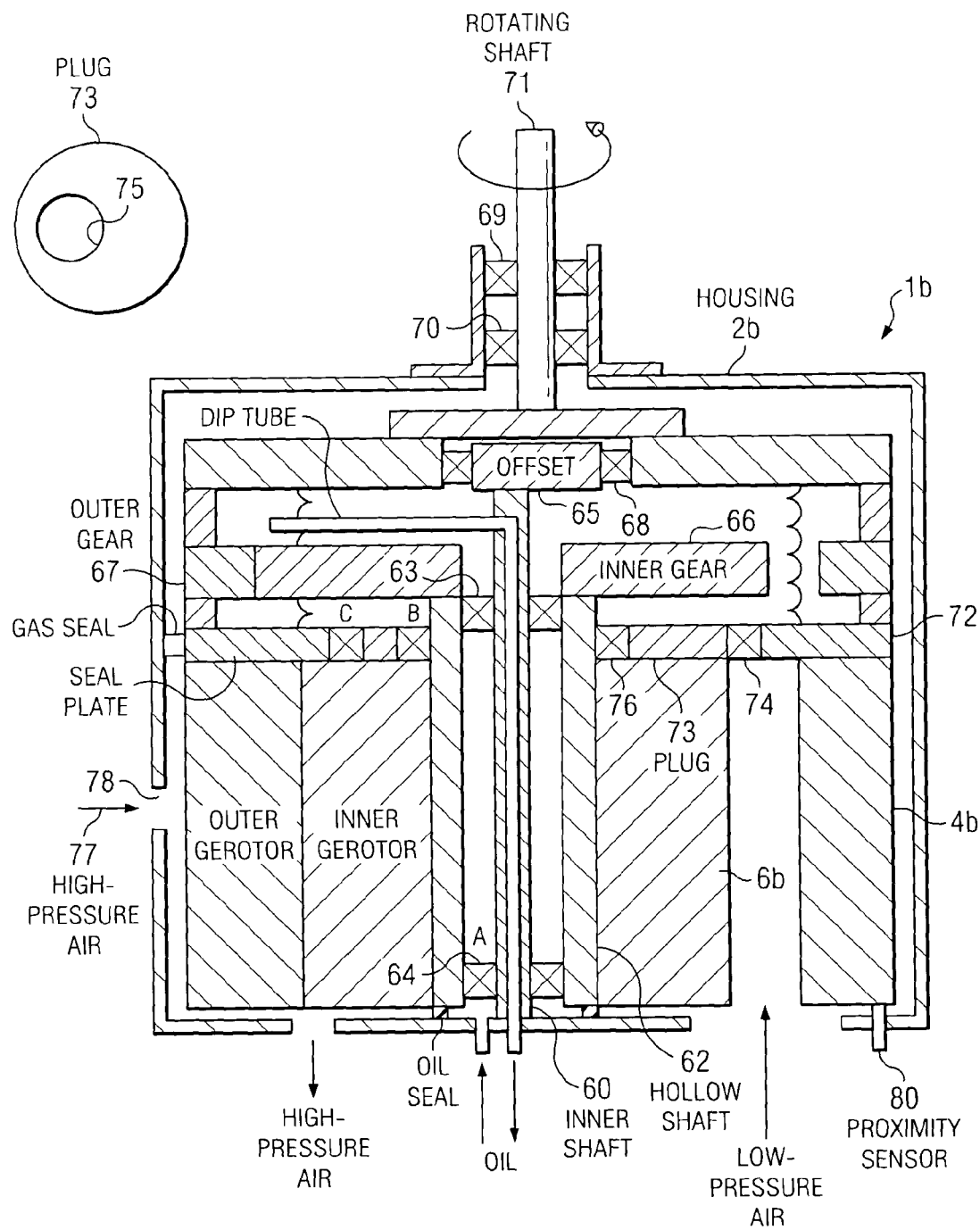
FIGS. 10 through 46 illustrate various embodiments of a gerotor apparatus of a quasi-isothermal Brayton cycle engine.

FIGS. 10 through 15 illustrate various embodiments of a gerotor apparatus 1b. With reference to FIG. 10, gerotor apparatus 1b includes a housing 2b, an outer gerotor 4b disposed within housing 2b, and an inner gerotor 6b disposed within outer gerotor 4b. Gerotor apparatus 1b also includes an inner shaft 60 rigidly coupled at a first end to housing 2b, a hollow shaft 62 rotatably coupled to inner shaft 60 via bearings 63 and 64, and an offset support plate 65 coupled to a second end of inner shaft 60. Inner gerotor 6b is rigidly coupled to hollow shaft 62 and an inner gear 66 is rigidly coupled to an end of hollow shaft 62. Inner gear 66 meshes with an outer gear 67 that is coupled to outer gerotor 4b. Outer gerotor 4b is rotatably coupled to offset support plate 65 via a bearing 68 and also rotatably coupled to an end of housing 2b via bearings 69 and 70 through a rotating shaft 71. Generally, when rotating shaft 71 rotates, it rotates outer gerotor 4b, which rotates inner gerotor 6b via gears 66 and 67.

A seal plate 72 is also coupled to outer gerotor 4b. Seal plate 72 has a concentrically located circular hole formed therein. A seal plug 73 is positioned within the hole formed in seal plate 72 by means of a bearing 74. Seal plug 73 has an eccentrically located circular hole 75 formed therein. Hole 75 is concentric with hollow shaft 62. Seal plug 73 also rotatably couples to hollow shaft 62 via a bearing 76. In the illustrated embodiment, both bearings 74 and 76 used for rotatably mounting seal plug 73 are "soft mounted," meaning they are mounted to seal plate 72 and hollow shaft 62 in a manner that is compliant in the radial direction but rigid in the axial direction. This prevents, among other things, excessive forces from being applied to bearings 74 and 76 due to misalignment. Seal plug 73 along with bearings 74 and 76 also provide additional support for outer gerotor 4b to reduce some of the "cantilevering" effect.

Because outer gerotor 4*b* is mounted in a cantilevered manner, bearings 69 and 70 may be subject to very high loads, which may shorten their life. To minimize this effect, bearings 69 and 70 may be substantially unloaded by applying a high pressure gas to a portion of the outer surface of outer gerotor 4*b*. Any suitable pressurized air source 77 may be utilized and the pressurized air enters housing 2*b* via any suitable port 78 formed in a perimeter of housing 2*b*. The loads on bearings 69 and 70 result from radial forces coming from the portion of outer gerotor 4*b* that has high-pressure gases acting on its inner surface. These loads may be substantially reduced by applying high-pressure air 77 into a portion of the outside surface of outer gerotor 4*b* that opposes the high pressure gas on the inside of outer gerotor 4*b*. A natural source of this natural gas 77 would be the high pressure gas produced by the compressor. This ensures that the two counteracting pressures are substantially the same during transient.

Gas leakage from high pressure regions to low pressure regions in gerotor apparatus 1*b* may be reduced by carefully controlling gaps between various components. Gaps may change from two actions: centrifugal forces and thermal growth. Centrifugal forces affect only in the radial direction, so they affect leakage through gaps at the gerotor tips. This may be minimized by using hole patterns in inner gerotor 6*b* and outer gerotor 4*b* that make each component equally compliant so they both expand together. Thermal growth may be regulated by ensuring that inner gerotor 6*b* and outer gerotor 4*b* are substantially the same temperature. The working surfaces of inner gerotor 6*b* and outer gerotor 4*b* experience substantially the same temperatures from the working gases. The outer surfaces of outer gerotor 4*b* is cooled by housing 2*b* and the inner surface of inner gerotor 6*b* is cooled by the flowing lubricating oil. By controlling the oil temperature the temperatures of the two components may be matched. A proximity sensor 80 may be located on housing 2*b* to measure the gap between outer gerotor 4*b* and the inside surface of housing 2*b*. Oil temperature may then be controlled as needed to regulate this gap. Proximity sensor 80 may provide feedback to any suitable controller to allow the controller to set a desired temperature for the lubricating oil.

Another way of controlling gas leakage from high pressure regions to low pressure regions in gerotor apparatus 1*b*, especially past gerotor tips and faces, is to roughen the surfaces of one or more components of gerotor apparatus 1*b*. Any suitable roughening may be employed, such as dimpling the surfaces with small holes, sandblasting, or other suitable surface roughening techniques. This surface roughening may be applied to surfaces in contact with the gas, such as outer gerotor 4*b*, inner gerotor 6*b*, seal plate 72, seal plug 73, etc. The present invention contemplates that this surface roughening may apply to any of the embodiments of the gerotor apparatuses described in this detailed description.

Figure 11:
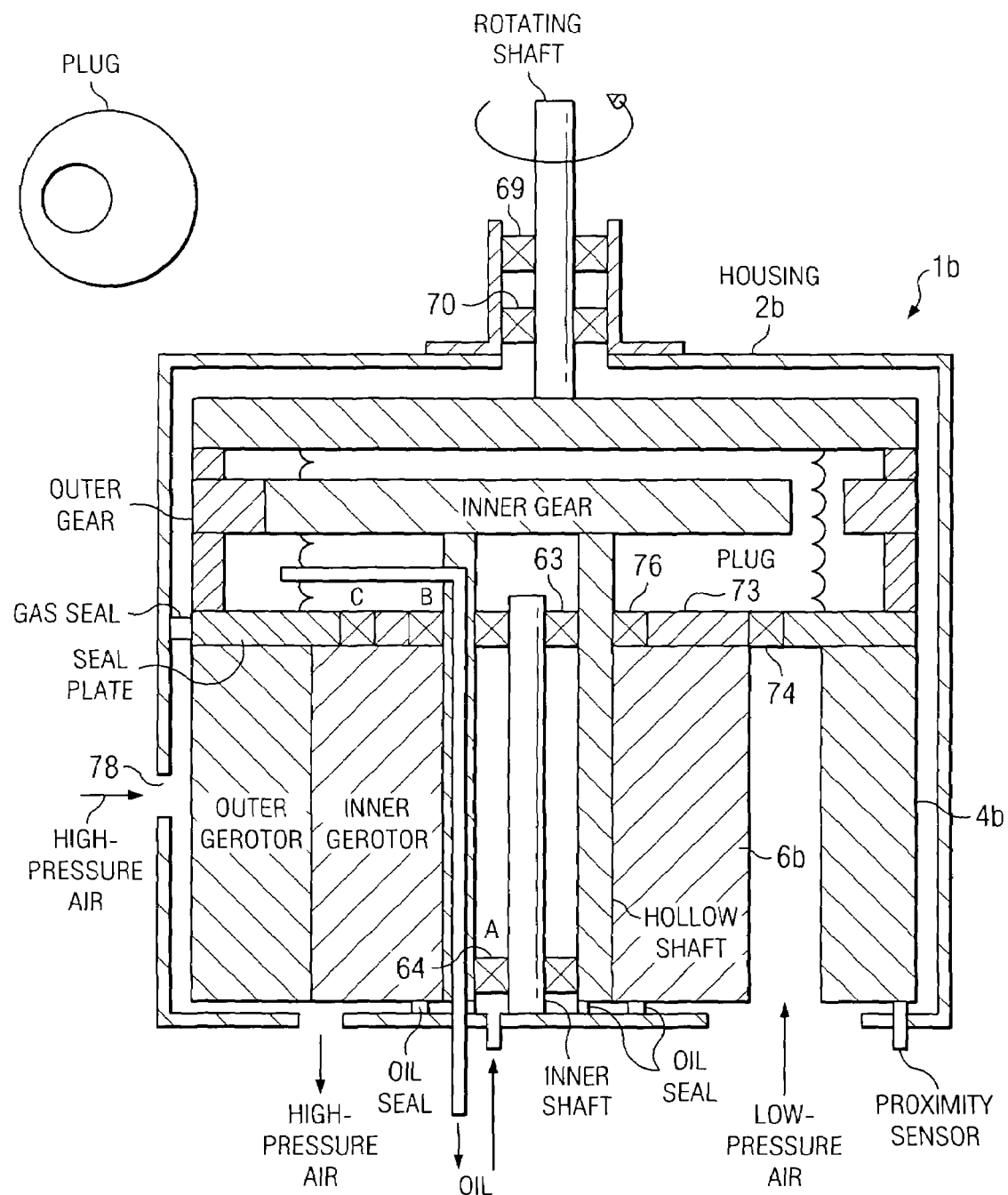

FIG. 11 illustrates another embodiment of gerotor apparatus 1*b* in which the offset support plate 65 is non-existent. In this embodiment, the end of inner shaft 60 that was previously supported by offset support plate 65 is now supported by bearings 74 and 76 of seal plug 73. In one embodiment, bearing 63 is substantially in the same plane as bearings 74 and 76, to provide support to outer gerotor 4*b*.

Figure 12:
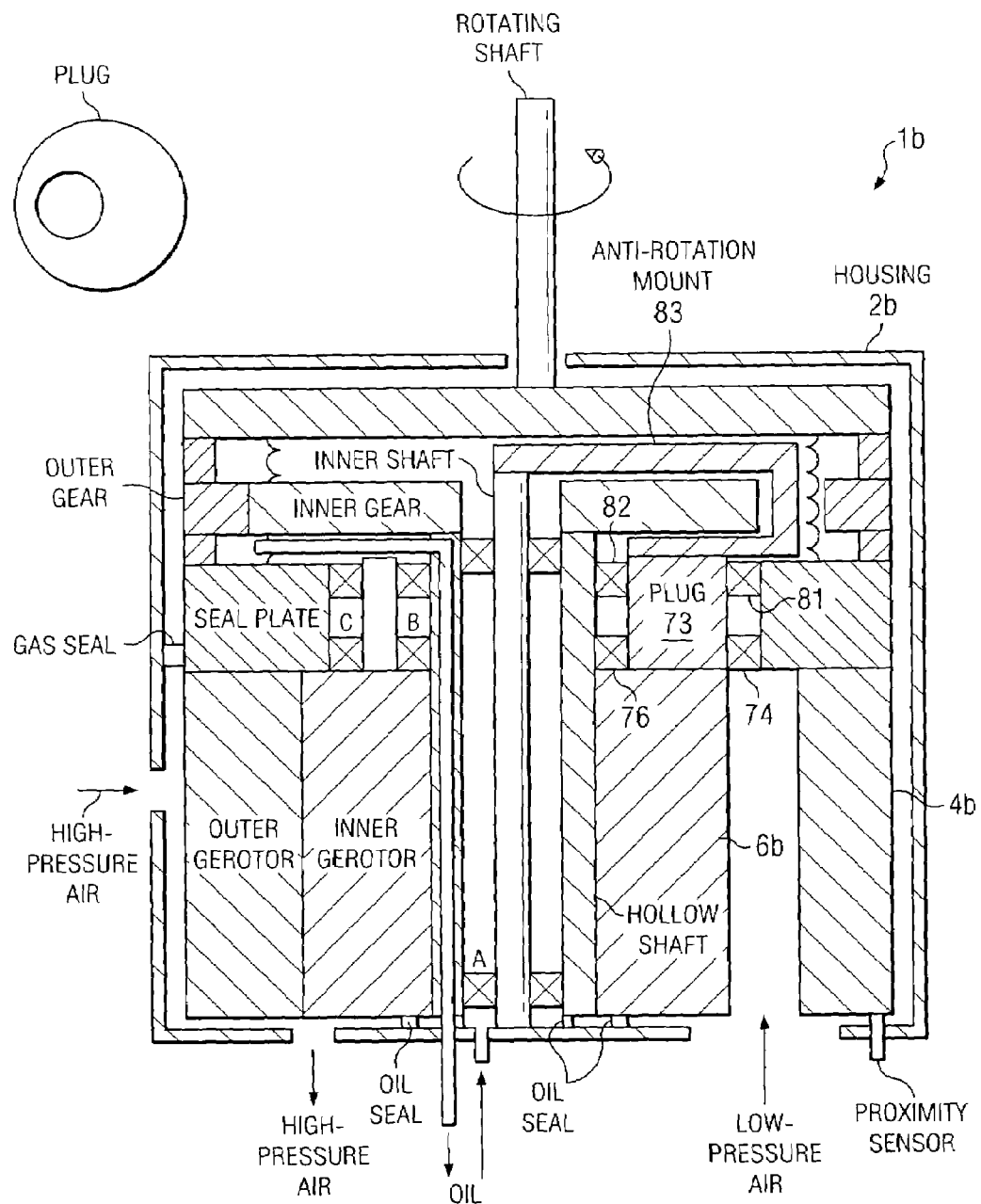

FIG. 12 illustrates another embodiment of gerotor apparatus 1*b*. This embodiment is substantially similar to the embodiment illustrated in FIG. 11; however, in the embodiment illustrated in FIG. 12 outer gerotor 4*b* is not rotatably coupled to the housing via bearings 69 and 70. Instead, outer gerotor 4*b* is supported by bearings 74 and 76 of seal plug 73. In addition, there is no support for outer gerotor 4*b* at the top of housing 2*b*. Therefore, seal plug 73 includes additional bearings 81 and 82. This embodiment requires that both seal plate 72 and seal plug 73 be thicker than the previous embodiments illustrated in FIGS. 10 and 11. To provide additional stability for outer gerotor 4*b*, inner shaft 60 is coupled to seal plug 73 via an anti-rotation mount 83. Anti-rotation mount 83 may any suitable configuration in order to carry out its function of coupling inner shaft 60 to seal plug 73.

Figure 13:
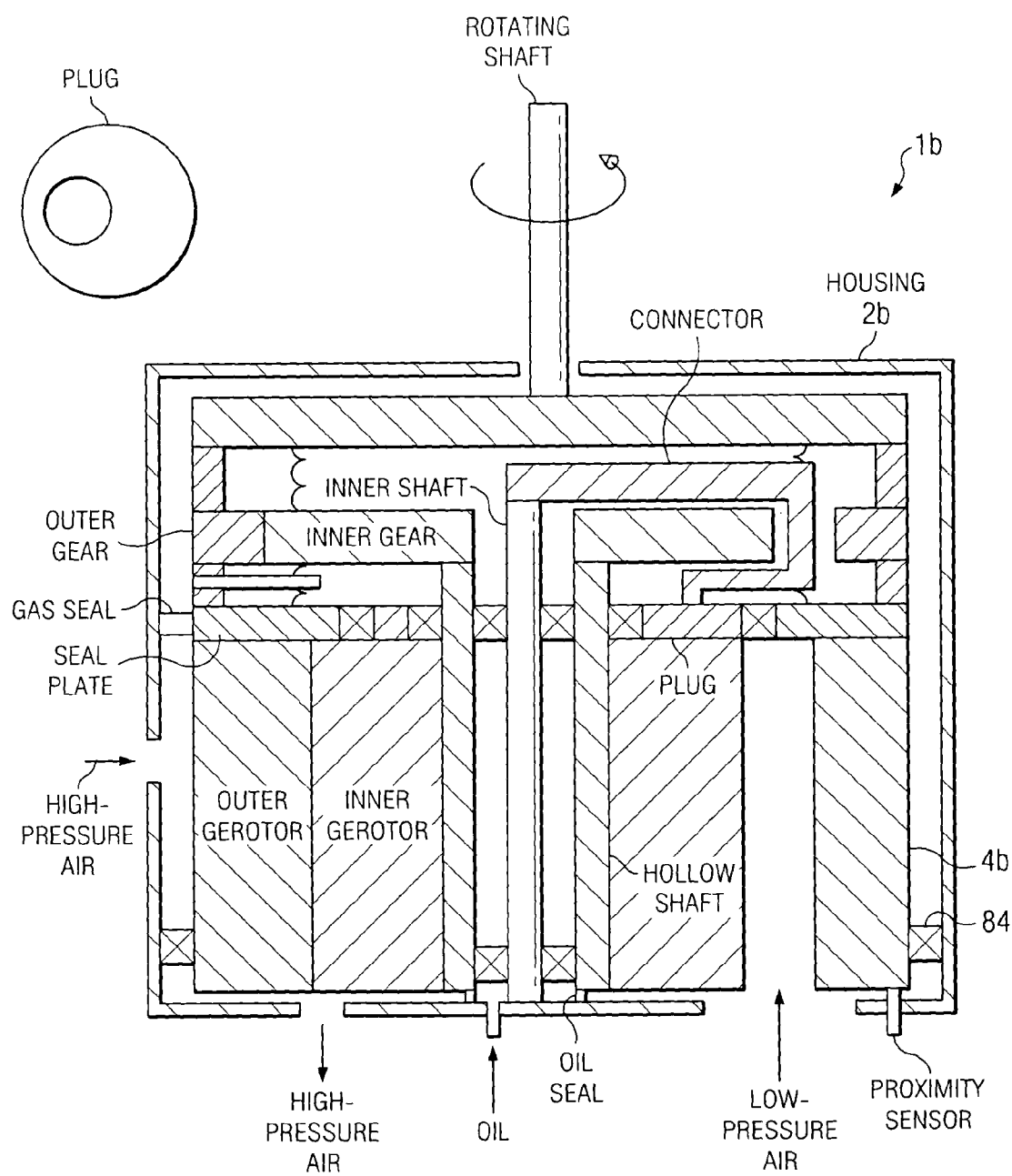

FIG. 13 illustrates another embodiment of gerotor apparatus 1*b*. The embodiment illustrated in FIG. 13 is substantially similar to the embodiment illustrated in FIG. 12; however, the embodiment illustrated in FIG. 13 does away with seal plug bearings 81 and 82 and instead uses a large diameter bearing 84 disposed around an outer perimeter of the end of outer gerotor 4*b*.

Figure 14:
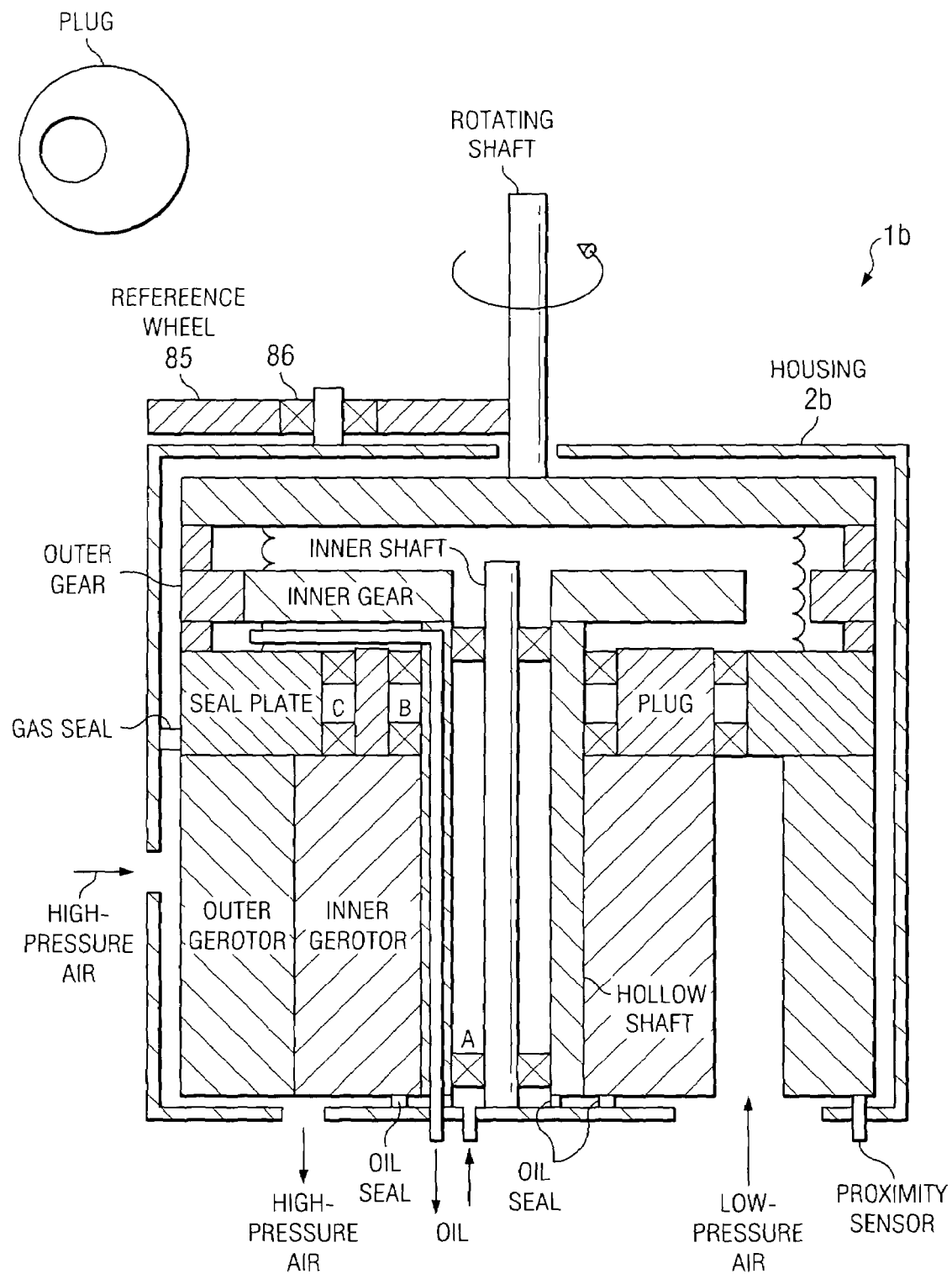

FIG. 14 illustrates another embodiment of gerotor apparatus 1*b*. The embodiment illustrated in FIG. 14 is substantially similar to the embodiment illustrated in FIG. 12; however, anti-rotation mount 83 does not exist in the embodiment of FIG. 14. Instead, a reference wheel 85 prevents rotation of seal plug 73. Reference wheel 85 is rotatably mounted to housing 2*b* with a bearing 86. An outer periphery of reference wheel 85 engages rotating shaft 71 that is coupled to outer gerotor 4*b*. Making the diameter of reference wheel 85 large relative to the shaft diameter slows the rotation rate of reference wheel 85, thereby extending its life.

Figure 15:
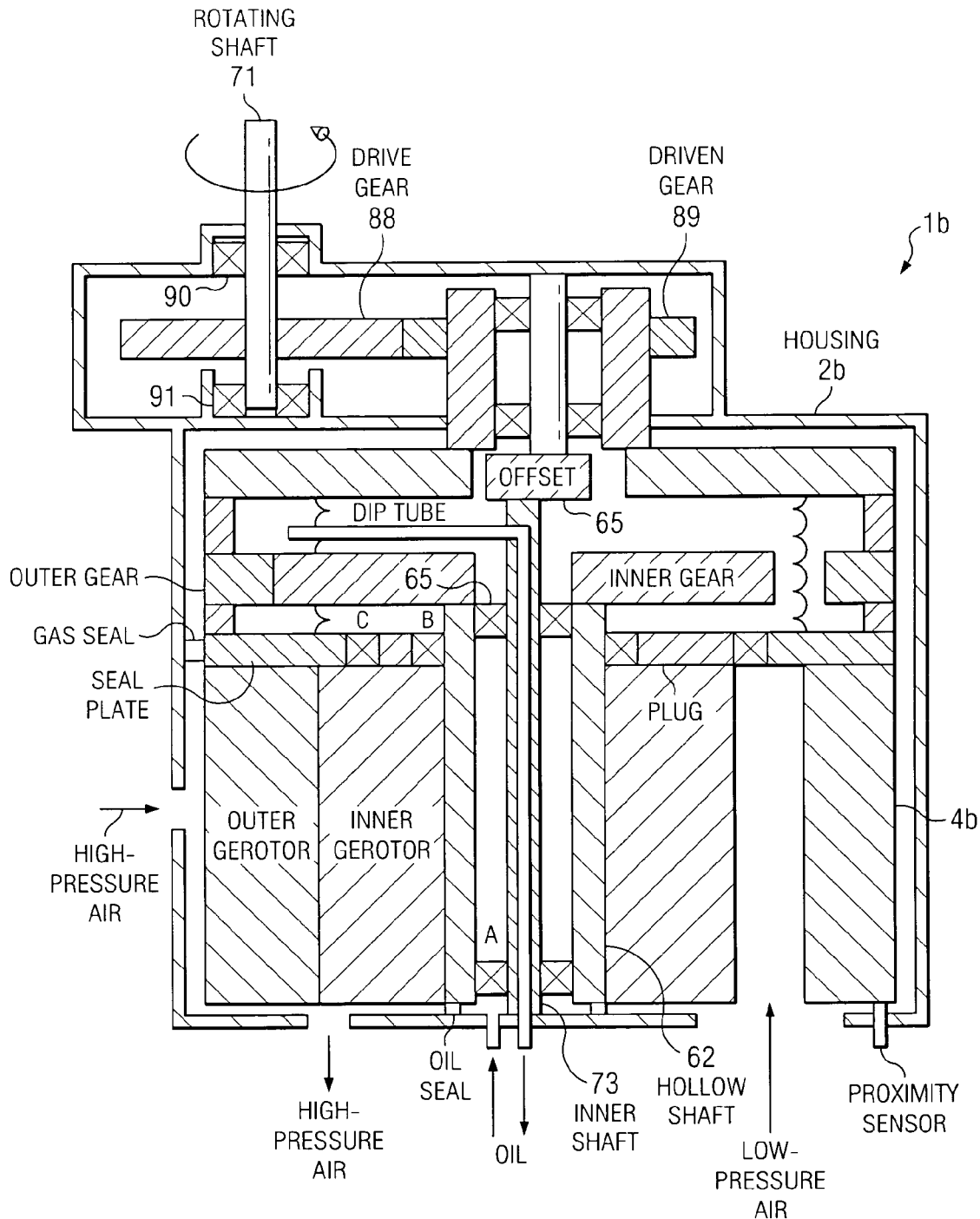

FIG. 15 illustrates another embodiment of gerotor apparatus 1*b*. In this embodiment, inner shaft 60 is rigidly coupled to both ends of housing 2*b* by using an offset support plate 65 similar to the one used in the embodiment of FIG. 10. Accordingly, rotating shaft 71 is off-center and in order to rotate outer gerotor 4*b* rotating shaft 71 includes a drive gear 88 that couples to a driven gear 89 that couples to outer gerotor 4*b*. Rotating shaft 71 is rotatably coupled to housing 2*b* via bearing 90 and 91.

Figure 16:
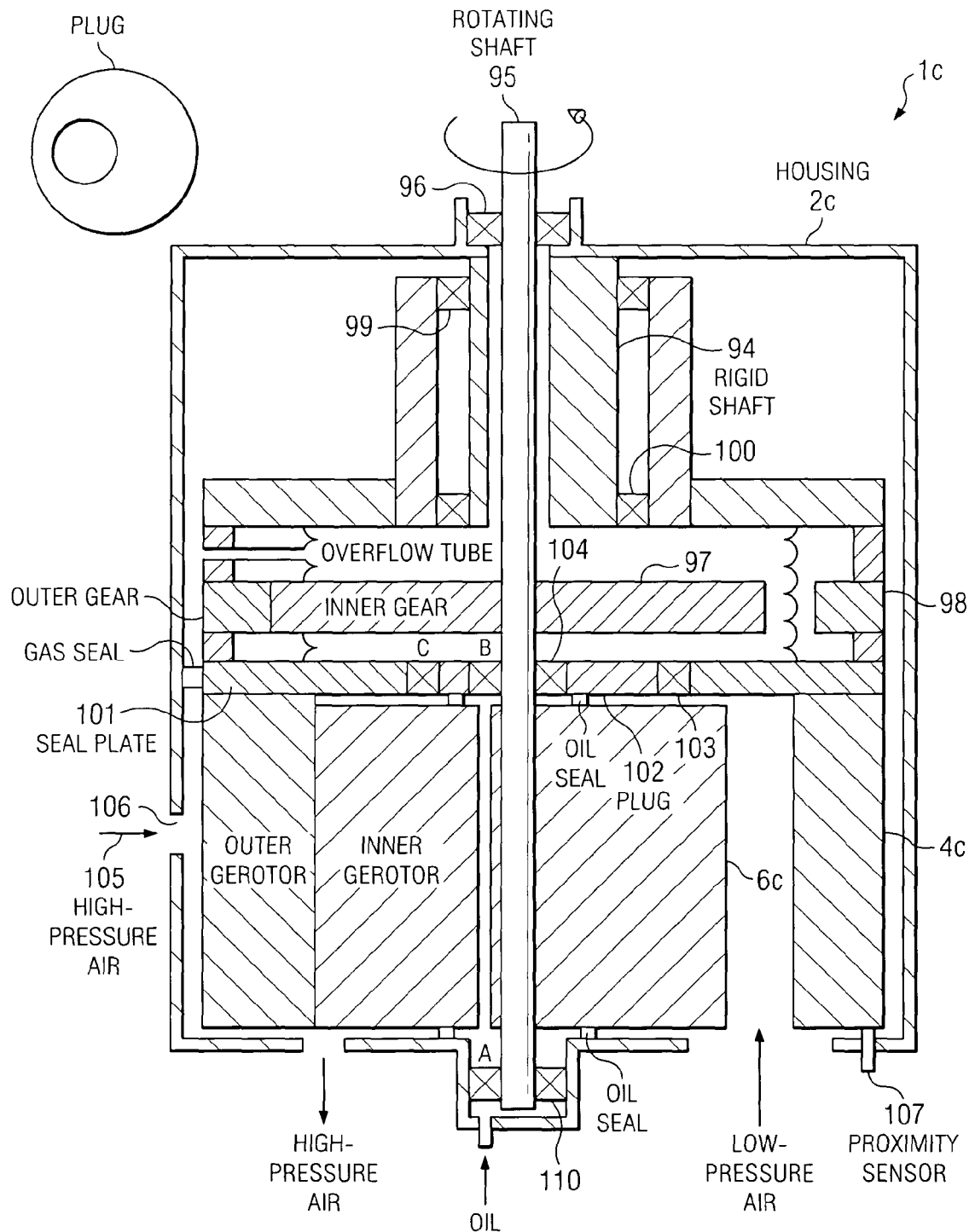

FIGS. 16 through 20 illustrate various embodiments of a gerotor apparatus 1*c*. As illustrated in FIG. 16, gerotor apparatus 1*c* includes a housing 2*c*, an outer gerotor 4*c* disposed within housing 2*c*, and an inner gerotor 6*c* disposed within outer gerotor 4*c*. Gerotor apparatus 1*c* also includes a hollow shaft 94 rigidly coupled to housing 2*c*, and an inner shaft 95 disposed within hollow shaft 94 and rotatably coupled to each end of housing 2*c* by a pair bearings 96 and 110. Inner gerotor 6*c* is rigidly coupled to inner shaft 95 and an inner gear 97 is also coupled to inner shaft 95. Inner gear 97 meshes with an outer gear 98 that is rigidly coupled to outer gerotor 4*c*. Outer gerotor 4*c* is rotatably coupled to hollow shaft 94 via a pair of bearings 99 and 100. Similar to gerotor apparatus 1*b* of FIGS. 10 through 15, outer gerotor 4*c* also includes a seal plate 101 coupled thereto and a seal plug 102 disposed in a hole in seal plate 101 by bearings 103 and 104.

In general, in this embodiment, inner shaft 95 rotates, which rotates inner gerotor 6*c* in addition to inner gear 97, which rotates outer gear 98 and outer gerotor 4*c*. Gerotor apparatus 1*c* may also have a pressurized air source 105 coupled to a perimeter of housing 2*c* that is operable to deliver pressurized air through a port 106 and into housing 2*c* to supply a force to at least a portion of an outside perimeter of outer gerotor 4*c*. Gerotor apparatus may also have a proximity sensor 107 that functions in a similar manner as proximity sensor 80 of gerotor apparatus 1*b*, as described above.

Figure 17:
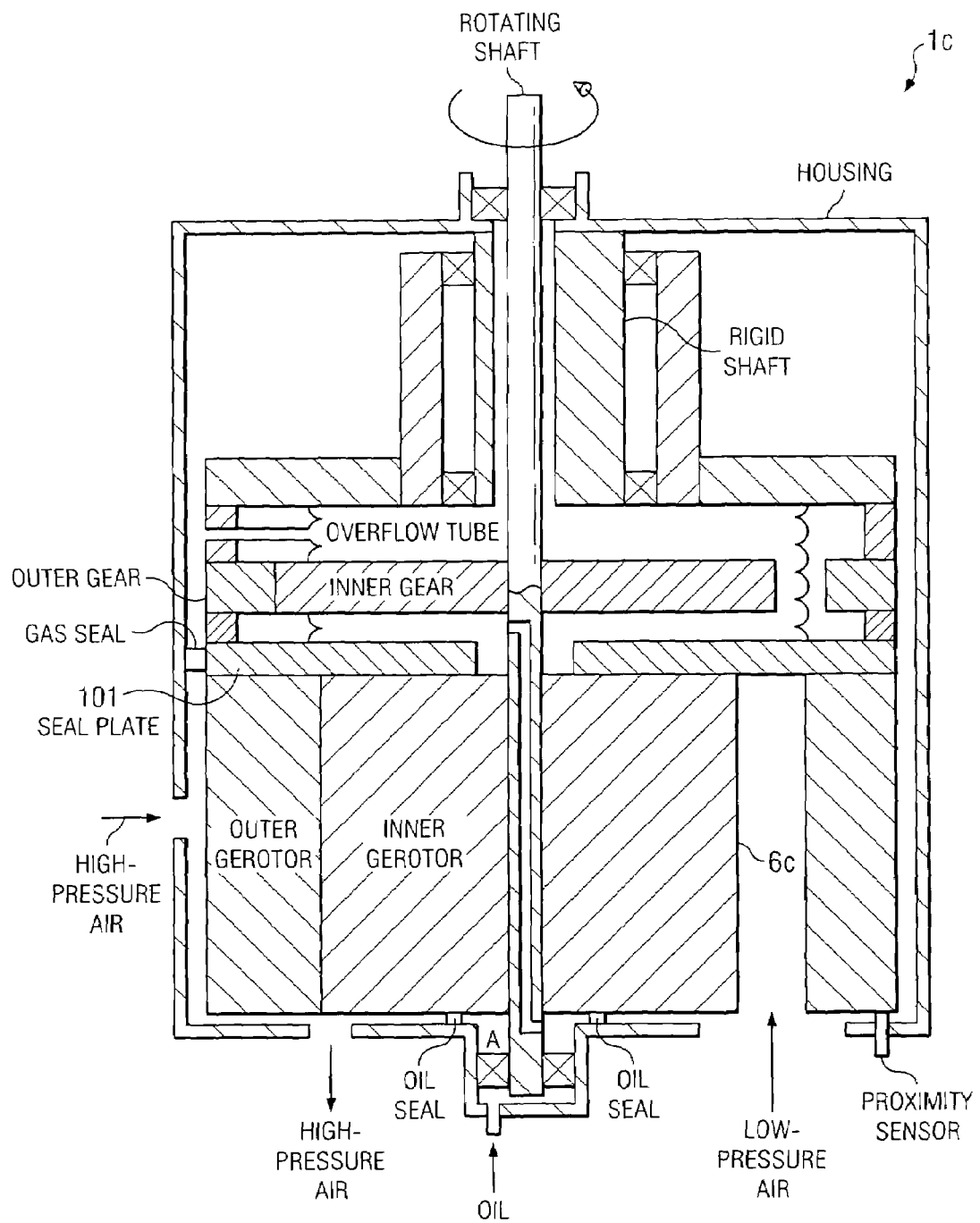

FIG. 17 illustrates another embodiment of gerotor apparatus 1c. This embodiment is substantially similar to the embodiment illustrated in FIG. 16; however, in the embodiment illustrated in FIG. 17 seal plug 102 and corresponding bearing 103 and 104 do not exist. In this case, sealing is accomplished simply by maintaining a small gap between inner gerotor 6c and seal plate 101.

Figure 18:
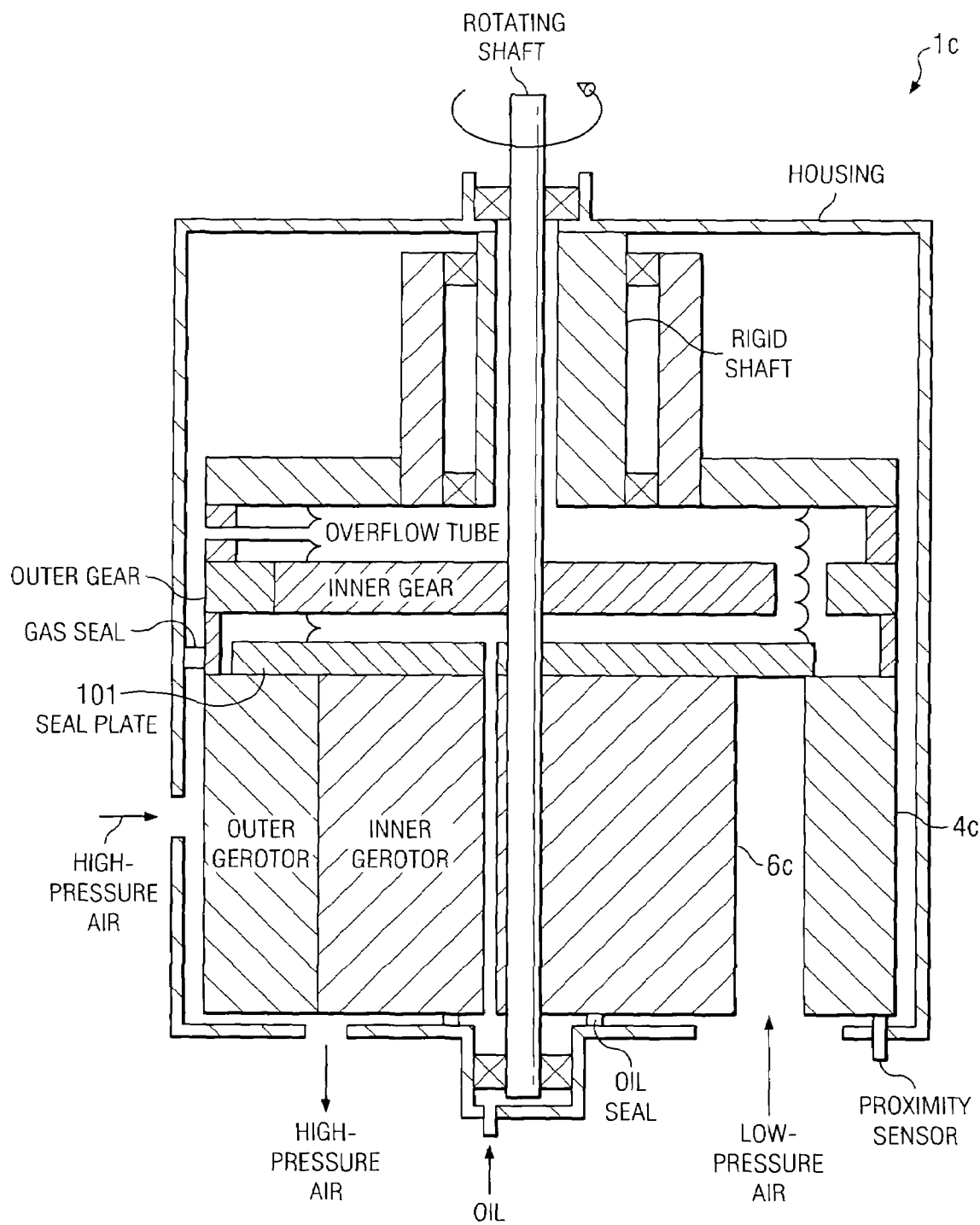

FIG. 18 illustrates another embodiment of gerotor apparatus 1c. This embodiment is substantially similar to the embodiment illustrated in FIG. 17; however, in the embodiment illustrated in FIG. 18 seal plate 101 is coupled to inner gerotor 6c instead of outer gerotor 4c. In this case, sealing is accomplished simply by maintaining a small gap between outer gerotor 4c and seal plate 101.

Figure 19:
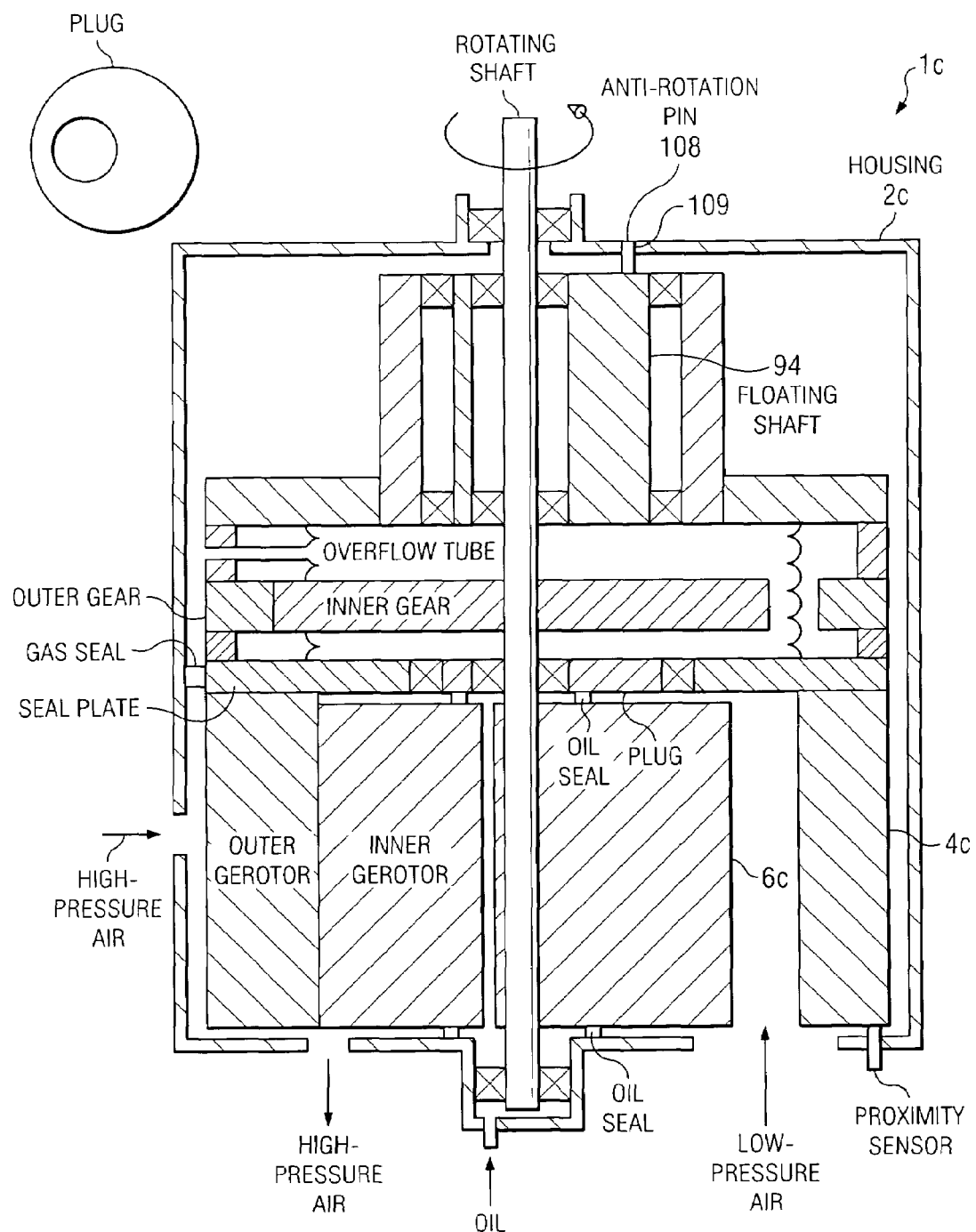

FIG. 19 illustrates another embodiment of gerotor apparatus 1c. This embodiment is substantially similar to the embodiment illustrated in FIG. 16; however, in the embodiment illustrated in FIG. 19 embodiment, hollow shaft 94 is coupled to housing 2c with anti-rotation pin 108 instead of being rigidly coupled to housing 2c as in FIG. 16. Anti-rotation pin 108 facilitates a "floating" arrangement for hollow shaft 94. In other words, housing 94 has a small amount of movement in both the axial and radial directions; however, hollow shaft 94 is prevented from rotating by anti-rotation pin 108 that fits within an aperture 109 in housing 2c. This allows hollow shaft 94 to be referenced to inner shaft 94 rather than housing 2c, which reduces the precision requirements of housing 2c.

Figure 20:
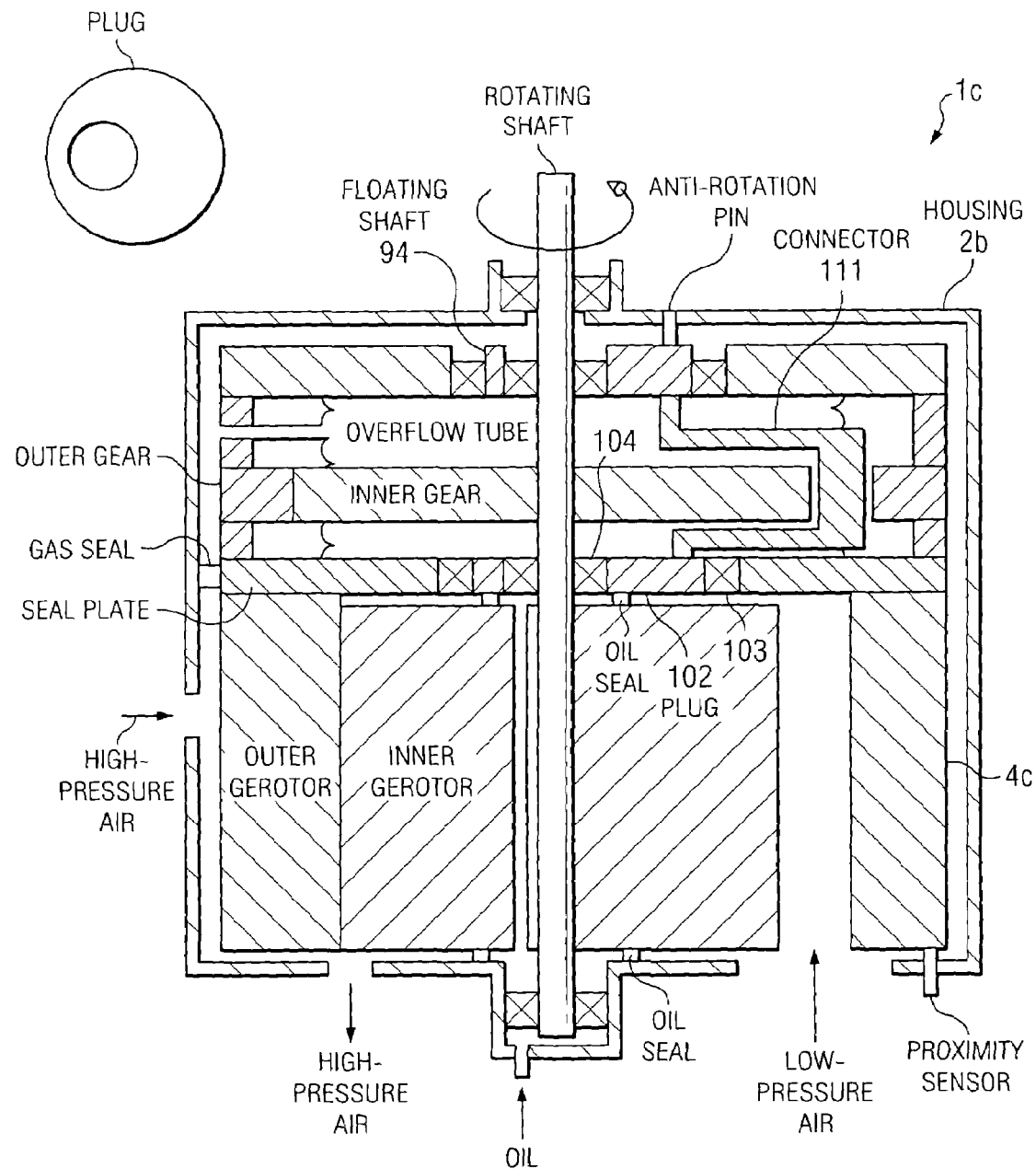

FIG. 20 illustrates another embodiment of gerotor apparatus of 1c. This embodiment is substantially similar to the embodiment illustrated in FIG. 19; however, in the embodiment illustrated in FIG. 20 gerotor apparatus 1c is a more compact design in which hollow shaft 94 is much shorter than in previous embodiments. And hollow shaft 94 is also coupled to seal plug 102 via a connector 111. Because connector 111 couples hollow shaft 94 and seal plug 102, plug bearings 103 and 104 are "hard mounted" in this embodiment in order to support outer gerotor 4c, thereby facilitating the shortening of the length of gerotor apparatus 1c.

Figure 21:
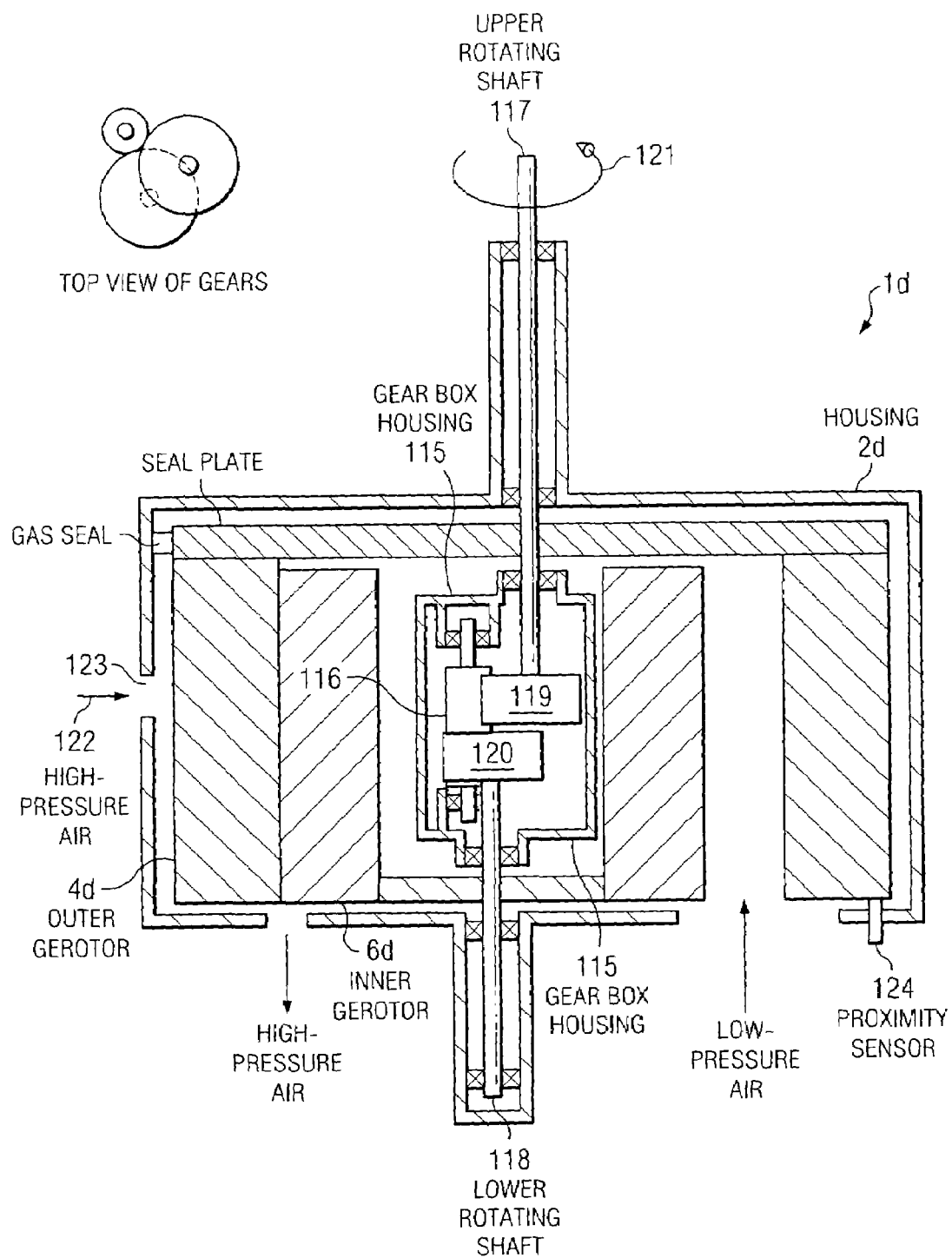

FIGS. 21 through 24 illustrate various embodiments of a gerotor apparatus 1d. Referring to FIG. 21, gerotor apparatus 1d includes a housing 2d, an outer gerotor 4d disposed within housing 2d, and an inner gerotor 6d disposed within outer gerotor 4d. Gerotor apparatus 1d also includes a gear housing 115 disposed within inner gerotor 6d. Gear housing 115 houses an idler gear 116 that is operable to synchronize a rotation of outer gerotor 4d with a rotation of inner gerotor 6d, as described below.

Outer gerotor 4d is rigidly coupled to an upper shaft 117, which is rotatably coupled to housing 2d and inner gerotor 6d is rigidly coupled to a lower shaft 118 that is rotatably coupled to housing 2d. Upper shaft 117 has a gear 119 coupled at an end thereof that is disposed within gear housing 115 and lower shaft 118 includes a gear 120 that is also disposed within gear housing 115. Both gear 119 and gear 120 are coupled to idler gear 116. Therefore, a rotation of upper shaft 117 as denoted by arrow 121 rotates gear 119, which rotates idler gear 116, which rotates gear 120, which rotates lower shaft 118, which rotates inner gerotor 6d. The rotation of upper shaft 117 also rotates outer gerotor 4d. Idler gear 117 may be coupled to gear housing 115 in any suitable manner, such as by bearings. The gear ratio between gears 119 and 120 is suitably selected to give the proper relative rotation between inner gerotor 6d and outer gerotor 4d. An advantage of having gear housing 115 disposed within inner gerotor 60 is compactness.

Similar to previous gerotor apparatuses described above, gerotor apparatus 1d may also include a pressurized air source 122 coupled to a port 123 formed in a perimeter of housing 2d. Pressurized air source 122 is operable to deliver pressurized air through port 123 and into housing 2d to supply a force to at least a portion of an outside perimeter of outer gerotor 4d. In addition, gerotor apparatus 1d may also include a proximity sensor 124 that functions in the same manner as previous proximity sensors as described above.

Figure 22:
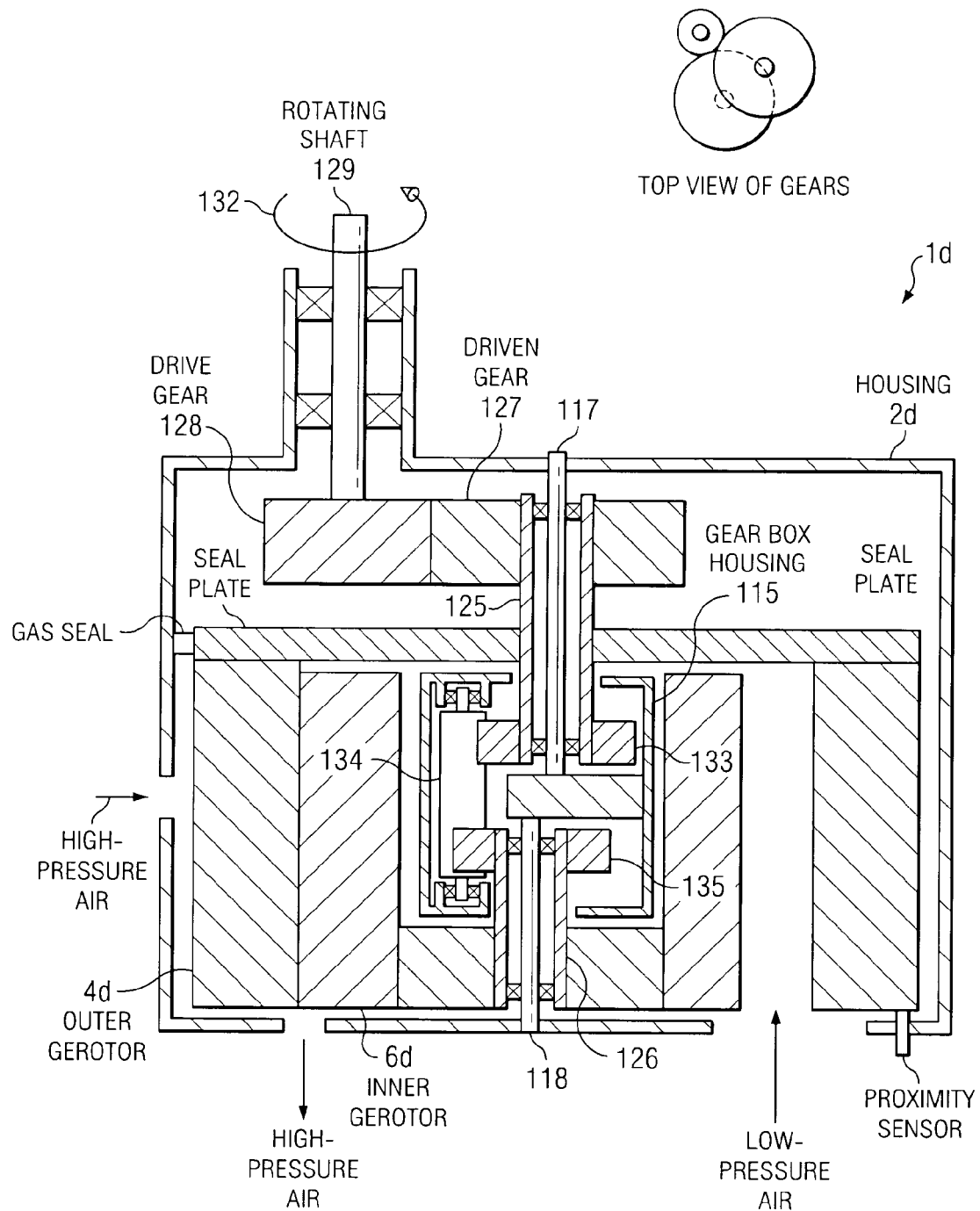

FIG. 22 illustrates another embodiment of gerotor apparatus of 1d. In this embodiment, upper shaft 117 and lower shaft 118 are rigidly coupled to housing 2d instead of rotatably coupled as in FIG. 21. In addition, upper shaft 117 and lower shaft 118 are both rigidly coupled to gear housing 115. In order to rotate both outer gerotor 4d and inner gerotor 6d, an upper hollow shaft 125 is rotatably coupled to upper shaft 117 and rigidly coupled to outer gerotor 4d, while a lower hollow shaft 126 is rotatably coupled to lower shaft 118 and rigidly coupled to inner gerotor 6d. In order to drive outer gerotor 4d, upper hollow shaft 125 includes a driven gear 127 that meshes with a drive gear 128 that is coupled to a rotating shaft 129. Rotating shaft 129 rotatably couples to housing 2d with bearings 130 and 131. Accordingly, the rotation of rotating shaft 129 as denoted by arrow 132 rotates drive gear 128, which rotates driven gear 127, which rotates upper hollow shaft 125, which rotates outer gerotor 4d. In addition, the rotation of upper hollow shaft 125 rotates a gear 133 disposed within gear housing 115 which rotates an idler gear 134 that is rotatably coupled to gear housing 115, which rotates a gear 135 that is rigidly coupled to lower housing shaft 126, thereby rotating inner gerotor 6d. An advantage of the embodiment illustrated in FIG. 22 is that housing 2d does not have to be made in a precise manner. The centers of rotation are established through the precision of shafts, which is relatively easy to achieve.

Figure 23:
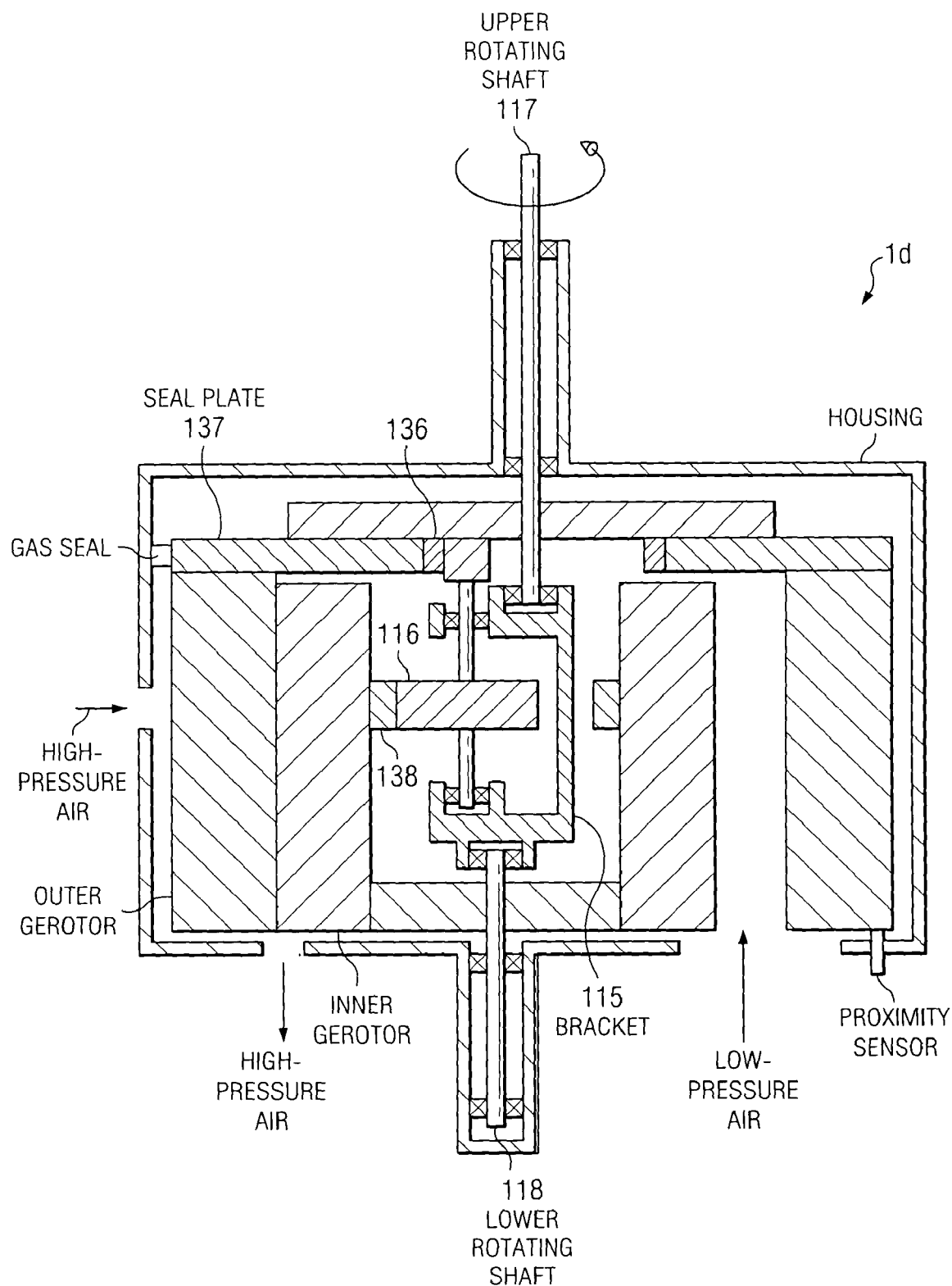

FIG. 23 illustrates another embodiment of gerotor apparatus of 1d. The embodiment illustrated in FIG. 23 is substantially similar to the embodiment illustrated in FIG. 21; however, in the embodiment in FIG. 23, neither upper shaft 117 nor lower shaft 118 have gears at their ends. Instead, idler gear 116 couples a gear 136 that is coupled to a seal plate 137 of outer gerotor 4d and a gear 138 that couples to inner gerotor 6d. Idler gear 116 is rotatably coupled to gear housing 115 in a similar manner and may be any suitable idler gear. Because there are two different centers of rotation on gear housing 115, gear housing 115 cannot rotate and is held stationary.

Figure 24:
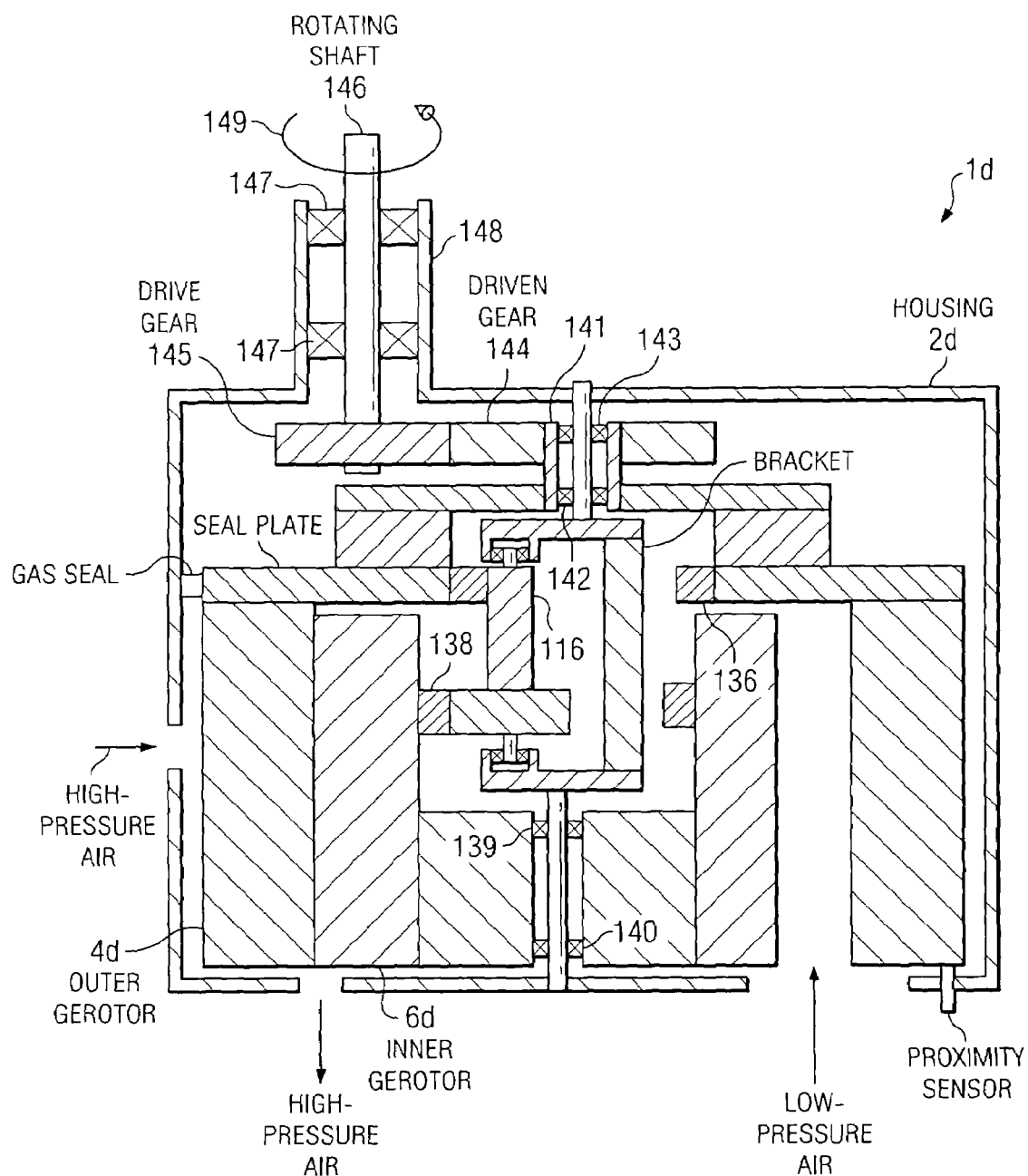

FIG. 24 illustrates another embodiment of gerotor apparatus 1d. The embodiment illustrated in FIG. 24 is similar to the embodiment illustrated in FIG. 23; however, in the embodiment in FIG. 24 both upper shaft 117 and lower shaft 118 are rigidly coupled to housing 2d instead of being rotatably coupled. In this case, inner gerotor 6d is rotatably coupled to lower shaft 118 via bearings 139 and 140 and outer gerotor 4d is rotatably coupled to upper shaft 117 with a hollow shaft 141 and pair of bearings 142 and 143. In addition, hollow shaft 141 has a driven gear 144 rigidly coupled thereto that meshes with a drive gear 145 that couples to rotating shaft 146, which is rotatably coupled with housing 2d with a pair of bearings 147 and 148. Thus, a rotation of rotating shaft 146 (as denoted by reference number 149) rotates drive gear 145, which drives driven gear 144, which rotates both hollow shaft 141 and outer gerotor 4d, which rotates outer gear 136, which rotates idler gear 116, which rotates inner gear 138, which then rotates inner gerotor 6d. An advantage of this embodiment is that housing 2d does not have to be made in a precise manner.

The centers of rotation are established through the precision of the shafts, which is relatively easy to achieve.

Figure 25:
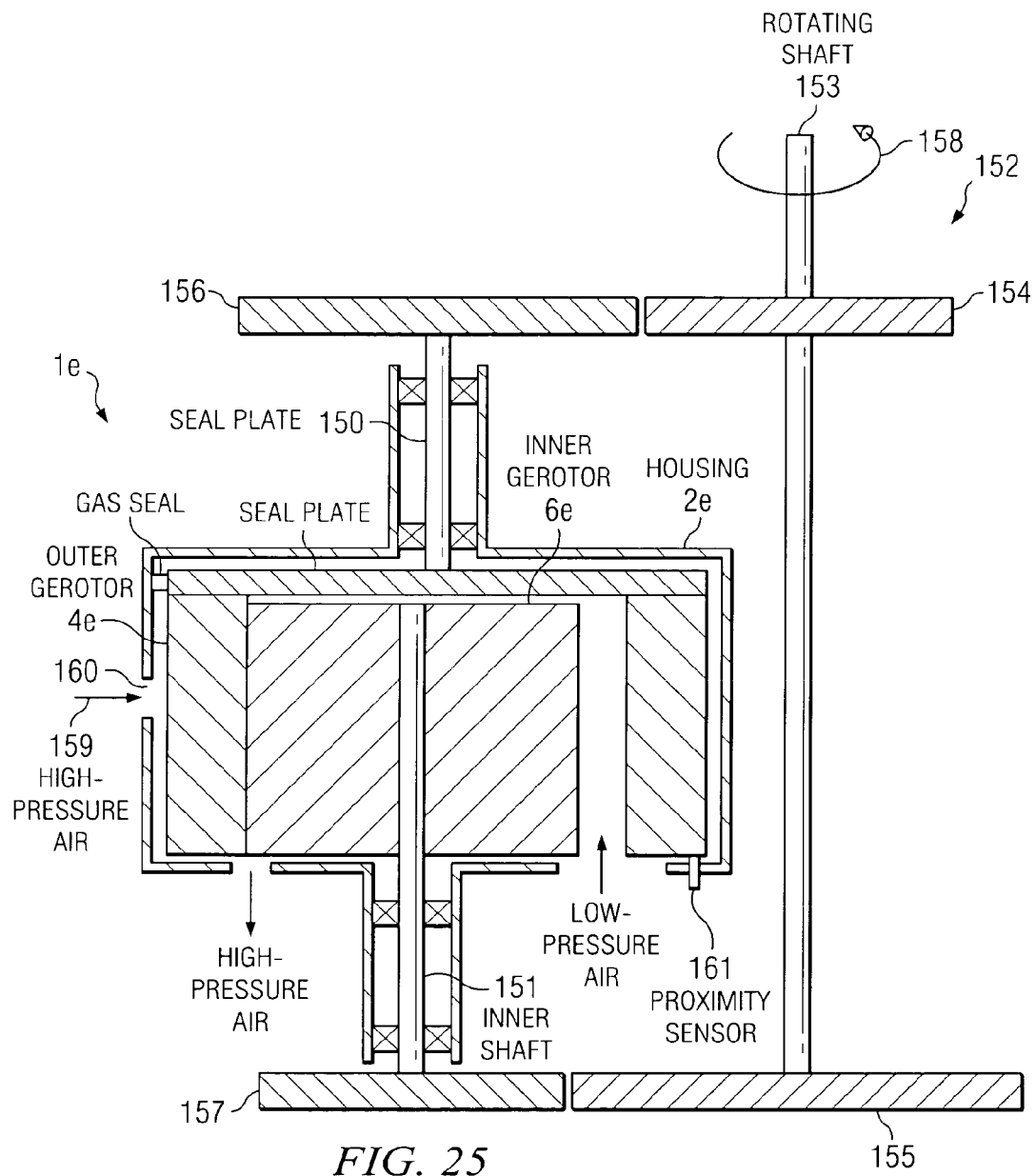

FIG. 25 illustrates an embodiment of a gerotor apparatus 1e. Gerotor 1e includes a housing 2e, an outer gerotor 4e disposed within housing 2e and an inner gerotor 6e disposed within outer gerotor 4e. Gerotor apparatus 1e also includes an upper shaft 150 that is rotatably coupled to housing 2e and an inner shaft 151 rotatably coupled to housing 2e. Shaft 150 is rigidly coupled to outer gerotor 4e and inner shaft 151 is rigidly coupled to inner gerotor 6e.

The rotation of both outer gerotor 4e and inner gerotor 6e is facilitated by an external gearing system 152 that includes a rotating shaft 153 having a first gear 154 and a second gear 155. First gear 154 meshes with and drives an upper gear 156 and second gear 155 meshes with and drives a lower gear 157. Upper gear 156 rigidly couples to upper shaft 150 while lower gear 157 rigidly couples to inner shaft 151, thereby providing the rotation of outer gerotor 4e and inner gerotor 6e, respectively. Hence, a rotation of shaft 153 as denoted by reference numeral 158 rotates both first and second gears 154 and 155. These rotations facilitate the rotation of upper gear 156 and lower gear 157, respectively, which rotates both outer gerotor 4e and inner gerotor 6e, respectively. As in previous gerotor apparatuses, gerotor apparatus 1e may also include a pressurized air source 159 coupled to a port 160 formed in a perimeter of housing 2e. Pressurized air source 159 is operable to deliver pressurized air through port 160 and into housing 2e. In addition, gerotor apparatus 1e may also include a proximity sensor 161 that functions in the same manner as previous proximity sensors described above. Alternatively, the input power could be delivered through shafts 150 or 151.

Figure 26:
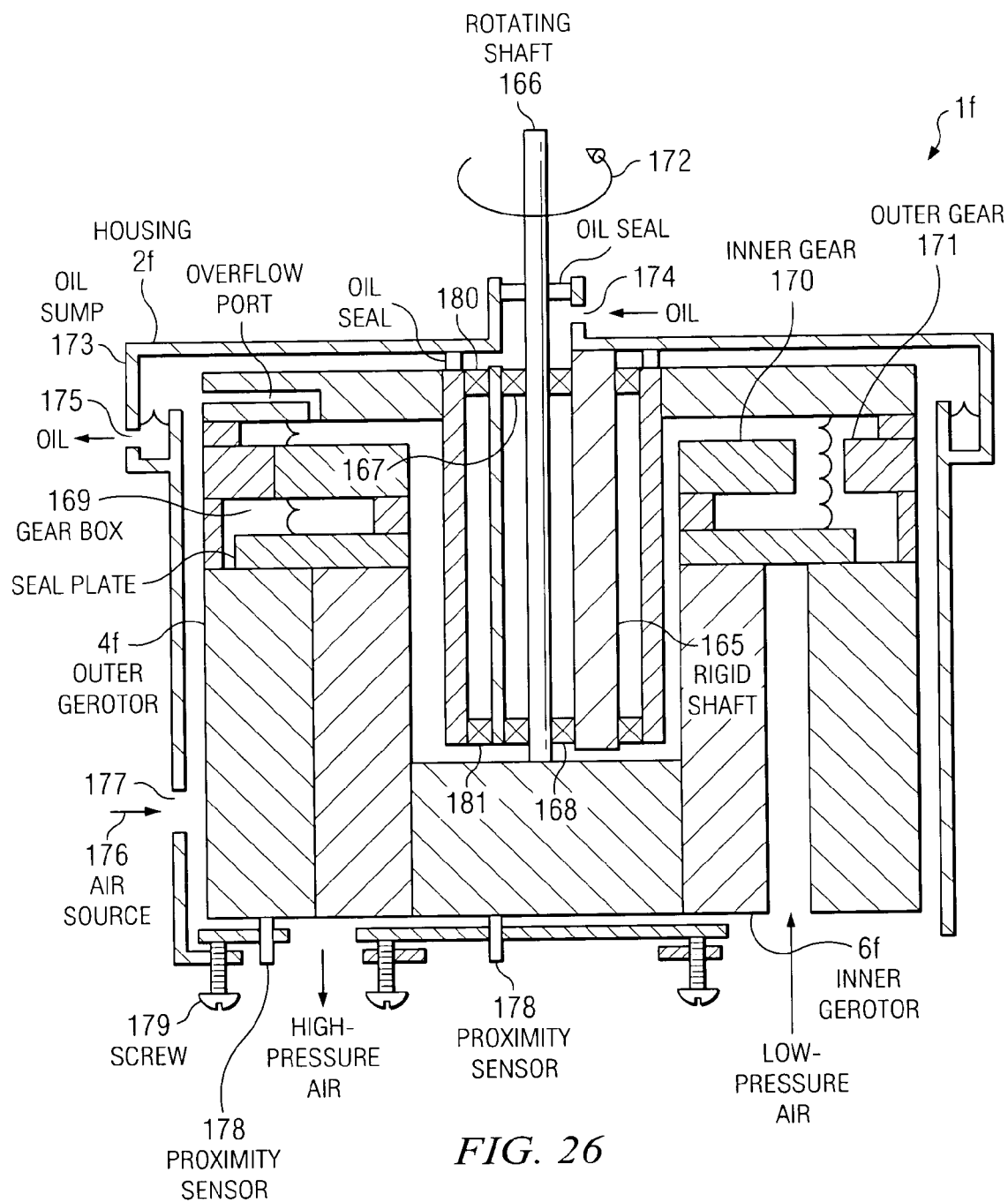
Figure 27:
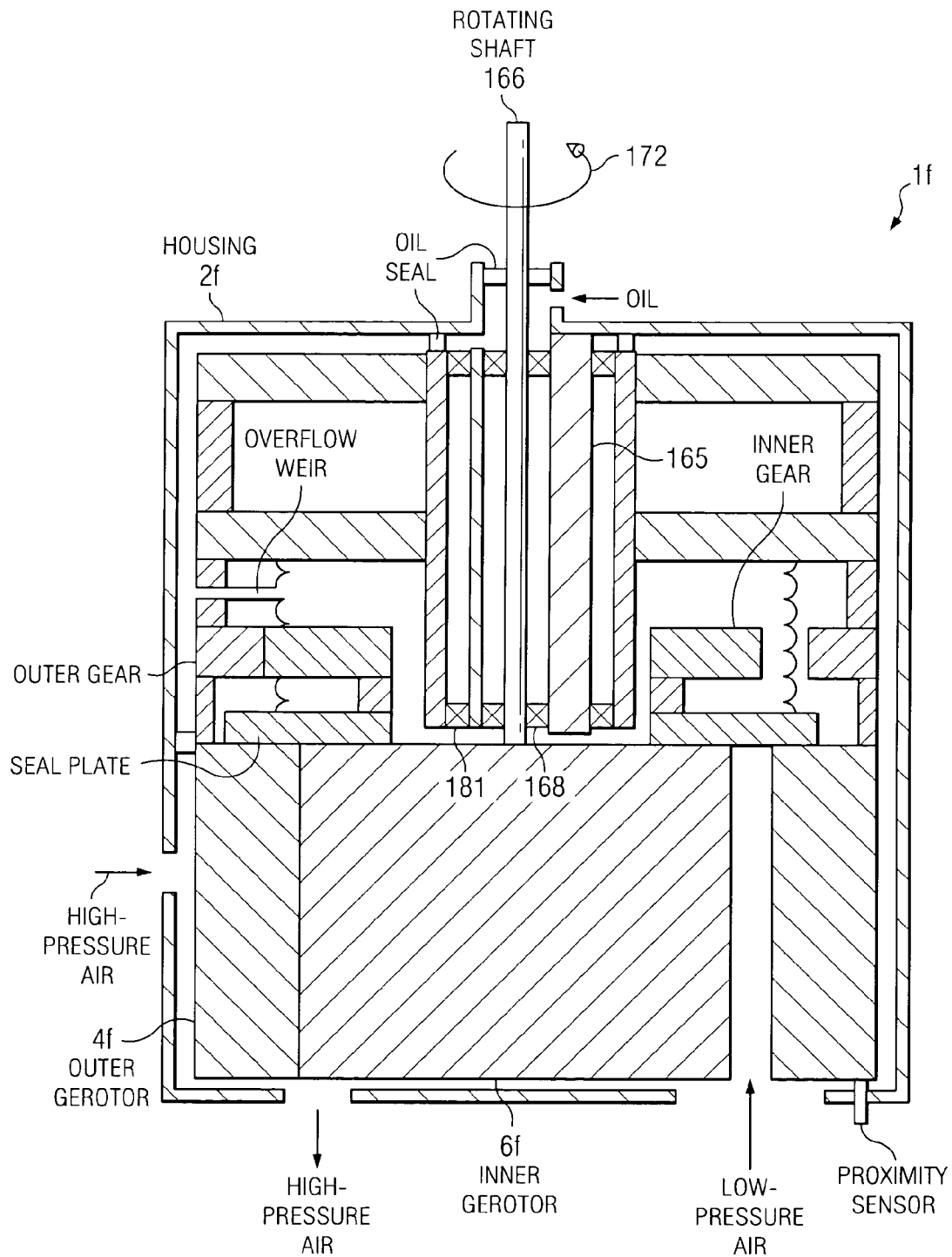
Figure 28:
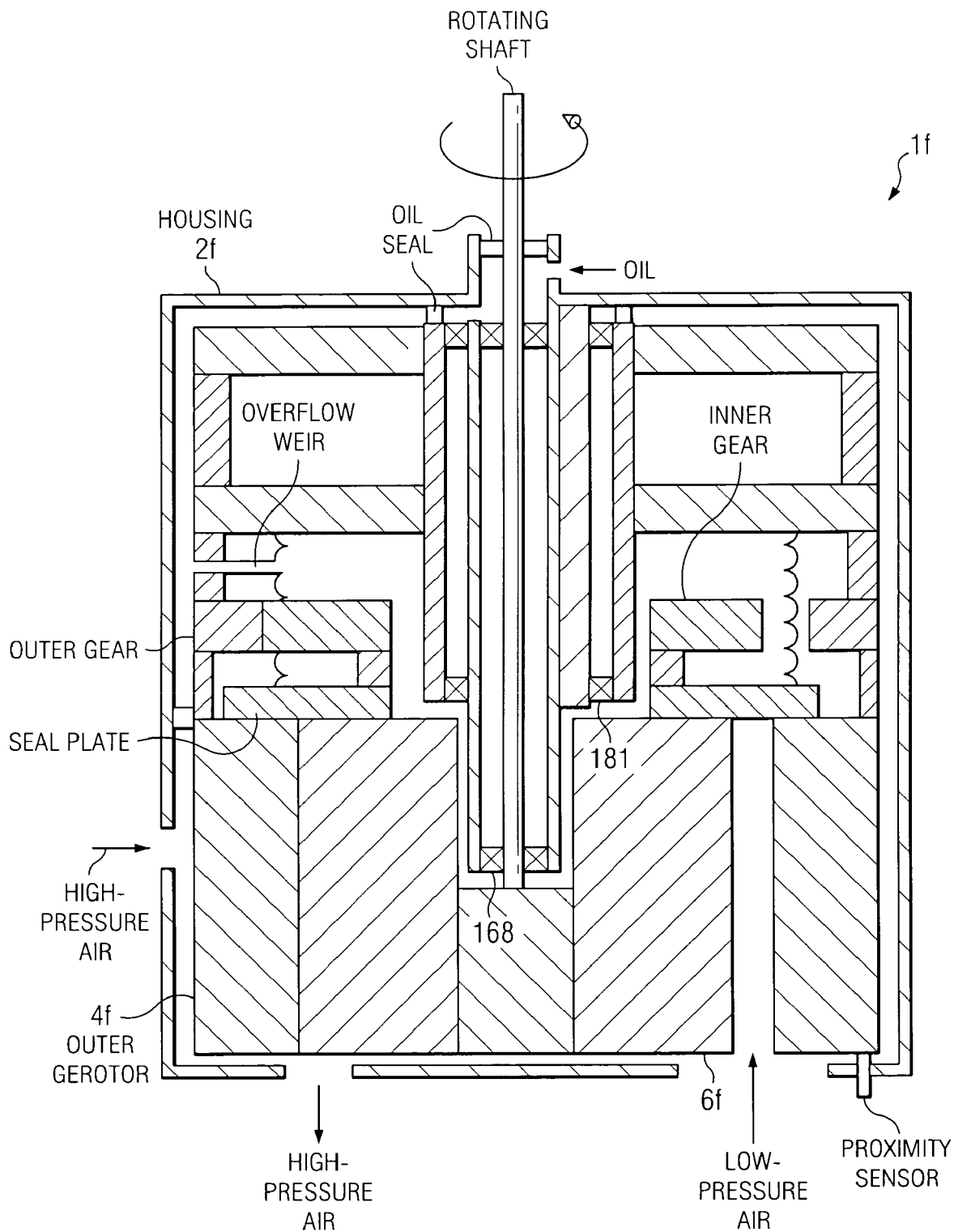
Figure 29:
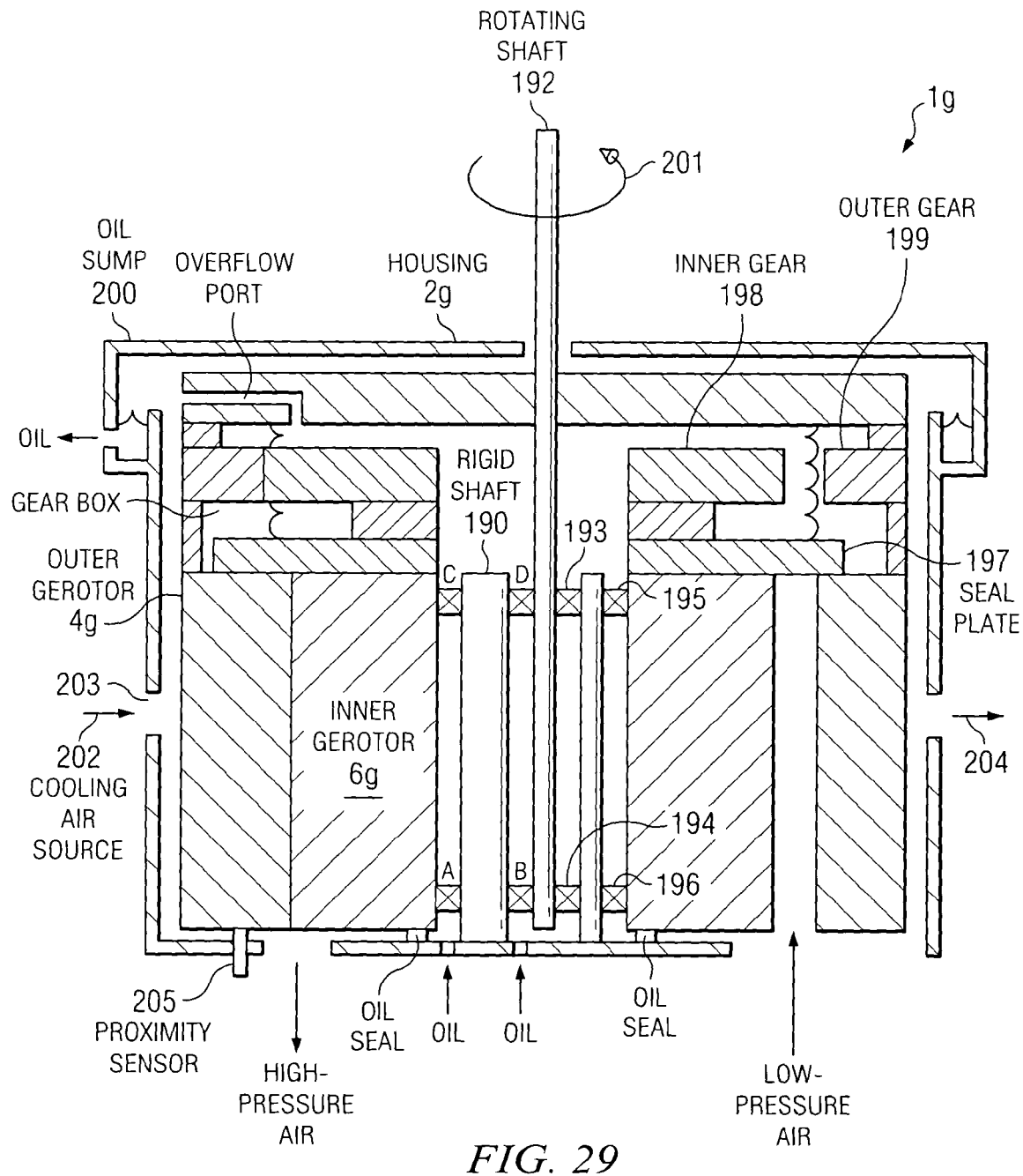

FIGS. 26 through 28 illustrate various embodiments of a gerotor apparatus 1f. Referring to FIG. 26, gerotor apparatus 1f includes a housing 2f, an outer gerotor 4f disposed within housing 2f, and an inner gerotor 6f disposed within outer gerotor 4f. In addition, gerotor 1f includes a hollow shaft 165 rigidly coupled to housing 2f, and an inner shaft 166 disposed within hollow shaft 165 and rotatably coupled to hollow shaft 165 with a bearing 167 and a bearing 168. Inner gerotor 6f is rigidly coupled to an end of inner shaft 166. Inner gerotor 6f includes a seal plate 169 coupled thereto and an inner gear 170 that meshes with an outer gear 171 that is rigidly coupled to outer gerotor 4f. Thus, rotation of inner shaft 166 as denoted by arrow 172 rotates inner gerotor 6f, which in turn rotates outer gerotor through the meshing of inner gear 170 and outer gear 171.

Also illustrates in FIG. 26 is an oil sump 173 coupled to housing 2f. Oil or other suitable lubricant enters through a port 174 in housing 2f to lubricate the bearings within housing 2f. Due to centrifugal force, the oil collects in oil sump 173 and exits an outlet port 175 formed in the perimeter of oil sump 173 and may be recycled to the bearings through a pump (not explicitly shown).

As in previous gerotor apparatuses, gerotor apparatus 1f may also include a pressurized air source 176 coupled to a port 177 formed in a perimeter of housing 2f. Pressurized air source 176 is operable to deliver pressurized air through port 177 and into housing 2f to supply a force to at least a portion of an outside perimeter of outer gerotor 4f. In addition, gerotor apparatus 1f may include a proximity sensor 178 that functions in the same manner as previous proximity sensors described above. A gap between an outer gerotor 4f and housing 2f may be adjusted using at least one screw 179 that is coupled to housing 2f. A similar approach may be taken to adjust a gap between inner gerotor 6f and housing 2f.

According to the embodiment illustrated in FIG. 26, bearings 168 and 181 are in a circumferential plane that is substantially the same as a circumferential plane passing through the axial centers of both inner gerotor 6f and outer gerotor 4f. This eliminates moments that could act on rigid shaft 165, inner shaft 166, and/or housing 2f to prevent their flexure. This facilitates tight tolerances to be maintained between inner gerotor 6f and outer gerotor 4f. Bearings 167 and 180 experience relatively negligible loads and basically provide alignment for inner gerotor 6f and outer gerotor 4f.

FIG. 27 illustrates another embodiment of gerotor apparatus 1f. The embodiment illustrated in FIG. 27 is essentially the same as the embodiment illustrated in FIG. 26; however, in the embodiment in FIG. 27 bearings 168 and 181 are no longer in the same circumferential plane as the axial centers of inner gerotor 6f and outer gerotor 4f. Instead they exist above inner gerotor 6f. Although an advantage of having bearings 168 and 181 in this location is that they do not experience temperatures based on the gas being compressed or expanded by gerotor apparatus 1f, additional moments acting on bearings 168 and 181 may cause hollow shaft 165, rotating shaft 166, and/or housing 2f to flex, which may open up a gap between inner gerotor 6f and outer gerotor 4f.

FIG. 28 illustrates an additional embodiment of gerotor apparatus 1f. The embodiment illustrated in FIG. 28 is essentially a hybrid of the embodiments illustrated in FIGS. 26 and 27 in that bearing 168 exists in a circumferential plane that is substantially the same as a circumferential plane passing through the axial centers of both inner gerotor 6f and outer gerotor 4f, but bearing 181 exists at a location above inner gerotor 6f. One advantage of this design is that it may be implemented with a small inner gerotor 6f.

FIGS. 29 through 33 illustrate various embodiments of a gerotor apparatus 1g. Gerotor apparatus 1g includes a housing 2g, an outer gerotor 4g disposed within housing 2g, and an inner gerotor 6g disposed within outer gerotor 4g. Gerotor apparatus 4g also includes a hollow shaft 190 rigidly coupled to housing 2f and an inner shaft 192 disposed within hollow shaft 190 and rotatably coupled thereto by a first bearing 193 and a second bearing 194. Inner gerotor 6g is rotatably coupled to hollow shaft 190 via a bearing 195 and a bearing 196. Inner gerotor 6g has a seal plate 197 attached thereto along with an inner gear 198. Inner gear 198 meshes with an outer gear 199 that rigidly couples to outer gerotor 4g. Similar to the embodiments illustrated in FIGS. 26 through 28, gerotor apparatus 1g also includes an oil sump 200 that functions to collect oil or other suitable lubricant circulated through gerotor apparatus 1g so that it may be recirculated and needed.

Generally, an inner shaft 192 is rotated as noted by arrow 201, which rotates outer gerotor 4g, which rotates outer gear 199, which rotates inner gear 198, which rotates inner gerotor 6g. According to an aspect of this embodiment, bearing 193 and 195 and bearings 194 and 196 are substantially equidistant from a circumferential plane passing through the axial centers of outer gerotor 4g and inner gerotor 6g. This eliminates moments that may act on hollow shaft 190, inner shaft 192, and/or housing 2g to prevent their flexure, which allows tight tolerances to be maintained between outer gerotor 4g and inner gerotor 6g. Because of the symmetry, each set of bearings takes approximately half the load.

Gerotor apparatus 1g may also include an air source 202 coupled to a perimeter of housing 2g via a port 203. Air source 202 is operable to deliver air or other suitable gas into housing 2g on the outside of outer gerotor 4g to control the temperature of outer gerotor 4g. The controlling of the temperature of outer gerotor 4g determines the gap between outer gerotor 4g and housing 2g. An air outlet 204 allows air within housing 2g to exit housing 2g. A proximity sensor 205 may provide feedback to a suitable controller to set the desired air flow rate of air source 202.

Figure 30:
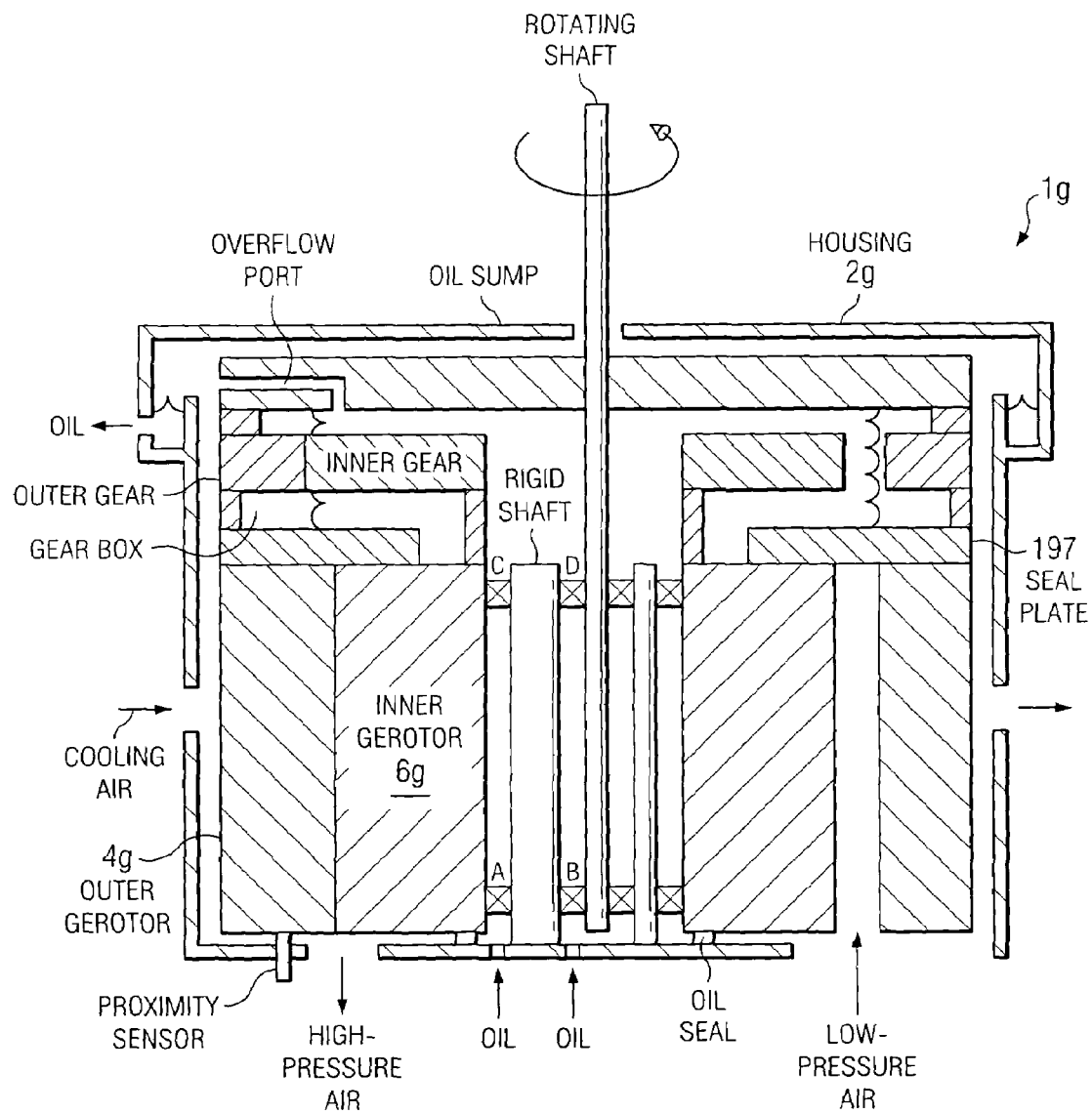

FIG. 30 illustrates another embodiment of gerotor apparatus 1g. The embodiment illustrated in FIG. 30 is substantially similar to the embodiment illustrated in FIG. 29; however, in the embodiment in FIG. 30 instead of seal plate 197 being coupled to inner gerotor 6g, seal plate 197 is coupled to outer gerotor 4g. The advantage of this embodiment is that it more effectively isolates oil from the gas being compressed.

Figure 31:
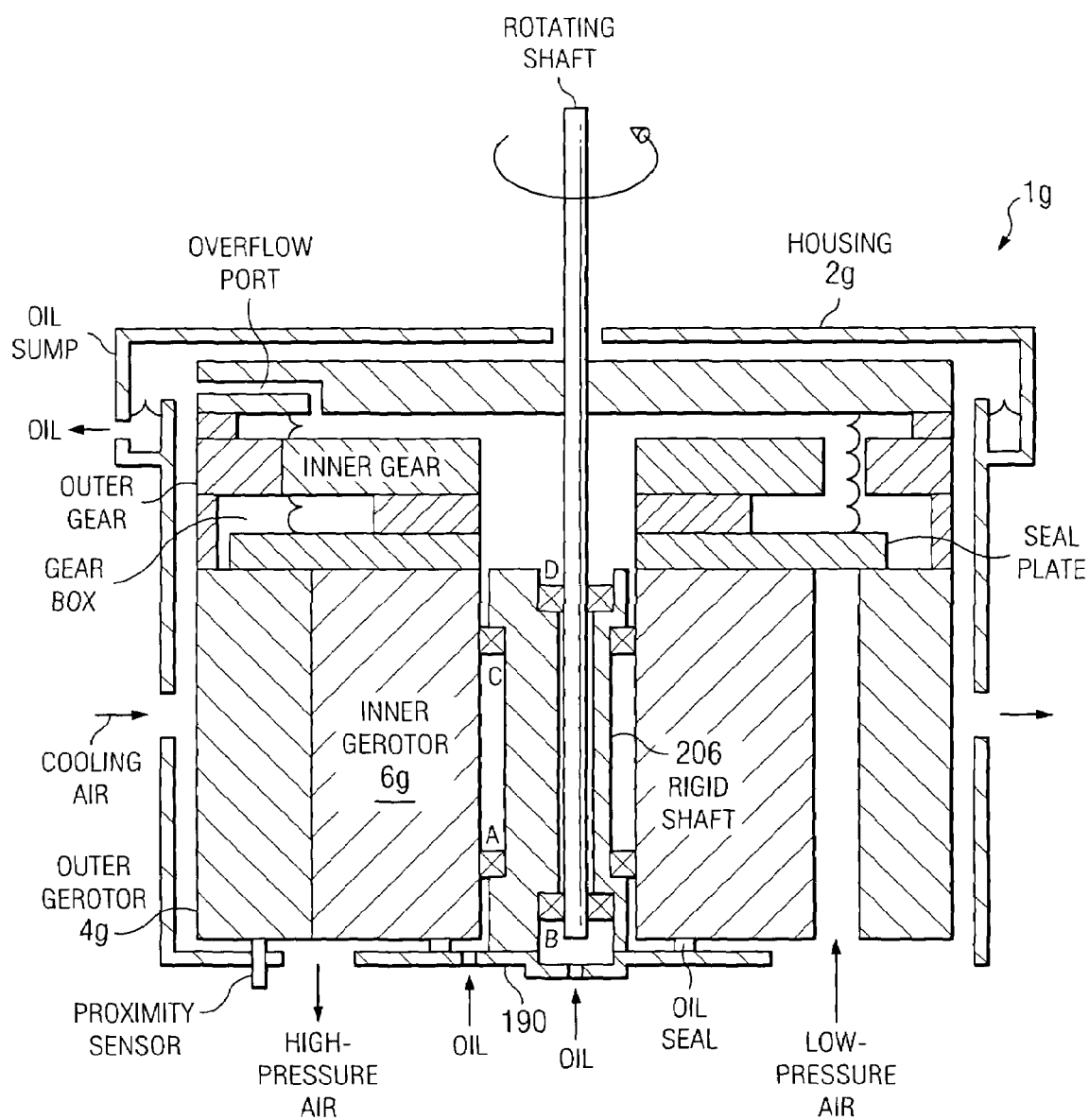

FIG. 31 illustrates another embodiment of gerotor apparatus 1g. The embodiment illustrated in FIG. 31 is substantially similar to the embodiment illustrated in FIG. 29; however, in the embodiment in FIG. 31, the outer diameter of shaft 190 is minimized to reduce the outer bearing diameter (namely, bearings 195 and 196) and thereby reduce power loss. One way of accomplishing this, as illustrated in FIG. 31, is to provide a circumferential recess 206 on hollow shaft 190. In addition, bearings 193 and 194 may also be positioned in recesses in the end of hollow shaft 190.

Figure 32:
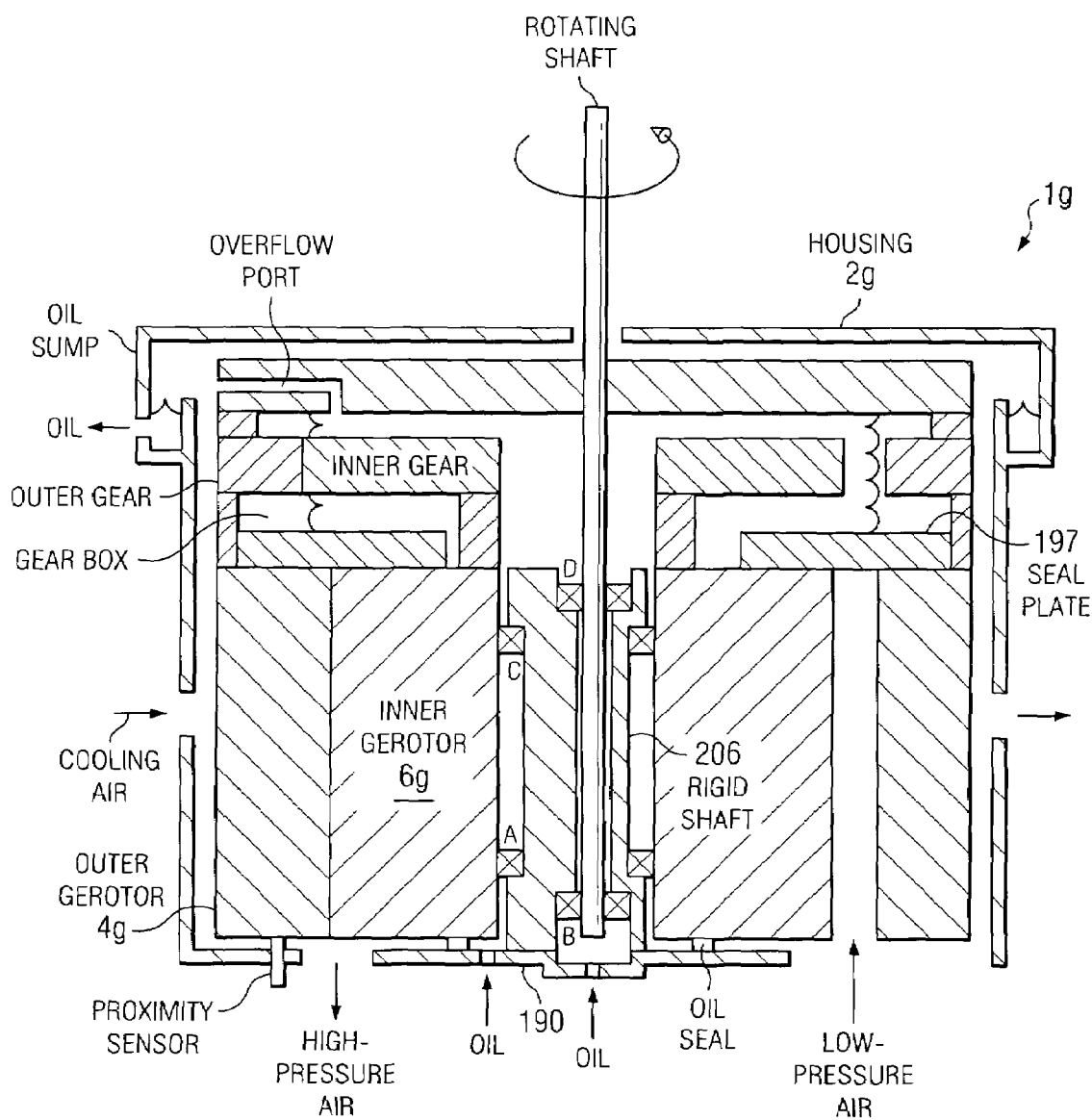

FIG. 32 illustrates another embodiment of gerotor apparatus 1g. The embodiment is substantially similar to the embodiment illustrated in FIG. 31; however, in the embodiment in FIG. 32, instead of seal plate 197 being coupled to gerotor apparatus 6g, the seal plate 197 is outer gerotor 4g.

Figure 33:
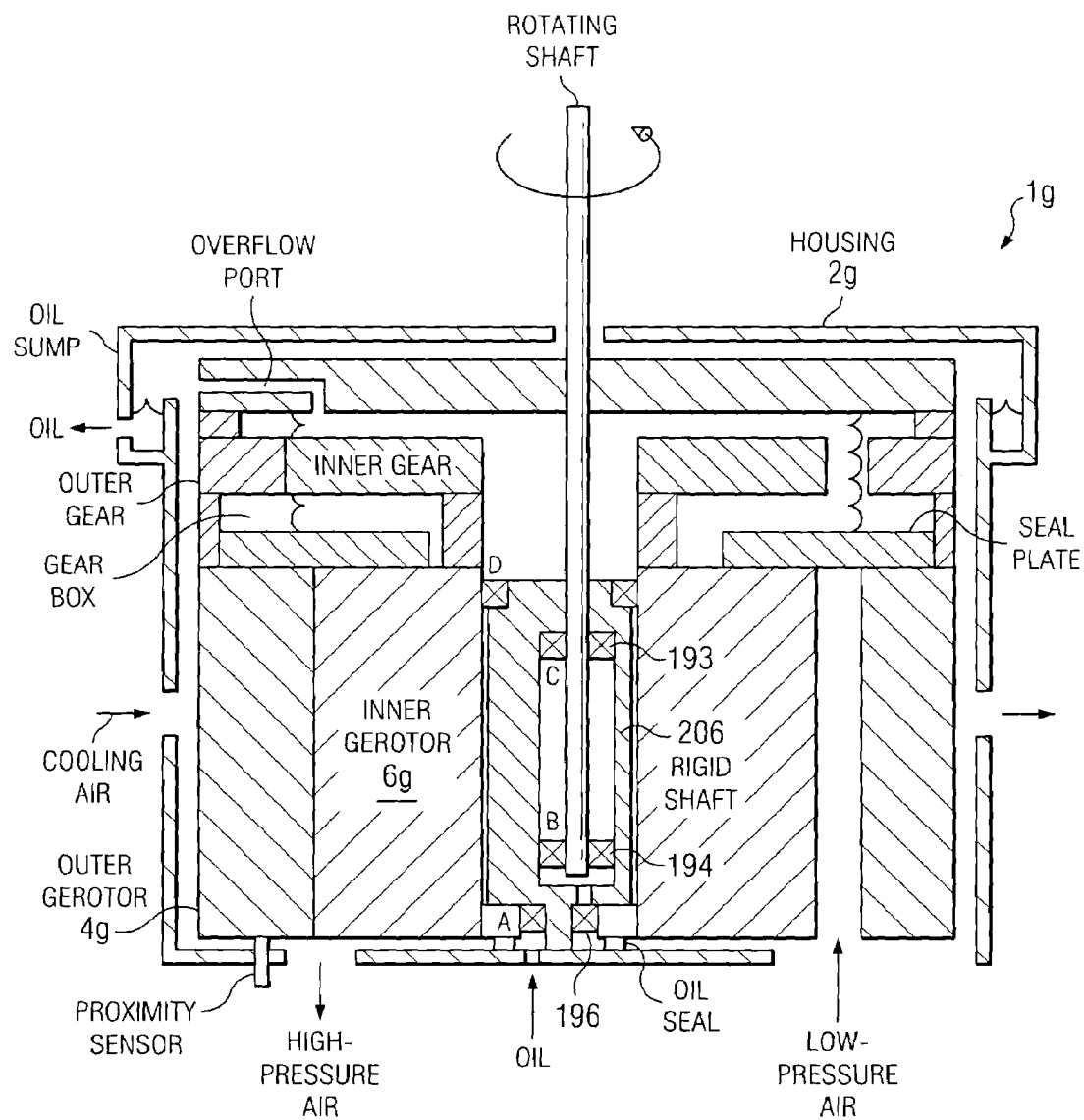

FIG. 33 illustrates another embodiment of gerotor apparatus 1g. This embodiment is substantially similar to the embodiment illustrated in FIG. 32; however, in the embodiment in FIG. 33, bearing 193 and 194 are positioned in a recess that is formed on the inside of hollow shaft 190. In addition, bearing 196 is even smaller than the previous embodiments, which helps to reduce power loss.

FIGS. 34 through 42 illustrate various embodiments of a gerotor apparatus 1h. Gerotor apparatus 1h includes a housing 2h, an outer gerotor 4h disposed within housing 2h, and an inner gerotor 6h disposed within outer gerotor 4h. Gerotor apparatus 4h also includes a lower shaft 210 rigidly coupled to housing 2h and an upper shaft 212 rotatably coupled to housing 2h with a bearing 213. Gerotor apparatus 1h may also include a shaft 214 rotatably coupled to shaft 210 via a bearing 215. Upper shaft 212 and shaft 214 may be separate shafts coupled to outer gerotor 4h or may be integral with one another, thereby comprising one shaft. Inner gerotor 6h is rotatably coupled to lower shaft 210 via bearings 216 and 217. Inner gerotor 6h has a seal plate 218 coupled thereto and an inner gear 219 coupled thereto. Inner gear 219 couples to an outer gear 220 that is rigidly coupled to outer gerotor 4h. Similar to previous embodiments described above in conjunction with FIGS. 26 through 33, gerotor apparatus 1h also includes an oil sump 221 that functions in a similar manner.

Figure 34:
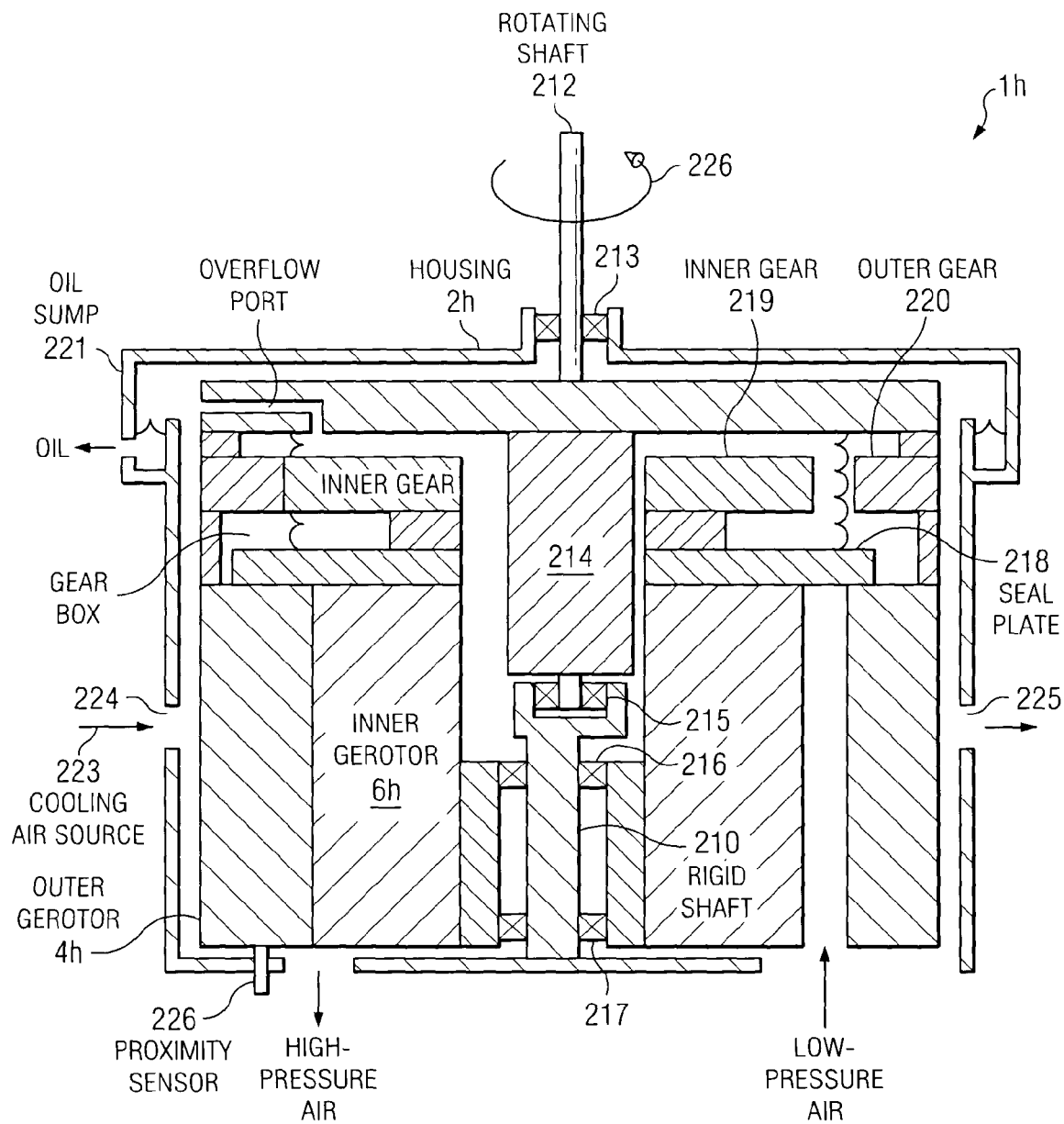

Similar to the embodiments described above in conjunction with FIGS. 29 through 33, gerotor apparatus 1h may also include an air source 223 coupled to a perimeter of housing 2h via a port 224. Air source 223 is operable to deliver cooled air into housing 2h and circulated around the outside of outer gerotor 4h in order to control the temperature of outer gerotor 4h. The cooled air enters housing 2h through port 224 and exits a port 225. A proximity sensor 226 may also be coupled to housing 2h and function in a similar manner to the embodiments described above in conjunction with FIGS. 29 through 33. In general operation, when upper shaft 212 is rotated as denoted by arrow 226, then outer gerotor 4h rotates, which rotates outer gear 220, which rotates inner gear 219, which rotates inner gerotor 6h. An advantage of the embodiment illustrated in FIG. 34 is that bearing 215, being supported by lower shaft 210, reduces the cantilevering effect of outer gerotor 4h.

Figure 35:
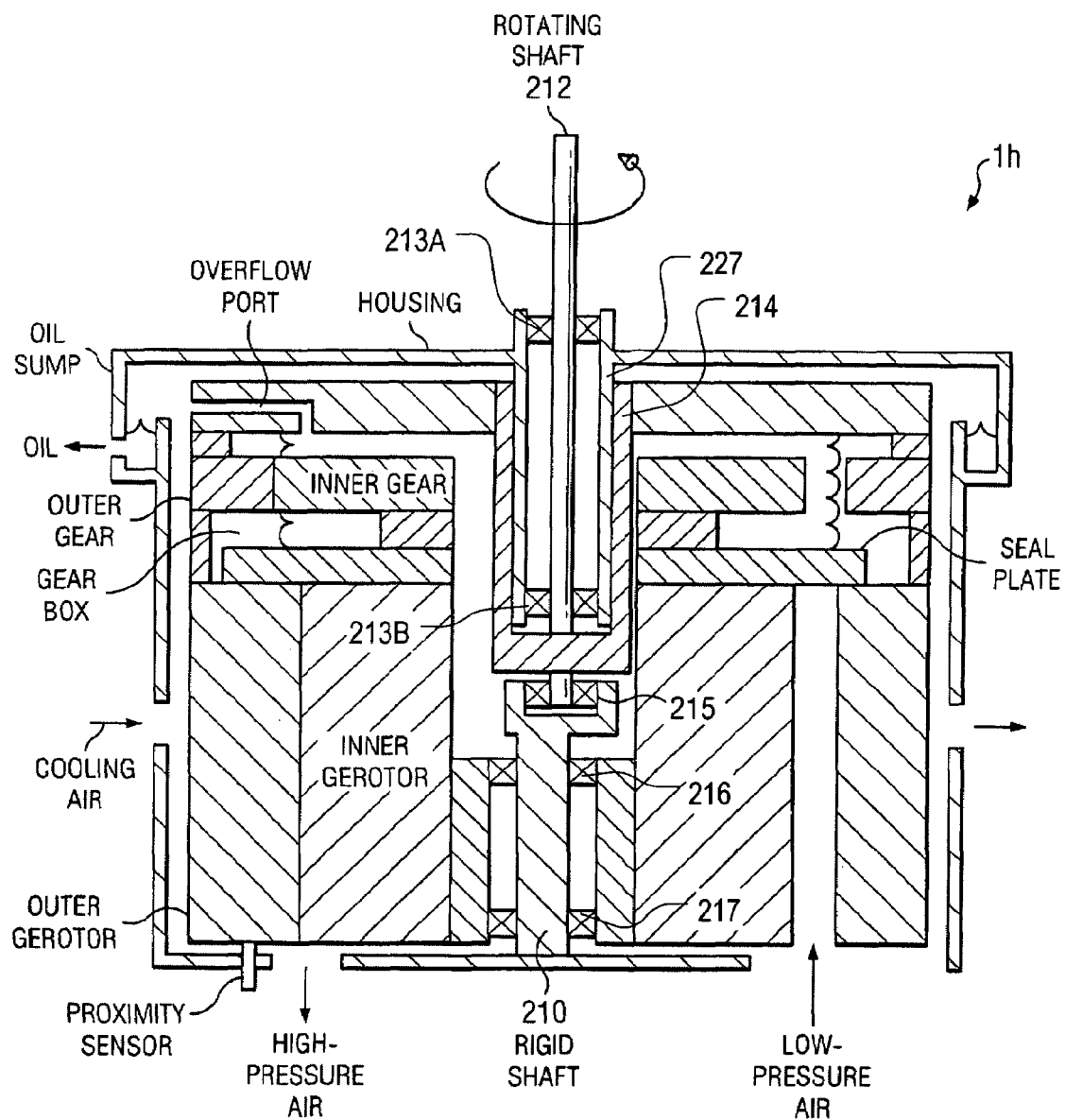

FIG. 35 illustrates another embodiment of gerotor apparatus 1h. This embodiment is substantially similar to the embodiment illustrated in FIG. 34, including the lower shaft 210 and bearings 216, 217; however, in the embodiment in FIG. 35, shaft 214 is hollow instead of being solid. The hollowed portion of shaft 214 allows an upper hollow shaft 227 to be disposed therein and upper hollow shaft 227 is rigidly coupled to housing 2h. Accordingly, shaft 212 is then rotatably coupled to upper hollow shaft 227. One advantage of this embodiment is the loads on bearing 215 are reduced because the loads are taken by the bearings 213A, 213B mounted in upper hollow shaft 227.

Figure 36:
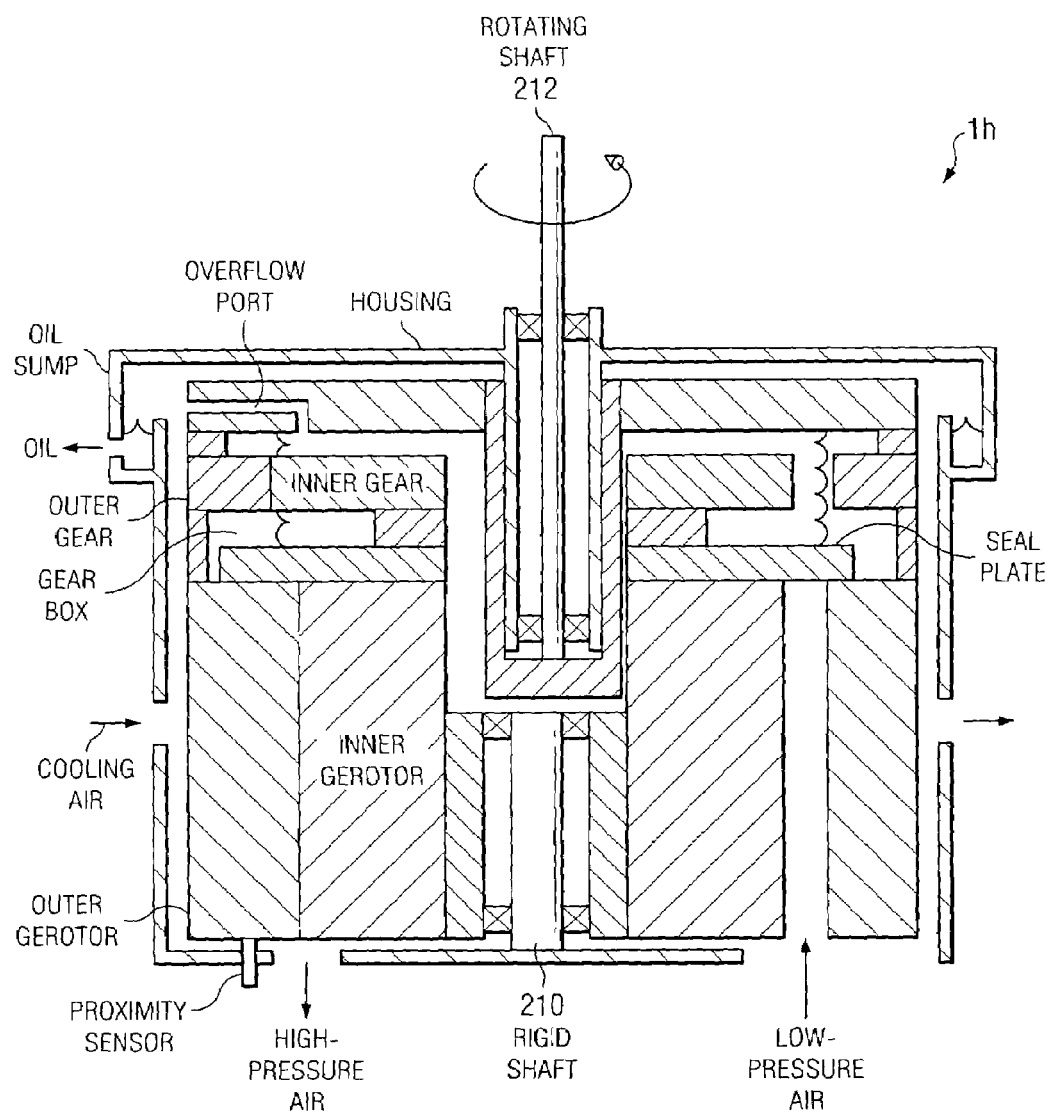

FIG. 36 illustrates an additional embodiment of gerotor apparatus 1h. This embodiment is substantially similar to the embodiment illustrated in FIG. 35; however, in the embodiment in FIG. 36, shaft 212 is not rotatably coupled to lower shaft 210. As a result, in this embodiment, the precision of gerotor apparatus 1h is designed into housing 2h.

Figure 37:
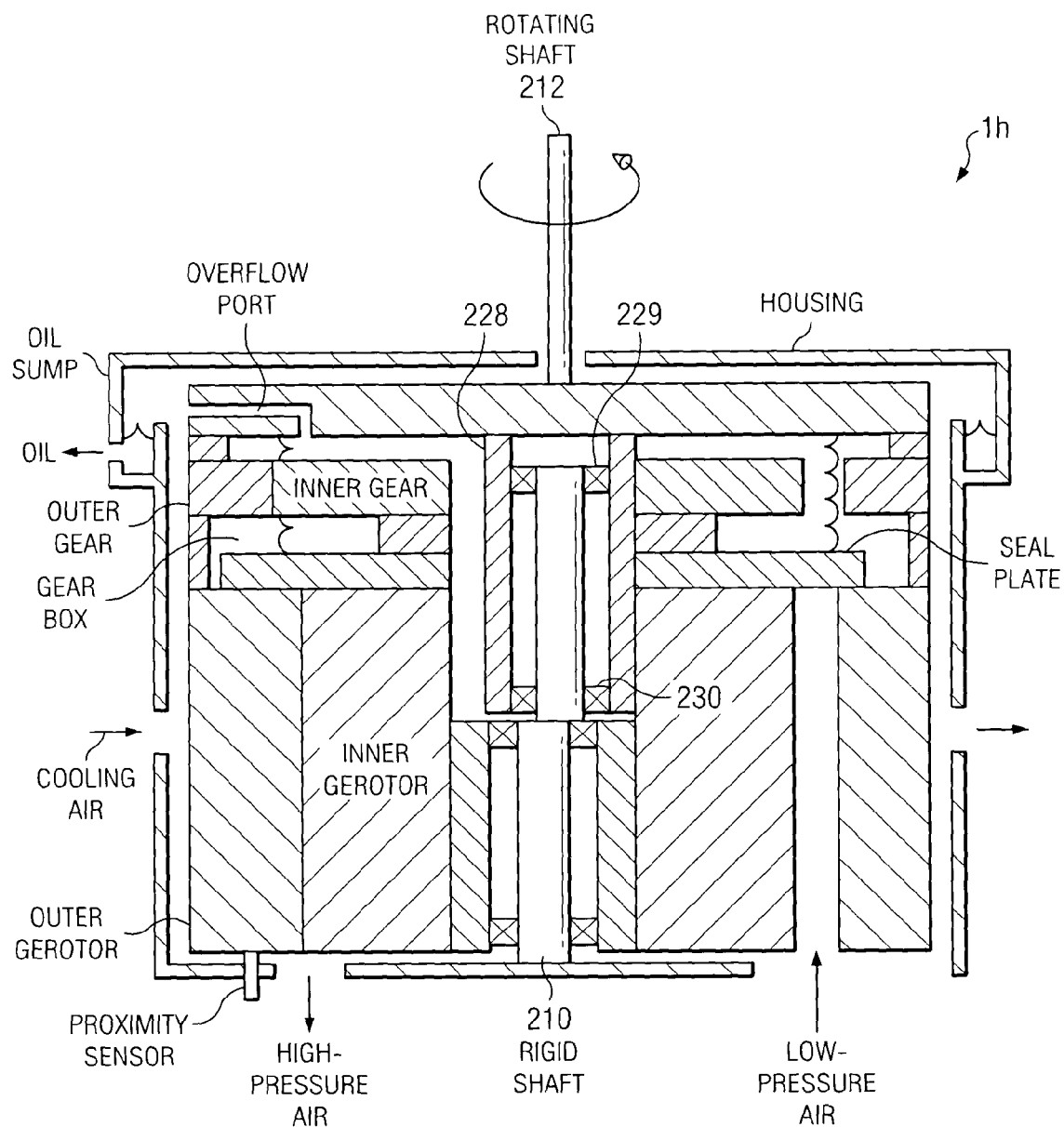

FIG. 37 illustrates an additional embodiment of gerotor apparatus 1h. In this embodiment, lower shaft 210 extends further than in previous embodiments so that a hollow shaft 228 may rotatably couple to lower shaft 210 via bearings 229 and 230. In addition, bearing 213 that functions to couple upper shaft 212 to housing 2h is removed in this embodiment. In this embodiment, the majority of the precision is built into housing 2h and lower shaft 210.

Figure 38:
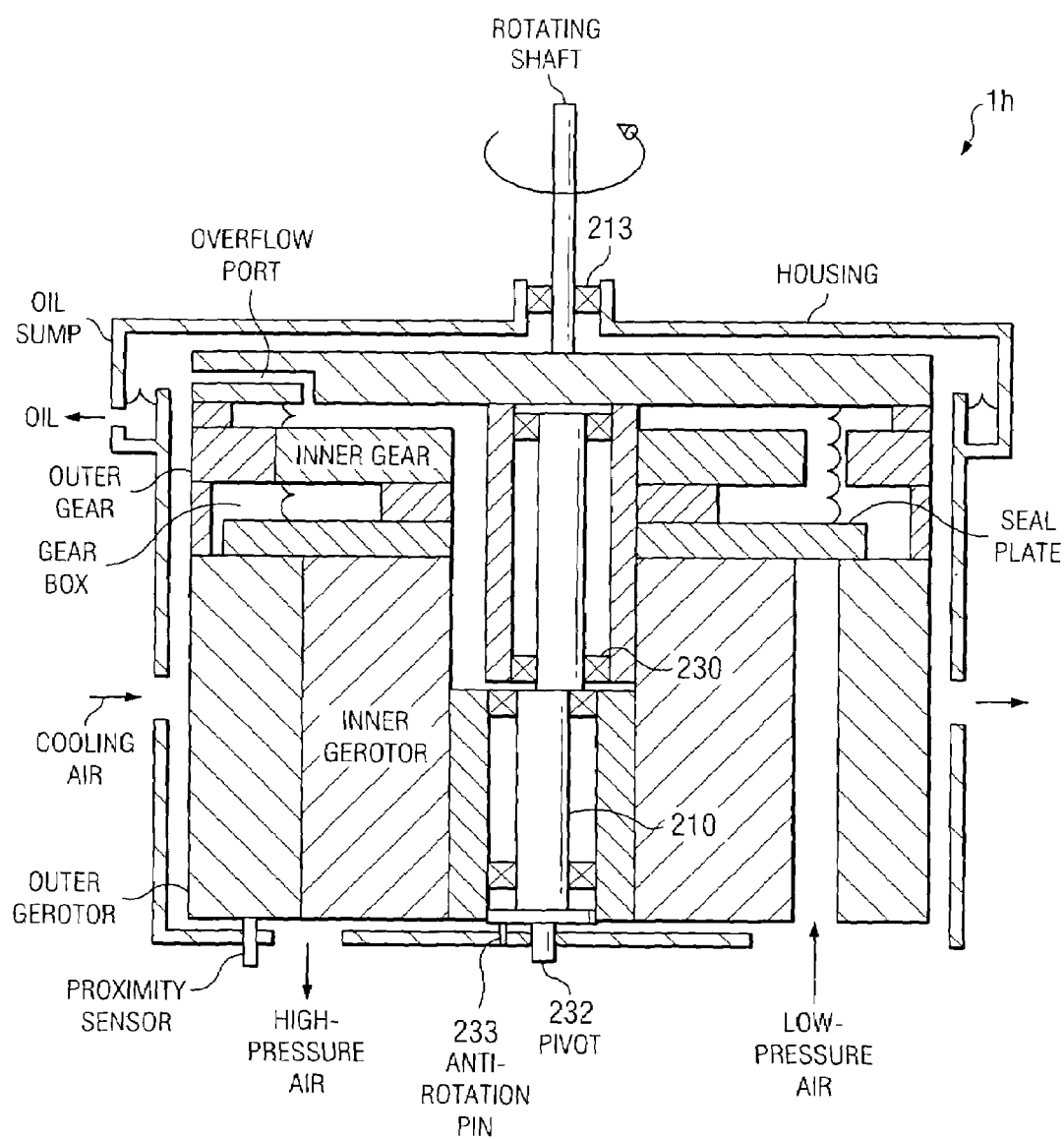

FIG. 38 illustrates an additional embodiment of gerotor apparatus 1h. In this embodiment, bearing 213 exists again to rotatably couple upper shaft 212 to housing 2h. Rigid shaft 210, instead of rigidly coupling to the bottom of housing 2h, pivotally couples to the bottom of housing 2h with a pivot 232. In this embodiment, the precision of inner gerotor 6h and outer gerotor 4h is essentially based on lower shaft 210. An anti-rotation pin 233 loosely couples to the bottom of housing 2h to prevent lower shaft 210 from rotating during operation.

Figure 39:
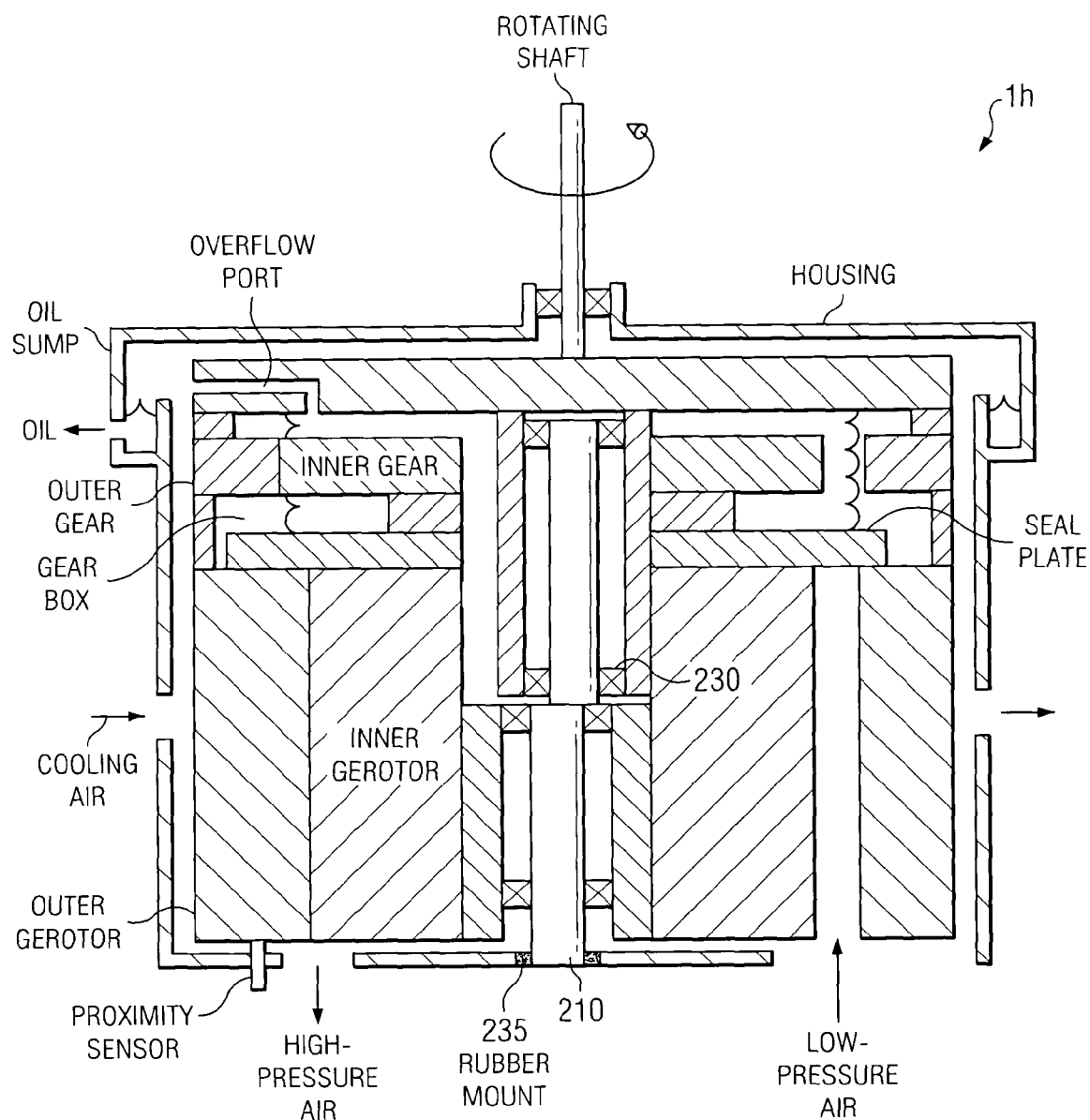

FIG. 39 illustrates an additional embodiment of gerotor apparatus 1h. The embodiment illustrated in FIG. 39 is substantially similar to the embodiment illustrated in FIG. 38; however, in the embodiment in FIG. 39, instead of pivot 232 and anti-rotation pin 233, lower shaft 210 couples to the bottom of housing 2h with a rubber mount 235. Rubber mount 235 functions in a similar manner to the combination of pivot 232 and anti-rotation pin 233 in FIG. 38.

Figure 40:
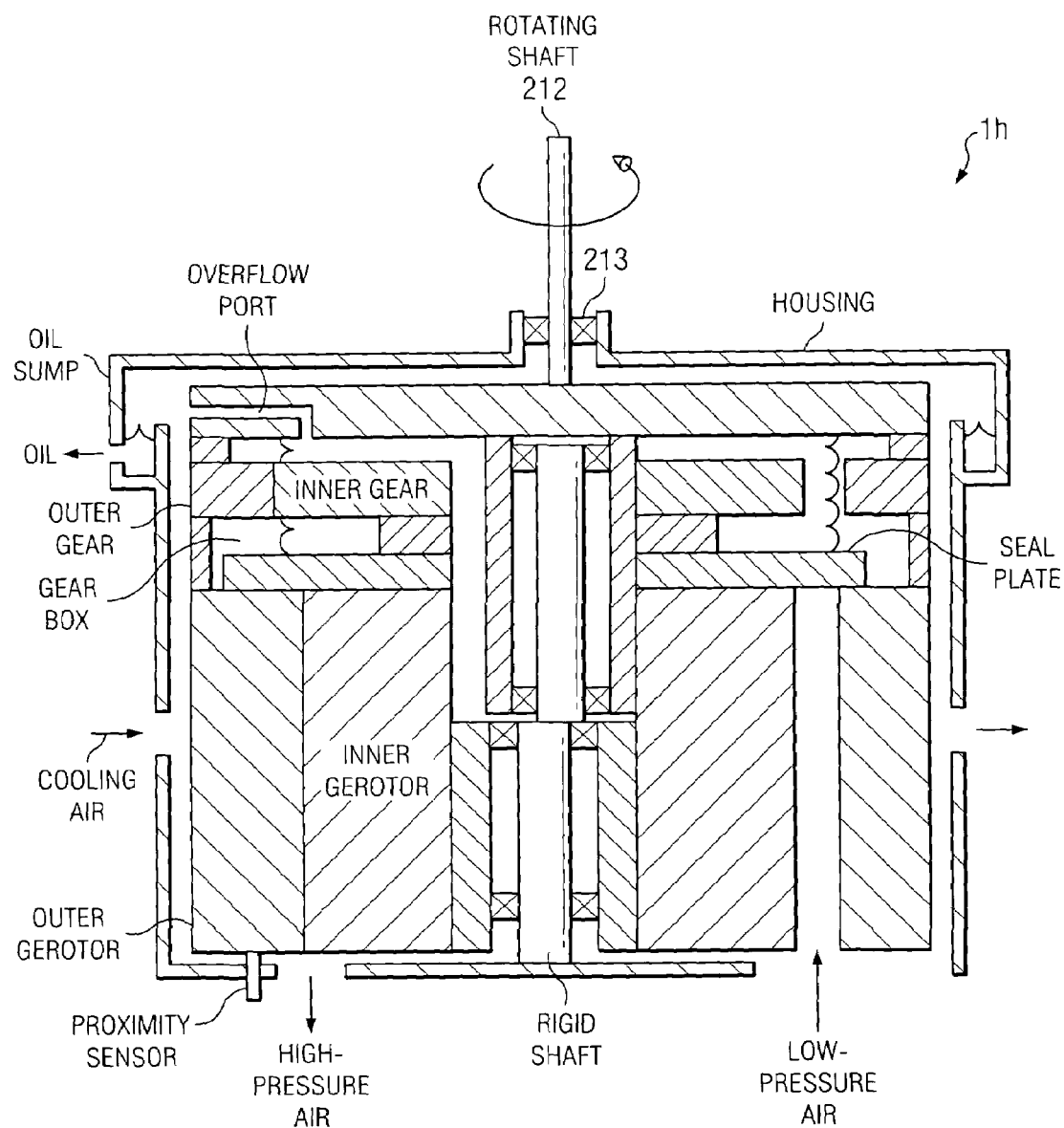

FIG. 40 illustrates an additional embodiment of gerotor apparatus 1h. The embodiment illustrated in FIG. 40 is substantially similar to the embodiment illustrated in FIG. 37; however, in the embodiment in FIG. 40 bearing 213 is utilized to rotatably couple upper shaft 212 to the top of housing 2h. This embodiment requires the precision to be designed into housing 2h.

Figure 41:
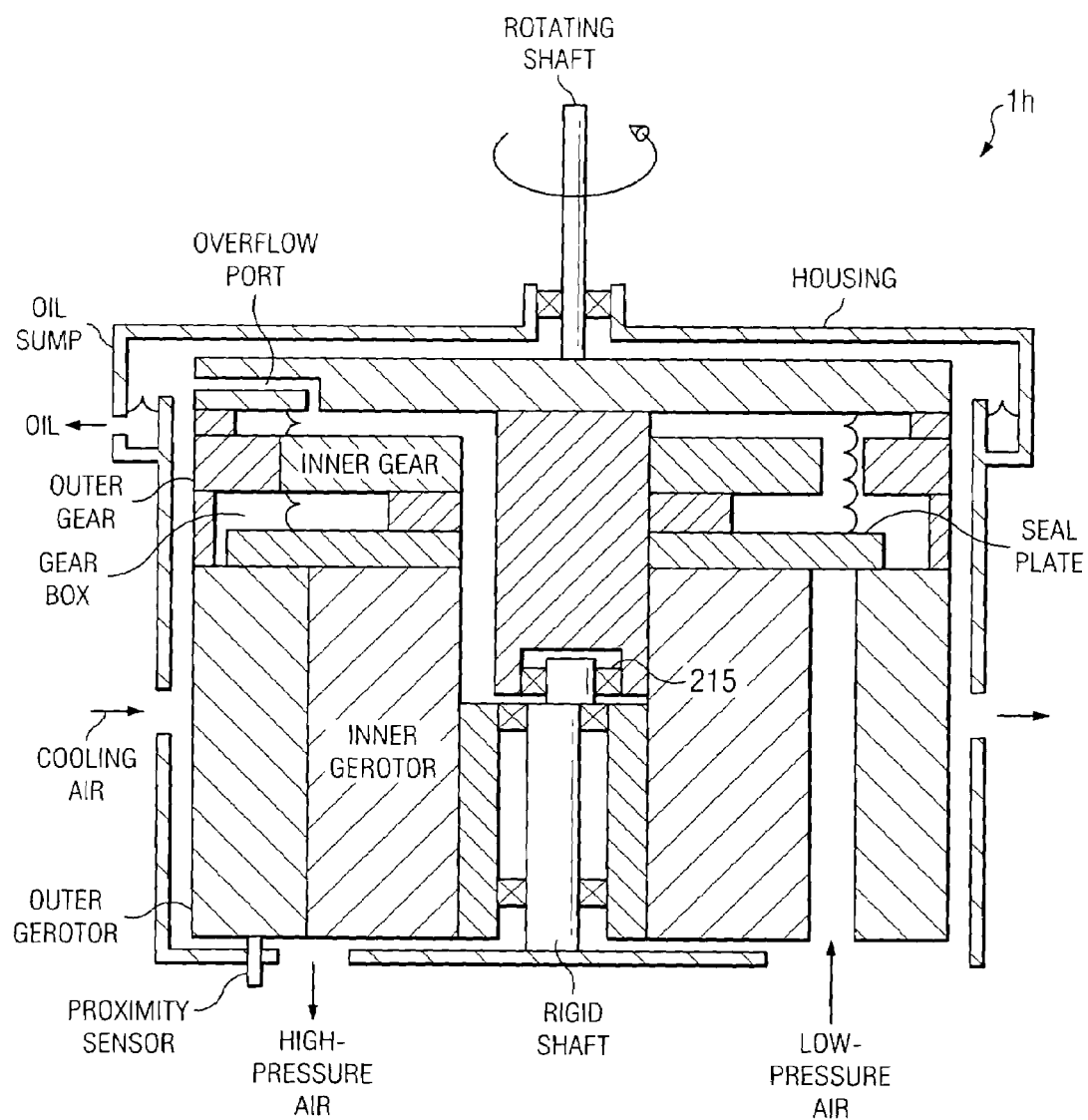

FIG. 41 illustrates an additional embodiment of gerotor apparatus 1h. The embodiment illustrated in FIG. 41 is substantially similar to the embodiment illustrated in FIG. 34; however, in the embodiment in FIG. 41 bearing 215 rotatably couples to an outside surface of lower shaft 210 instead of coupling to a recessed portion of lower shaft 210, as in the embodiment illustrated in FIG. 34.

Figure 42:
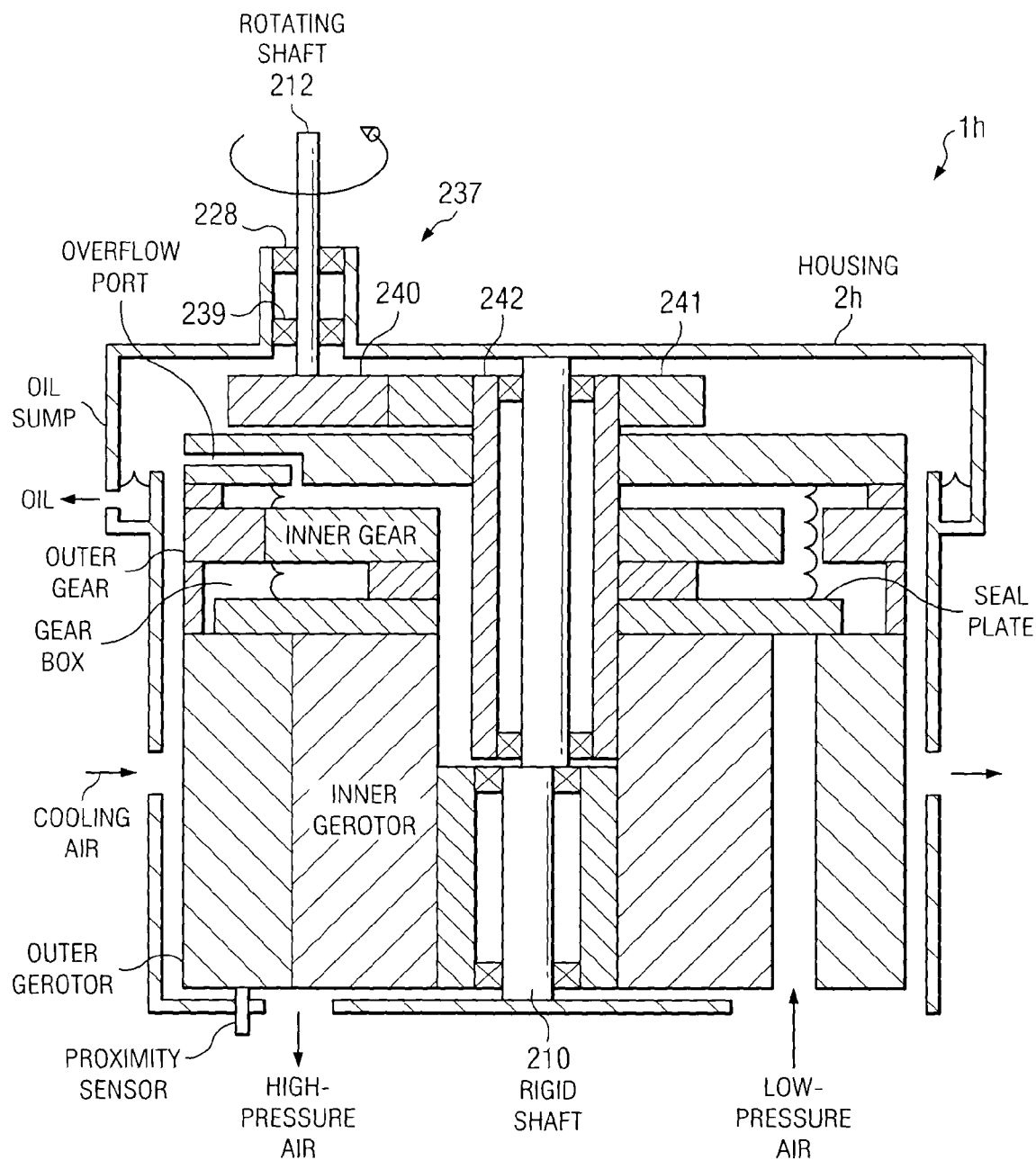

FIG. 42 illustrates another embodiment of gerotor apparatus 1h. In this embodiment, lower shaft 210 is no longer cantilevered and couples to both the top and bottom of housing 2h. This facilitates having a drive system 237 comprising upper shaft 212 rotatably coupled to housing 2h with bearings 238 and 239, and a drive gear 240 meshing with a driven gear 241 that rigidly couples to a hollow shaft 242 that rotatably couples to shaft 210. The advantage of this embodiment is that shaft 210 is strongly supported at each end, which reduces flexing thus maintaining precision.

Figure 43:
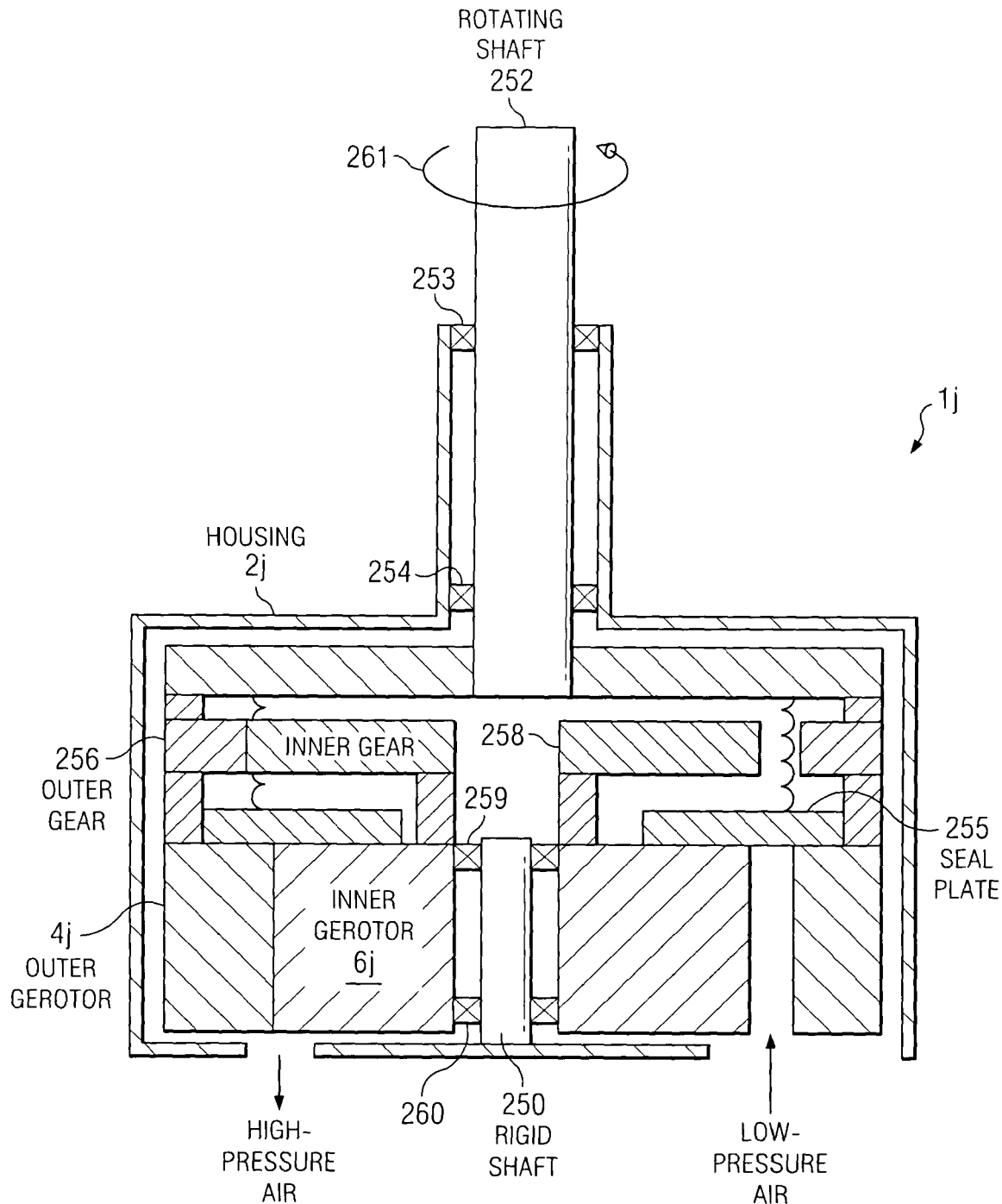

FIGS. 43 through 46 illustrate various embodiments of a gerotor apparatus 1*j*. Gerotor apparatus 1*j* includes a housing 2*j*, an outer gerotor 4*j* disposed within housing 2*j*, and an inner gerotor 6*j* disposed within outer gerotor 4*j*. Gerotor apparatus 1*j*, as shown in FIGS. 43 through 46, have a "pancake" geometry that reduces cantilevered effects, as described further below. Referring to FIG. 43, gerotor apparatus 1*j* includes a lower shaft 250 rigidly coupled to the bottom of housing 2*j*. Gerotor apparatus 1*j* also includes an upper shaft 252 rotatably coupled to an upper portion of housing 2*j* by a pair of bearings 253 and 254. Upper shaft 252 couples to outer gerotor 4*j*, which includes a seal plate 255 and an outer gear 256. Outer gear 256 meshes with an inner gear 258 that couples to inner gerotor 6*j*. Inner gerotor 6*j* rigidly couples to lower shaft 250 with bearings 259 and 260. Generally, when rotating shaft 252 rotates, as denoted by arrow 261, outer gerotor 4*j* rotates, which rotates outer gear 256, which rotates inner gear 258, which rotates inner gerotor 6*j*.

In one embodiment, bearings 259 and 260 are located equidistant from an axial center of inner gerotor 6*j* so that each of the bearings takes approximately half of the load. Bearings 253 and 254, in one embodiment, are greased bearings rather than oil lubricated bearings so that no oil distribution system is required. In other embodiments, an oil distribution system may be employed.

Figure 44:
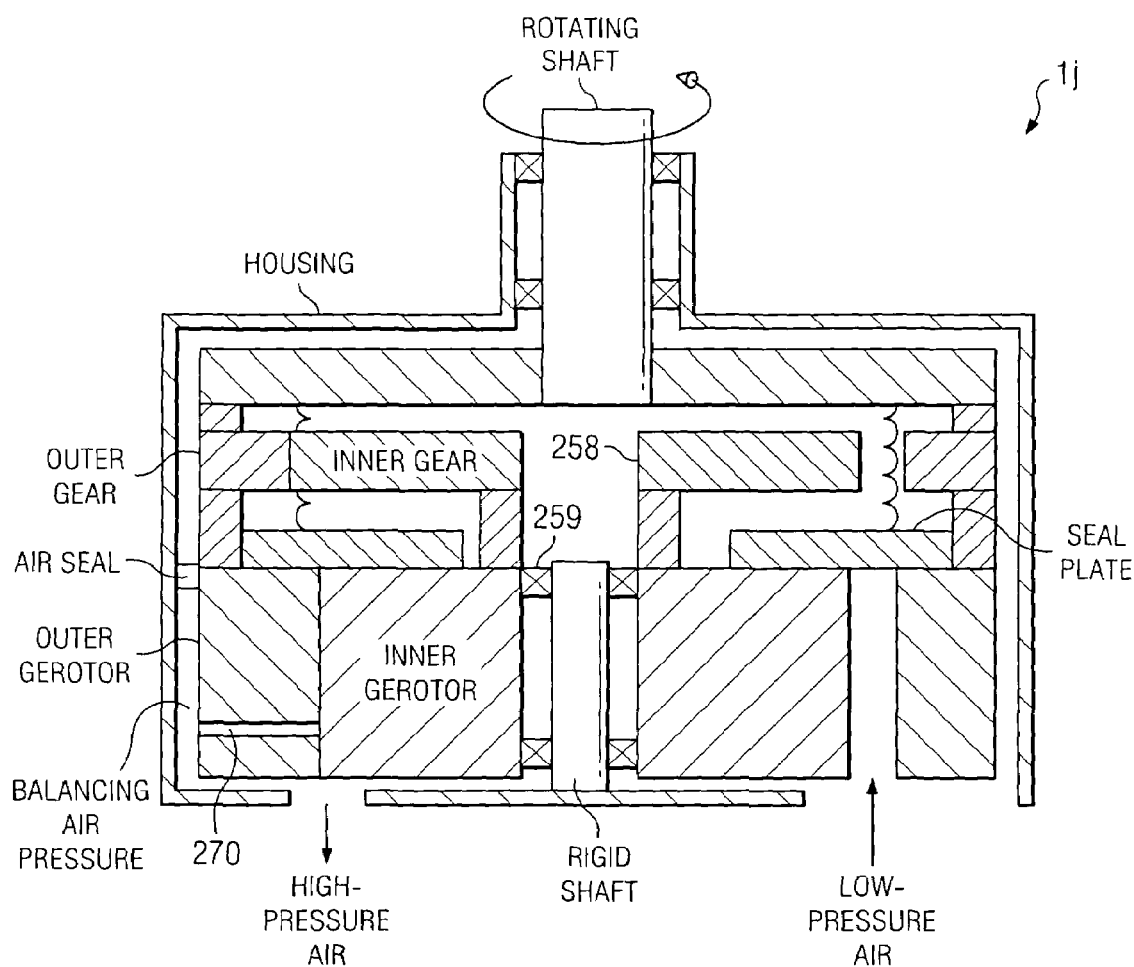

FIG. 44 illustrates an additional embodiment of gerotor apparatus 1*j*. The embodiment illustrated in FIG. 44 is substantially similar to the embodiment illustrated in FIG. 43; however, in the embodiment of FIG. 44, upper shaft 252 may be shorter because the gas pressure acting on the inside of outer gerotor 4*j* is balanced by having a plurality of conduits 270 formed therein. This is described in greater detail below in conjunction with FIG. 47.

Figure 47:
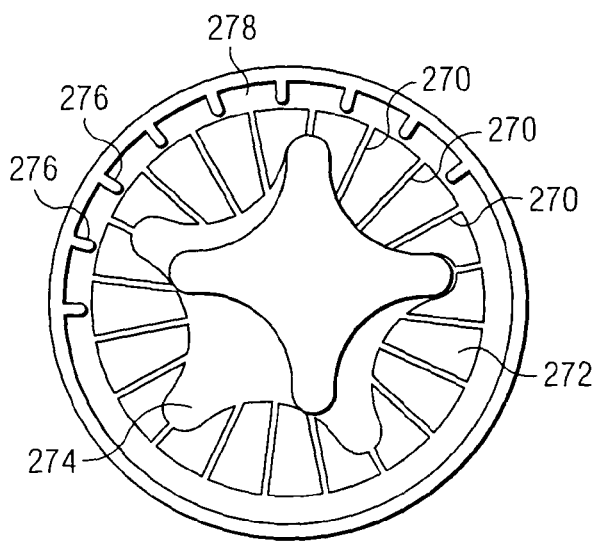
FIG. 47 shows a method for balancing the pressure across an outer gerotor according to an embodiment of the invention.

Referring to FIG. 47, a method for balancing pressures across outer gerotor 4*j* is illustrated. As illustrated, conduits 270 are formed in a wall 272 of outer gerotor 4*j* in a substantially radial direction. Conduits 270 allow some gas to leak from a chamber 274 within outer gerotor 4*j* to the outside of outer gerotor 4*j* in order to balance the loads acting on outer gerotor 4*j* to make it more stable during operation. Housing 2*j* includes a plurality of protrusions 276 that form a plurality of small chambers 278 each associated with a respective conduit 270. During operation, the gas leaks from chamber 274 through conduits 270 into chambers 278. Protrusions 276 may have any suitable spacing. In addition, conduits 270 may have any suitable shape and any suitable dimensions.

Figure 45:
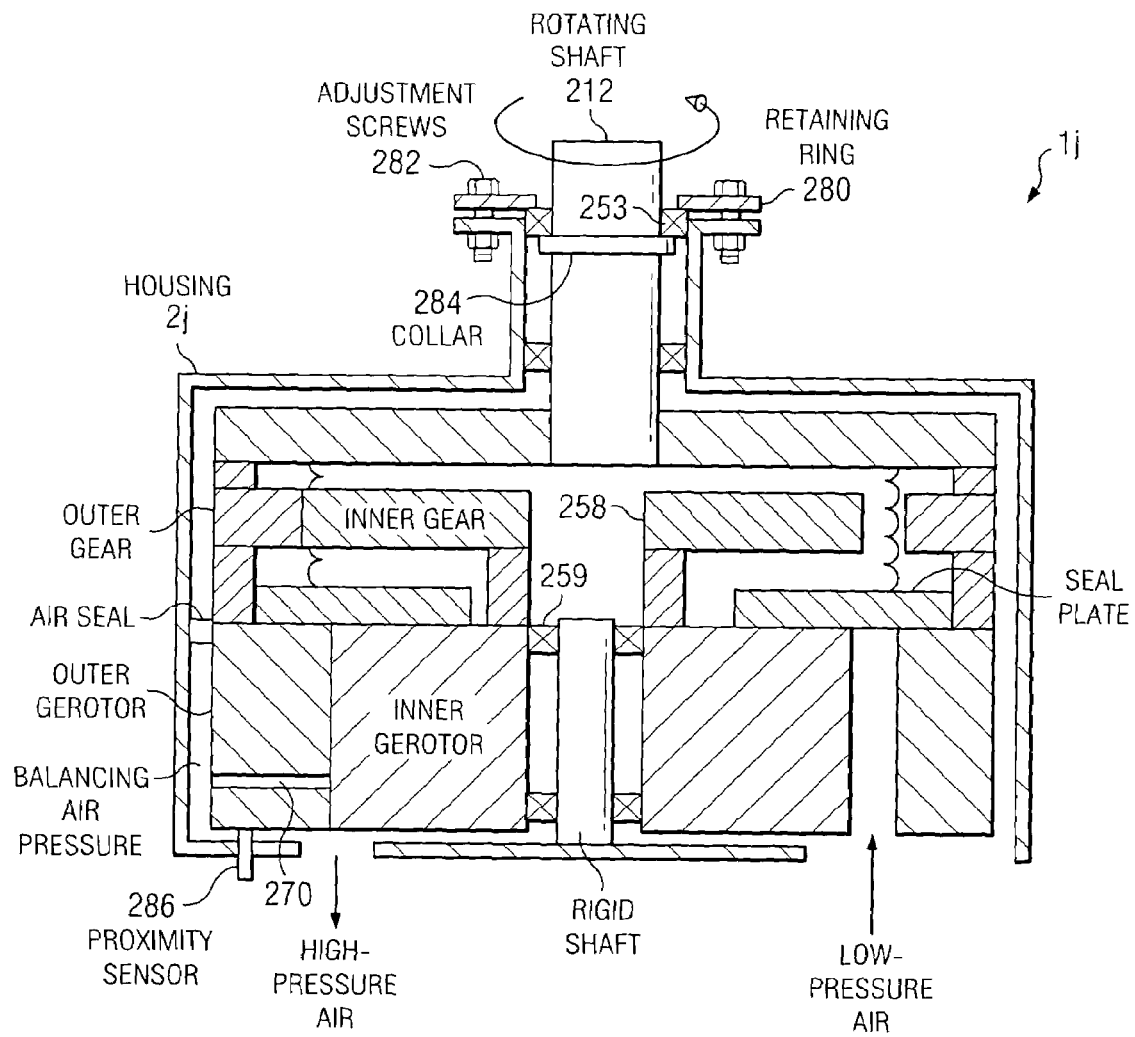

FIG. 45 illustrates an additional embodiment of gerotor apparatus 1*j*. This embodiment is substantially similar to the embodiment illustrated in FIG. 44; however, in the embodiment in FIG. 45, a retaining ring 280 couples to an upper portion of housing 2*j*. Retaining ring 280 couples to housing 2*j* with one or more adjustment screws 282. Retaining ring 280 engages bearing 253 and bearing 253 rests on a collar 284 that is integral with shaft 252. This setup allows an adjustment of a gap between the bottom of outer gerotor 4*j* and housing 2*j*. A proximity sensor 286 may be utilized to measure the gap between outer gerotor 4*j* and housing 2*j*.

Figure 46:
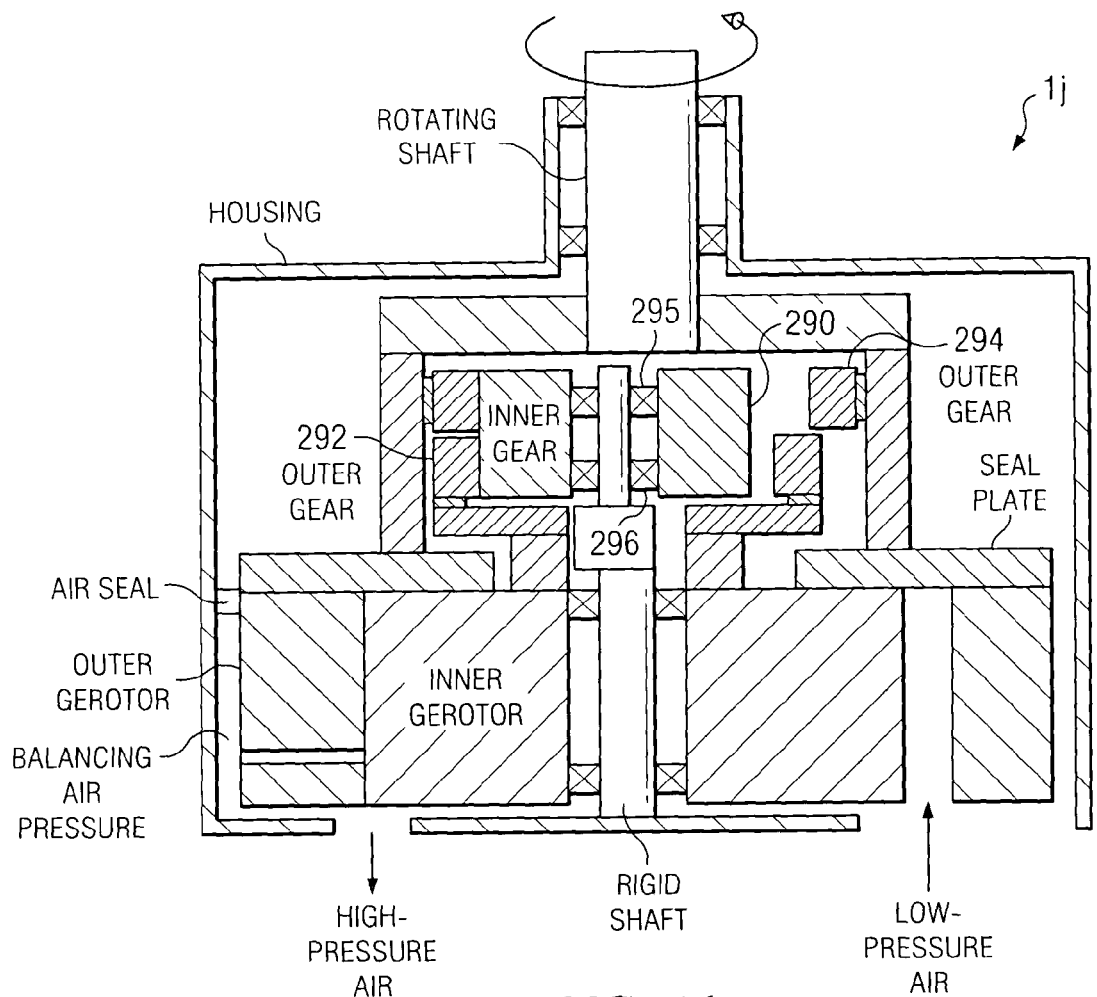

FIG. 46 illustrates an additional embodiment of gerotor apparatus 1*j*. The embodiment illustrated in FIG. 46 is substantially similar to the embodiment illustrated in FIG. 44; however, in the embodiment in FIG. 46 there is a slightly different gearing arrangement. More specifically, an idler gear 290 couples an inner gear 292 that is associated with inner gerotor 6*j* to an outer gear 294 that is associated with outer gerotor 4*j*. Idler gear 290 is rotatably coupled to lower shaft 250 with bearings 295 and 296.

FIGS. 48 through 53 illustrate various embodiments of a gerotor apparatus 1*k*. Gerotor apparatus 1*k* includes a housing 2*k*, an outer gerotor 4*k* disposed within housing 2*k*, and an inner gerotor 6*k* disposed within outer gerotor 4*k*. Gerotor apparatus 1*k* includes a lower shaft 320 rigidly coupled to an end of housing 2*k* that includes a gas inlet port 322 and a gas exhaust 324. A gear housing 326 is coupled to lower shaft 320 and an upper shaft 328 couples to gear housing 326 and extends upwards towards the top of housing 2*k*. A rotating shaft 330 is rotatably coupled to hosing 2*k* by a bearing 332. Shaft 330 couples to outer gerotor 4*k* and also couples to upper shaft 328 via a hollow shaft 334 and bearings 335 and 336. Inner gerotor 6*k* is rotatably coupled to lower shaft 320 via a bearing 337 and a bearing 338.

Figure 48:
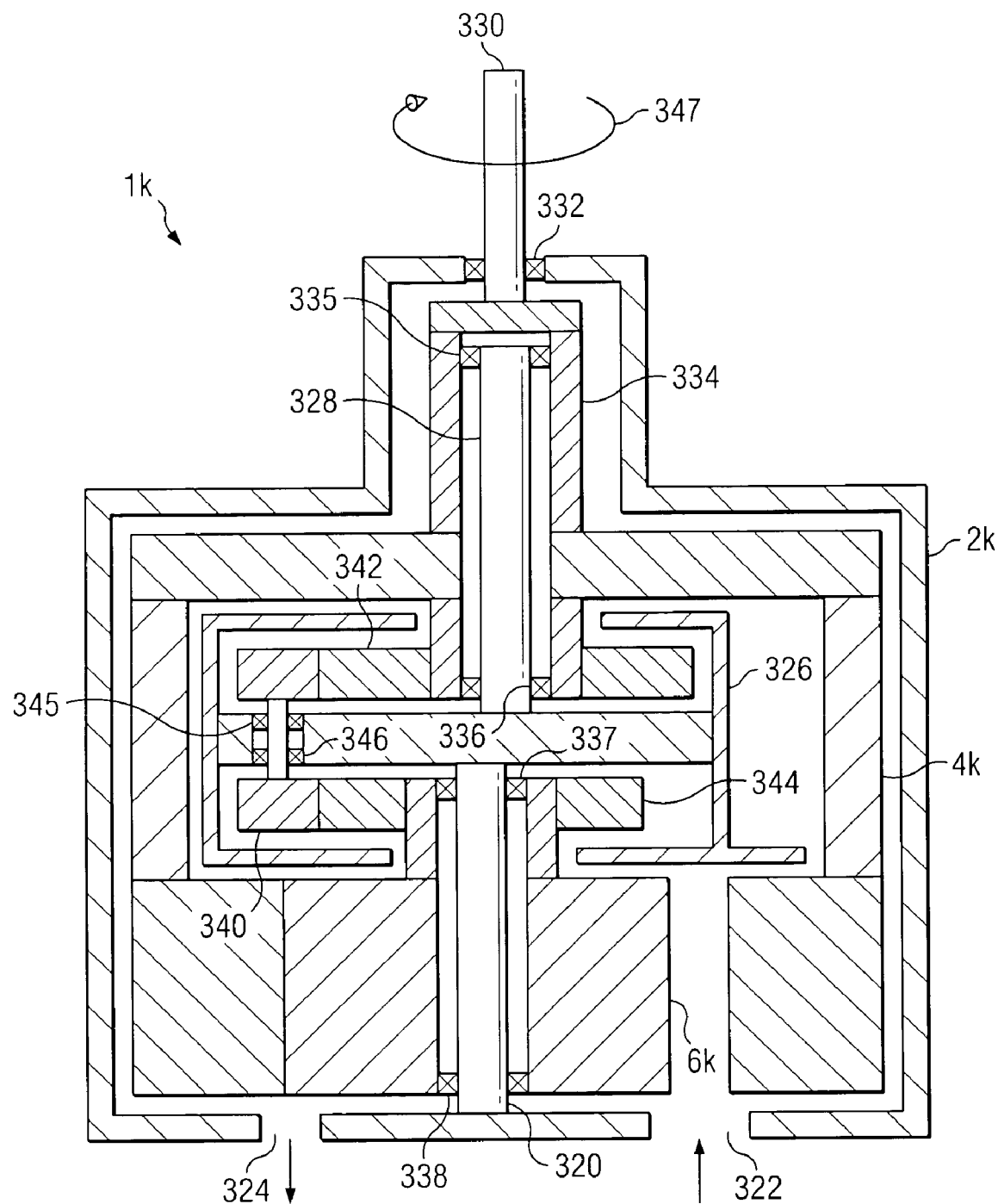
FIGS. 48 through 52 illustrate various embodiments of a gerotor apparatus of a quasi-isothermal Brayton cycle engine.

Gear housing 326 includes an idler gear 340 coupling a first gear 342 that is associated with outer gerotor 4*k* and a second gear 344 that is associated with inner gerotor 6*k*. Idler gear 340 is rotatably coupled to gear housing 326 in any suitable manner, such as by bearings 345 and 346. In general operation, when shaft 330 rotates, as denoted by arrow 347, it rotates outer gerotor 4*k*, which rotates first gear 342, which rotates idler gear 340, which rotates second gear 344, which rotates inner gerotor 6*k*. The advantage of the embodiment illustrated in FIG. 48 is that it employs large gears that are not constrained to be located within inner gerotor 6*k*.

Figure 49:
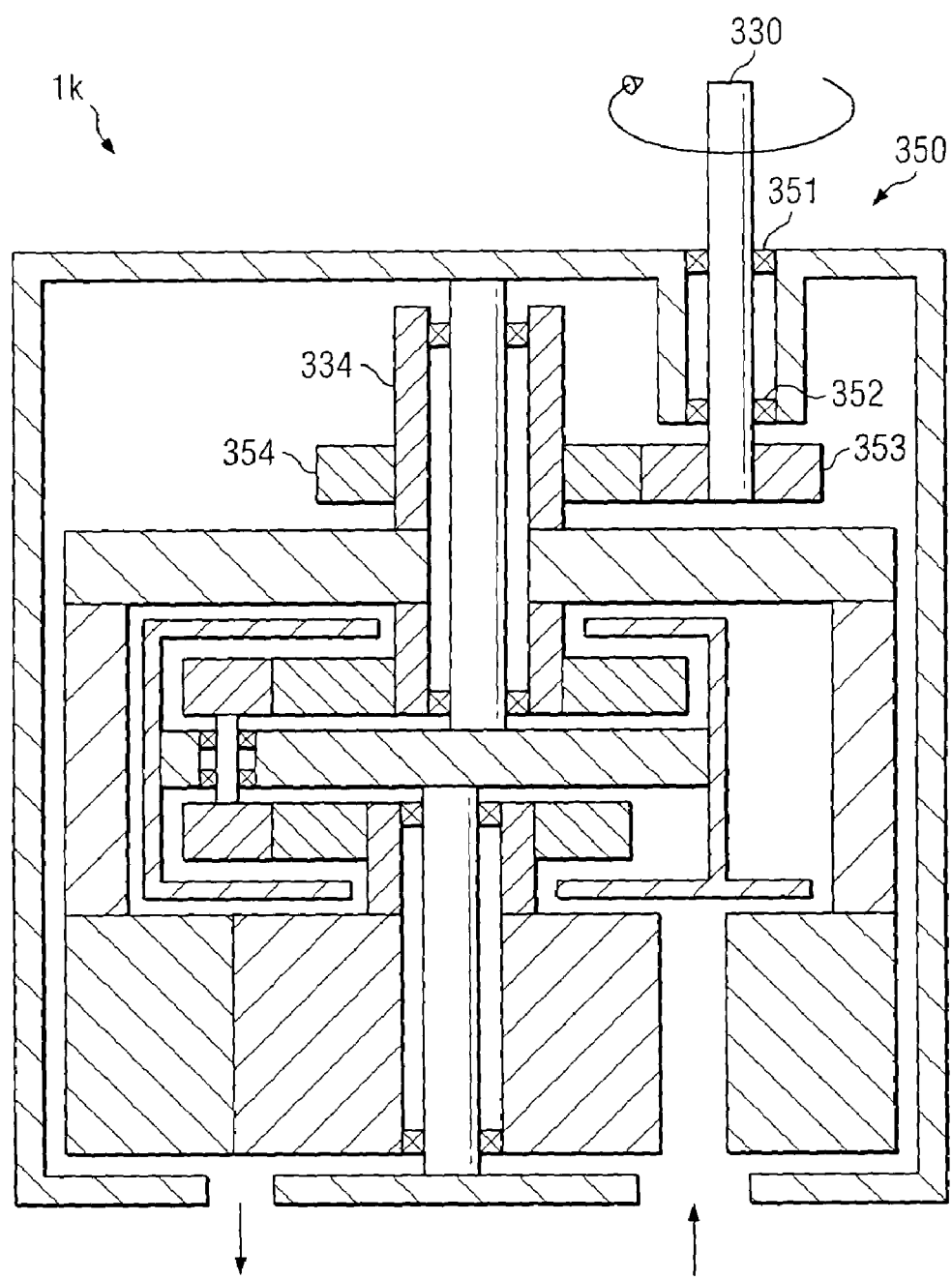

FIG. 49 illustrates an additional embodiment of gerotor apparatus 1*k*. The embodiment illustrated in FIG. 49 is substantially similar to the embodiment illustrated in FIG. 48; however, in the embodiment of FIG. 49, upper shaft 328 is rigidly coupled to the top of housing 2*k*. Accordingly, a drive system 350 exists off-center of housing 2*k*. Drive system 350 includes rotating shaft 330 that is rotatably coupled to housing 2*k* via bearings 351 and 352. Rotating shaft 330 includes a drive gear 353 meshing with a driven gear 354 that is rigidly coupled to hollow shaft 334 of outer gerotor 4*k*. An advantage of this embodiment is that both lower shaft 320 and upper shaft 328 are rigidly attached to housing 2*k*, thus providing strength and rigidity.

Figure 50:
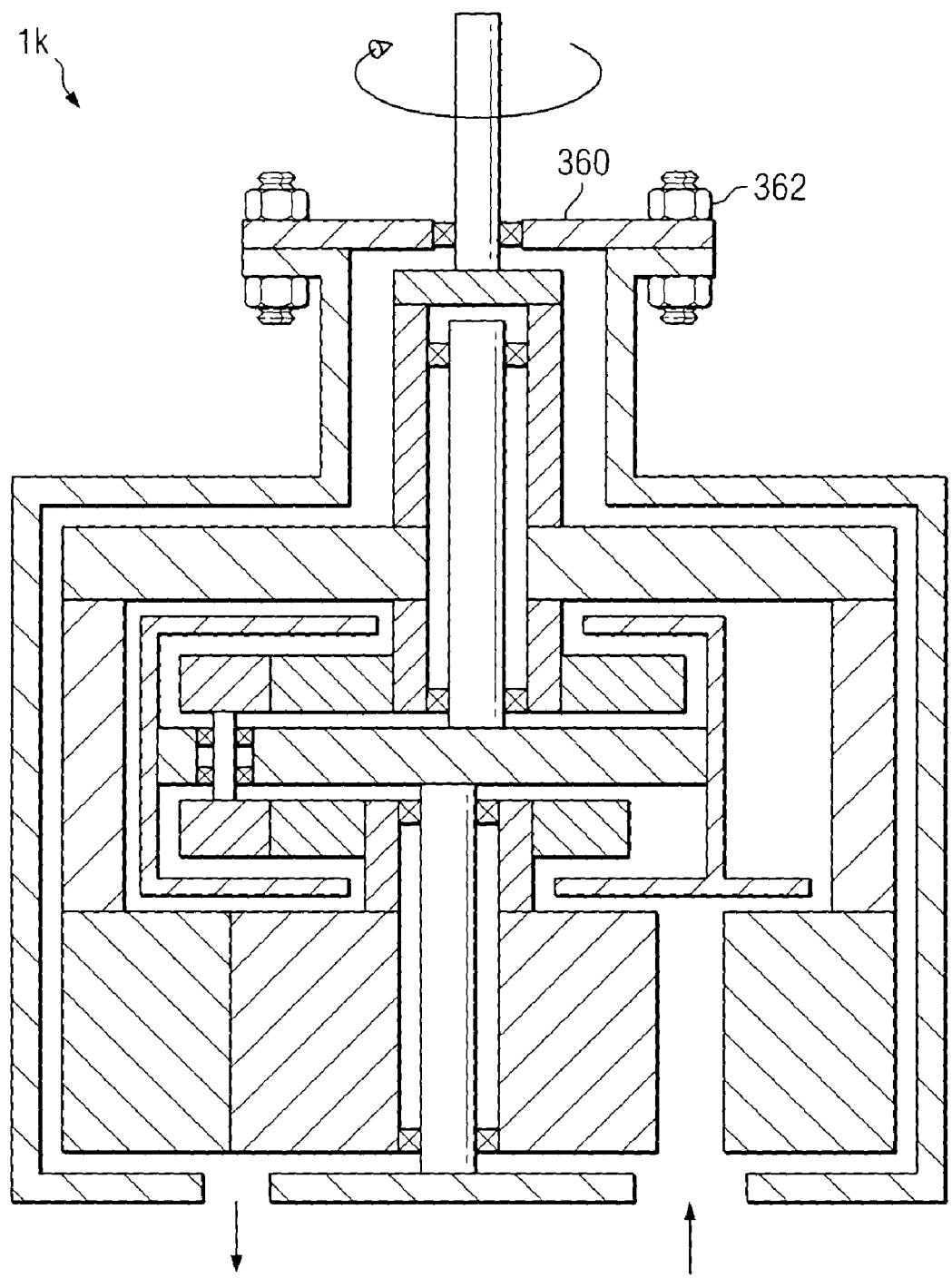

FIG. 50 illustrates an additional embodiment of gerotor apparatus 1*k*. The embodiment illustrated in FIG. 50 is substantially similar to the embodiment illustrated in FIG. 48; however, in the embodiment of FIG. 50, a retaining ring 360 is coupled to an upper portion of housing 2*k* with one or more adjustment screws 362. This embodiment requires little precision in housing 2*k*; shaft alignment is achieved when screws 362 are tightened.

Figure 51:
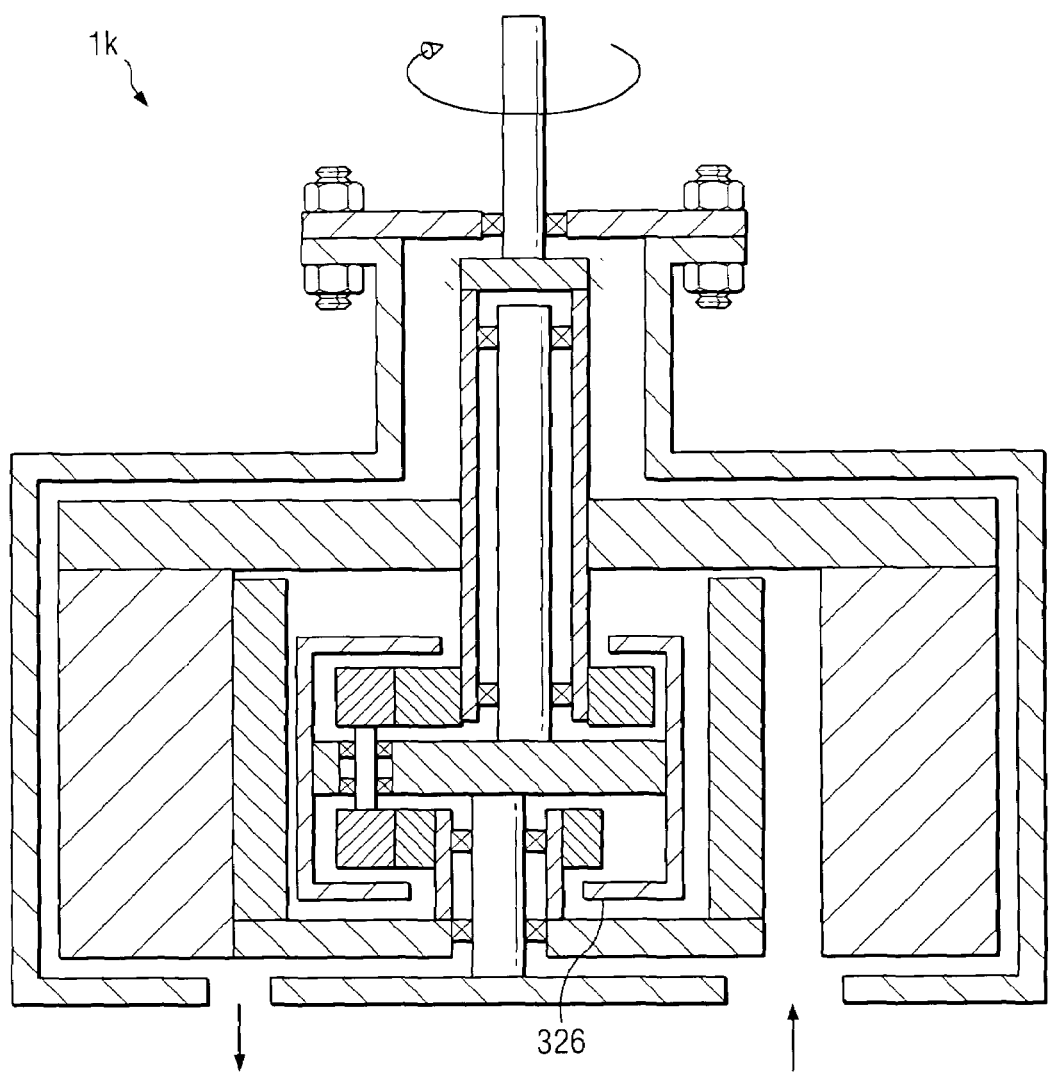

FIG. 51 illustrates an additional embodiment of gerotor apparatus 1*k*. The embodiment illustrated in FIG. 51 is substantially similar to the embodiment illustrated in FIG. 50; however, in the embodiment of FIG. 51, gear housing 326 is now disposed within inner gerotor 6*k*. This facilitates more of a "pancake" arrangement so that the cantilevering effect of outer gerotor 4*k* is reduced.

Figure 52:
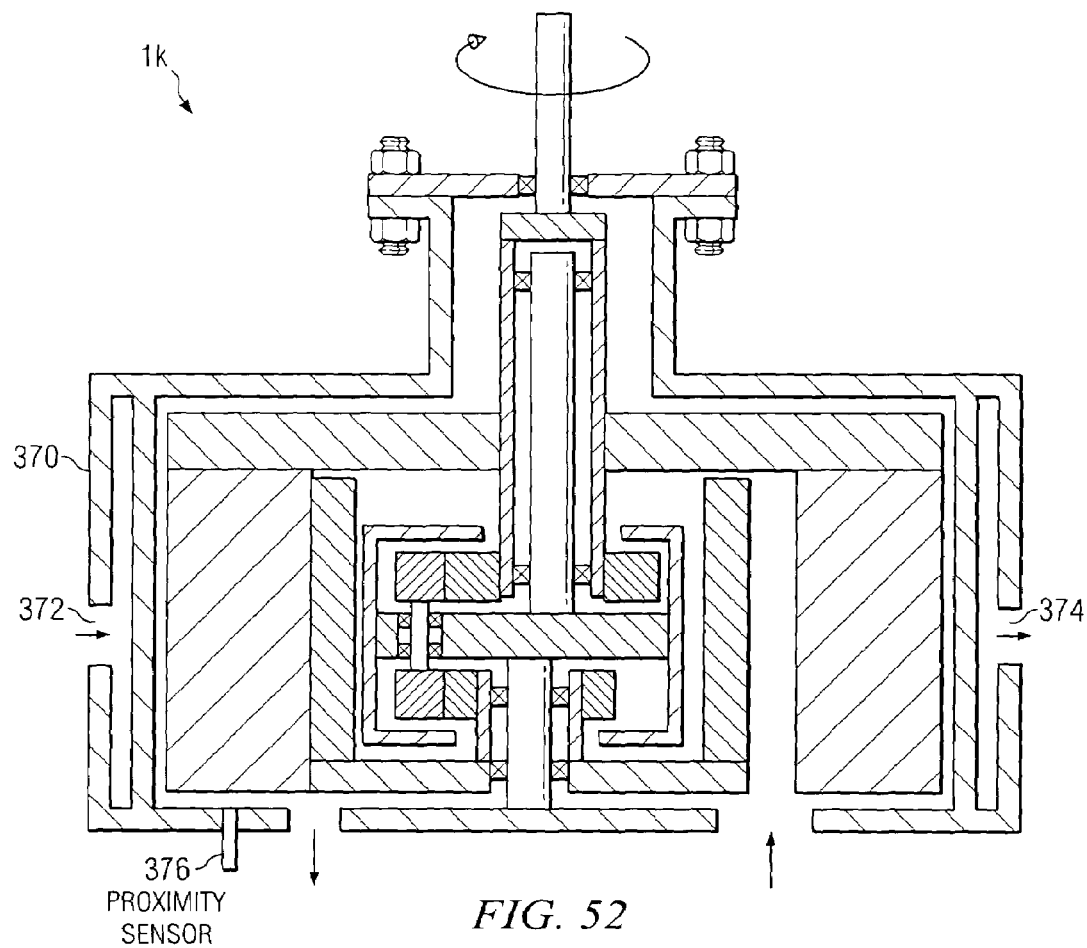

FIG. 52 illustrates an additional embodiment of gerotor apparatus 1*k*. The embodiment illustrated in FIG. 52 is substantially similar to the embodiment illustrated in FIG. 51; however, in the embodiment of FIG. 52, a jacket 370 exists around a perimeter of housing 2*k*. Jacket 370 has an inlet 372 and an exit 374 that function to recirculate any suitable fluid around the perimeter of housing 2*k* to control the temperature of housing 2k, thereby regulating its length and controlling a gap between the end of outer gerotor 4k and housing 2k. A proximity sensor 376 may be used to measure the gap. Proximity sensor 376 may be coupled to a suitable controller (not shown) that controls the flow of fluid through jacket 370 to regulate the gap to a predetermined distance. The present invention contemplates other methods to regulate the gap between outer gerotor 4k and housing 2k. Jacket 370, as illustrated in FIG. 52, may be used in any of the embodiments of the gerotor apparatuses described in this detailed description.

Figure 53A:
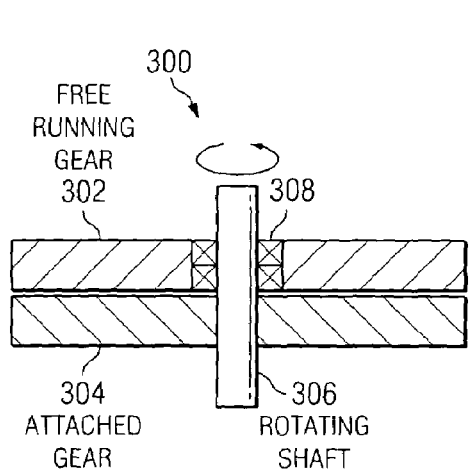
FIGS. 53A and 53B illustrate side and top views, respectively, of an anti-backlash gear system.
Figure 53B:
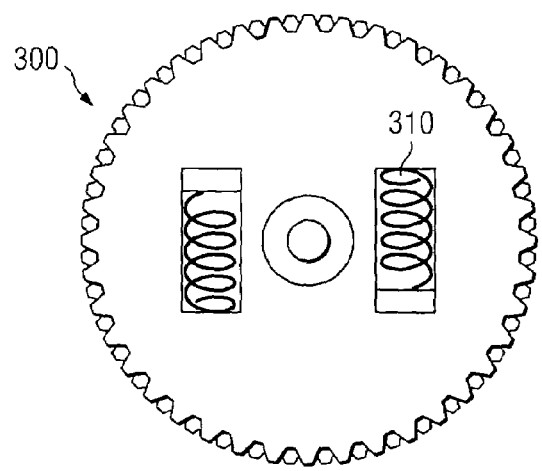

FIGS. 53A and 53B illustrate side and top views, respectively, of an anti-backlash gear system 300. Anti-backlash gearing system 300 includes a free spinning gear 302 and a gear 304 rigidly coupled to a rotating shaft 306. Free spinning gear 302 rotatably couples to rotating shaft 306 with one or more bearings 308. One or more springs 310 are biased against both free spinning gear 302 and gear 304. When the teeth of free spinning gear 302 and gear 304 are aligned, springs 310 compress. Then, when the aligned gear teeth are inserted or meshed with a mating gear (not shown), then contact is made on both faces of a single tooth, thereby preventing backlash. The present invention contemplates other anti-backlash gear systems.

Figure 54:
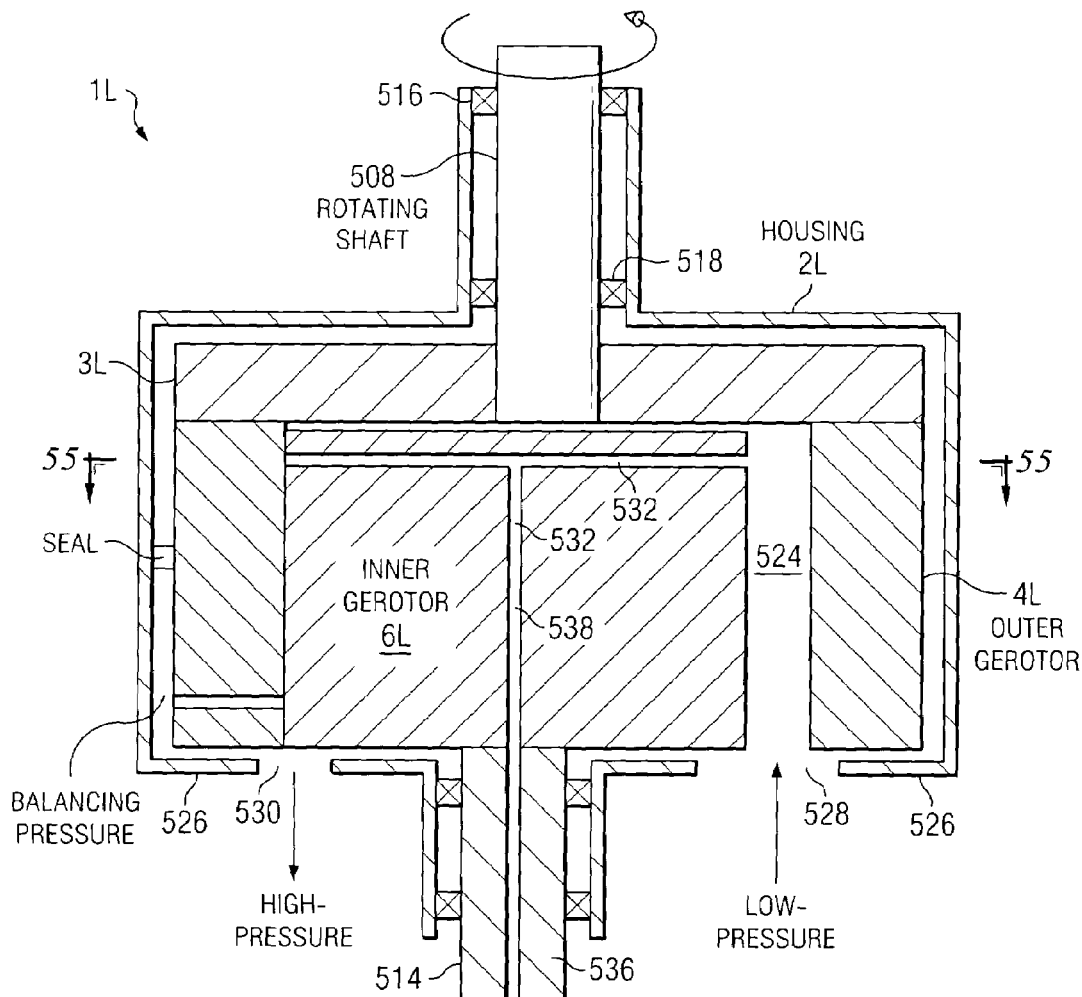

FIG. 54 illustrates an example embodiment of a gerotor apparatus 1L in which a lubricant is used to reduce friction. Gerotor apparatus 1L comprises a housing 2L, an outer gerotor assembly 3L, and an inner gerotor assembly 5L. Outer gerotor assembly 3L comprises an outer gerotor 4L and an outer gerotor shaft 508. Similarly, inner gerotor assembly 5L comprises an inner gerotor 6L and an inner gerotor shaft 514. Outer gerotor shaft 508 may be rotatably coupled to housing 2L by one or more bearings, such as first bearing 516 and second bearing 518 shown in FIG. 54. Similarly, inner gerotor shaft 514 may be rotatably coupled to housing 2L by one or more bearings, such as third bearing 520 and fourth bearing 522 shown in FIG. 54.

Outer gerotor 4L comprises an outer gerotor chamber 524. As shown in FIG. 54, at least a portion of inner gerotor 6L may be disposed within outer gerotor chamber 524. Gerotor apparatus 1L may also include a valve plate 526 operable to allow gas to enter into and exit from outer gerotor chamber 524. Valve plate 526 may include one or more gas inlet ports 528 allowing gas to enter outer gerotor chamber 524 and one or more gas outlet ports 530 allowing gas to exit outer gerotor chamber 524.

Outer gerotor 4L and inner gerotor 6L are operable to rotate relative to each other such that gerotor apparatus 1L may function as a compressor or an expander. For example, in an embodiment in which gerotor apparatus 1L functions as a compressor, a volume of gas at a first pressure may enter outer gerotor chamber 524 through gas inlet port 528, be compressed by the relative rotation of inner gerotor 6L and outer gerotor 4L, and exit outer gerotor chamber 524 through gas outlet port 530 at a second pressure higher than the first pressure. Alternatively, in an embodiment in which gerotor assembly 1L functions as an expander, pressurized or relatively high pressure gas may enter outer gerotor chamber 524 through gas outlet port 530, expand within outer gerotor chamber 524 while causing rotation of inner gerotor 6L and/or outer gerotor 4L in order to drive inner gerotor shaft 514 and/or outer gerotor shaft 508, and exit outer gerotor chamber 524 through gas inlet port 528.

Inner gerotor assembly 5L comprises one or more entrance passages 532 operable to communicate a lubricant 534 through inner gerotor 6L and into outer gerotor chamber 524 in order to reduce friction between inner gerotor 6L and outer gerotor 4L. For example, as shown in FIG. 54, inner gerotor shaft 514 may include a shaft entrance passage 536 coupled to an inner gerotor entrance passage 538 which opens into outer gerotor chamber 524. Lubricant 534 may comprise any suitable type or types of lubricating oil, such as motor oil, lubricating grease, water, fuel, or any other type of lubricant suitable to reduce friction between inner gerotor 6L and outer gerotor 4L.

As inner gerotor 6L rotates, lubricant 534 may travel outwardly along entrance passages 532 and into outer gerotor chamber 524 due to centrifugal forces. As discussed in greater detail with reference to FIG. 55, as lubricant 534 exits inner gerotor 6L, portions of the outer perimeter, or the tips, of inner gerotor 6L may be lubricated. In this embodiment, lubricant 534 may contact and/or mix with gases within outer gerotor chamber 524, including gas entering into outer gerotor chamber 524 through gas inlet port 528. In some embodiments, outer gerotor chamber 524 is substantially enclosed, such as by housing 2L and/or valve plate 526, such that at least a portion of lubricant 534 that is introduced into outer gerotor chamber 524 is contained within outer gerotor chamber 524 at least temporarily.

Figure 55:
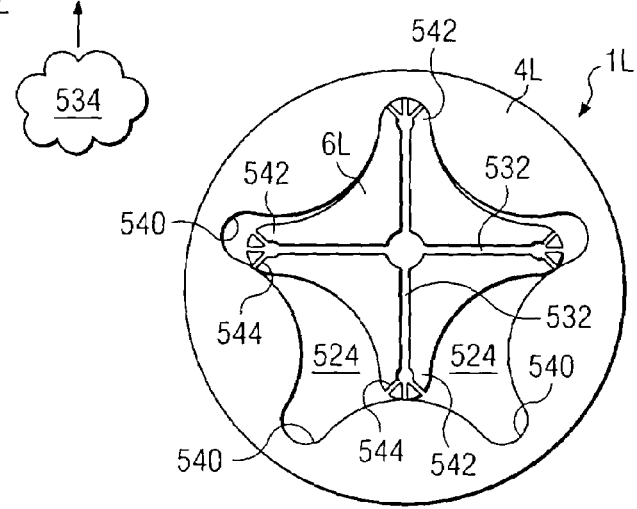

FIG. 55 illustrates a cross-section of outer gerotor 4L and inner gerotor 6L taken along line A—A of FIG. 54. For illustrative purposes, housing 2L is not shown in FIG. 55. As shown in FIG. 55, outer gerotor chamber 524 may include a plurality of notches 540 located around the perimeter of outer gerotor chamber 524. Inner gerotor 6L may include a plurality of protrusions, or tips, 542. Tips 542 may be shaped and/or sized such that they generally fit within notches 540 as inner gerotor 6L and outer gerotor 4L rotate relative to one another.

As discussed above, inner gerotor 6L may include one or more inner gerotor entrance passages 532. As shown in FIG. 55, inner gerotor 6L may include an inner gerotor entrance passage 538 extending generally from the center of inner gerotor 6L toward each tip 542 of inner gerotor 6L. Each tip 542 may include one or more tip openings 544 operable to allow lubricant 534 to enter outer gerotor chamber 524 via inner gerotor entrance passages 532. Although inner gerotor 6L comprises a star shape based upon a hypocycloid having four tips 542 and outer gerotor chamber 524 comprises a star shape having five notches 540 in the embodiment shown in FIG. 55, inner gerotor 6L and outer gerotor chamber 524 may have any other suitable shape or configuration without departing from the scope of the present invention. For example, the shape may be based on an epicycloid, or the number of tips and notches may be altered.

Figure 56:
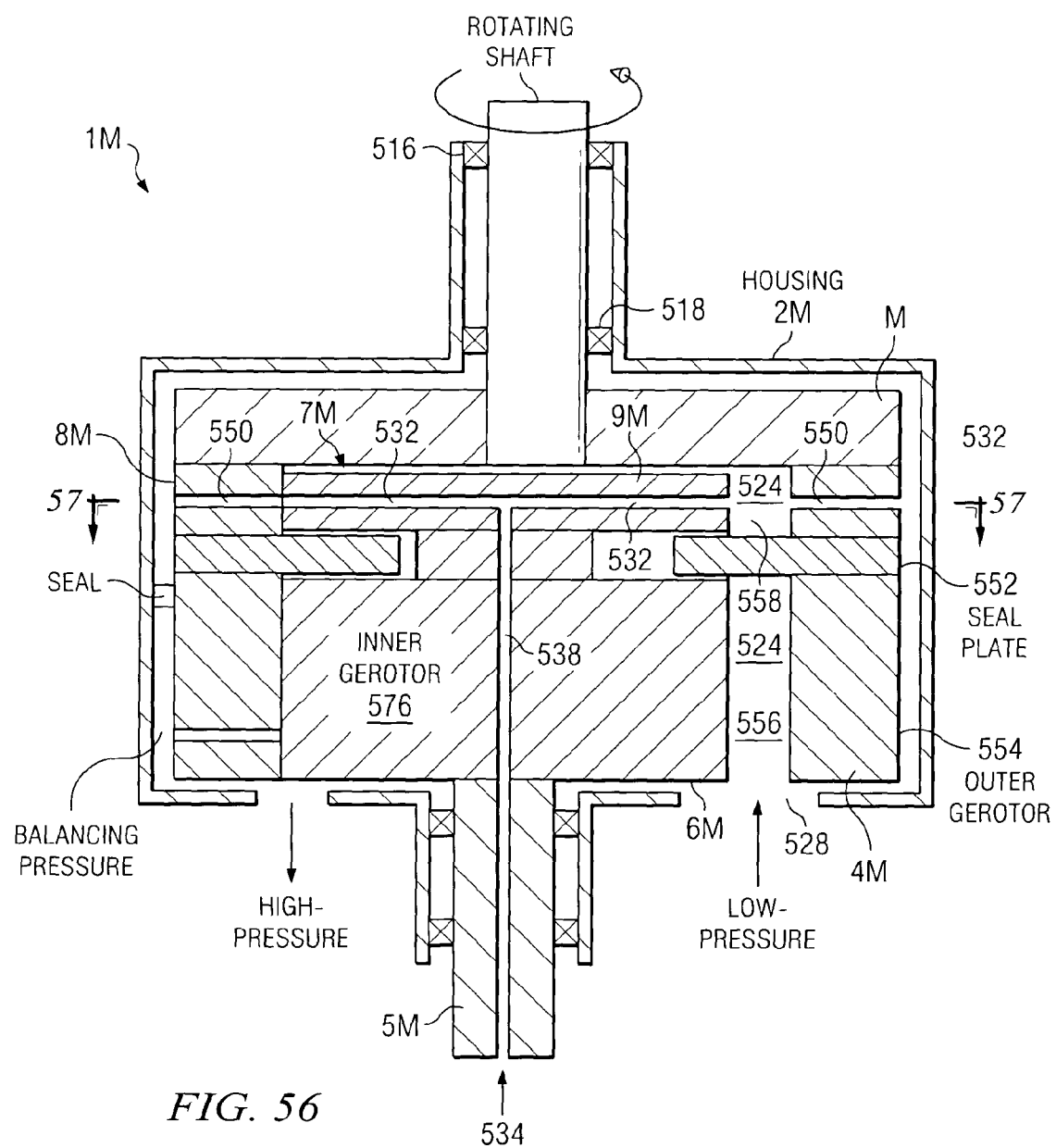

FIG. 56 illustrates an example embodiment of a gerotor apparatus 1M in which lubricant 534 may be expelled from outer gerotor chamber 524 and kept at least substantially separate from gases entering outer gerotor chamber 524 through gas inlet port 528. As shown in FIG. 56, gerotor apparatus IM comprises a housing 2M, an outer gerotor assembly 3M comprising an outer gerotor 4M, an inner gerotor assembly 5M comprising an inner gerotor 6M, and a synchronizing system 7M. Synchronizing system 7M comprises an outer gerotor portion 8M and an inner gerotor portion 9M. Inner gerotor 6M may function along with outer gerotor 4M to provide compressor or expander functions while synchronizing system 7M may be used to synchronize inner gerotor 6M and outer gerotor 4M.

In particular embodiments, such as shown in FIG. 56 for example, inner gerotor 6M is disposed generally with first section 556 of outer gerotor chamber 524 and inner gerotor portion 9M of synchronizing system 7M is disposed generally within second section 558 of outer gerotor chamber 524.

In addition, in some embodiments, inner gerotor 6M may comprise a star shape, such as shown in FIGS. 55 and 57A, while inner gerotor portion 9M of synchronizing system 7M may comprise a different shape, such as the cross shape shown in FIG. 57B, for example.

Inner gerotor portion 9M of synchronizing system 7M comprises one or more entrance passages 532 allowing lubricant 534 to be introduced into portion 558 of outer gerotor chamber 524. Outer gerotor portion 8M of synchronizing system 7M comprises one or more exit passages 550 operable to allow such lubricant 534 introduced into portion 558 to escape portion 558 of outer gerotor chamber 524. For example, as outer gerotor assembly 3M rotates, exit passages 550 may communicate lubricant 534 from inside portion 558 of outer gerotor chamber 524 to an area 554 external to outer gerotor 4M.

In addition, gerotor apparatus 1M may comprise a seal plate 552 operable to at least substantially separate or seal a first portion 556 of outer gerotor chamber 524 comprising lubricant 534 from a second portion 558 of outer gerotor chamber 524 in which gases are received through gas inlet port 528. In this manner, lubricant 534 may be kept from mixing with gases entering first portion 556 of outer gerotor chamber 524 through gas inlet port 528. The advantage of this embodiment is the gases are substantially free of lubricants.

FIGS. 57A and 57B illustrate two example cross sections of synchronizing system 7M taken along line B—B of FIG. 56. FIG. 57A shows a portion of inner gerotor portion 9M of synchronizing system 7M disposed within outer gerotor portion 8M of synchronizing system 7M. In this embodiment, inner gerotor portion 9M comprises a star shape having a plurality of protrusions, or tips, 560, and second portion 558 of outer gerotor chamber 524 comprises a plurality of notches 562 located proximate the perimeter of outer gerotor portion 8M. As discussed above, outer gerotor portion 8M comprises exit passages 550 operable to allow lubricant 534 introduced into second section 558 of outer gerotor chamber 524 to escape outer gerotor chamber 524. For example, lubricant 534 may be introduced into a central portion 564 of inner gerotor portion 9M, travel outward along entrance passages 532 (such as due to centrifugal forces caused by the rotation of inner gerotor 6M, for example), enter into second portion 558 of outer gerotor chamber 524, and exits outer gerotor portion 9M through exit passages 550. In some embodiments, such as those shown in FIGS. 57A and 57B, exit passages 550 may be located proximate notches 562 in outer gerotor chamber 524. In such embodiments, one or more notches 562 may include an exit opening 566 opening into an exit passage 550.

FIG. 57B illustrates one alternative to the embodiment shown in FIG. 57A. As shown in FIG. 57B, inner gerotor portion 9M of synchronizing system 7M comprises a cross shape including a center 568 and a plurality of arms 570 projecting outwardly from center 568. Each arm 570 comprises a tip 572 which may be shaped and/or sized to fit generally within notches 562 of second section 558 of outer gerotor chamber 524. Each tip 572 may comprise one or more openings 574 allowing entrance passages 532 to communicate lubricant 534 into second section 558 of outer gerotor chamber 524. An advantage of the embodiment illustrated in FIG. 57B is there are fewer losses due to gas compression in the second portion 558 of outer gerotor chamber 524.

FIGS. 58 through 63 illustrate various example embodiments of gerotor apparatuses including a synchronizing system having one or more alignment members and/or alignment guides for controlling and/or insuring the proper rotation and/or alignment of the inner gerotor and outer gerotor. An advantage of these embodiments is they may provide two alignment surfaces, which reduces loads at the contact points.

Figure 58:
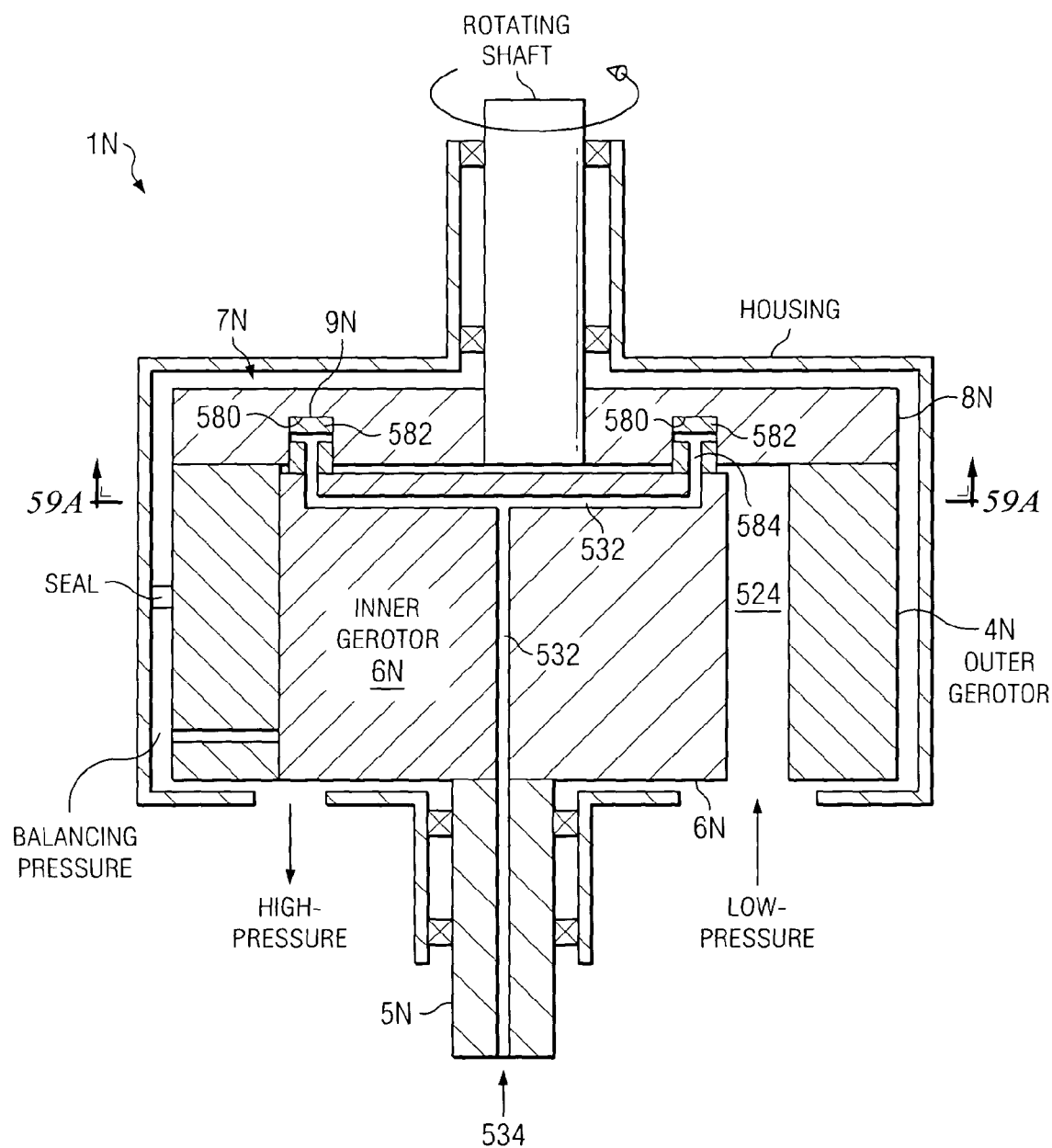

FIG. 58 illustrates an embodiment of a gerotor apparatus 1N comprising a housing 2N, an outer gerotor assembly 3N comprising an outer gerotor 4N, an inner gerotor assembly 5N comprising an inner gerotor 6N, and a synchronizing system 7N. Like the other various gerotor apparatuses discussed herein, gerotor apparatus 1N may be designed to function as a compressor and/or an expander, depending on the particular embodiment. Inner gerotor 6N may function along with outer gerotor 4N to provide compressor or expander functions while synchronizing system 7N may be used to synchronize inner gerotor 6N and outer gerotor 4N.

Synchronizing system 7N comprises an outer gerotor portion 8N and an inner gerotor portion 9N, such as described above with reference to FIGS. 56, 57A and 57B. Outer gerotor portion 8N comprises a plurality of alignment guides 580 and inner gerotor portion 9N comprises a plurality of alignment members 582 positioned in alignment with alignment guides 580. One or more alignment members 582 may comprise an alignment member passage 584 operable to communicate a lubricant, such as lubricant 534 for example, toward or into one or more alignment guides 580. As shown in FIG. 58, each alignment member passage 584 may be coupled to an appropriate entrance passage 532 formed in inner gerotor 6N such that lubricant 534 may be introduced into inner gerotor assembly 5N, travel toward alignment members 582 (such as due to centrifugal forces caused by the rotation of inner gerotor 6N, for example), and release into alignment guides 580 in order to provide lubrication between alignment members 582 and alignment guides 580 during the rotation of inner gerotor 6N relative to outer gerotor 4N. In the embodiment shown in FIG. 58, lubricant 534 may contact and/or mix with gases within outer gerotor chamber 524, including gases entering into outer gerotor chamber 524 through gas inlet port 528. In some embodiments, outer gerotor chamber 524 is substantially enclosed such that at least a portion of lubricant 534 that is introduced into outer gerotor chamber 524 is contained within outer gerotor chamber 524 at least temporarily.

FIG. 59A illustrates an exploded cross-sectional view of a portion of synchronizing system 7N taken along line C—C shown in FIG. 58, with outer gerotor portion 8N shown separate from inner gerotor portion 9N. Inner gerotor portion 9N may be at least partially integral with inner gerotor 6N. FIG. 59B illustrates a side view of a portion of outer gerotor portion 8N and inner gerotor portion 9N shown in FIG. 59A assembled for operation (such as shown in FIG. 58).

As shown in FIGS. 59A and 59B, alignment guide 580 may comprise an alignment track 586 and alignment members 582 may comprise knob devices 588 operable to move along alignment track 586 as inner gerotor assembly 5N rotates relative to outer gerotor assembly 3N. Knob device 588 may comprise a knob, protrusion, or other suitable member rigidly coupled to inner gerotor portion 9N of synchronizing system 7N such that knob device 588 does not rotate relative to inner gerotor portion 9N. In alternative embodiments, such as shown in FIGS. 60 through 62, knob device 588 may comprise a wheel device rotatably coupled to inner gerotor portion 9N.

As discussed above, each alignment member 582, or knob device 588, may comprise one or more alignment member passages 584 operable to communicate lubricant 534 toward, or into, alignment track 586. In this manner, lubricant 534 may travel outwardly along inner gerotor entrance passages 532, through alignment member passages 584, and into alignment guide 586 in order to reduce friction between knob devices 588 and alignment track 586.

Figure 59C:
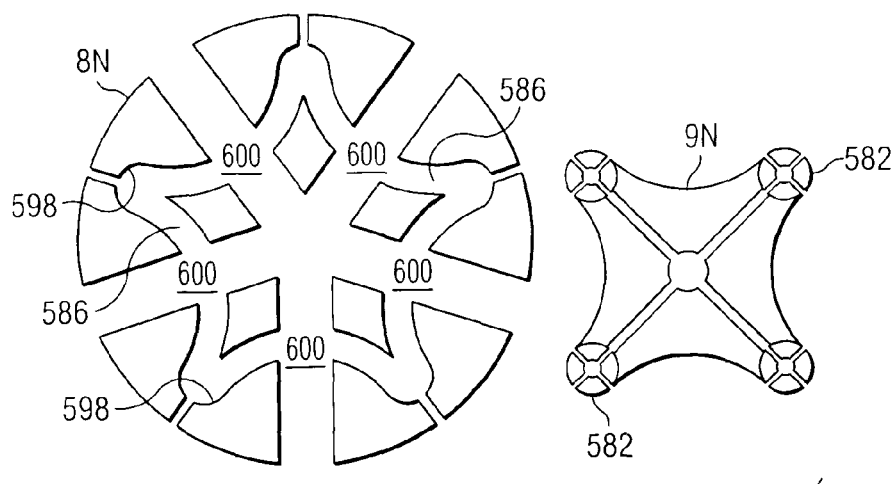

Alignment track 586 is defined at least in part by an inner surface 594 and an outer surface 596, and may comprise a plurality of alignment guide notches 598 in the embodiment shown in FIG. 59A, the width of alignment track 586 is at least substantially uniform around the perimeter of alignment track 586. In alternative embodiments, such as the embodiments shown in FIGS. 59C and 59D, for example, alignment track 586 may comprise one or more breaks or may have a substantially non-uniform width.

Outer gerotor portion 8N may comprise one or more exit passages 592 operable to allow lubricants, such as lubricant 534, to exit alignment track 586. It should be noted that exit passages 592 are not shown in FIG. 58, but are shown in FIGS. 59A and 59B. As shown in FIG. 59A, exit passages 592 may be located proximate alignment track notches 598. In operation, lubricant 534 entering alignment track 586 through alignment member passages 584 may be removed from alignment track 586 through exit passages 592.

FIG. 59C illustrates an exploded cross-sectional view of a portion of synchronizing system 7N taken along line C—C shown in FIG. 58, with outer gerotor portion 8N shown separate from inner gerotor portion 9N, in an alternative embodiment of the invention. As discussed above, inner gerotor portion 9N may be at least partially integral with inner gerotor 6N.

As shown in FIG. 59C, alignment track 586 may be intermittent, or contain one or more breaks 600. In some embodiments, as alignment members 582 travel along alignment track 586, they may provide rotational torque when located in a notch 598 in alignment track 586. When alignment members 582 are located in notches 598, the relative motion of the alignment member 582 and alignment track 586 is relatively small, and thus friction between the two may be relatively small. In contrast, when an alignment member 582 is proximate a valley of alignment track 586, the alignment member 582 provides little rotational torque but because the relative motion of the alignment member 582 with alignment track 586 is relatively large, the friction between the two is also relatively large. Thus, the intermittent alignment track 586 shown in FIG. 59C removes the valleys of alignment track 586 because such valleys serve little useful function and contribute to friction losses.

Figure 59D:
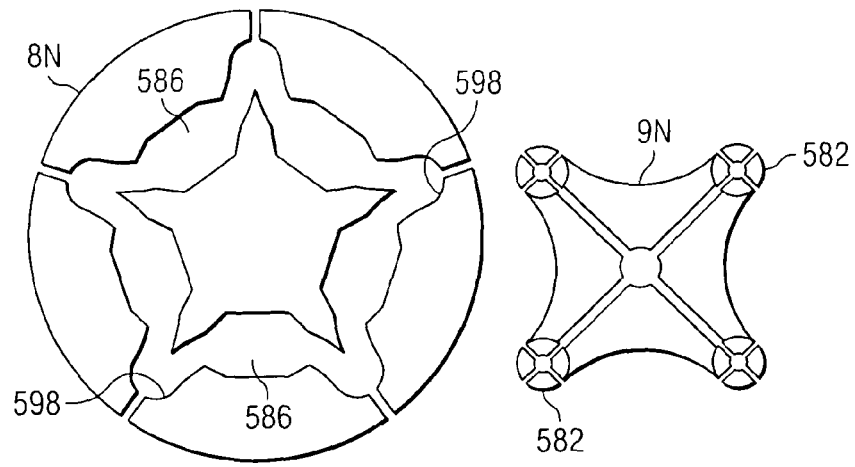

FIG. 59D illustrates an exploded cross-sectional view of a portion of synchronizing system 7N taken along line C—C shown in FIG. 58, with outer gerotor portion 8N shown separate from inner gerotor portion 9N, in an another alternative embodiment of the invention. As shown in FIG. 59D, alignment track 586 comprises a relatively non-uniform width around the perimeter of alignment track 586. In particular, the width of alignment track 586 may be greater proximate the valleys of alignment track 586 than proximate notches 598 of alignment track 586. In this manner, alignment members 582 may be kept from contacting alignment guide 586 when alignment members 582 are located proximate the valleys of alignment track 586 in order to reduce friction between the two, as discussed above with reference to FIG. 59C.

Figure 60A:
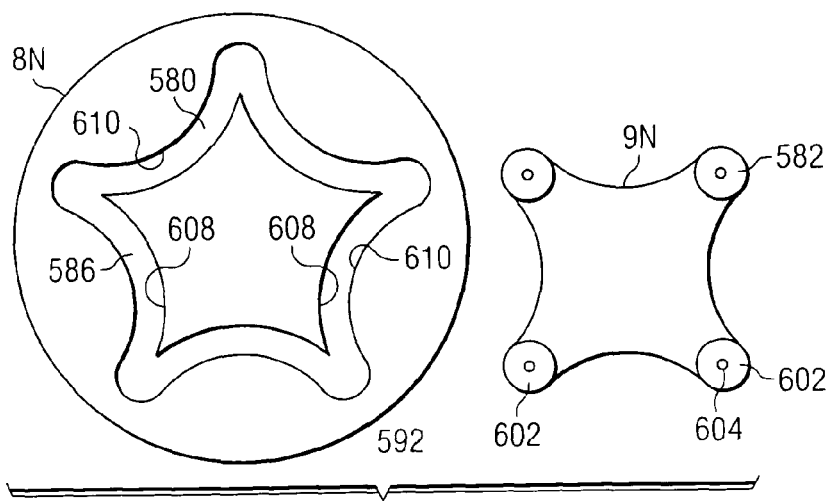

FIGS. 60A and 60B illustrate an example of a synchronizing system 7N in accordance with yet another embodiment of the present invention. FIG. 60A illustrates an exploded cross-sectional view similar to those shown in FIGS. 59A, 59C and 59D, while FIG. 60B illustrates a partial side view similar to that of FIG. 59B. In this embodiment, alignment members 582 may comprise rollers, or wheels, 604 rotatably coupled to inner gerotor portion 9N of synchronizing system 7N, such as by pegs or shafts 604. As shown in FIG. 60B, each roller 602 rotates with the aid of a bearing 606. The rollers can be hollow to reduce weight. Rollers 602 are operable to rotate relative to inner gerotor portion 9N as rollers 602 travel along alignment track 586. As shown in FIG. 60A, alignment track 586 may be defined at least in part by an inner surface 608 and an outer surface 610. As rollers 602 travel along alignment track 586, individual rollers 602 may roll along inner surface 608 and/or outer surface 610 at various locations of alignment track 586. Rollers 602 may be advantageous as they may reduce friction between alignment members 582 and alignment guide 580.

FIGS. 61A and 61B illustrate another example of a synchronizing system 7N in accordance with yet another embodiment of the present invention. This embodiment is similar to the embodiment shown in FIGS. 60A and 60B, without the inner surface of alignment guide 580. Such a configuration may eliminate friction between rollers 602 and an inner surface of alignment guide 580, which may be advantageous.

FIGS. 62A, 62B and 62C illustrate an embodiment of a synchronizing system 7M which may be viewed in conjunction with the embodiment shown in FIG. 56. As discussed above regarding FIG. 56, gerotor apparatus 1M comprises a housing 2M, an outer gerotor assembly 3M comprising an outer gerotor 4M, an inner gerotor assembly 5M comprising an inner gerotor 6M, and a synchronizing system 7M. Synchronizing system 7M comprises an outer gerotor portion 8M and an inner gerotor portion 9M.

As discussed above regarding FIG. 56, inner gerotor portion 9M of synchronizing system 7M is disposed generally within a second section 558 of outer gerotor chamber 524. Second section 558 of outer gerotor chamber 524 may comprise a plurality of notches 614 and an inner perimeter surface 616.

Inner gerotor portion 9M may comprise a star shape including a center region 618 and a plurality of protrusions 620 extending outwardly from center region 618. A knob device 622 is coupled to each of the protrusions 620 of inner gerotor portion 9M. In the embodiments shown in FIGS. 62A, 62B and 62C, knob devices 622 comprise roller devices rotatably coupled to each protrusion 620. In alternative embodiments, however, knob devices 622 may comprise other suitable types of devices rigidly coupled to inner gerotor portion 9M.

Knob devices 622 may be sized and/or shaped such that they generally fit within notches 614 of outer gerotor chamber 524. Knob devices 622 may contact and/or roll along inner perimeter surface 616 of second section 558 of outer gerotor chamber 524 as inner gerotor assembly 5M rotates relative to outer gerotor assembly 3M. Gerotor apparatus 1M may be designed to function as a compressor or an expander depending on the particular embodiments.

FIG. 62B illustrates a side view of a roller device 622 rotatably coupled to a protrusion 620 of inner gerotor portion 9M of synchronizing system 7M in accordance with one embodiment. In this embodiment, protrusion 620 comprises a protuberance 624 and roller device 622 comprises a first roller 626 and a second roller 628 rotatably coupled on opposite sides of protuberance 624. Protuberance 624 may comprise an outer tip 630 and roller device 622 may extend beyond tip 630 such that protuberance 624 does not contact inner perimeter surface 616 of second section 558 of outer gerotor chamber 524.

FIG. 62C illustrates a side view of a roller device 622 rotatably coupled to a protrusion 620 of inner gerotor portion 9M of synchronizing system 7M in accordance with another embodiment of the present invention. In this embodiment, protrusion 620 includes a slot 634 and roller device 622 is disposed at least partially within slot 634. Protrusion 620 may comprise a leading tip 636 and roller device 622 may extend beyond leading tip 636 such that protrusion 620 does not contact inner perimeter surface 616 of second section 558 of outer gerotor chamber 524.

Figure 63:
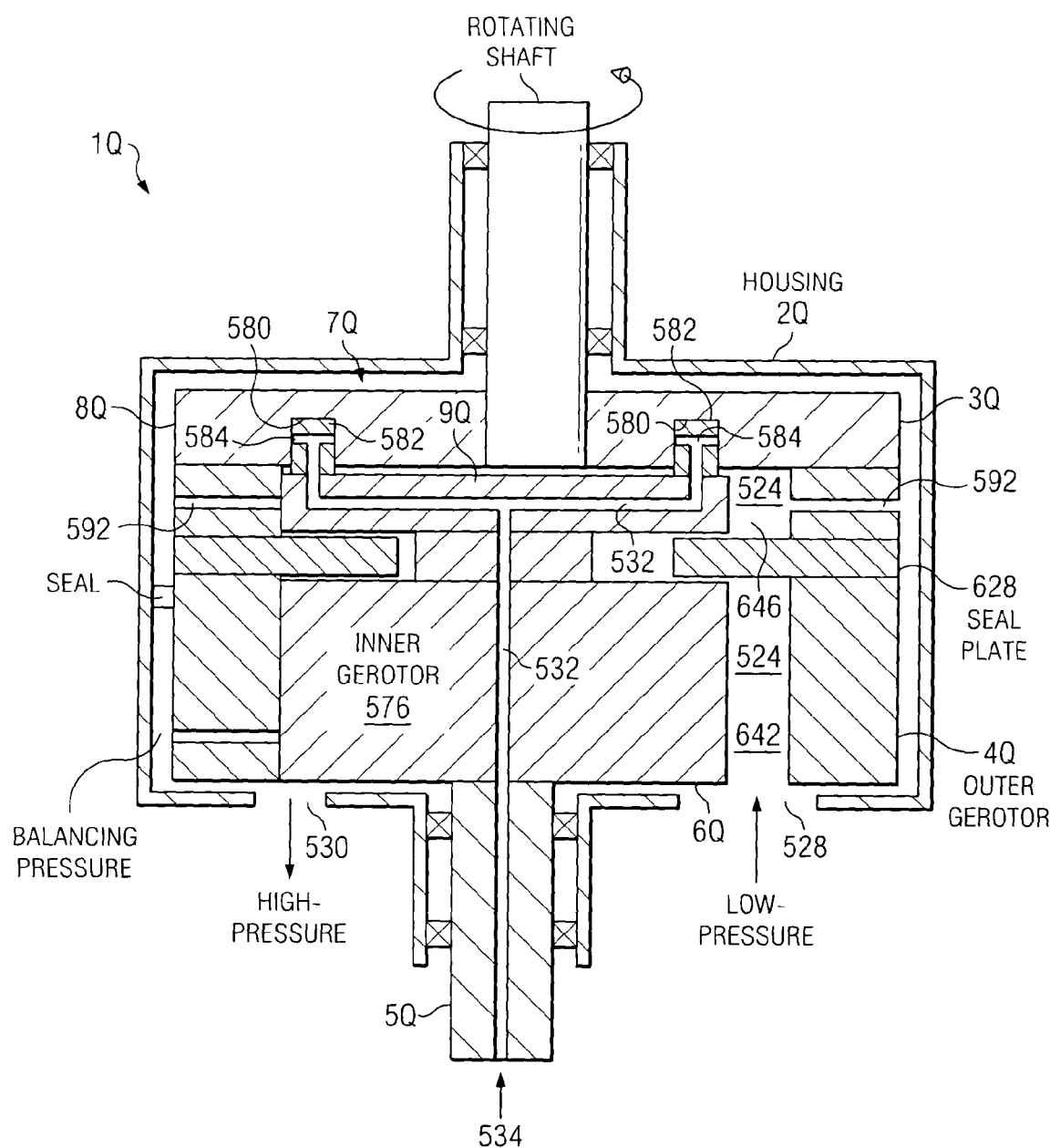

FIG. 63 illustrates another embodiment of a gerotor apparatus 1Q in which a lubricant may be introduced between alignment members and alignment guide of a synchronizing system and kept at least substantially separate from gases being introduced into gerotor apparatus 1Q. Gerotor apparatus 1Q comprises a housing 2Q, an outer gerotor assembly 3Q comprising an outer gerotor 4Q, an inner gerotor assembly 5Q comprising an inner gerotor 6Q, and a synchronizing system 7Q. Synchronizing system 7Q comprises an outer gerotor portion 8Q and an inner gerotor portion 9Q.

Inner gerotor 6Q is disposed at least partially within a first section 642 of outer gerotor chamber 524 while inner gerotor portion 9M of synchronizing system 7M is disposed at least partially within a second section 646 of outer gerotor chamber 524. Outer gerotor portion 8Q of synchronizing system 7M comprises one or more alignment guides 580, and inner gerotor portion 9Q of synchronizing system 7M comprises one or more alignment members 582 disposed in alignment with alignment guide 580. Inner gerotor 6Q may include one or more entrance passages 532 operable to communicate a lubricant, such as lubricant 534 for example, toward inner gerotor portion 9Q of synchronizing system 7M. Alignment members 582 may comprise alignment member passages 584 coupled to inner gerotor entrance passages 532 and operable to communicate lubricant 534 into alignment guide 580 in order to reduce friction between alignment members 582 and alignment guide 580.

Outer gerotor portion 8Q of synchronizing system 7M may comprise one or more exit passages 592 operable to allow lubricant 534 present within second section 626 of outer gerotor chamber 524 to escape or exit from outer gerotor assembly 3Q. In some embodiments, outer gerotor assembly 3Q includes a barrier or seal, such as a seal plate, 628 operable to at least substantially separate first and second sections 642 and 646 of outer gerotor chamber 524. In this manner, seal plate 628 may be operable to substantially keep lubricant 534 introduced into second section 646 from entering into first section 642 and contacting and/or mixing with gases entering first section 642 through gas inlet port 528.

Figure 64A:
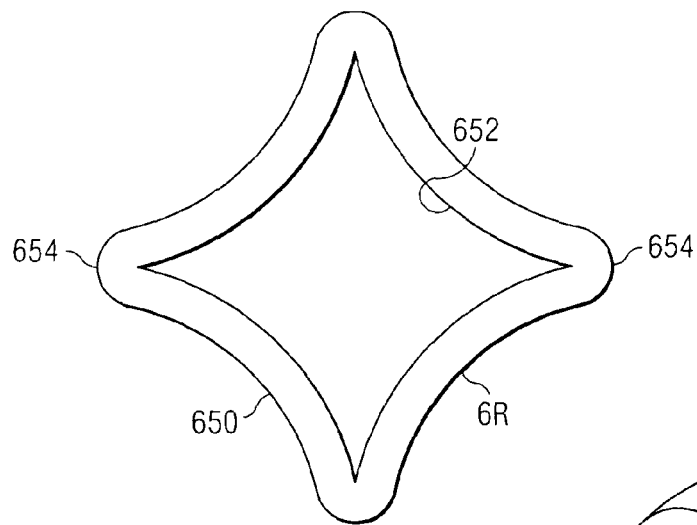
FIGS. 64A and 64B illustrate an inner gerotor having a hypocycloid shape.

FIG. 64A illustrates an embodiment of an inner gerotor 6R having a shape based on a hypocycloid. Inner gerotor 6R comprises a cross-sectional shape 650 based at least in part on a hypocycloid shape 652. In the embodiment shown in FIG. 64A, cross-sectional shape 650 of inner gerotor 6R comprises a substantially uniform offset from hypocycloid shape 652 with a plurality of curved tips 654. An advantage of the embodiment illustrated in FIG. 64A is that the inner and outer gerotors may achieve a high compression ratio in a single stage.

Figure 64B:
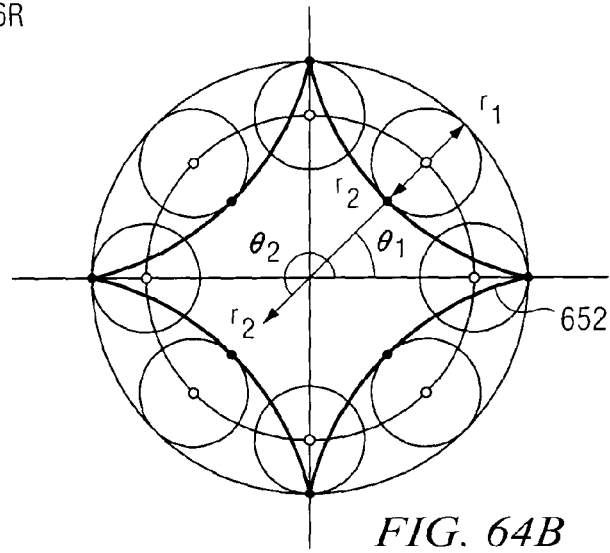

FIG. 64B illustrates a method of generating a hypocycloid shape, such as hypocycloid shape 652, for example.

Figure 65A:
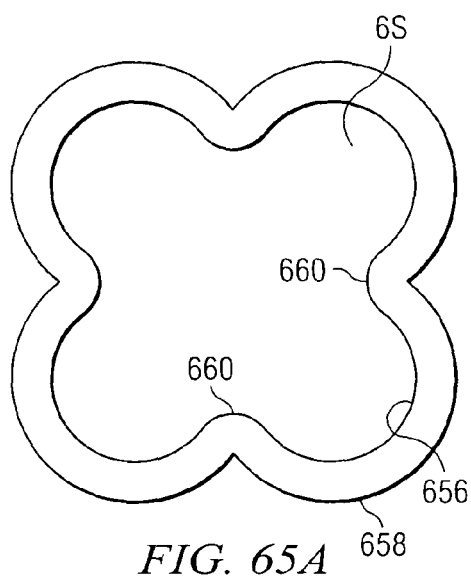
FIGS. 65A and 65B illustrate an inner gerotor having a epicycloid shape.

FIG. 65A illustrates an embodiment of an inner gerotor 6S having a shape based at least in part on an epicycloid. Inner gerotor 6S comprises a cross-sectional shape 656 based at least in part on an epicycloid shape 658. For example, as shown in FIG. 65A, cross-sectional shape 656 of inner gerotor 6S comprises a substantially uniform offset from epicycloid shape 658 and a plurality of curved protuberances 660. An advantage of the embodiment illustrated in FIG. 65A is when small numbers of teeth are employed, it has a large volumetric capacity.

Figure 65B:
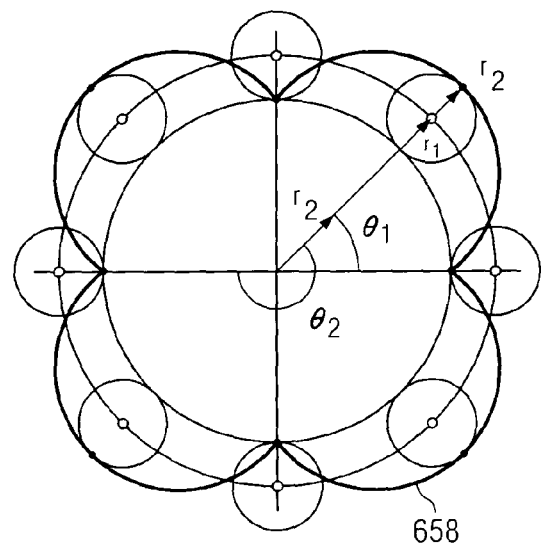

FIG. 65B illustrates a method of generating an epicycloid shape, such as epicycloid 658, for example.

FIGS. 66 through 74 illustrate example embodiments of an engine system comprising a pair of gerotor apparatuses which work together to perform one or more engine functions. Although each of the embodiments shown in FIGS. 66 through 74 are described such that the pair of gerotor apparatuses includes an expander and a compressor, in alternative embodiments the pair of gerotor apparatuses may include a pair of expanders or a pair of compressors. In addition, in alternative embodiments, a component of the engine system may comprise any suitable number of interrelated expanders, compressors, or any combination thereof. An advantage of the embodiments illustrated in FIGS. 66 through 74 is compactness.

FIG. 66A illustrates an engine system 700A in accordance with one embodiment to the present invention. Engine system 700A comprises a compressor 702A at least partially integrated with an expander 704A and disposed at least partially within a housing 706A. Compressor 702A comprises a compressor outer gerotor 708A and a compressor inner gerotor 710A. Similarly, expander 704A comprises an expander outer gerotor 712A and an expander inner gerotor 714A. As shown FIG. 66A, compressor outer gerotor 708A and expander outer gerotor 712A may be at least partially integrated within an outer gerotor assembly 716A. Similarly, compressor inner gerotor 710A and expander inner gerotor 714A may be at least partially integrated within an inner gerotor assembly 718A. Some embodiments, outer gerotor assembly 716A comprises a barrier or seal, such as a seal plate, 720A that substantially separates a first section 744 of an outer gerotor chamber from a section 746 of the outer gerotor chamber. In this manner, seal 720A may substantially separate compressor 702A from expander 704A.

As shown in FIG. 66A, inner gerotor 718A may be rigidly coupled to an inner gerotor shaft 722A which may be rotatably coupled to housing 706A. For example, in the embodiment shown in FIG. 66A, shaft 722A is rotatably coupled to housing 706A by first bearing 724A and a second bearing 726A. Similarly, outer gerotor assembly 716A may be rotatably coupled to housing 706A. For example, outer gerotor assembly 716A may be rotatably coupled to housing 706A by a third bearing 728A and a fourth bearing 730A. In this manner, inner gerotor assembly 714A and outer gerotor 716A may rotate relative to housing 706A in order to perform the functions of compressor 702A and expander 704A.

As shown in FIG. 66A, engine system 700A comprises a first valve plate 732A allowing gases to flow in and out of compressor 702A and a second valve plate 734A allowing gases to flow in and out of expander 704A. First valve plate 732A comprises a compressor gas inlet port 736A and a compressor gas outlet port 738A. Compressor gas inlet port 736A allows gas at a first pressure to enter compressor 702A. These gases are then compressed by the rotation of compressor inner gerotor 710A relative to compressor outer gerotor 708A before exiting or being expelled from compressor 702A through compressor gas outlet port 738A.

Similarly, second valve plate 734A comprises an expander gas inlet port 740A and an expander gas outlet port 742A. Expander gas inlet port 740A allows gases to enter expander 704A. These gases expand within expander 704A as expander inner gerotor 714A rotates relative to expander outer gerotor 712A before exiting or being expelled from expander 704A through expander gas outlet port 742A. The expansion of these gases within expander 704A may at least partially drive the rotation of inner gerotor assembly 718A and/or outer gerotor assembly 716A.

FIG. 66B illustrates a cross section of compressor 702A taken along line C—C shown in FIG. 66A, while FIG. 66C illustrates a cross section of expander 704A taken along line D—D shown in FIG. 66A. As shown in FIG. 66B, compressor 702A comprises compressor inner gerotor 710A disposed substantially within outer gerotor chamber 744 of compressor outer gerotor 708A. Similarly, as shown in FIG. 66C, expander 704A comprises expander inner gerotor 714A disposed substantially within outer gerotor chamber 746 of expander outer gerotor 712A. In the embodiment shown in FIGS. 66B and 66C, compressor inner gerotor 710A may comprise one or more entrance passages 748 operable to communicate a lubricant, such as lubricant 534, into outer gerotor chamber 744, while expander inner gerotor 714A does not include such entrance passages for communicating a lubricant into outer gerotor chamber 746. This configuration may be appropriate in an embodiment in which it is desirable or acceptable for lubricant 534 to contact and/or mix with relatively low temperature gases traveling through outer gerotor chamber 744 of compressor outer gerotor 708A but not desirable or acceptable for a lubricant to contact and/or mix with relatively high temperature gases traveling through outer gerotor chamber 746 of expander outer gerotor 712A. However, in alternative embodiments, neither or both of compressor inner gerotor 710A and expander inner gerotor 714A may include entrance passages for introducing a lubricant into outer gerotor chambers 744 or 746.

Figure 67:
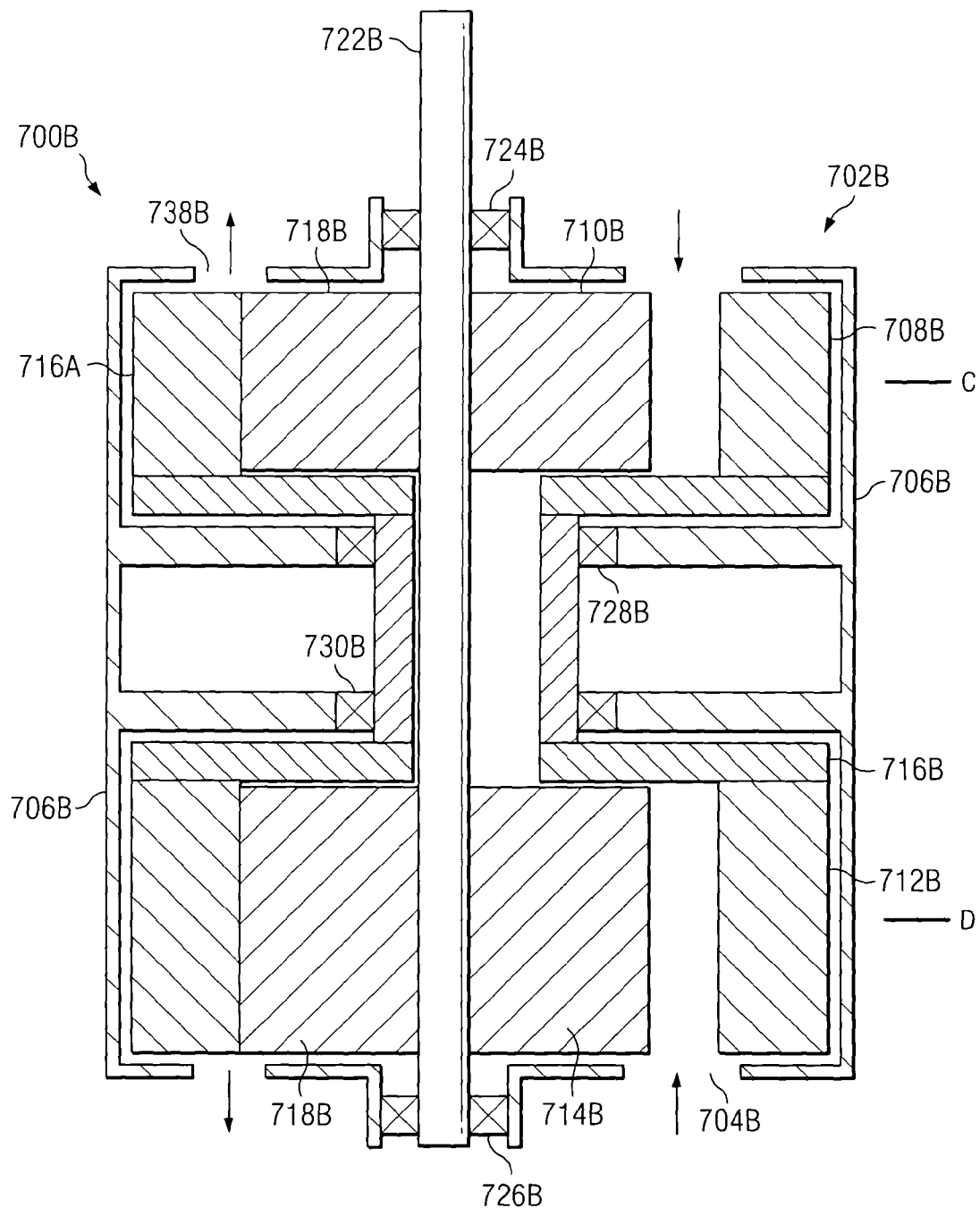

FIG. 67 illustrates another embodiment of an engine system 700B comprising a compressor 702B at least partially integrated with a compressor 704B. Engine system 700B is similar to engine system 700A shown FIG. 66A; however, in engine system 700B, third bearing 728B and fourth bearing 730B which rotatably couple outer gerotor assembly 716B to housing 706B are disposed inwardly and between compressor 702B and expander 704B. This configuration may allow a reduced diameter or outer perimeter of housing 706B as compared with housing 706A shown in FIG. 66A, assuming the outer diameters of outer gerotor assemblies 716A and 716B are the same. In addition, because the diameters of third and fourth bearings 728B and 730B shown in FIG. 67 are generally smaller than the diameters of third and fourth bearings 728A and 730A shown in FIG. 66A, the configuration of engine system 700B may be more appropriate for high rotational speed applications than the configuration of engine system 700A shown in FIG. 66A. It should be noted that cross sections of engine system 700B taken along line C—C and line D—D shown in FIG. 67 may, in some embodiments, be represented by the cross sections shown in FIGS. 66B and 66C, respectively.

FIG. 68A illustrates a side view of an embodiment of an engine system 700D comprising an outer gerotor assembly 716D, and inner gerotor assembly 718D, and a synchronizing system 760D operable to control the rotation of inner gerotor assembly 718D relative outer gerotor assembly 176D and/or to physically align inner gerotor assembly 718D relative to outer gerotor assembly 176D. As shown in FIG. 68A, engine system 700D may be similar to engine system 700A shown in FIG. 66A, with the addition of synchronizing system 760D.

Synchronizing system 760D comprises a drive plate 762D, a cam plate 764D, and an alignment plate 766D. Cam plate 764D comprises one or more alignment guides 768D. Alignment plate 768D comprises one or more alignment members, such as knobs, rollers or pegs, 770D generally disposed in alignment with alignment guide 768D of cam plate 764D. Alignment guide 768D and alignment members 77D may be designed and/or positioned such that inner gerotor assembly 718D is maintained in alignment with outer gerotor assembly 716D as inner gerotor assembly 718D rotates relative to outer gerotor assembly 716D. In alternative embodiments, the synchronizing system 760D may include gears, such as those described in above embodiments.

Figure 68C:
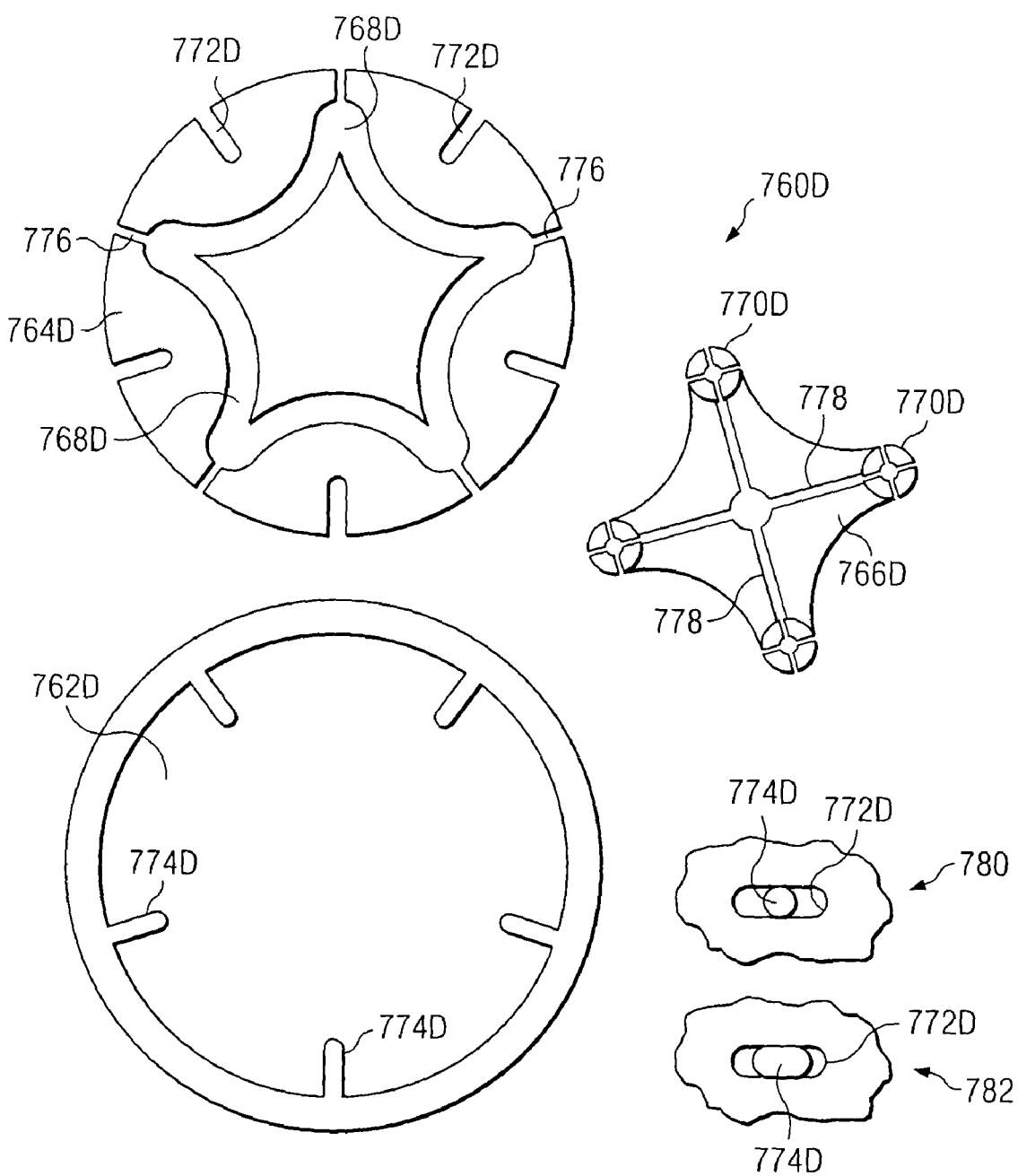

As shown in FIG. 68A, cam plate 764D also comprises one or more notches, or grooves, 772D. Drive plate 762D comprises one or more drive members, such as knobs, rollers or pegs, 774D disposed within notches 772D when drive plate 762D is mated with cam plate 764D. As described below with reference to FIG. 68C, notches 772D and drive members 774D may be designed to allow thermal expansion or contraction of drive plate 762D and/or cam plate 764D. Although not shown in FIG. 68A, drive plate 762D may be coupled to a drive mechanism operable to at least partially control the rotation of drive plate 762D. Drive members 774D of drive plate 762D fit within notches 772D of cam plate 764D such that drive plate 762D may at least partially control the rotation of cam plate 764D.

FIG. 68B illustrates a cross section of engine system 700D taken along each line J—J shown in FIG. 68A. In other words, FIG. 68B illustrates a cross section of both compressor 702D and expander 704D.

FIG. 68C illustrates cross sectional views of the various components of synchronizing system 760D taken along line A—A shown in FIG. 68A. As discussed above, cam plate 764D comprises alignment guide 768D such as an alignment track, for example, and a plurality of notches 772D disposed around the perimeter of cam plate 764D. Cam plate 764D may also comprise one or more exit passages 776 operable to communicate a lubricant away from alignment guide 768D. Peg plate 766D comprises a plurality of alignment members 770D, as discussed above. In addition, peg plate 766D comprises one or more entrance passages 778 operable to communicate a lubricant, such as lubricant 534 for example, into alignment guide 768D to reduce friction between alignment members 770D and alignment guide 768D.

Drive plate 762D comprises a plurality of drive members 774D operable to generally fit within notches 772D in cam plate 764D. Using such a configuration of drive members 774D and notches 772D, drive plate 762D and/or cam plate 764D may expand and/or contract, such as due to thermal changes, for example. FIG. 68C also illustrates two example alternative configurations 780 and 782 of cam plate notches 772D and drive members 774D. In such alternative embodiments, notches 772D may be located at any suitable position in cam plate 764D. In addition, in alternative embodiments (not shown), drive plate 762 may comprise notches similar to notches 772D and cam plate 764D may comprise drive members similar to drive members 774D.

An advantage of the embodiment illustrated in FIGS. 68A, 68B and 68C is that lubricating oil is isolated from the gases flowing through the compressor and expander.

Figure 69:
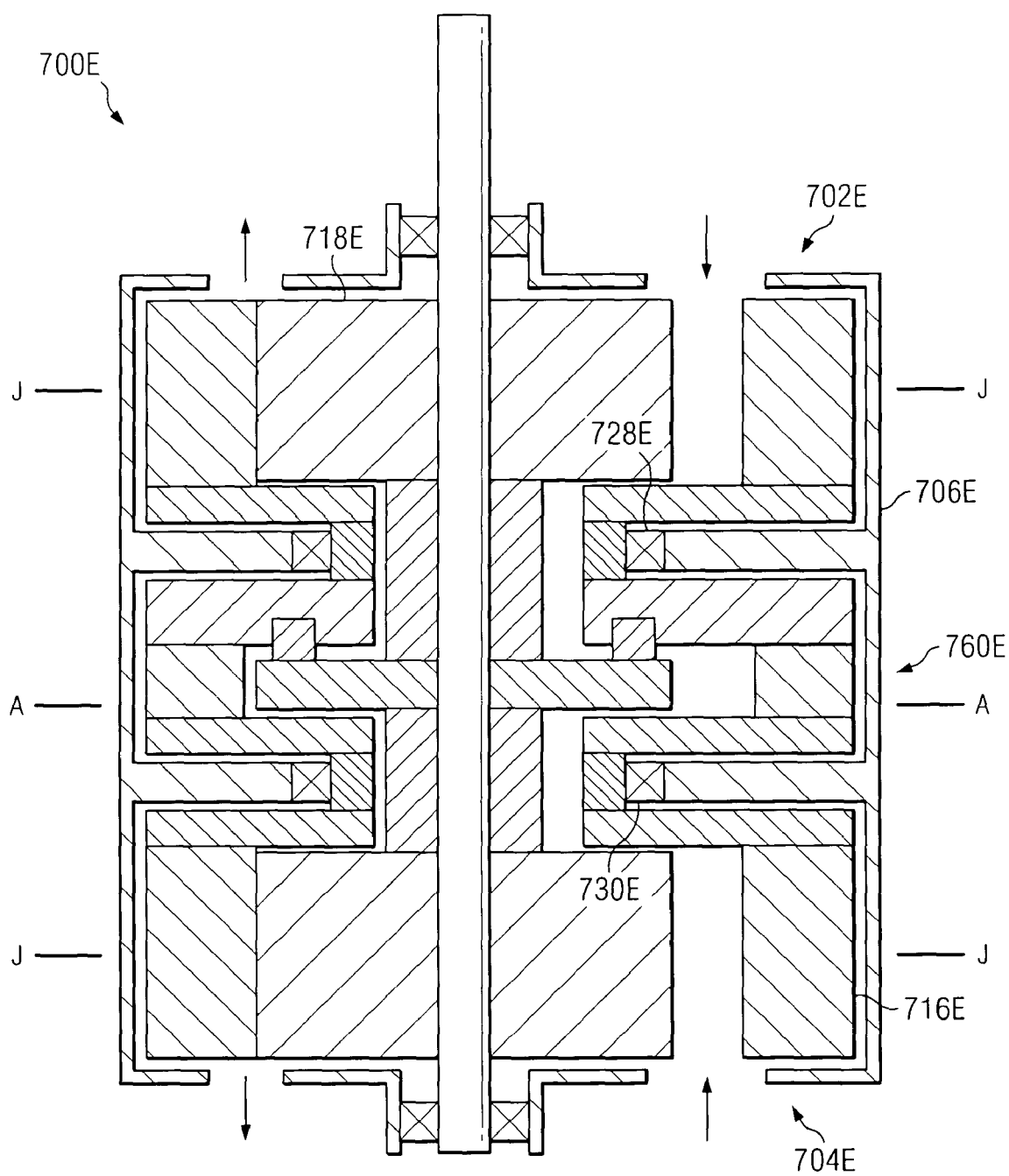

FIG. 69 illustrates another embodiment of an engine system 700E. Engine system 700E is similar to engine system 700D shown in FIG. 68A; however, third and fourth bearings 728E and 730E of engine system 700E are disposed inwardly and between compressor 702E and expander 704E as compared with third and fourth bearings 728D and 730D shown in FIG. 68A. As discussed above with regard to third and fourth bearings 728B and 730B of engine system 700B shown in FIG. 67, because third and fourth bearings 728E and 730E of engine system 700E may be smaller in diameter than third and fourth bearings 728D and 730D of engine system 700D, the configuration of engine system 700E may be more suitable or desirable for high rotation speed applications than the configuration of engine system 700D. In addition, because third and fourth bearings 728E and 730E are located inwardly from the outer perimeter of outer gerotor assembly 716E, housing 706E may have a smaller outer diameter or perimeter than that of housing 706D, assuming outer gerotor assemblies 716D and 716E have the same outer diameter.

Figure 70A:
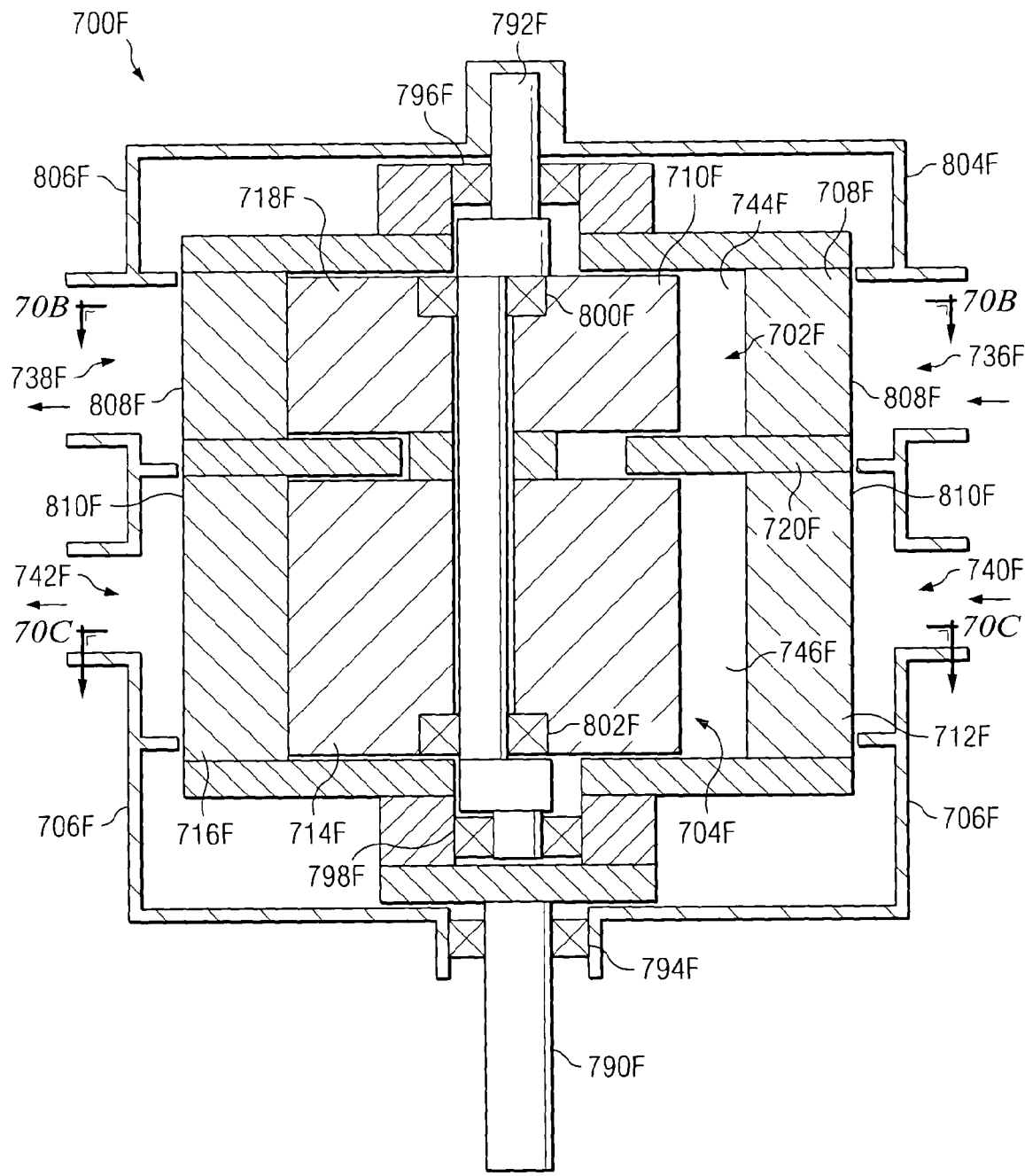
FIGS. 70 through 79 illustrate various embodiments of an engine system including a gerotor apparatus having an outer gerotor comprising openings allowing gases to travel through the outer perimeter of the outer gerotor.

FIG. 70A illustrates an embodiment of an engine system 700F comprising a compressor 702F and an expander 704F in which gases enter and exit compressor 702F and expander 704F through openings in the outer perimeter of compressor 702F and expander 704F. Similar to several of the embodiments discussed above, engine system 700F comprises compressor 702F, expander 704F, and a housing 706F. An outer gerotor assembly 716F comprises a compressor outer gerotor 708F and an expander outer gerotor 712F. An inner gerotor assembly 718F comprises a compressor inner gerotor 710F and an expander inner gerotor 714F.

Outer gerotor assembly 716F comprises an outer gerotor shaft 790F, and inner gerotor assembly 718F comprises an inner gerotor shaft 792F. Outer gerotor shaft 790F is rotatably coupled to housing 706F by a first bearing 794F and to inner gerotor shaft 792F by a second bearing 796F. Inner gerotor shaft 792F is rigidly attached to housing 706F. Inner gerotor shaft 792F is rotatably coupled to outer gerotor assembly 716F by a third bearing 798F. Inner gerotor assembly 718F is rotatably coupled to inner gerotor shaft 792F by a fourth bearing 800F and a fifth bearing 802F. With this configuration, outer gerotor assembly 716F and inner gerotor assembly 718F may rotate relative to each other and relative to housing 706F.

Unlike engine systems 700A–700E described above, engine system 700F is configured such that gases may enter into and exit from compressor 702F and expander 704F through openings in the outer perimeter of compressor outer gerotor 708F and expander outer gerotor 712F. A portion of housing 706F, which may comprise a first valve plate 804F, comprises a compressor gas inlet port 736F and an expander gas inlet port 740F. Another portion of housing 706F, which may comprise a second valve plate 806F, comprises a compressor gas outlet port 738F and an expander gas outlet port 742F.

Regarding compressor 702F, gas enters housing 706 through compressor gas inlet port 736F, enters an outer gerotor chamber 744F through one or more openings 808F (shown in greater detail in FIGS. 70B and 70C), becomes compressed due to the rotation of compressor inner gerotor 710F in relation to compressor outer gerotor 708F, exits outer gerotor chamber 744F through one or more of the openings in compressor outer gerotor 708F, and exits housing 706F through compressor gas outlet port 738F. Generally, gas enters compressor gas inlet port 736F at a first, relatively low, pressure and exits through compressor gas outlet port 738F at a second, relatively high, pressure.

Regarding expander 704F, gas enters housing 706F through expander gas inlet port 740F, enters an outer gerotor chamber 746F through one or more openings 810F in expander outer gerotor 712F, expands as expander inner gerotor 714F rotates relative to expander outer gerotor 712F, exits outer gerotor chamber 746F through one or more of the openings 810F in expander outer gerotor 712F, and exits housing 706F through expander gas outlet port 742F. Generally, gases enter expander gas inlet port 740F at a first, relatively high, pressure and exits through expander gas outlet port 742F at a second, relatively low, pressure.

Figure 70B:
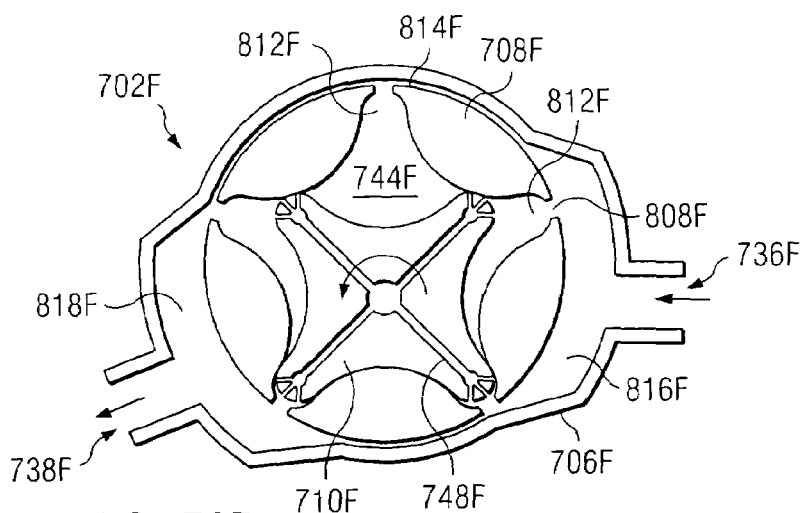

FIG. 70B illustrates a cross sectional view of compressor 702F taken along line A—A shown in FIG. 78. Compressor inner gerotor 710F is disposed generally within outer gerotor chamber 744F of compressor outer gerotor 708F. Outer gerotor chamber 744F comprises a plurality of notches 812F disposed proximate a perimeter 814F of compressor outer gerotor 708F. Openings 808F comprise openings in perimeter 814F which are coupled to notches 812F of outer gerotor chamber 744F such that gases may enter into or exit from outer gerotor chamber 744F through openings 808F in perimeter 814F.

Housing 706F comprises a first inlet opening 816F operable to receive gases from compressor gas inlet port 736F and a first outlet opening 818F operable to communicate gases received from outer gerotor chamber 744F toward compressor gas outlet port 738F. The shape, configuration and/or dimensions of first inlet opening 816F and first outlet opening 818F may be selected to achieve a particular compression ratio or a range of compression ratios of gases traveling through compressor 702F. As compressor inner gerotor 708F rotates, gases within outer gerotor chamber 744F may be forced toward notches 812F and into first outlet opening 818F through openings 808F at least in part due to centrifugal forces caused by the rotation of expander inner gerotor 708F.

Compressor inner gerotor 710F may comprise one or more entrance passages 748F operable to communicate a lubricant, such as lubricant 534 for example, into outer gerotor chamber 744F in order to reduce friction between compressor inner gerotor 710F and compressor outer gerotor 708F.

Figure 70C:
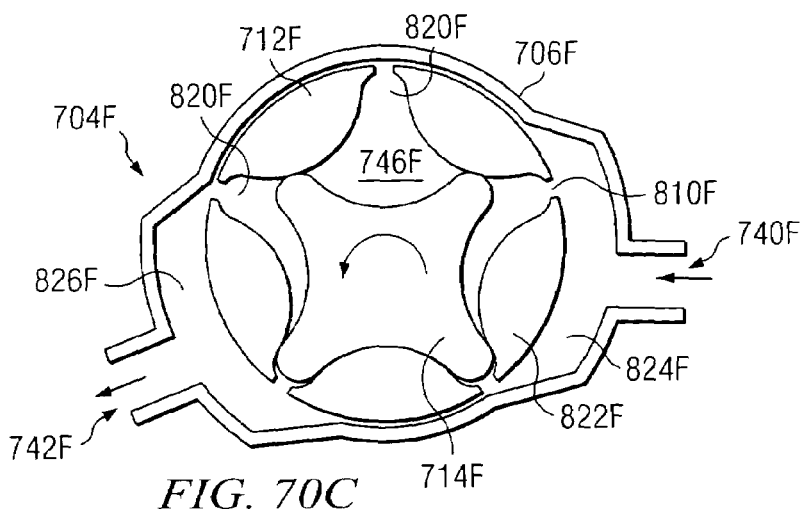

FIG. 70C illustrates a cross sectional view of expander 704F taken along line B—B shown in FIG. 70A. Outer gerotor chamber 746F of expander outer gerotor 712F comprises a plurality of notches 820F disposed adjacent a perimeter 822F of expander outer gerotor 712F. Openings 810F comprise openings in perimeter 822F which are coupled to notches 820F of outer gerotor chamber 746F such that gases may enter into and exit from outer gerotor chamber 746F through openings 810F in perimeter 822F.

Housing 706F may comprise a second inlet opening 824F operable to receive gases from expander gas inlet port 740F, and a second outlet opening 826F operable to communicate gases received from outer gerotor chamber 746F toward expander gas outlet port 742F. The shape, configuration and/or dimensions of second inlet opening 824F and second outlet opening 826F may be selected to achieve a particular expansion ratio or range of expansion ratios of gases passing through expander 704F. As expander inner gerotor 712F rotates, gases within outer gerotor chamber 746F may be forced toward notches 820F and into second outlet opening 826F through openings 810F at least in part due to centrifugal forces caused by the rotation of expander inner gerotor 712F. In addition, in some embodiments (not shown), expander inner gerotor 714F comprises one or more entrance passages (such as entrance passages 748F shown in FIG. 70B) operable to communicate a lubricant into outer gerotor chamber 746F to reduce friction between expander inner gerotor 714F and expander outer gerotor 712F.

An advantage of the embodiment illustrated in FIGS. 70A, 70B and 70C is that capacity may be increased by adding length if the diameter is constrained.

FIG. 70 D illustrates an alternative embodiment in which engine system 700F comprises either compressor 702F or expander 704F, rather than both compressor 702F and expander 704F.

Figure 71B:
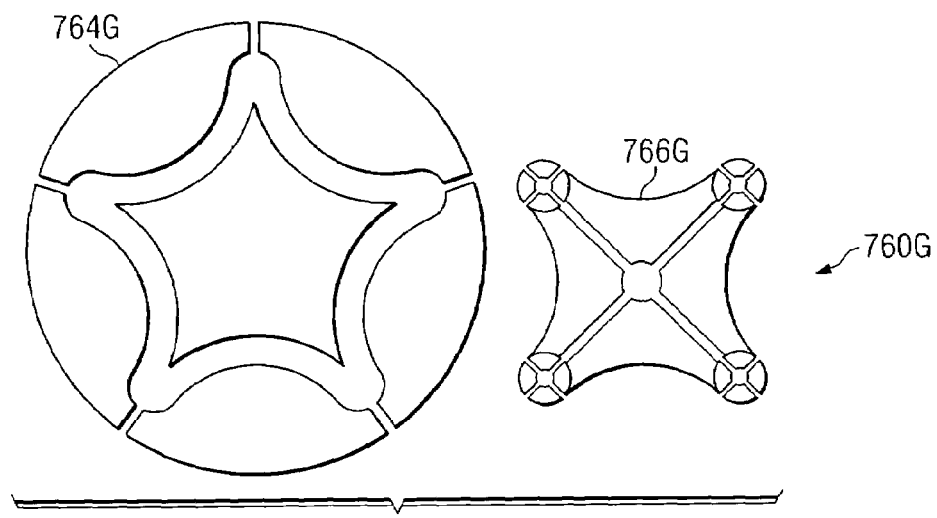
Figure 71A:
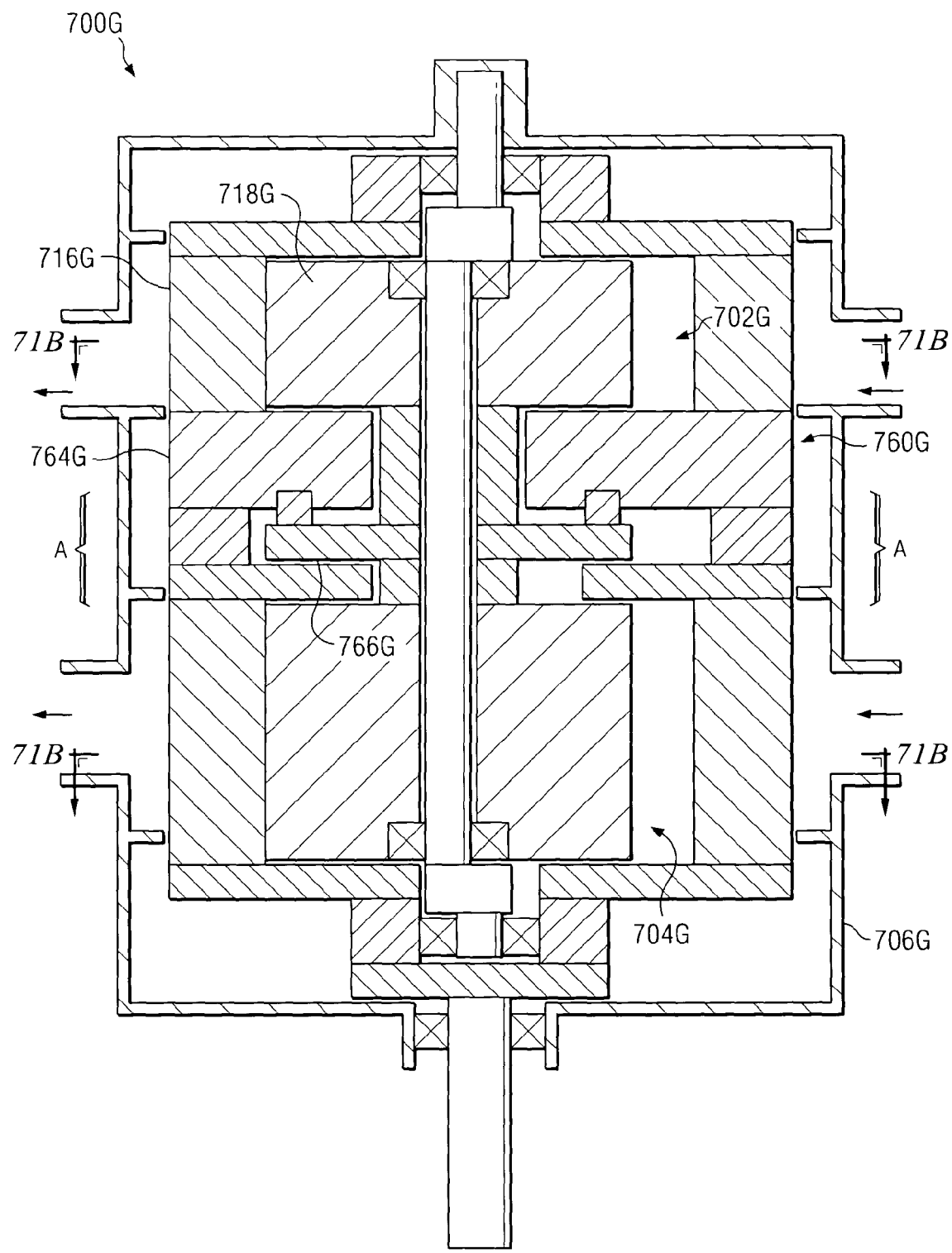

FIG. 71A illustrates another embodiment of an engine system 700G. Engine system 700G comprises a compressor 712G, an expander 704G, a housing 706G, an outer gerotor assembly 716G and an inner gerotor assembly 718G. Engine system 700G is similar to engine system 700F shown in FIG. 70A; however, engine system 700G additionally includes a synchronizing system 760G operable to control the relative rotation and/or align inner gerotor assembly 718G with outer gerotor assembly 716G as inner gerotor assembly 718G rotates relative to outer gerotor assembly 716G. Synchronizing system 760G may be similar to synchronizing system 760D described above with reference to FIGS. 68A and 68C. In particular, 760G comprises a cam plate 764G and an alignment plate 766G. In addition, in some embodiments, synchronizing system 760G may include a drive plate similar to drive plate 762D discussed above with reference to FIGS. 68A and 68C. In alternative embodiments, synchronizing system 760G may include gears, such as described in above embodiments.

FIG. 71B illustrates an exploded cross section of cam plate 764G and alignment plate 766G taken along line A—A shown in FIG. 71A. The cross-sections of compressor 702G and expander 704G taken along line H—H and line I—I of FIG. 71A may be similar or identical to the cross sections of compressor 702F and expander 704F illustrated in FIGS. 70B and 70C, respectively.

Figure 72:
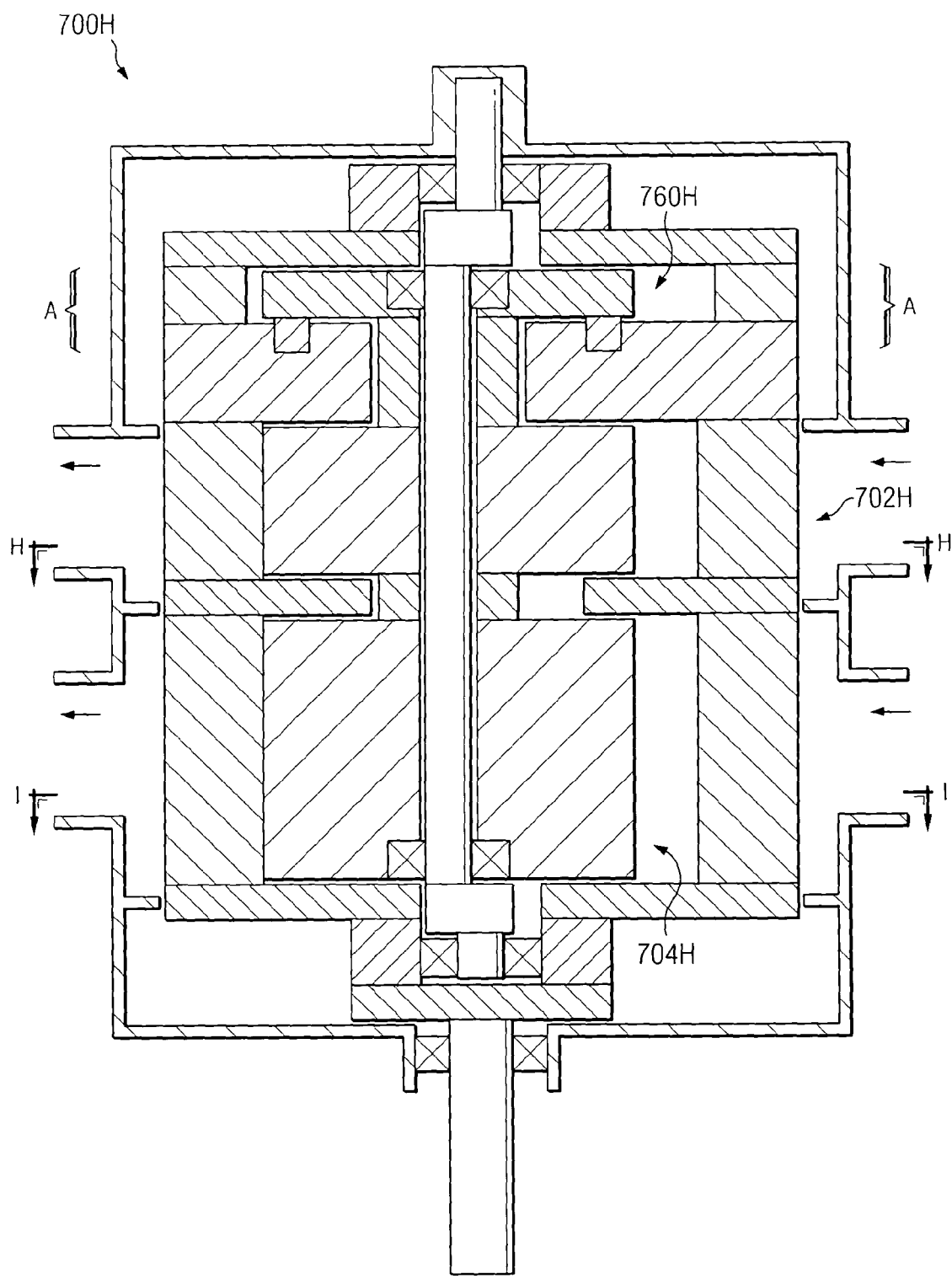

FIG. 72 illustrates another embodiment of an engine system 700H comprises a compressor 702H, an expander 704H and a synchronizing system 760H. Engine system 700H is similar to engine system 700G shown in FIG. 71A; however, synchronizing system 760H of engine system 700H is disposed on a first side of both compressor 702H and expander 704H, rather than being disposed between compressor 702H and expander 704H. The cross sections of compressor 702H and expander 704H taken along line H—H and line I—I, respectively, shown in FIG. 72 may be similar or identical to cross sections of compressor 702F and expander 704F shown in FIGS. 70B and 70C, respectively. In addition, cross sections of synchronizing system 760H taken along line A—A shown in FIG. 72 may be similar or identical to the cross sections of synchronizing system 760G shown in FIG. 71B or the cross sections of 760D shown in FIG. 68C. In alternative embodiments, synchronizing system 760G may include gears, such as described in previous figures.

Figure 73:
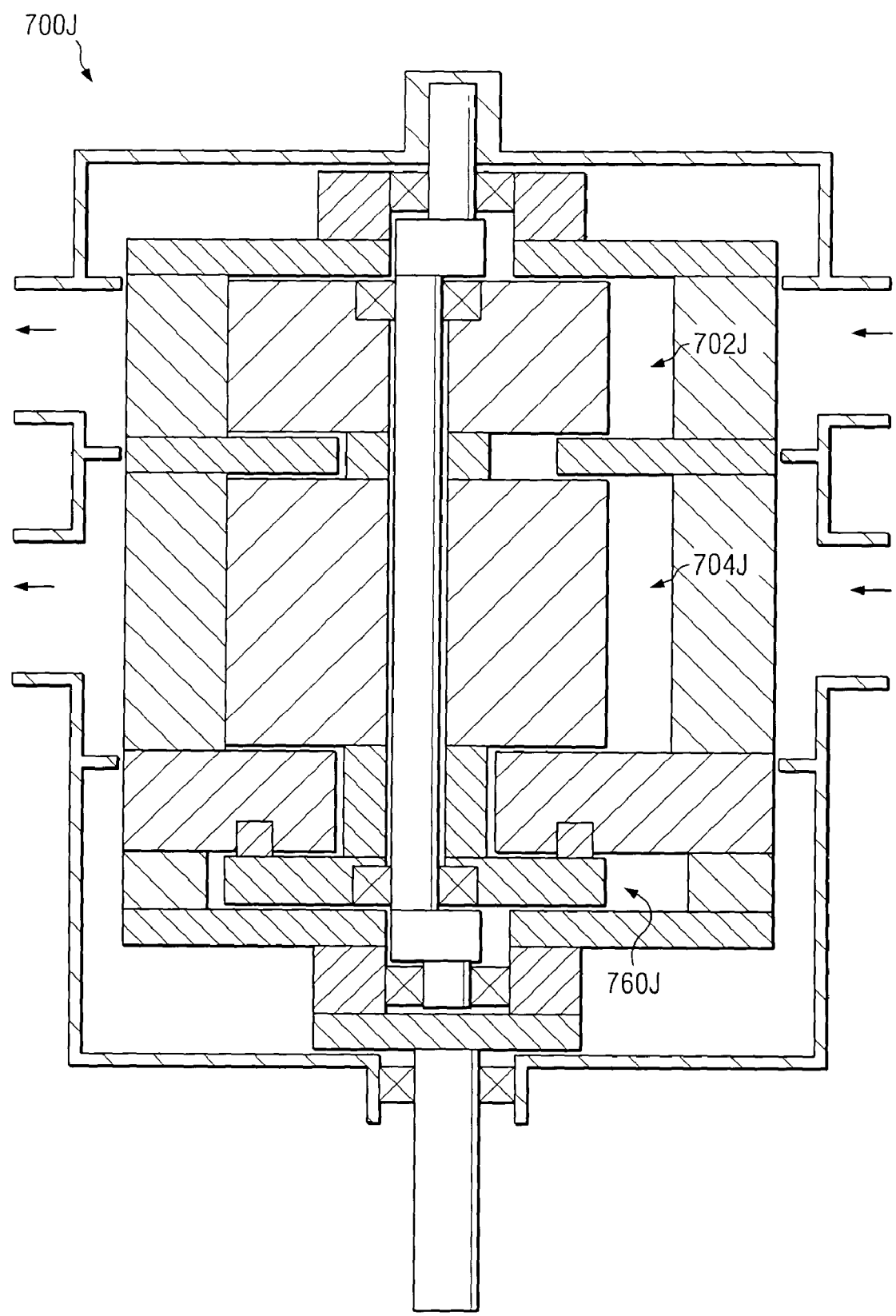

FIG. 73 illustrates another embodiment of an engine system 700J comprising a compressor 702J, and expander 704J and a synchronizing system 760J. Engine system 700J is similar to engine system 700H shown in FIG. 72; however, synchronizing system 760J of engine system 700J is disposed on the opposite side of both compressor 702J and expander 704J as compared to the location of synchronizing system 760H of engine system 700H.

Figure 74:
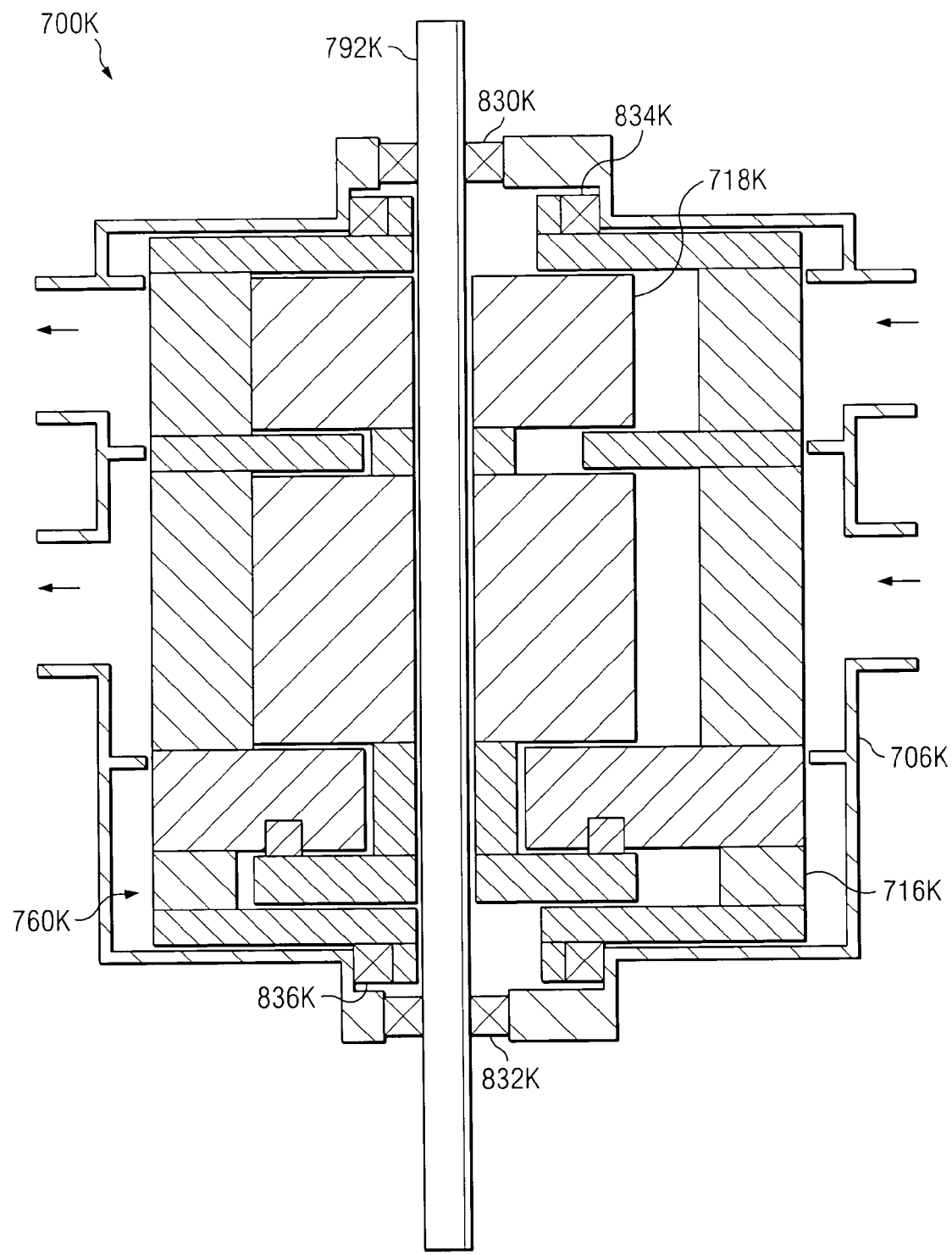

FIG. 74 illustrates another embodiment of an engine system 700K having a different configuration of bearings and shafts as compared with engine system 700G, 700H and 700J shown in FIGS. 71A, 72 and 73, respectively. As shown in FIG. 74, engine system 700K comprises an outer gerotor assembly 716K and inner gerotor assembly 718K, and an inner gerotor shaft 792K. Inner gerotor assembly 718K is rigidly coupled to inner gerotor shaft 792K, which is rotatably coupled to housing 706K by a first bearing 830K and a second bearing 832K. Outer gerotor assembly 716K is rotatably coupled to housing 706K by a third bearing 834K and a fourth bearing 836K. In this manner, inner gerotor assembly 718K and outer gerotor assembly 716K may rotate relative to each other and relative to housing 706K. Engine system 700K also comprises a synchronizing system 760K operable to synchronize and/or align inner gerotor assembly 718K and outer gerotor 716K, such as discussed above with reference to synchronizing system 760D, for example. As shown in FIG. 74, synchronizing system 760K includes cams and pegs. It may also include gears, as described in earlier figures.

Figure 75A:
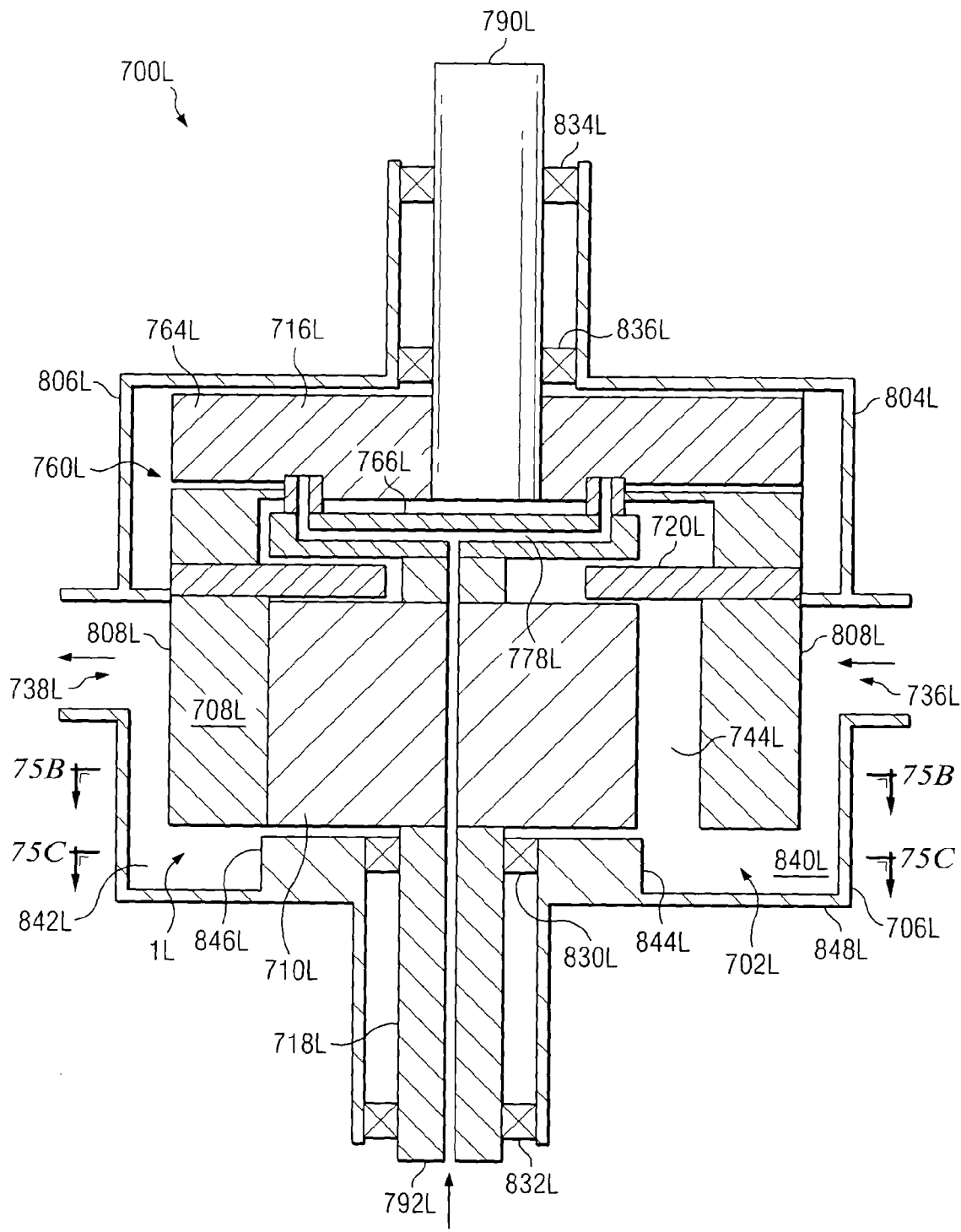

FIG. 75A illustrates another embodiment of an engine system 700L comprising a gerotor apparatus 1L, which may comprise a compressor and/or an expander. Assuming in the embodiment shown in FIG. 75A that gerotor apparatus 1L comprises a compressor 702L, engine system 700L comprises an outer gerotor assembly 716L comprising a compressor outer gerotor 708L and an outer gerotor shaft 790L, and an inner gerotor assembly 718L comprising a compressor inner gerotor 710L and an inner gerotor shaft 792L.

Engine system 700L also comprises a housing 706L comprising a compressor gas inlet port 736L and a compressor gas outlet port 738L allowing gases to enter into an exit from compressor 702L. In some embodiments, compressor gas inlet port 736L and compressor gas outlet port 738L may be formed in a first valve plate 804L and a second valve plate 806L, respectively, which may be integral with or coupled to housing 706L. Inner gerotor shaft 792L is rotatably coupled to housing 706L by a first bearing 830L and a second bearing 832L. Outer gerotor shaft 790L is rotatably coupled to housing 706L by a third bearing 834L and a fourth bearing 836L. In this manner, inner gerotor assembly 718L and outer gerotor assembly 716L may rotate relative to each other and relative to housing 706L.

Engine system 700L may also comprise a synchronizing system 760L operable to synchronize and/or align inter gerotor assembly 718L and outer gerotor assembly 716L. Compressor outer gerotor 708L comprises an outer gerotor chamber 744L. Compressor outer gerotor 708L may also comprise one or more openings 808L in the perimeter of compressor outer gerotor 708L operable to allow gases to enter into and exit from outer gerotor chamber 744L. Inner gerotor assembly 718L may include one or more entrance passages 778L operable to communicate a lubricant, such as lubricant 534 for example, into synchronizing system 760L in order to reduce friction between inner gerotor assembly 718L and outer gerotor assembly 716L.

In addition, housing 706L may comprise an inlet passage 840L and an outlet passage 842L operable to allow gases to enter into and exit from outer gerotor chamber 744L. Some embodiments, inlet passage 840L and outlet passage 842L are defined at least in part by a first opening 844L and a second opening 846L formed in a valve plate 848L which may be integral or coupled to housing 706L. Thus, gases entering through compressor gas inlet port 736L may enter outer gerotor chamber 744L through inlet passage 840L as well as through openings 808L formed in the perimeter of compressor outer gerotor 708L. Similarly, gases may exit outer gerotor chamber 744L through outlet passage 842L as well as through openings 808L formed in the perimeter of compressor outer gerotor 708L. This embodiment may allow increased volumes of gases to pass through compressor 702L as compared with one or more other embodiments described above.

Figure 75B:
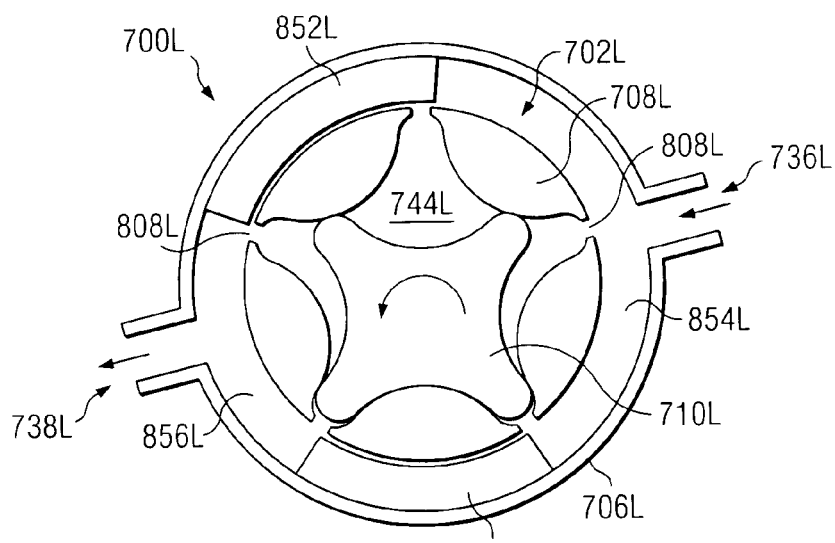

FIG. 75B illustrates a cross sectional view of engine system 700L taken along line B-B shown in FIG. 75A. As discussed above, compressor outer gerotor 708L comprises one or more openings 808L in the outer perimeter of compressor outer gerotor 708L which allow gases to enter into and exit from outer gerotor chamber 744L. Housing 706 L comprises a first barrier 850L and a second barrier 852L operable to at least substantially prevent the flow of gases around the outer perimeter of compressor outer gerotor 708L. First and second barriers 850L and 852L at least partially define a perimeter gas inlet area 854L and a perimeter gas outlet area 856L. The shape, configuration and size of first and second barriers 850L and 852L may be selected to achieve a desired shape, configuration and size of perimeter gas inlet opening 854L and perimeter gas outlet opening 856L, which may be selected to achieve a desired compression ratio or range of compression ratios of gases passing through 702L.

Figure 75C:
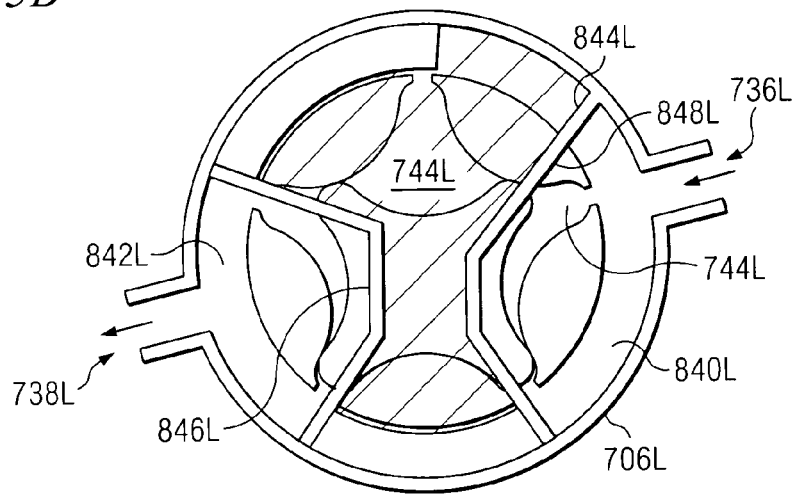

An advantage of the embodiment illustrated in FIGS. 75A, 75B and 75C is a free-breathing design that has a high volumetric capacity.

FIG. 75C illustrates a cross sectional view of engine system 700L taken along line C—C shown in FIG. 75A. FIG. 75C illustrates inlet passage 840L and outlet passage 842L formed by first opening 844L and second opening 846L, respectively, in housing 706L. As discussed above, in some embodiments, first opening 844L and second opening 846L may be formed in a valve plate 848L integral or coupled to housing 706L. Viewing FIGS. 75B and 75C together, it can be seen that gases entering compressor gas inlet port 736L may enter into gerotor outer chamber 744L through openings 808L in the outer perimeter of compressor outer gerotor 708L as well as through inlet passage 840L formed by first opening 844L in housing 706L. Similarly, it can be seen that gases may exit outer gerotor chamber 744L through openings 808L and the outer perimeter of compressor outer gerotor 708L as well as through outlet passage 842L formed by second opening 846L in housing 706L.

Figure 76B:
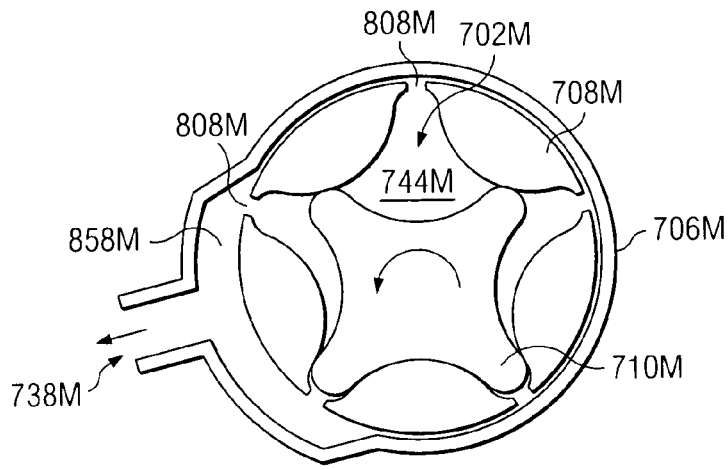
Figure 76A:
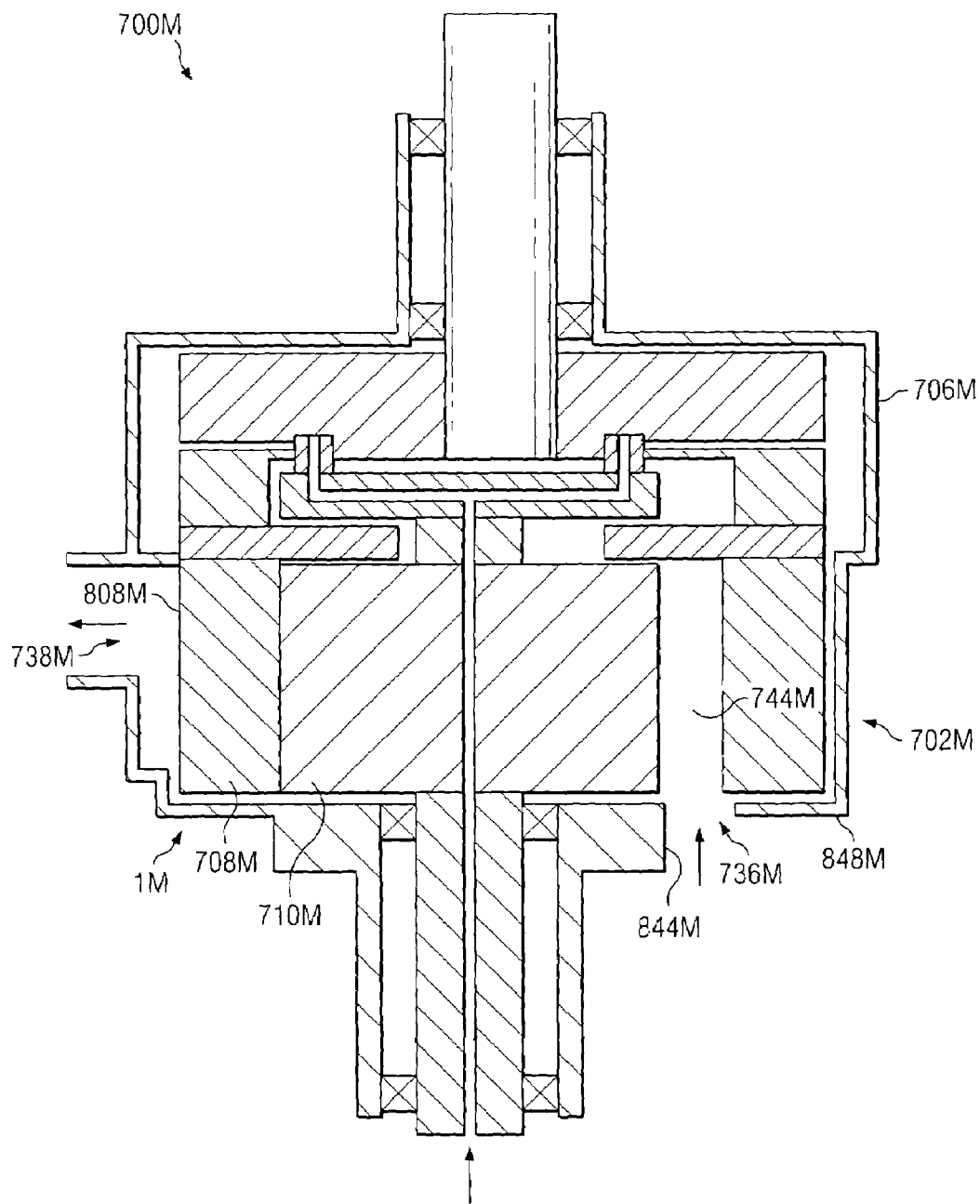

FIG. 76A illustrates another embodiment of an engine system 700M comprising a gerotor apparatus 1M which may comprise a compressor or an expander. In the embodiment shown in FIG. 76A, gerotor apparatus 1M comprises a compressor 702M comprising a compressor outer gerotor 708M and a compressor inner gerotor 710M. Engine system 700M comprises a housing 706M. Engine system 700M is similar to engine system 700L shown in FIG. 75A; however, housing 706M of engine system 700M is configured differently than housing 706L of engine system 700L, providing a different flow of gases through compressor 702M as compared with compressor 702L.

Housing 706M of engine system 700M comprises a first opening 844M allowing gases to enter into an outer gerotor chamber 744M of compressor 702M. Opening 844M in housing 706M generally provides a compressor gas inlet port 736M. In some embodiments, first opening 844M comprises an opening in a first valve plate 848M, which may be integral or coupled to housing 706M. Unlike with engine system 700L shown in FIG. 75A, gases generally do not enter into outer gerotor chambers 744M through openings in the outer perimeter of compressor outer gerotor 708M.

Gases may exit outer gerotor chamber 744M through one or more openings 808M in the outer perimeter of compressor outer gerotor 708M. Unlike engine system 700L shown in FIG. 75A, engine system 700M does not include an output passage adjacent outer gerotor chamber 744M similar to outlet passage 842L shown in FIG. 75A. It should be noted that as discussed above with regard to gerotor apparatus 1L shown in FIG. 75A, gerotor apparatus 1M shown in FIG. 76A may alternatively comprise an expander rather than compressor 702M.

FIG. 76B illustrates a cross sectional view of engine system 700M taken along line D—D shown in FIG. 76A. As shown in FIG. 76B, housing 706M may be shaped to form an outlet opening 858M allowing gases to exit outer gerotor chambers 744M through openings 808M in the outer perimeter of compressor outer gerotor 708M. The shape, configuration and size of outlet opening 858M may be selected to achieve a desired compression ratio or range of compression ratios of gases traveling through compressor 702M.

Figure 76C:
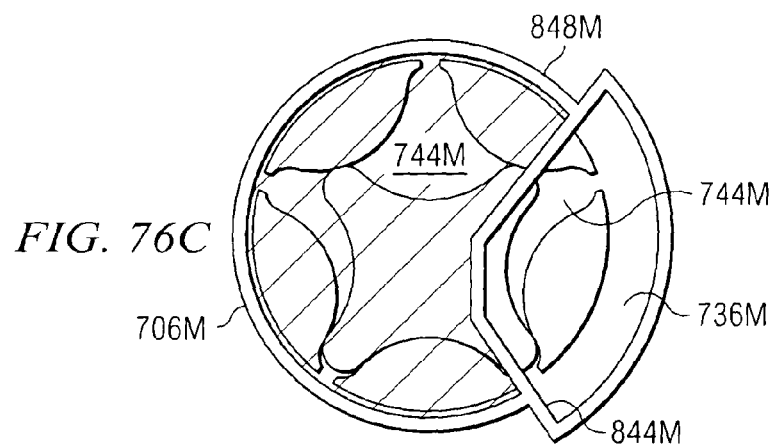

FIG. 76C illustrates a cross sectional view of engine system 700M taken along line E—E shown in FIG. 76A. FIG. 76C illustrates compressor gas inlet port 736M formed by first opening 844M in housing 706M. First opening 844M allows gases to enter into outer gerotor chamber 744M. As discussed above, first opening 844M may be formed in first valve plate 848M, which may be integral or coupled to housing 706M.

Figure 77A:
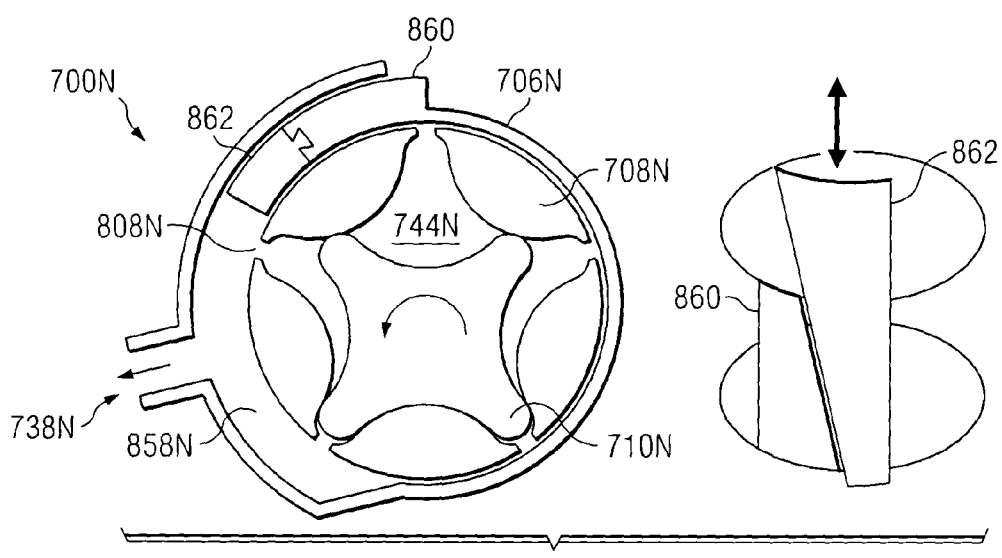
Figure 77B:
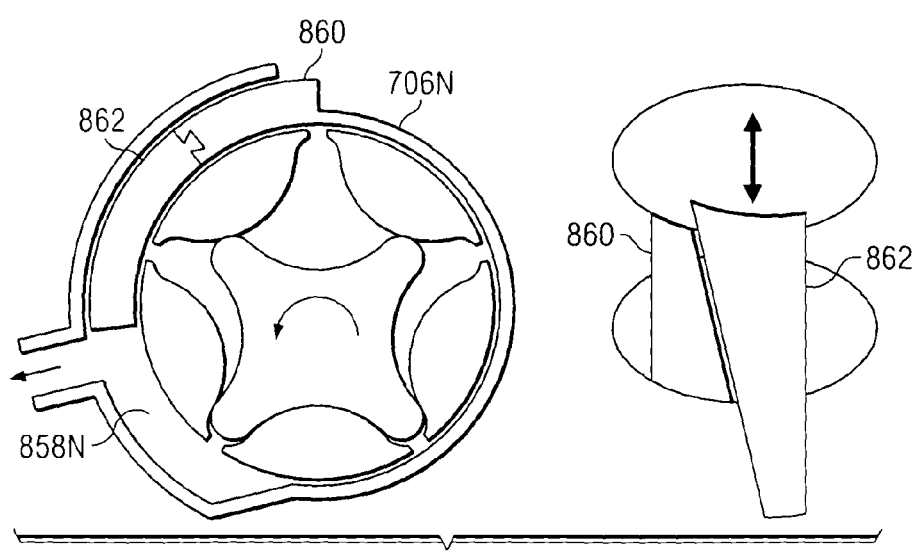

FIGS. 77A and 77B illustrate an alternative embodiment of the cross section shown in FIG. 76B. Housing 706N comprises a barrier coupling portion 860 and adjustable barrier 862 slidably coupled to barrier coupling portion 860. Adjustable barrier 862 is shaped such that it may be adjusted relative to barrier coupling portion 860 in order to change the shape and or size of output opening 858N. The shape and or size of output 858N may be adjusted using adjustable barrier 862 in order to control the compression ratio of gases exiting outer gerotor chamber 744N through openings 808N. For example, FIG. 77A illustrates a cross section in which adjustable barrier 862 is in a first position, and FIG. 77B illustrates a cross section in which adjustable barrier 862 is in a second position. An advantage of the embodiment illustrated in FIGS. 77A and 77B is the compression ratio is infinitely adjustable allowing compressor or expander efficiency to be maximized.

Figure 78A:
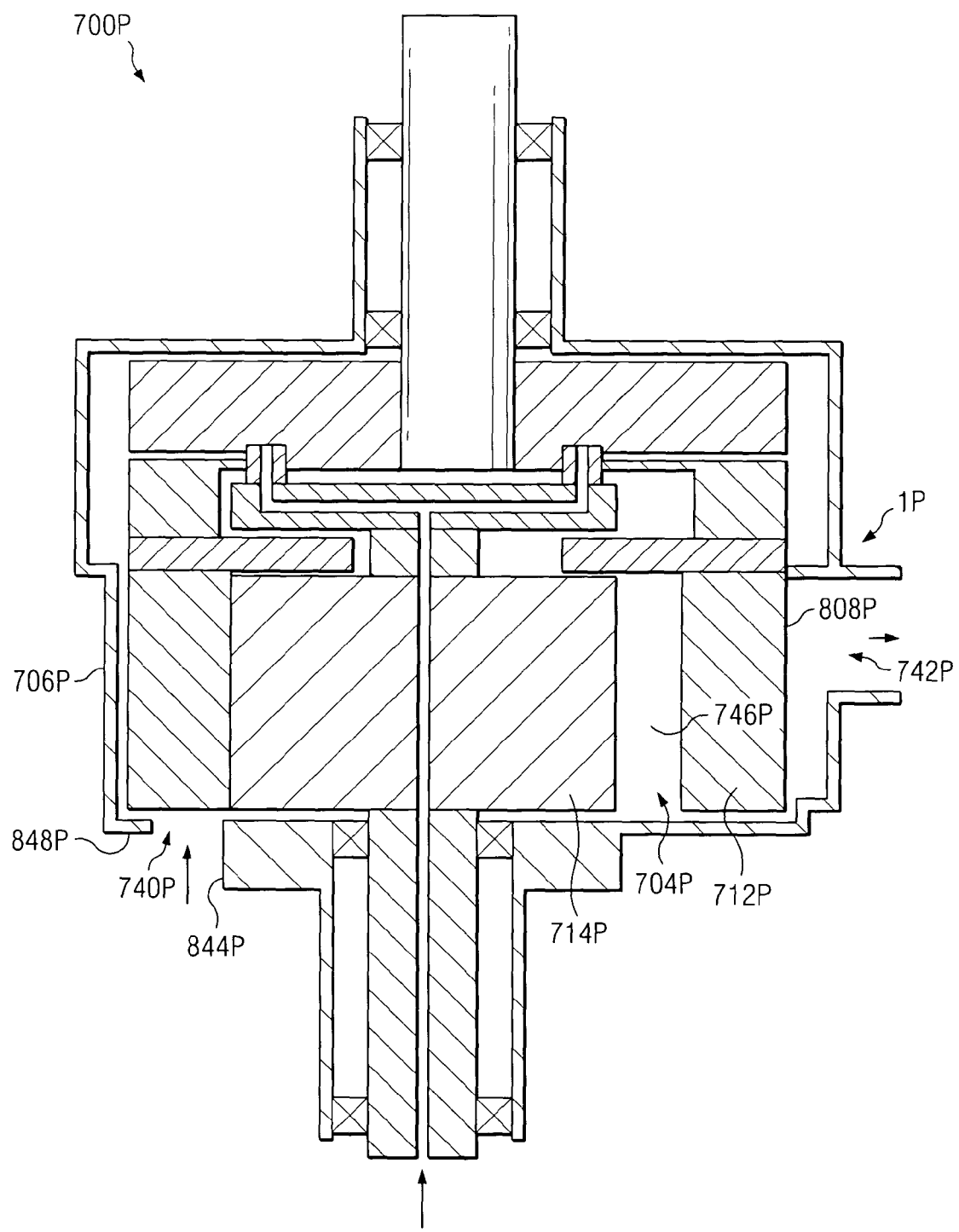

FIG. 78A illustrates another embodiment of an engine system 700P. Engine system 700P is similar to engine system 700M shown in FIG. 76A; however, engine system 700P comprises a gerotor apparatus 1P which comprises an expander 704P rather than a compressor. Expander 704P comprises an expander outer gerotor 712P comprising an outer gerotor chamber 746P, and an expander inner gerotor 714P.

Figure 78B:
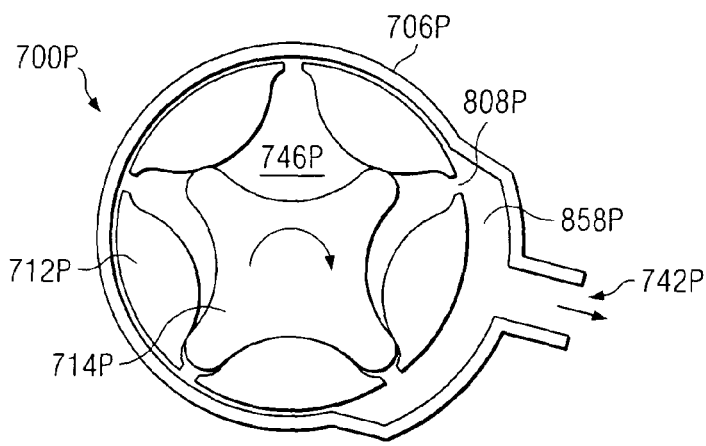

Engine system 700P comprises a housing 706P which includes a first opening 844P forming an expander gas inlet port 740P operable to allow gases to enter into outer gerotor chamber 746P. First opening 844P may be formed in a first valve plate 848P, which may be integral or coupled to housing 706P. Gases may exit outer gerotor chamber 746P through one or more openings 808P in the outer perimeter of expander outer gerotor 708P. The gases may then exit housing 706P through an expander gas outlet port 742P. FIG. 78B illustrates a cross sectional view of engine system 700P taken along line F—F shown in FIG. 78A.

Housing 706P is configured to form an outlet opening 858P allowing gases to exit outer gerotor chamber 746P through openings 808P in the outer perimeter of expander outer gerotor 712P. The shape, configuration, and size of outlet opening 858P may be selected based on the desired expansion ratio of gases exiting outer gerotor chamber 746P and or a desired amount of torque applied to expander outer gerotor 712P caused by the expansion of gases within outer gerotor chamber 746P.

Figure 78C:
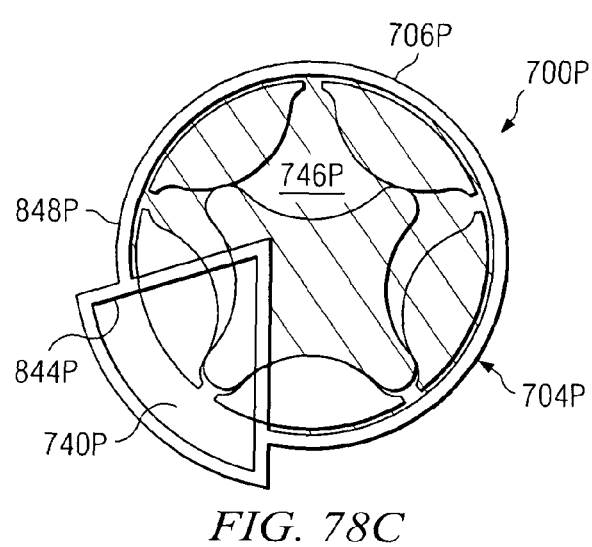

FIG. 78C illustrates a cross sectional view of engine system 700P taken along line G—G shown in FIG. 78A. FIG. 78C illustrates expander gas inlet port 740P formed by a first opening 844P formed in housing 706P. First opening 844P allows gases to enter outer gerotor chamber 746P through expander gas inlet port 740P. As discussed above, first opening 8444P may be formed in first valve plate 848P, which may be integral or coupled to housing 706P. First opening 844P may be shaped and or sized to allow a desired level of gas flow into expander 704P.

Figure 79A:
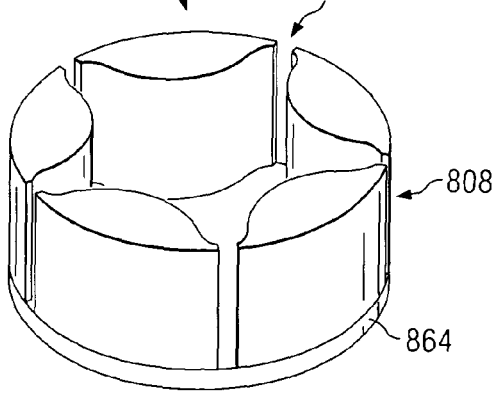
Figure 79B:
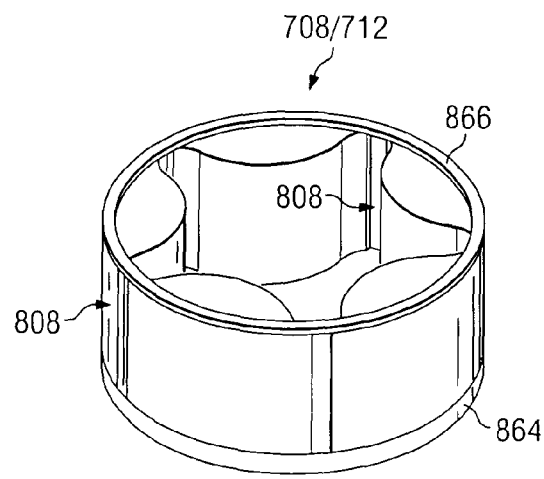

FIGS. 79A and 79B illustrate three-dimensional views of two embodiment of a compressor outer gerotor 708 or an expander outer gerotor 712, such as compressor outer gerotor 708 or expander outer gerotor 712 shown in FIGS. 70 and 75–78, for example. As shown in FIG. 79A, outer gerotor 708 or 712 comprises a base section 864 and a plurality of openings 808 formed in the perimeter of outer gerotor 708 or 712. As shown in FIG. 79B, outer gerotor 708 or 712 may also comprise a support ring 866 to provide support or rigidity to outer gerotor 708 or 712.

Figure 80:
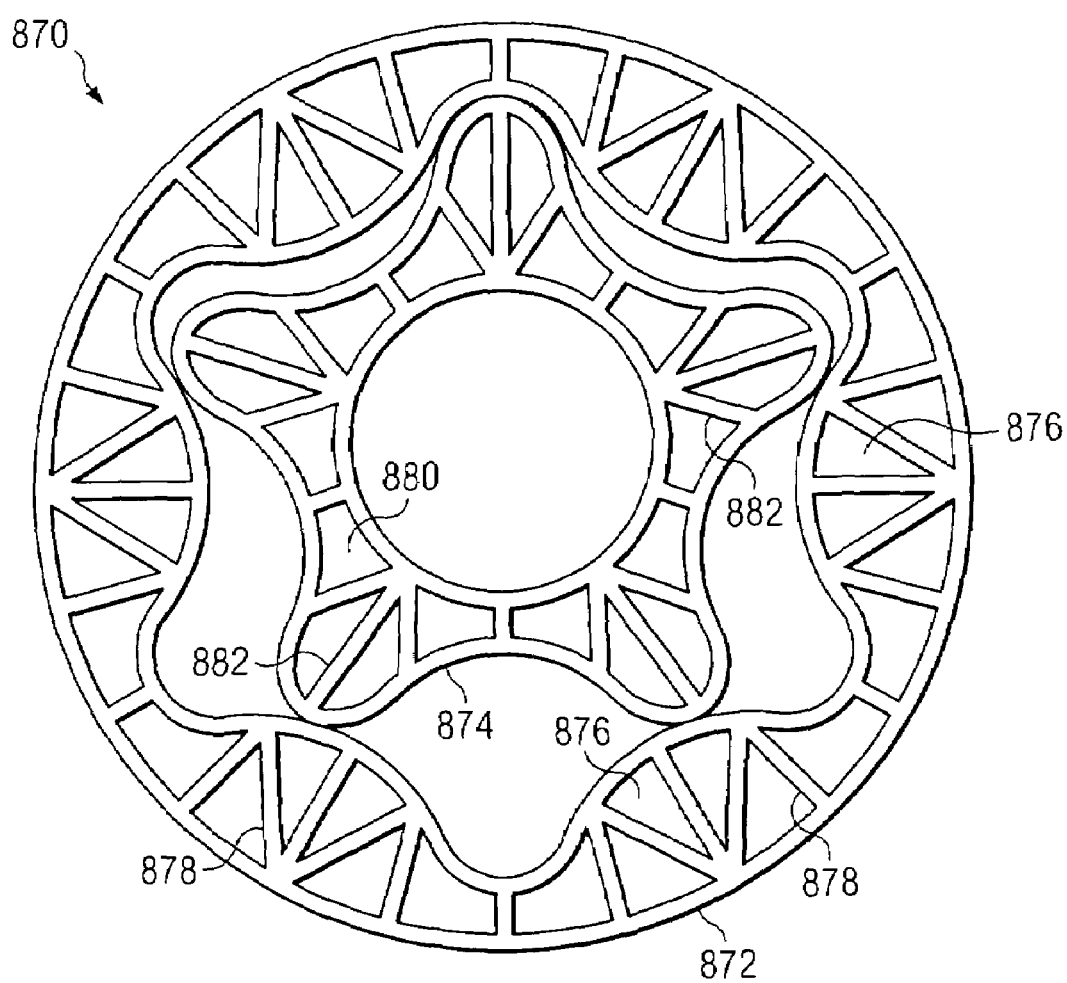
FIGS. 80 through 83 illustrate various methods of manufacturing a gerotor apparatus.

FIG. 80 illustrates an embodiment of a gerotor apparatus 870 comprising and outer gerotor 872 and an inner gerotor 874. Outer gerotor 872 may comprise an outer gerotor skin 876 supported by an outer gerotor web 878. Inner gerotor 874 may comprise an inner gerotor web 880 supported by an inner gerotor web 882. Outer gerotor web 878 and inner gerotor web 882 may be formed by extrusion, and may comprise any material suitable for extrusion, such as aluminum or plastic, for example. In one embodiment, outer gerotor web 878 and inter gerotor web 882 may each be extruded as a single piece.

Figure 81A:
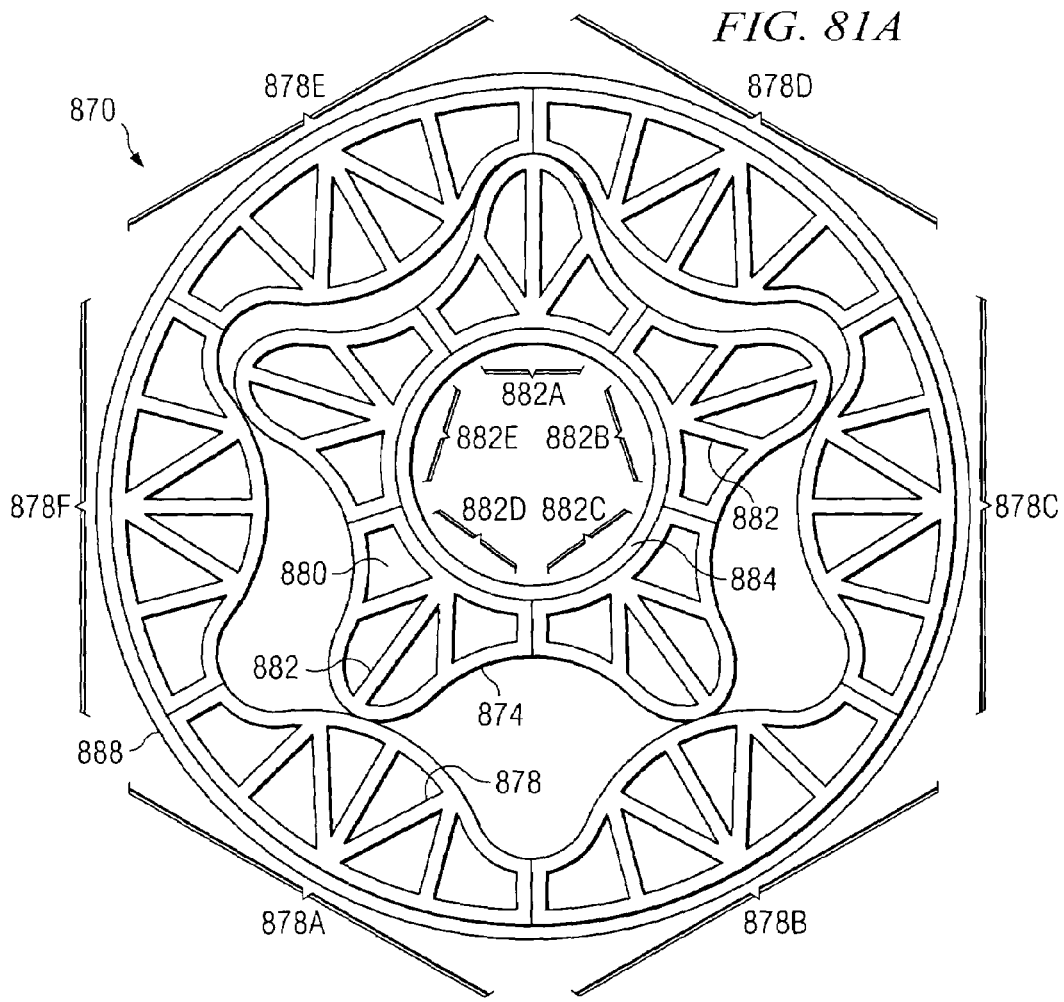

FIG. 81A illustrates an alternative embodiment of gerotor apparatus 870 shown in FIG. 80. In the embodiment shown in FIG. 81A, outer gerotor web 878 comprises a plurality of outer gerotor web sections 878A–878F. Similarly, inner gerotor web 882 comprises a plurality of inner gerotor web sections 882A–882E. Inner gerotor web sections 882A–882E may be coupled to each other and to an inner gerotor support structure 884.

Figure 81B:
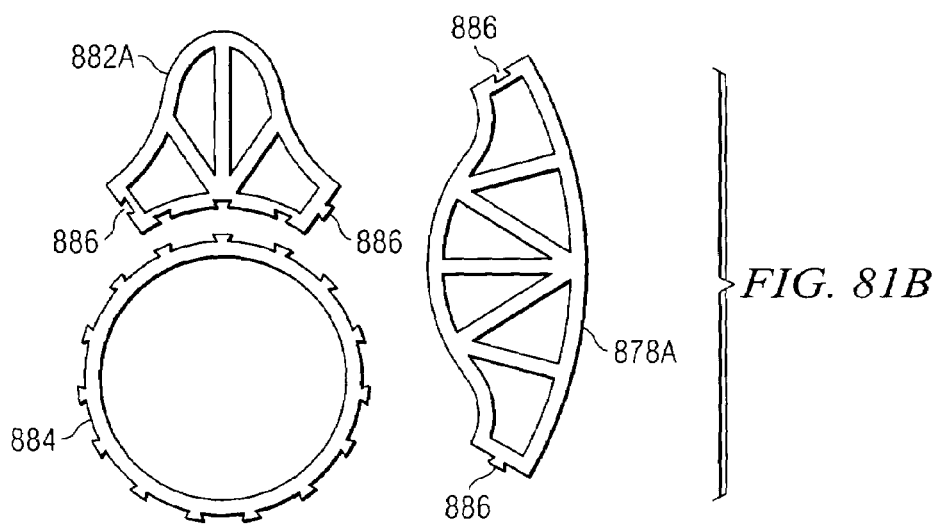

FIG. 81B illustrates a particular outer gerotor web section 878A, a particular inner gerotor web section 882A, and inner gerotor support structure 884 in accordance with one embodiment. Outer gerotor web sections 878A–878F may be coupled to each other by tongue-and-groove couplers 886. Similarly, inner gerotor web sections 882A–882E may be coupled to each other and to inner gerotor support structure 884 using tongue-and-groove couplers 886. As shown in FIG. 81A, a support sleeve 888 may be disposed around outer gerotor web sections 878A–878F to provide support and or rigidity to outer gerotor web 878.

Figure 82:
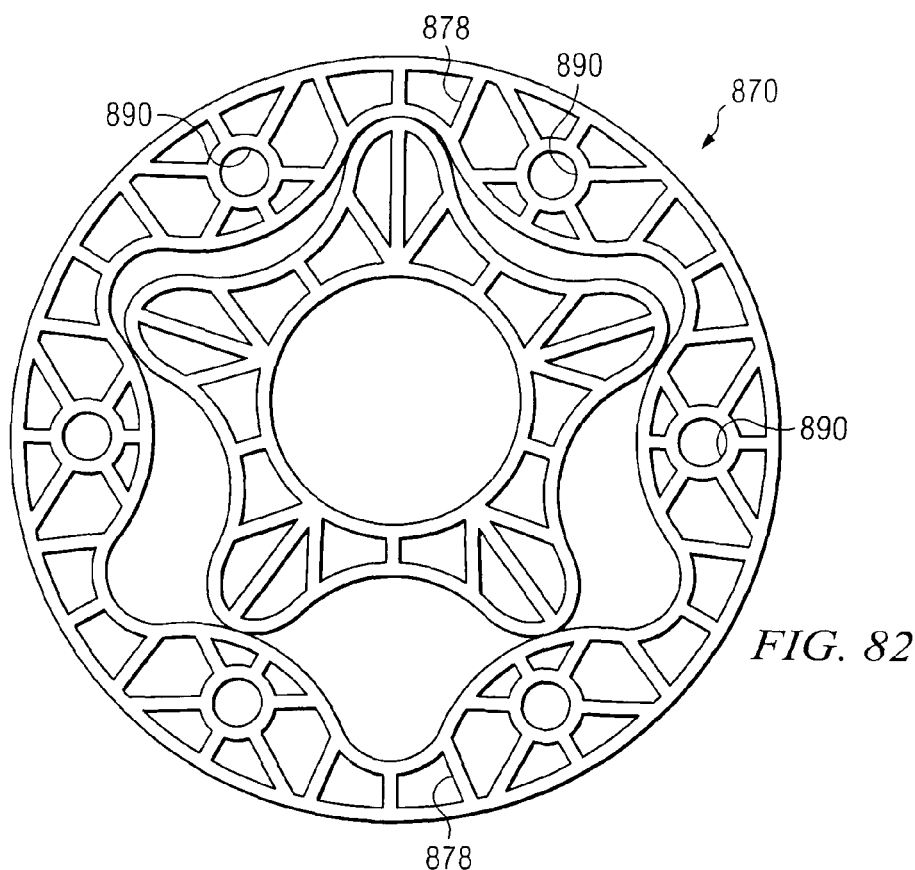

FIG. 82 illustrates another embodiment of gerotor apparatus 870, in which outer gerotor web 878 comprises a plurality of web openings 890 into which magnets or ferromagnetic material may be inserted, such as discussed below.

Figure 83:
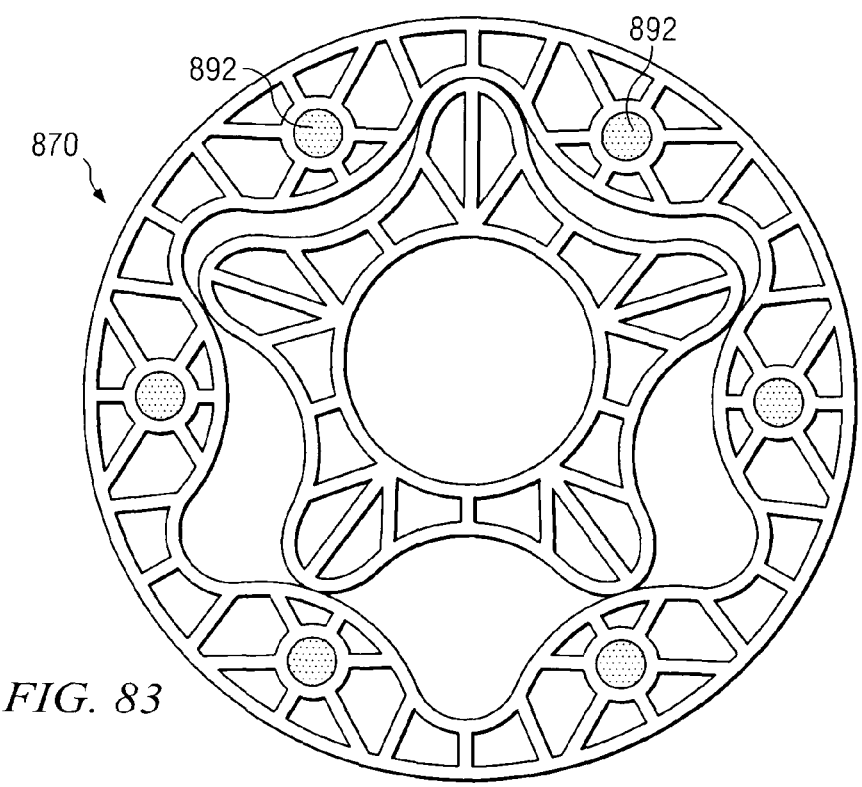

FIG. 83 illustrates gerotor apparatus 870 shown in FIG. 82, in which masses of ferromagnetic material 892 are disposed within each web opening 890. Ferromagnetic masses 892 may be used in connection with a motor or generator, such as described below. Ferromagnetic masses 892 may comprise one or more ferromagnetic materials, such as iron, nickel or cobalt, for example.

Figure 84A:
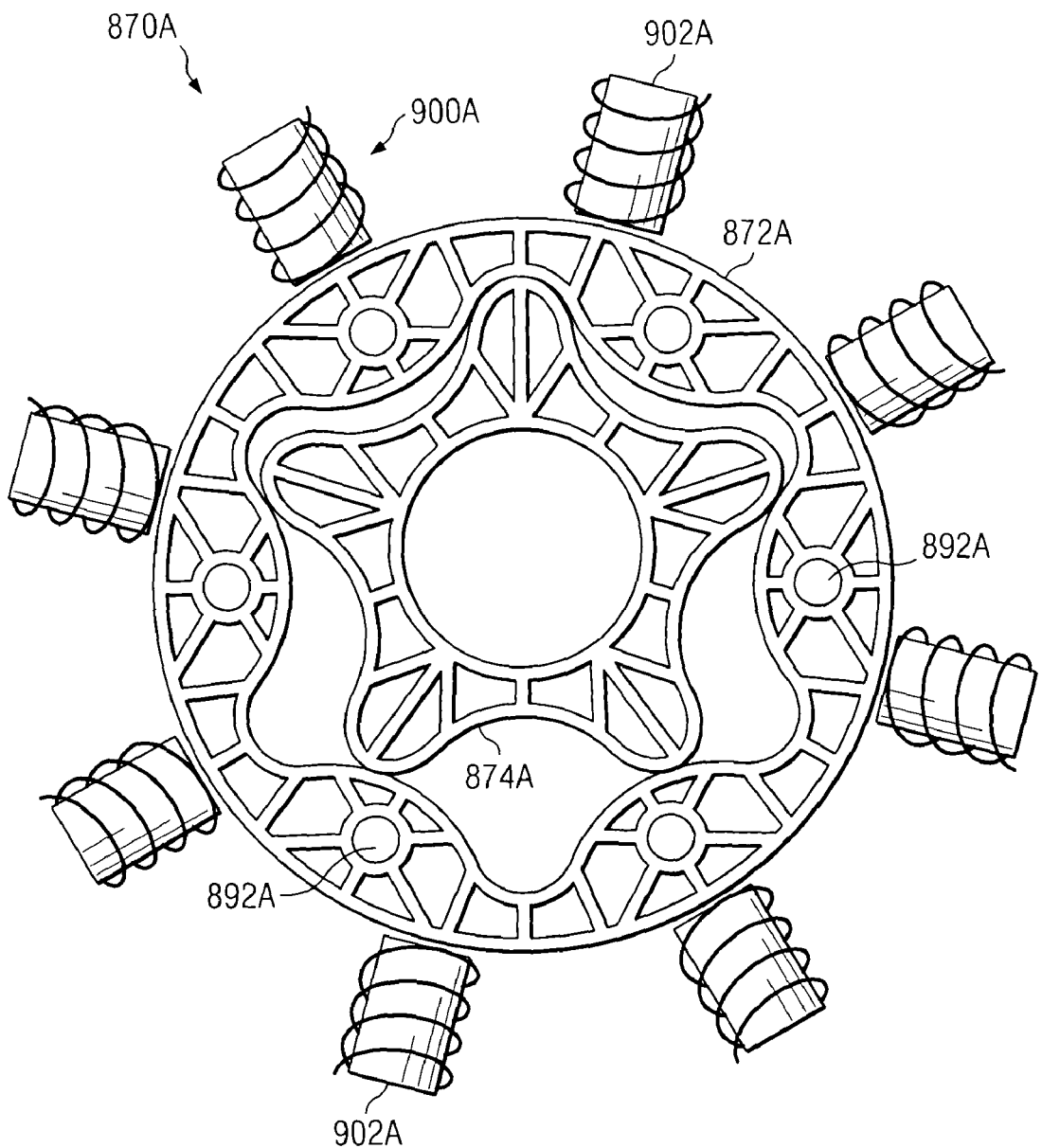
FIGS. 84 through 87 illustrate various methods of a gerotor apparatus including an electric motor or generator integral with the gerotor apparatus.

FIG. 84A illustrates an example embodiment of a gerotor apparatus 870A comprising an outer gerotor 872A, an inner gerotor 874A, and an electric motor or generator 900A. In the embodiment shown in FIG. 84A, electric motor or generator 900A comprises a switched reluctance machine (SRM), which may be used as either a motor or a generator. Switched reluctance machine 900A comprises a plurality of ferromagnetic masses 892A (such as shown in FIG. 83) and a plurality of coils 902A disposed around the outer perimeter of outer gerotor 872A. In one embodiment, coils 902A are C-shaped coils which extend over ferromagnetic masses 892A on each side of outer gerotor 872A, as shown in FIG. 84B and discussed below.

In an embodiment in which switch reluctance machine 900A is a switched reluctance motor, coils 902A and ferromagnetic masses 892A may interact to at least partially control the rotation of outer gerotor 872A. Alternatively, in an embodiment in which switched reluctance machine 900A is a switched reluctance generator, coils 902A and ferromagnetic masses 892A may interact to generate electricity as outer gerotor 872A rotates. In some embodiments, as shown in FIG. 84A for example, the number of coils 902A does not match the number of ferromagnetic masses 892A, which allows the firing sequence of coils 902A to be adjusted for relatively smooth operation of electric motor or generator 900A.

Figure 84B:
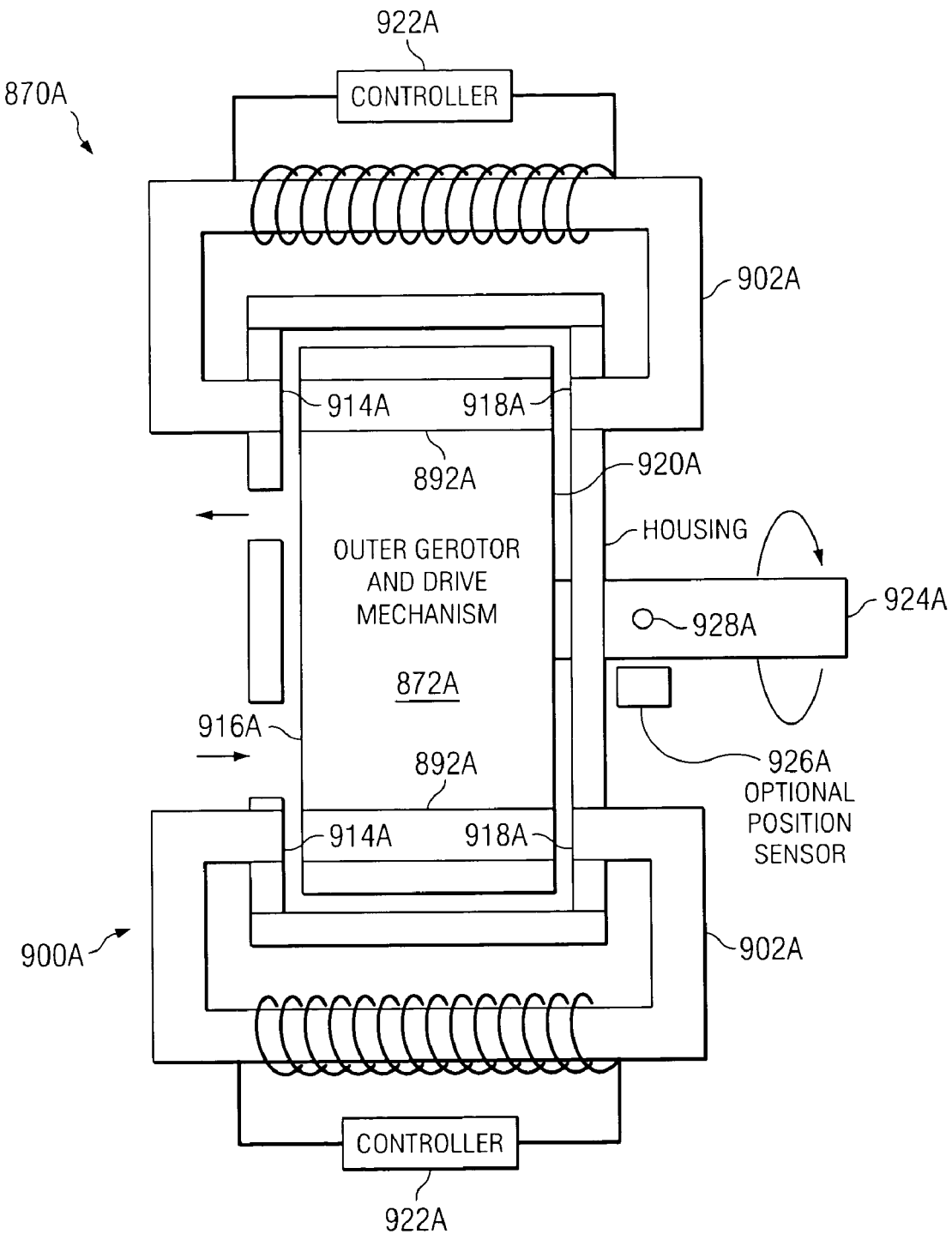

FIG. 84B illustrates a schematic side view of gerotor apparatus 870A shown in FIG. 84A, including electric motor or generator 900A. As shown in FIG. 84B, ferromagnetic masses 892A may extend across the thickness of outer gerotor 872A. Coils 902A may comprise C-shaped coils having a first end 914A adjacent a first side 916A of outer gerotor 872A and a second end 918A adjacent a second side 920A of outer gerotor 872A. A controller 922A may be coupled to each coil 902A and operable to control the timing of the firing of each coil 902A within electric motor or generator 900A. A shaft 924A may be coupled to outer gerotor 872A or inner gerotor 874A. An optional position sensor 926A may be disposed proximate shaft 924A and operable to detect the position of one or more position targets 928A as the shaft 924A rotates. Optional position sensor 926 may be operable to communicate with each controller 922A in order to properly control the timing of the firing of each of the coils 902A according to the rotational position of outer gerotor 872A.

An advantage of the embodiment illustrated in FIGS. 84A and 84B is low cost and the ability to operate at high speeds.

Figure 85A:
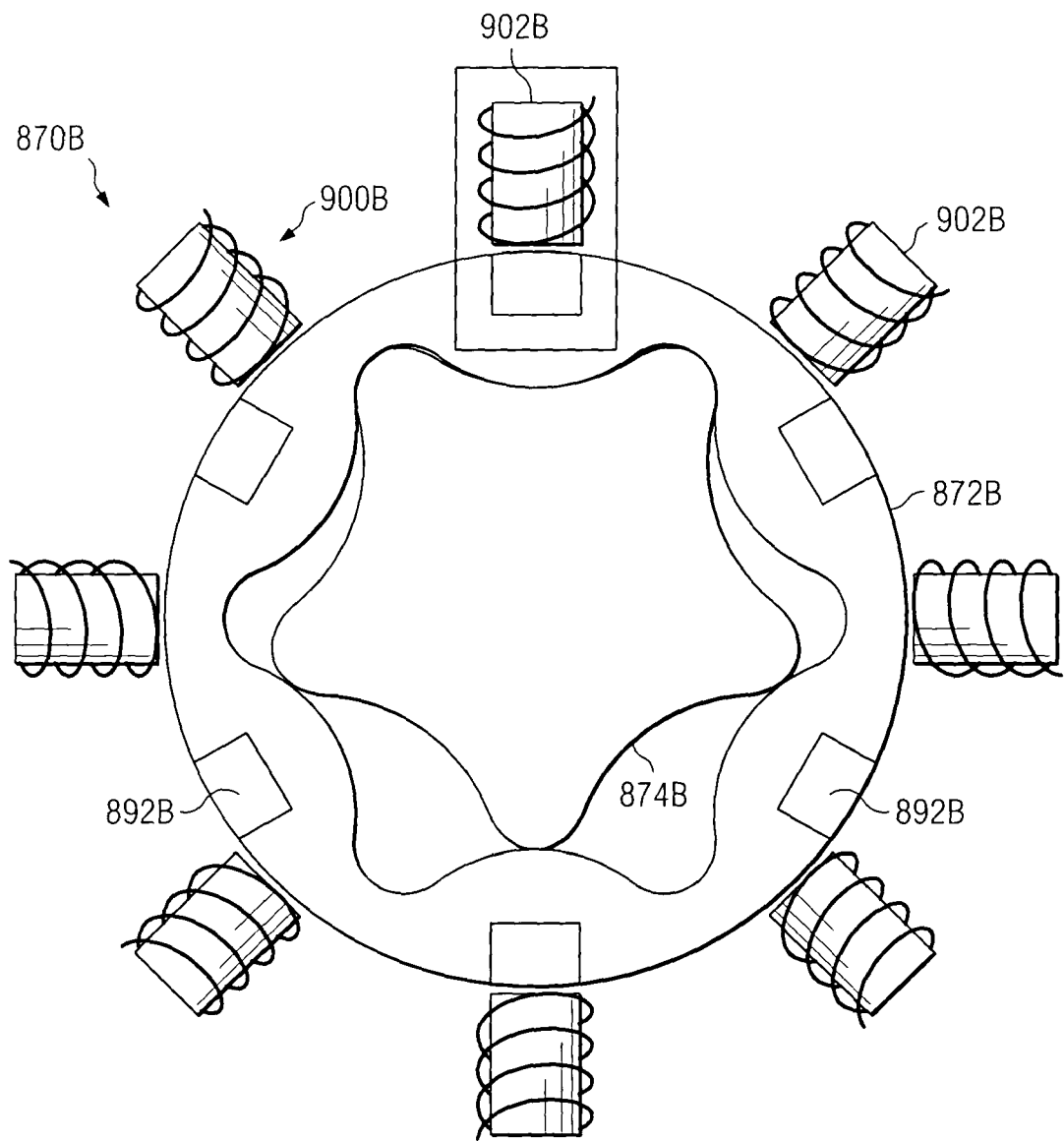
Figure 85B:
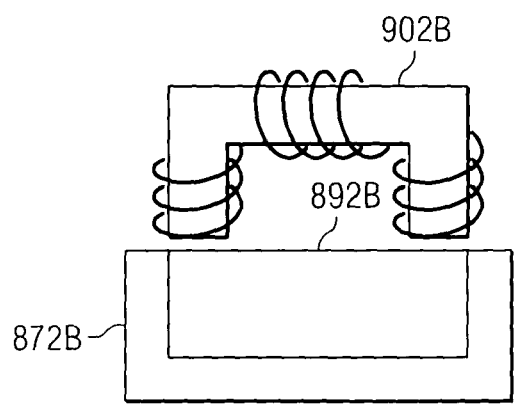

FIGS. 85A and 85B illustrate another embodiment of a gerotor apparatus 870B comprising an outer gerotor 872B, an inner gerotor 874B, and an electric motor or generator 900B. Like electric motor or generator 900A shown in FIG. 84A, electric motor or generator 900B shown in FIG. 85A comprises a plurality of ferromagnetic masses 892B and plurality of coils 902B. However, ferromagnetic masses 983B are coupled or embedded to the outer perimeter of outer gerotor 872B.

FIG. 85B illustrates a blown up cross section of a particular ferromagnetic mass 892B aligned with a particular coil 902B. As shown in FIG. 85B, coiled 902B may comprise a C-shaped coil. An advantage of the embodiment illustrated in FIGS. 85A and 85B is a more compact coil.

Figure 86:
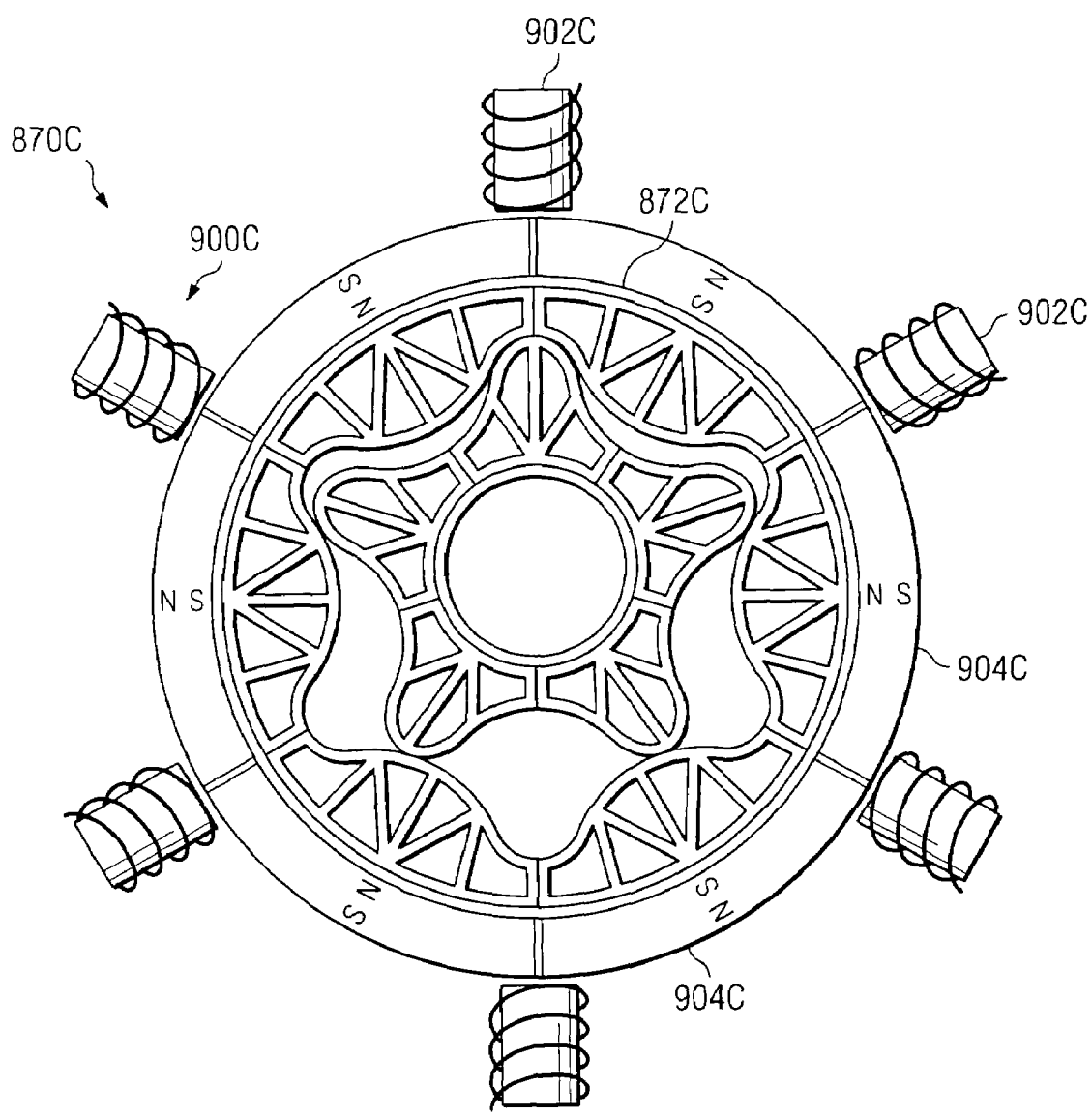

FIG. 86 illustrates another embodiment of a gerotor apparatus 870C comprising an outer gerotor 872C, an inner gerotor 874C, and an electric motor or generator 900C. Electric motor or generator 900C comprises a permanent magnet motor or generator comprising a plurality of coils 902C and a plurality of permanent magnets 904C coupled around the outer perimeter of outer gerotor 872C. In an embodiment in which electric motor or generator 900C comprises a permanent magnet motor, coils 902C and permanent magnets 904C interact to at least partially control the rotation of outer gerotor 872C. Alternatively, in an embodiment in which electric motor or generator 900C comprises a permanent magnet generator, coils 902C and permanent magnets 904C interact to generate electricity as outer gerotor 872C rotates. An advantage of the embodiment illustrated in FIG. 86 is high efficiency.

Figure 87A:
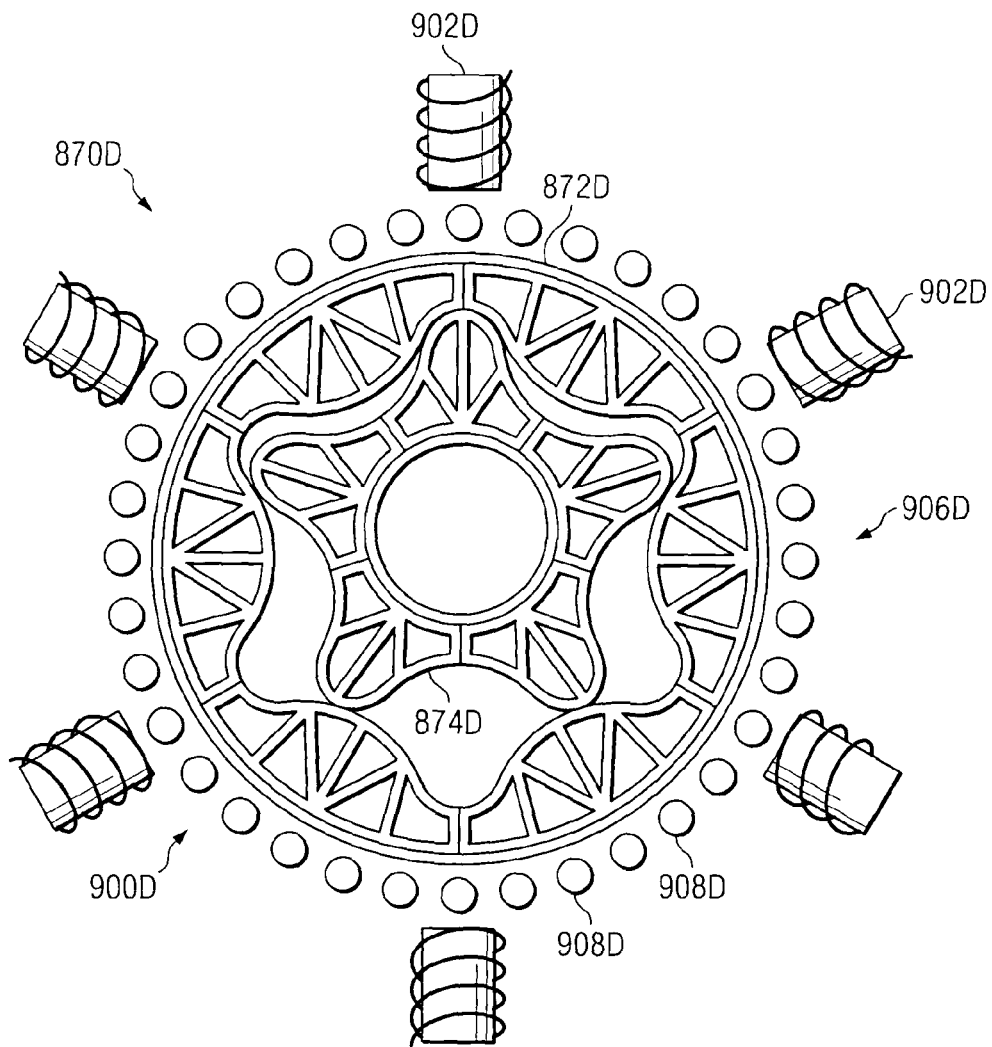

FIG. 87A illustrates a cross section of another embodiment of a motor or generator apparatus 870D comprising an outer gerotor 872D, an inner gerotor 874D, and a squirrel-cage induction motor or generator comprising a plurality of coils 902D and a squirrel-cage 906 disposed around outer gerotor 872D.

Figure 87B:
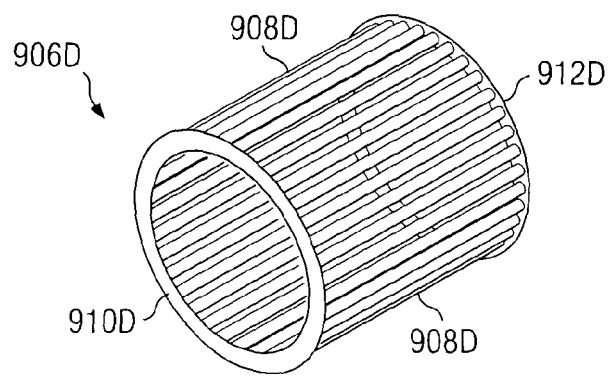

FIG. 87B illustrates a three-dimensional view of an example squirrel-cage 906D. Squirrel-cage 906D comprises a plurality of parallel cage bars 908D, each coupled to a first ring support 910D and a second ring support 912D. FIG. 87A illustrates a cross-section of the plurality of cage bars 908D, which may or may not be coupled to outer gerotor 872D.

In an embodiment in which electric motor or generator 900D comprises a squirrel-cage motor, coils 902D and squirrel-cage 906D interact in order to at least partially control the rotation of outer gerotor 872D. Alternatively, in an embodiment in which electric motor or generator 900D comprises a squirrel-cage generator, coils 902D and squirrel-cage 906D interact to generate electricity as squirrel-cage 906D rotates along with outer gerotor 872D.

Figure 88:
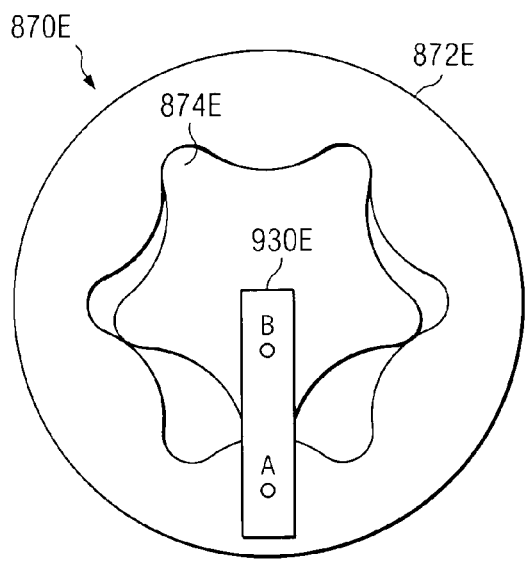
FIGS. 88 through 91 illustrate methods of generating patterns for alignment tracks in an outer gerotor or an inner gerotor of a gerotor apparatus.

FIG. 88 illustrates a configuration of an example gerotor apparatus 870E used to generate various alignment tracks to control the movement of components of gerotor apparatus 870E. Gerotor apparatus 870E comprises an outer gerotor 872E, an inner gerotor 874E, and a radial bar 930E rigidly coupled to inner gerotor 874E. As inner gerotor 874E and outer gerotor 872E rotate, various points along radial bar 930E may be used to trace patterns for alignment tracks in outer gerotor 872E, such as shown in FIGS. 89 and 90, for example. If radial bar 930E is rigidly attached to outer gerotor 872E, the alignment tracks are traced on inner gerotor 874E.

For example, a first point A on radial bar 930E may trace a pattern for an alignment track in outer gerotor 872E, such as shown in FIGS. 89A–89D. As another example, a second point B on radial bar 930E may be used to trace an alignment track in outer gerotor 874E, such as shown in FIGS. 90A–90D.

Figure 89C:
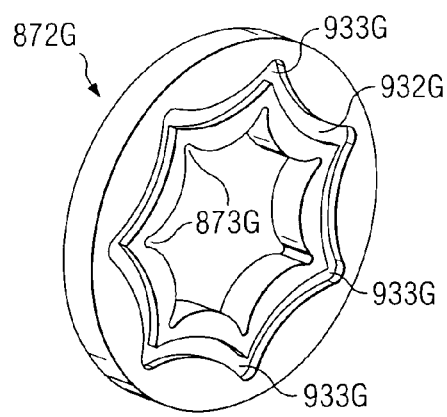
Figure 89D:
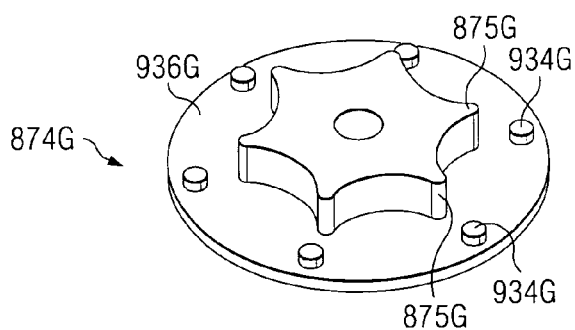
Figure 89A:
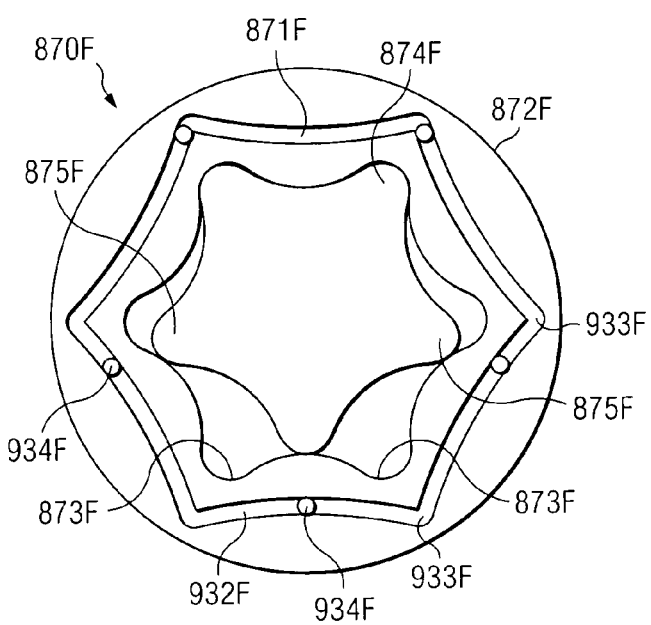

FIG. 89A illustrates a cross-section of an embodiment of a gerotor apparatus 870F comprising an inner gerotor 874F, an outer gerotor 872F, and a synchronizing system 871F coupled to and/or integrated with inner gerotor 874F and/or outer gerotor 872F. Synchronizing system 871F comprises an alignment guide, or track, 932F formed in outer gerotor 872F having a shape defined by the pattern traced by point A, as described above with reference to FIG. 88. In the embodiment shown in FIG. 89A, the opening in outer gerotor 872F comprises six notches 873F and alignment track 932F comprises six notches 933F.

Figure 89B:
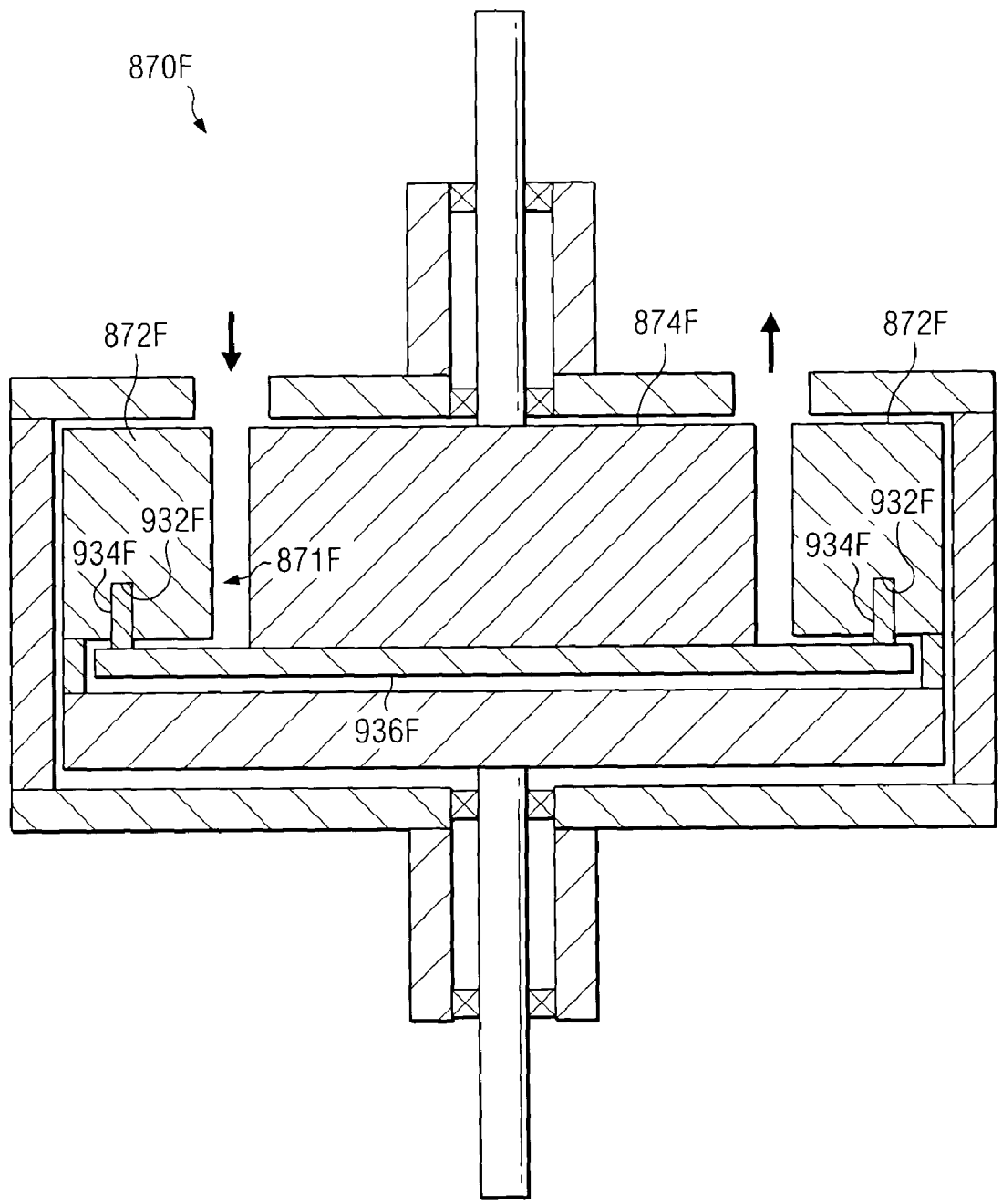

Synchronizing system 871F also comprises a plurality of alignment members 934F, such as knobs, rollers or pegs, for example, coupled to, or integral with, inner gerotor 874F (as shown in FIG. 89B) and aligned within alignment track 932F. In the embodiment shown in FIG. 89A, inner gerotor 874F comprises five protrusions, or tips, 875F, and five alignment members 934F are coupled to inner gerotor 874F.

As inner gerotor 874F and outer gerotor 872F rotate relative to each other, alignment members 934F travel along alignment track 932F in order to provide alignment between inner gerotor 874F and outer gerotor 872F.

FIG. 89B illustrates a side view of gerotor apparatus 870F shown in FIG. 89A. As shown in FIG. 89B, alignment members 934F are coupled to inner gerotor 874F by a first plate 936F. Alignment members 934F are generally disposed within and travel along alignment track 932F as inner gerotor 874F rotates relative to outer gerotor 872F.

FIG. 89C illustrates a three-dimensional view of an outer gerotor 872G including an alignment track 932G similar to outer gerotor 872F and alignment track 932F (shown in FIGS. 89A and 89B). However, in this embodiment, outer gerotor 872G comprises seven notches 873G whereas outer gerotor 872F comprises six notches 873F (as shown in FIG. 89A). Similarly, alignment track 932G comprises seven notches 933G whereas alignment track 932F comprises six notches 933F (as shown in FIG. 89A).

FIG. 89D illustrates a three-dimensional view of an inner gerotor 874G and a plurality of alignment members 934G coupled to inner gerotor 874G similar to inner gerotor 874F and alignment members 934F (shown in FIGS. 89A and 89B). However, in this embodiment, inner gerotor 874G comprises six protrusions 875G whereas inner gerotor 874F comprises five protrusions 875F (as shown in FIG. 89A). Similarly, the embodiment shown in FIG. 89D includes six alignment members 934G as opposed to the embodiment shown in FIG. 89A which includes five alignment members 934F.

An advantage of the embodiment illustrated in FIGS. 89A–89D is a compact design with short axial length.

Figure 90A:
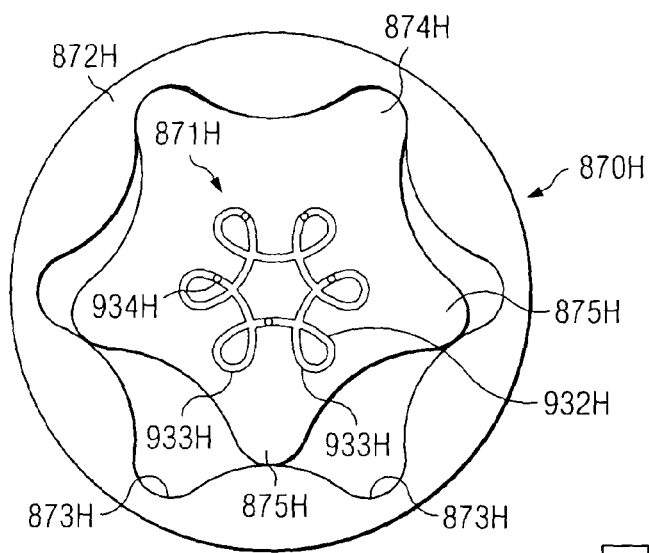

FIG. 90A illustrates a cross sectional view of another embodiment of a gerotor apparatus 870H comprising an outer gerotor 872H, an inner gerotor 874H, an outer gerotor 872H, and a synchronizing system 871H coupled to and/or integrated with inner gerotor 874H and/or outer gerotor 872H. Synchronizing system 871H comprises an alignment track 932H formed in outer gerotor 872H having a shape defined by the pattern traced by point B on radial bar 930E shown in FIG. 88. In the embodiment shown in FIG. 90A, the opening in outer gerotor 872H comprises six notches 873H and alignment track 932H comprises six loops 933H.

Synchronizing system 871F also comprises a plurality of alignment members 934H, such as knobs, rollers, or pegs, for example, are coupled to inner gerotor 874H and generally disposed in alignment with alignment track 932H. In the embodiment shown in FIG. 90A, inner gerotor 874H comprises five protrusions, or tips, 875H, and five alignment members 934H are coupled to inner gerotor 874H. As inner gerotor 874H rotates relative to outer gerotor 872H, alignment members 934H and alignment track 932H interact to provide alignment between inner gerotor 874H and outer gerotor 872H.

Figure 90B:
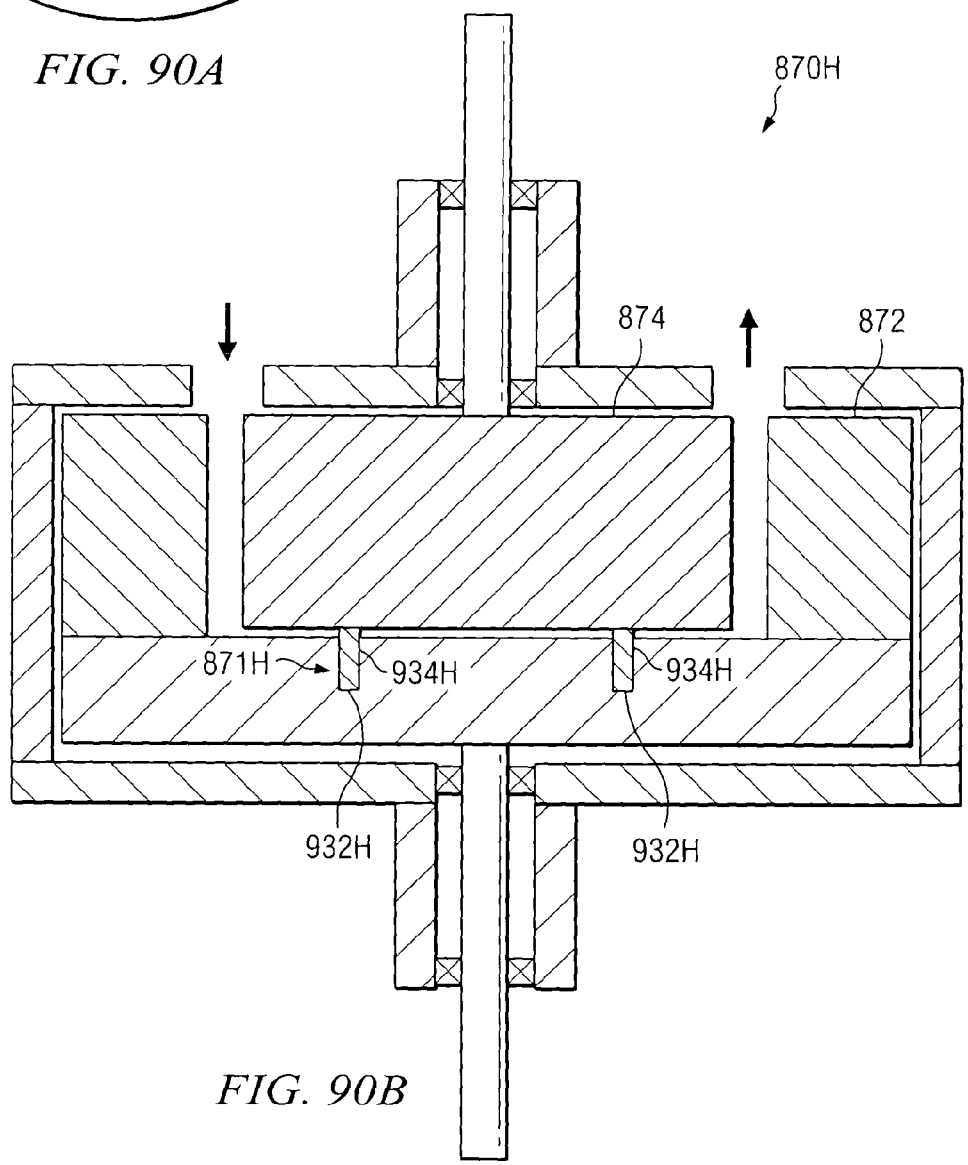

FIG. 90B illustrates a side view of gerotor apparatus 870H shown in FIG. 90A. As shown in FIG. 90B, alignment members 934H are coupled to inner gerotor 874H and aligned within alignment track 932H.

Figure 90C:
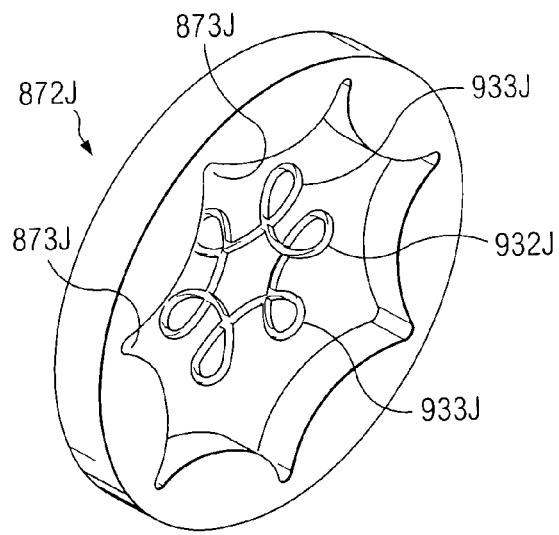

FIG. 90C illustrates a three-dimensional view of an outer gerotor 872J including an alignment track 932J similar to outer gerotor 872H and alignment track 932H (shown in FIGS. 90A and 90B). However, in this embodiment, outer gerotor 872J comprises seven notches 873G whereas outer gerotor 872H comprises six notches 873J (as shown in FIG. 90A). Similarly, alignment track 932J comprises seven loops 933J whereas alignment track 932H comprises six loops 933H (as shown in FIG. 90A).

Figure 90D:
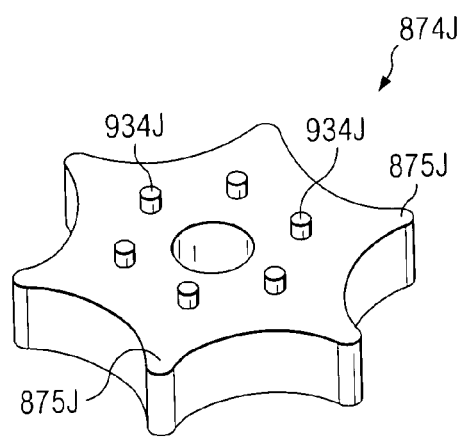

FIG. 90D illustrates a three-dimensional view of an inner gerotor 874J and a plurality of alignment members 934J coupled to inner gerotor 874J similar to inner gerotor 874H and alignment members 934H (shown in FIGS. 90A and 90B). However, in this embodiment, inner gerotor 874J comprises six protrusions 875J whereas inner gerotor 874H comprises five protrusions 875H (as shown in FIG. 90A). Similarly, the embodiment shown in FIG. 90D includes six alignment members 934J as opposed to the embodiment shown in FIG. 90A which includes five alignment members 934H.

An advantage of the embodiment illustrated in FIGS. 90A–90D is a compact design with very short axial length.

Figure 91A:
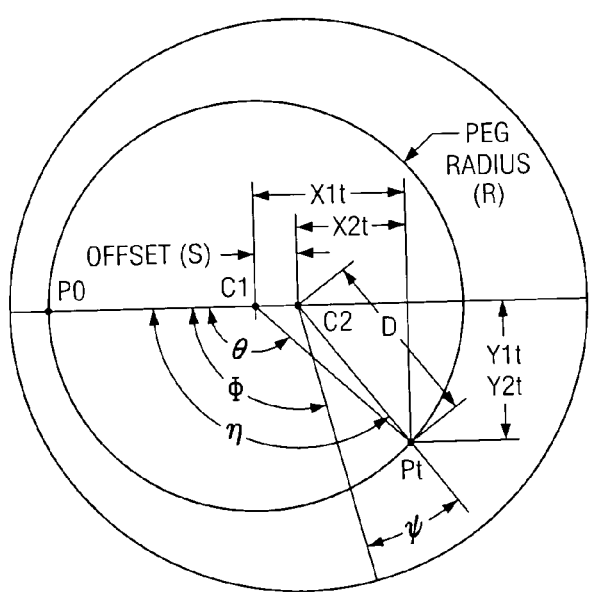
Figure 91B:
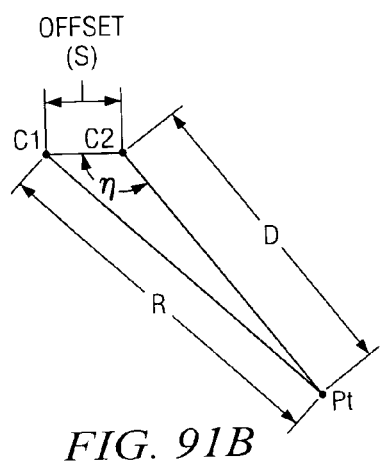

The following discussion, taken in conjunction with FIGS. 91A and 91B, describes an example method of generating the patterns for alignment tracks 932G and 932J shown in FIGS. 89C and 90C, respectively. In other words, the following discussion illustrates a method of determining various alignment tracks for an embodiment in which the outer gerotor comprises seven notches (such as notches 873G or 873J shown in FIGS. 89C and 90C, respectively) and the inner gerotor comprises six protrusions, or tips (such as protrusions 875G or 875J shown in FIGS. 89D and 90D, respectively).

Considering FIG. 91A, because the angular velocity of the outer gerotor and inner gerotor should have a constant ratio of 6:7, theta and phi can be related by the following equation:

$$\phi = \frac{6}{7}\theta \qquad \text{Eq. (1)}$$

The point P0 is located on circle 1 and moves as that part rotates. The coordinate values, $X_{1t}$ and $Y_{1t}$, relative to a fixed set of coordinate axes are:

$$X_{1t} = R\cos(\theta)$$

$$Y_{1t} = R\sin(\theta) \qquad \text{Eq. (2)}$$

To plot the path, point P needs to be tracked with respect to circle 2. The coordinates of point Pt using point C2 as the origin are:

$$X2t = X1t + S$$

Note the sign convention on the X value $$Y2t = Y1t \qquad \text{Eq. (3)}$$

With these defined, the length D can be found by using the Pythagorean theorem:

$$D = \sqrt{X2t^2 + Y2t^2}$$

$$D = \sqrt{(R\cos(\theta) + S)^2 + (R\sin(\theta))^2}$$

$$D = \sqrt{R^2\cos^2(\theta) + 2RS\cos(\theta) + S^2 + R^2\sin^2(\theta)}$$

$$D = \sqrt{R^2 + 2RS\cos(\theta) + S} \qquad \text{Eq. (4)}$$

however, plotting the path of the point on circle 2 cannot be done with the fixed coordinate system, since circle 2 is also rotating. The coordinate system must rotate with the circle. Thus, the actual path on a stationary disk would be:

$$X = D\cos(\psi)$$

$$Y = D\sin(\psi) \qquad \text{Eq. (5)}$$

Psi and Theta must now be related to one another to allow parametric equations to be written for X and Y in terms of theta.

$$\eta = \phi + \psi \qquad \text{Eq. (6)}$$

Using the law of cosines on triangle C1, C2, Pt illustrated in FIG. 91B provides:

$$R^2 = S^2 + D^2 - 2SD\cos(\eta) \qquad \text{Eq. (7)}$$

Solving Equation (7) for eta:

$$\eta = \cos^{-1}\left(\frac{R^2 - S^2 - D^2}{2SD}\right) \qquad \text{Eq. (8)}$$

Substituting Equation (4) into Equation (8) provides:

$$\eta = \cos^{-1}\left(\frac{R^2 - S^2 - (R^2 + 2RS\cos(\theta) + S^2)}{2S\sqrt{R^2 + 2RS\cos(\theta) + S^2}}\right) \qquad \text{Eq. (9)}$$

$$\eta = \cos^{-1}\left(\frac{-R\cos(\theta) - S}{\sqrt{R^2 + 2RS\cos(\theta) + S^2}}\right)$$

Combining Equations (1), (6) and (9) provides:

$$\cos^{-1}\left(\frac{R\cos(\theta)}{\sqrt{R^2 + 2RS\cos(\theta) + S^2}}\right) = \frac{6}{7}\theta + \psi \qquad \text{Eq. (10)}$$

$$\psi = \cos^{-1}\left(\frac{R\cos(\theta)}{\sqrt{R^2 + 2RS\cos(\theta) + S^2}}\right) - \frac{6}{7}\theta$$

Using Equations (4), (5) and (10), the values for X and Y can be solved (such as by using a spreadsheet, for example) and the path of point P can be plotted as if circle 2 was stationary.

Figure 91C:
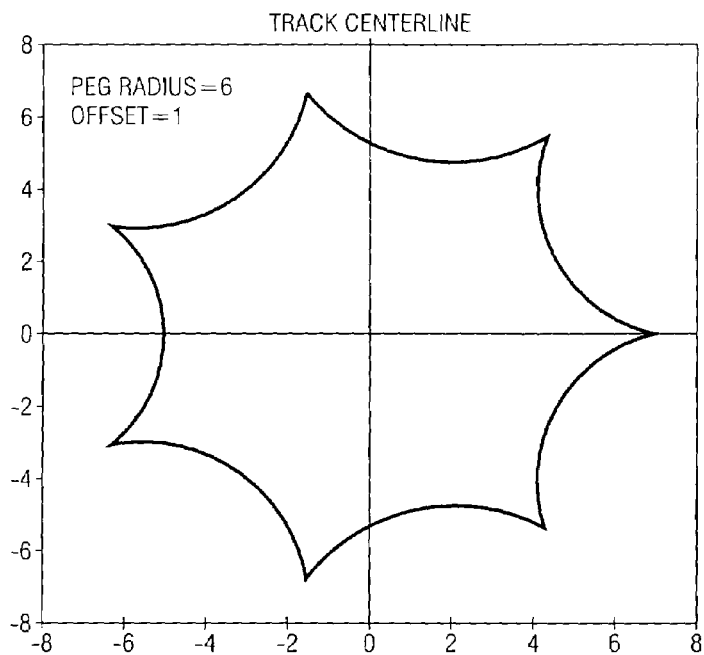
Figure 91D:
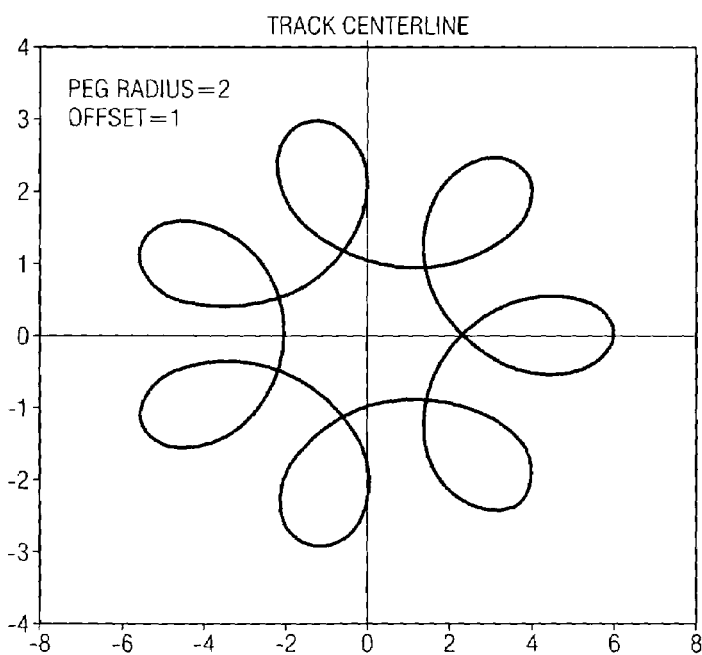

For example, a spreadsheet may be used to calculated one lobe of the path by varying theta from 0 to 360° is small increments. To plot the entire path, the same D values may be used with psi incremented by $2(\pi)/7$ for each lobe. An example of a complete plot is shown in FIG. 91C. By changing the peg radius, R (for example, to R=2 inches), the track shown in FIG. 91D may be generated. Alignment tracks 932G and 932J shown in FIGS. 89C and 90C, respectively, may be generated using the method described above.

Figure 92:
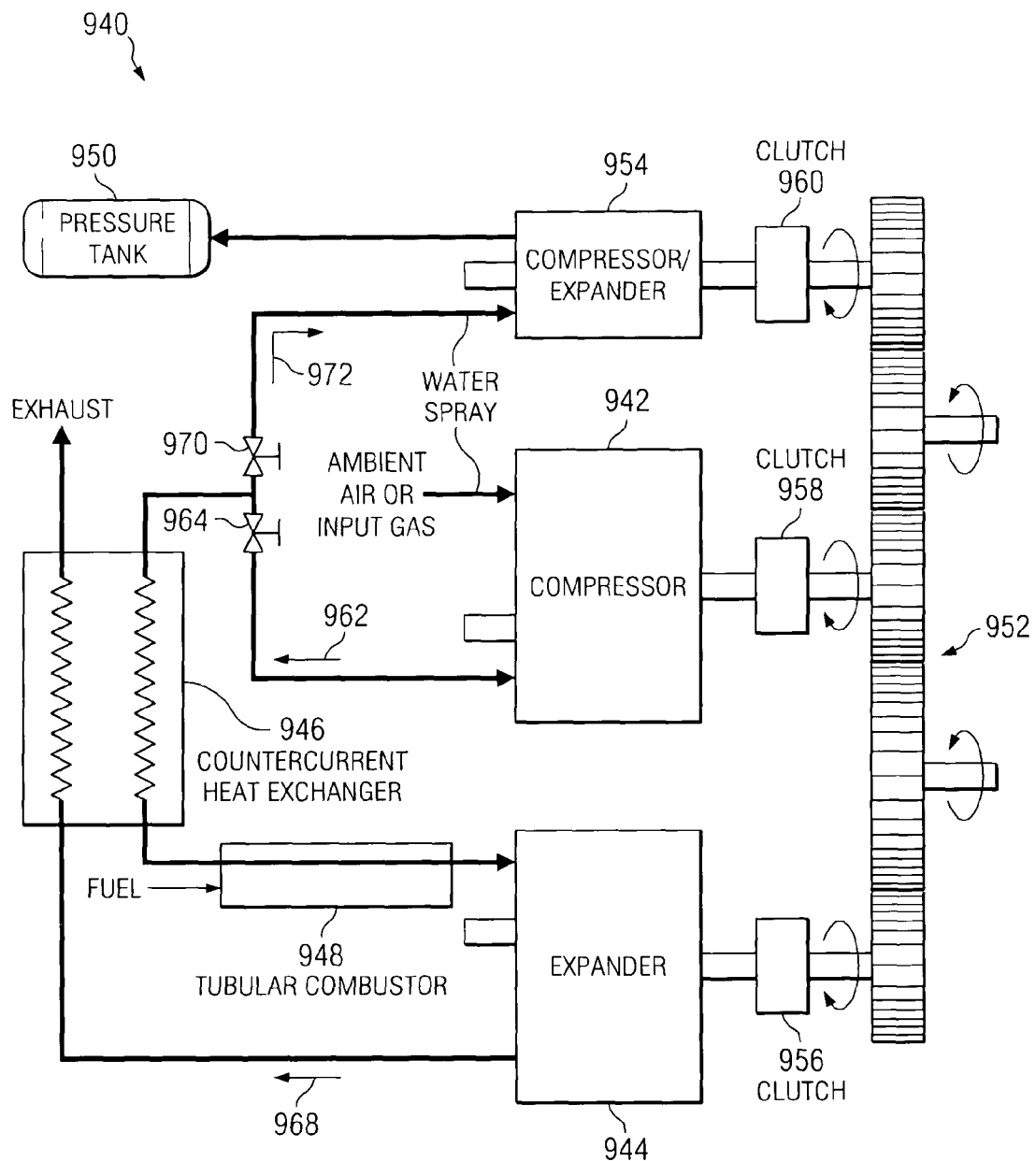
FIG. 92 illustrates an engine system including a compressor, an expander, one or more additional compressors and/or expanders, and a drive apparatus, in which the compressor and expander are separately clutched from the drive apparatus according to an embodiment of the invention.

FIG. 92 illustrates a schematic of an example embodiment of an engine system 940. Engine system 940 comprises a gerotor compressor 942, a gerotor expander 944, a heat exchanger 946, a combustor 948, a pressure tank 950, a drive apparatus 952, and one or more additional compressor/expanders 954. Engine system 940 also comprises an expander clutch 956 coupled to gerotor expander 944 and operable to engage and disengage gerotor expander 944 from drive apparatus 952, a compressor clutch 958 coupled to gerotor compressor 942 and operable to engage and disengage gerotor compressor 942 from drive apparatus 952, and a compressor/expander clutch 960 coupled to each additional compressor/expander 954 and operable to engage and disengage each additional compressor/expander 954 from drive assembly 952. In some embodiments, expander clutch 956 operates independently from compressor clutch 958. In particular embodiments, clutches 956, 958 and 960 each function independently to engage or disengage from drive apparatus 952.

In operation, during steady state, gerotor compressor 942 receives a volume of gas, such as a volume of ambient air for example, compresses the gas, and communicates the compressed gas toward heat exchanger 946 along path 962 shown in FIG. 92. The compressed gas travels through a first valve 964, which is generally open during steady-state operation, travels through heat exchanger 946 and combustor 948, where the compressed gas is heated. The heated compressed gas enters gerotor expander 944 and drives shaft 966 as it expands within gerotor expander 944. The expanded, or decompressed, gas exits gerotor expander 944 along path 968, travels through heat exchanger 946 where the gas is cooled, and exits engine system 940 as exhaust. During steady-state operation, a second valve 970 between gerotor compressor 942 and the one or more additional compressor/expanders 954 remains closed. In addition, during steady-state operation, expander clutch 956 and compressor clutch 958 are generally engaged with drive apparatus 952. Compressor/expander clutches 960 may be disengaged from drive apparatus 952.

During a braking state (such as when a vehicle including engine system 940 is braking, for example), expander clutch 956 may disengage from drive apparatus 952 while compressor clutch 958 remains engaged with drive apparatus 952. The kinetic energy of drive apparatus 952 (such as caused by kinetic energy of the vehicle) continues to drive gerotor compressor 942. In addition, compressor/expander clutches 960 are engaged with drive apparatus 952 during the braking state. In addition, first valve 964 is closed and second valve 970 is opened during the braking state such that compressed gases exiting gerotor compressor 942 are communicated along path 972 toward the one or more additional compressor/expanders 954, which may further process the compressed gases. For example, in an embodiment in which engine system 940 comprises an additional compressor 954, compressed gases communicated to the additional compressor 954 along path 972 may be further compressed by the additional compressor 954 and communicated into pressure tank 50. Using additional compressors 954 along with gerotor compressor 942, gases may be relatively highly compressed before being stored in pressure tank 950, which may reduce the required volume or size of pressure tank 950. Each additional compressor 954 may be similar or identical to gerotor compressor 942. Similarly, in an embodiment in which engine system 940 comprises one or more additional expanders 954, each additional expander 954 may be similar or identical to gerotor expander 944.

In a startup state (such as when the vehicle including engine system 940 starts up, for example), compressed gas from the pressure tank 950 flows through one or more expanders 954 while clutch 960 is engaged. Valves 970 and 964 are open allowing gas to travel through heat exchanger 946 and combustor 948 in order to drive gerotor expander 944. In some embodiments, during the startup state, expander clutch 956 is engaged with drive apparatus 952, while compressor clutch 958 is disengaged from drive apparatus 952 for at least a portion of the startup state.

Figure 93:
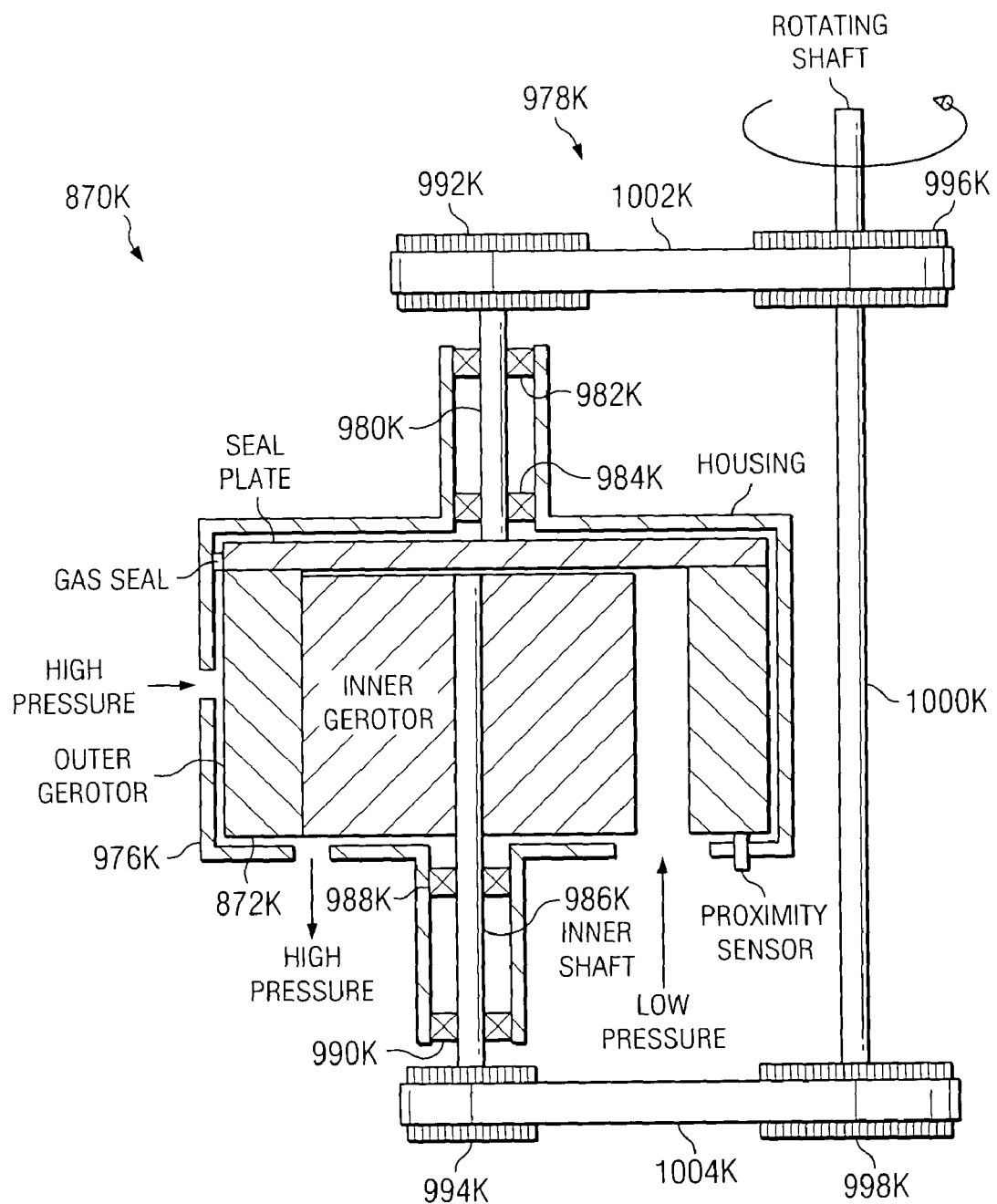
FIGS. 93 through 94 illustrate example embodiments of a gerotor apparatus including an outer gerotor, and inner gerotor, and a synchronization system operable to synchronize the relative rotation of the outer gerotor and inner gerotor.

FIG. 93 illustrates an embodiment of a gerotor apparatus 870K comprising an outer gerotor 872K, in inner gerotor 874K, a housing 976K, and a synchronizing system 978K operable to control the rotation of outer gerotor 872K relative to the rotation of inner gerotor 874K. An outer gerotor shaft 980K is rigidly coupled to outer gerotor 872K and rotatably coupled housing 976K by a first bearing 982K and a second bearing 984K. Similarly, an inner gerotor shaft 986K is rigidly coupled to inner gerotor 874K and rotatably coupled housing 976K by a third bearing 988K and a second bearing 990K.

Synchronizing system 978K comprises a first rotational object 992K coupled to outer gerotor shaft 980K, a second rotational object 994K coupled to inner gerotor shaft 986K, and a third rotational object 996K and a fourth rotational object 998K coupled to a synchronizing system shaft 1000K. First rotational object 992K and third rotational object 996K are coupled to each other by a first belt device 1002K, and second rotational object 994K and fourth rotational object 998K are coupled to each other by a second belt device 1004K.

First and second belt devices 1002K and 1004K may comprise any device suitable to drive rotational objects 992K, 994K, 996K and 998K. For example, in some embodiments (such as shown in FIG. 93, for example), rotational objects 992K, 994K, 996K and 998K comprise pulleys and first and second belt devices 1002K and 1004K comprises timing belts 1002K and 1004K. Timing belts 1002K and 1004K may comprise Kevlar or carbon fiber belts, or any other substantially rigid belts, such cable belts that are able to resist stretching. In other embodiments, rotational objects 992K, 994K, 996K and 998K comprise gear sprockets and first and second belt devices 1002K and 1004K comprises chains 1002K and 1004K operable to interact with gear sprockets 992K, 994K, 996K and 998K.

As discussed above, synchronizing system 978K is generally operable to control the rotation of outer gerotor 872K relative to the rotation of inner gerotor 874K. This may be achieved by appropriately selecting the size (or number of sprockets) of rotational objects 992K, 994K, 996K and 998K relative to each other. For example, as shown in FIG. 93, third rotational object 994K is smaller in diameter than first rotational object 992K such that inner gerotor 874K rotates at a greater speed than outer gerotor 872K.

Figure 94:
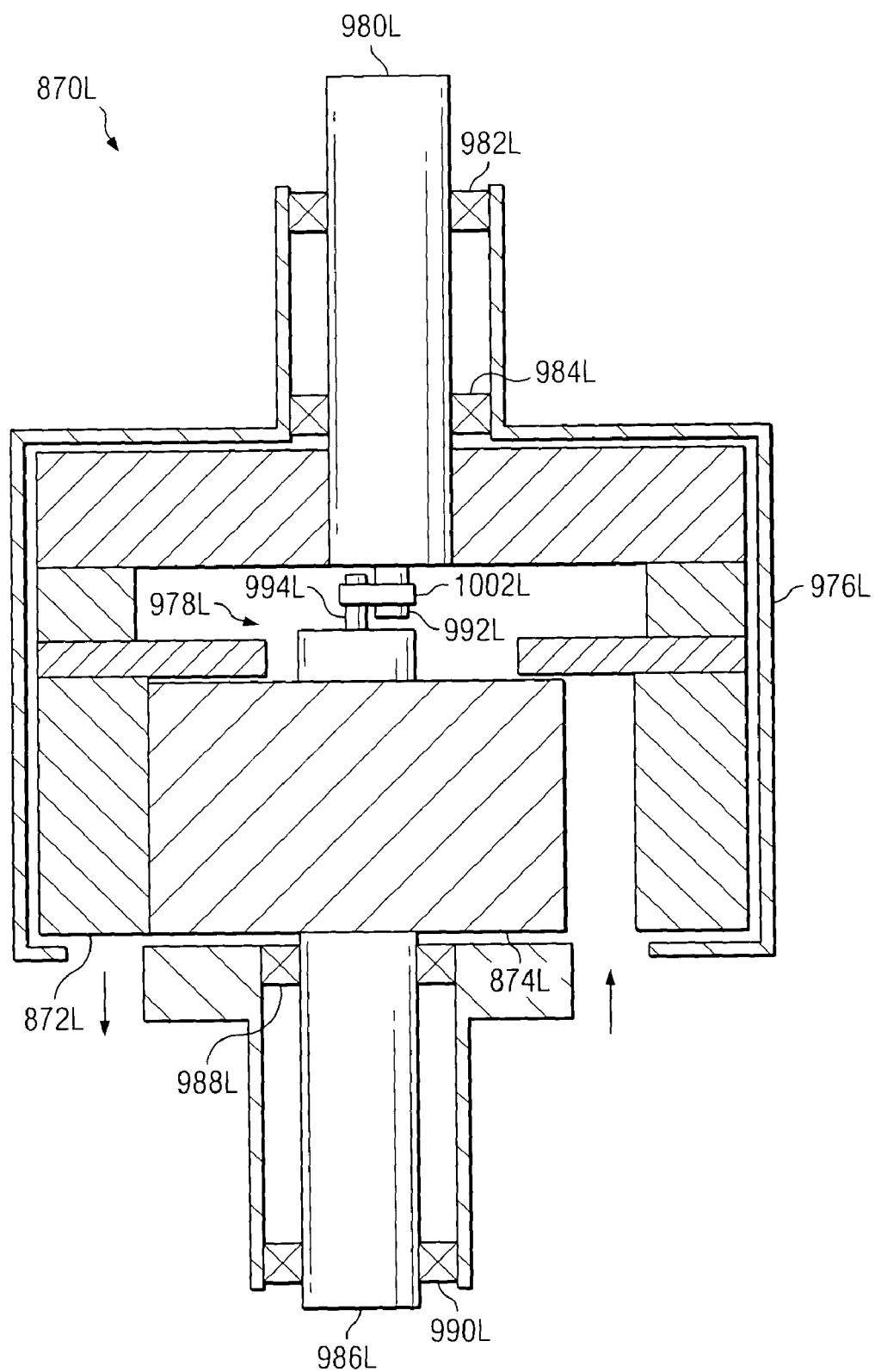

FIG. 94 illustrates another embodiment of a gerotor apparatus 870L comprising an outer gerotor 872L, an inner gerotor 874L, a housing 976L, and a synchronizing system 978L operable to control the rotation of outer gerotor 872L relative to the rotation of inner gerotor 874L. An outer gerotor shaft 980L is rigidly coupled to outer gerotor 872L and rotatably coupled housing 976L by a first bearing 982L and a second bearing 984L. Similarly, an inner gerotor shaft 986L is rigidly coupled to inner gerotor 874L and rotatably coupled housing 976L by a third bearing 988L and a second bearing 990L.

Synchronizing system 978L comprises a first rotation object 992L rigidly coupled to outer gerotor shaft 980L, a second rotation object 994L is rigidly coupled to inner gerotor shaft 986L, and a belt device 1002L coupling first rotation object 992L with second rotation object 994L. Belt device 1002L and rotation objects 992L and 994L may comprise any suitable devices, such as those discussed above regarding belt devices 1002K and 1004K and rotational objects 992K, 994K, 996K and 998K shown in FIG. 93, for example.

FIGS. 95A, 95B and 95C illustrate an embodiment of a gerotor apparatus 870M in which gas enters into and exits from the gerotor apparatus 870M through a central shaft. Gerotor apparatus 870M may comprise a compressor or an expander, depending on the embodiment. As shown in FIG. 95A, gerotor apparatus 870M comprises an outer gerotor 872M, an inner gerotor 874M, an alignment mechanism 1015M, and a housing 976M. The alignment mechanism 1015M shown here may be similar to that shown in FIG. 55, but other alignment mechanisms, such as gears, may be used also. Outer gerotor 872M is rotatably coupled to housing 976M by a first bearing 982M and a second bearing 984M. Inner gerotor 874M is rigidly coupled to an inner gerotor shaft 986M, which is rotatably coupled to housing 976M by a third bearing 998M and a fourth bearing 990M.

Outer gerotor 872M comprises an outer gerotor chamber 1010M in which gases are compress or expanded, depending on whether gerotor apparatus 870M comprised a compressor or an expander. Inner gerotor shaft 986M comprises an inside opening 1012M through which gases may enter into and exit from outer gerotor chamber 1010M. A separator 1014M is disposed within inside opening 1012M and is configured such that it is substantially separates a first, intake section 1016M of inside opening 1012M from a second, exit section 1018M of inside opening 1012M, as shown in FIGS. 95B and 95C. Intake section 1016M of inside opening 1012M is operable to receive and communicate gases into outer gerotor chamber 1010M through one or more passages 1020M in inner gerotor 874M, as shown in FIGS. 95B and 95C. Similarly, exit section 1018M is operable to receive gases from outer gerotor chamber 1010M through one or more passages 1020M and release such received gases away from gerotor apparatus 870M, as shown in FIGS. 95B and 95C.

In an embodiment in which gerotor apparatus 870M comprises a compressor (such as the embodiment shown in FIGS. 95A, 95B and 95C), intake section 1016M of inside opening 1012M communicates relatively low pressure gases into outer gerotor chamber 1010M through passages 1020M in inner gerotor 874M. As outer gerotor 872M and an inner gerotor 874M rotate relative to each other, gases within intake section 1016M become compressed. The compressed gases may then enter exit section 1016M of inside opening 1012M through passages 1020M and escape away from gerotor apparatus 870M.

FIGS. 96 through 101 illustrate various embodiments of a gerotor apparatus 1r. Gerotor apparatus 1r includes a housing 2r, an outer gerotor 4r disposed within housing 2r, and an inner gerotor 6r disposed within outer gerotor 4r. Gerotor apparatus 1r includes a lower shaft 450 coupled to an end of housing 2k that includes a gas inlet port 452 and a gas exhaust 454. A gear housing 456 is coupled to lower shaft 450 and an upper shaft 458 couples to gear housing 456 and extends upwards towards the top of housing 2r. A rotating shaft 460 is rotatably coupled to hosing 2r by a bearing 461. Shaft 460 couples to outer gerotor 4r and also rotatably couples to upper shaft 458 via a hollow shaft 462 and suitable bearings. Inner gerotor 6r is rotatably coupled to lower shaft 450 via suitable bearings.

Gear housing 456 includes an idler gear 464 coupling a first gear 466 that is associated with outer gerotor 4r and a second gear 468 that is associated with inner gerotor 6r. Idler gear 464 is rotatably coupled to gear housing 456 in any suitable manner, such as by bearings. In the illustrated embodiment, both first and second gears are ring gears having interior gear teeth. In general operation, when shaft 460 rotates, as denoted by arrow 469, it rotates outer gerotor 4r, which rotates first gear 466, which rotates idler gear 464, which rotates second gear 468, which rotates inner gerotor 6r. An advantage of the embodiment illustrated in FIG. 96 is compactness.

Figure 96:
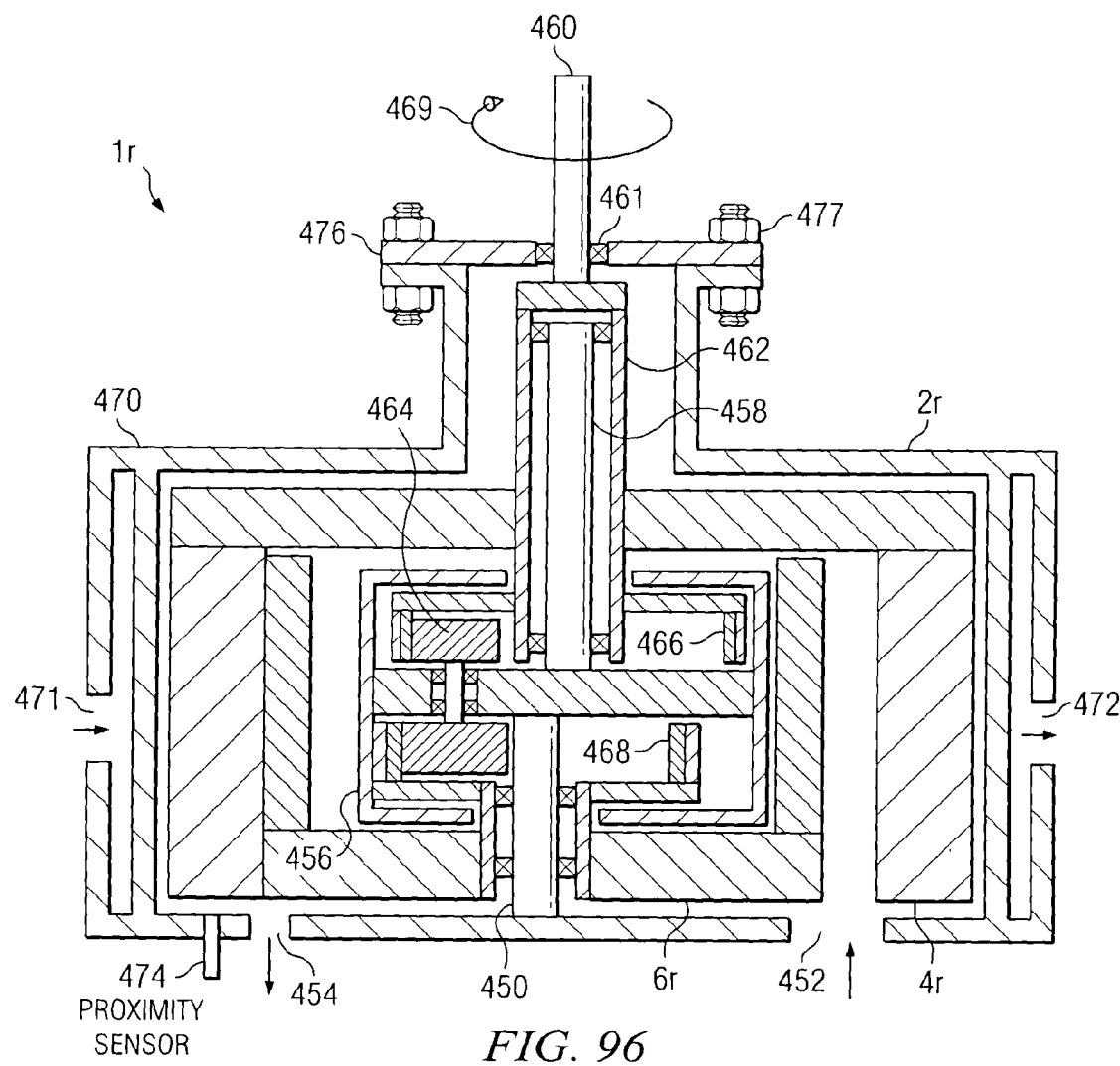
FIGS. 96 through 101 illustrate various embodiments of a gerotor apparatus of a quasi-isothermal Brayton cycle engine.

Also illustrated in FIG. 96 is a jacket 470 that exists around a perimeter of housing 2r. Jacket 470 has an inlet 471 and an exit 472 that function to recirculate any suitable fluid around the perimeter of housing 2r to control the temperature of housing 2r, thereby regulating its length and controlling the gap. A proximity sensor 474 measures a gap between the end of outer gerotor 4r and housing 2r. Proximity sensor 474 may be coupled to a suitable controller (not shown) that controls the flow of fluid through jacket 470 to regulate the gap to a predetermined distance. The present invention contemplates other methods to regulate the gap between outer gerotor 4r and housing 2r. For example, gerotor apparatus 1r may have a retaining ring 476 coupled to an upper portion of housing 2r with one or more adjustment screws 477. Retaining ring 476 may allow an adjustment of the gap between the bottom of outer gerotor 4r and housing 2r via adjustment screws 477.

Figure 97:
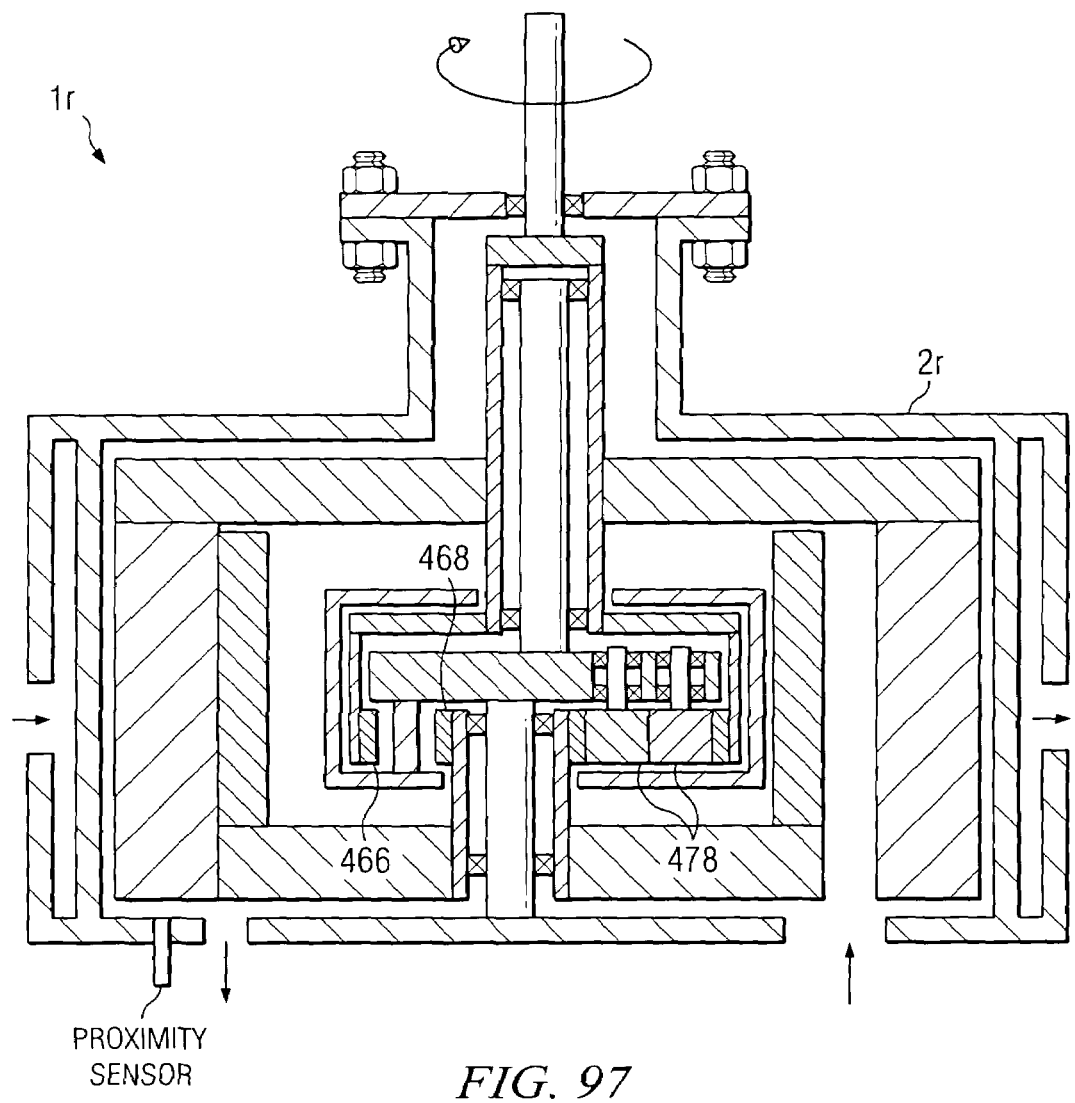

FIG. 97 illustrates an additional embodiment of gerotor apparatus 1r. The embodiment illustrated in FIG. 97 is substantially similar to the embodiment illustrated in FIG. 96; however, in the embodiment of FIG. 97, second gear 468 is a spur gear instead of a ring gear having interior teeth. Accordingly, a pair of idler spur gears 478 replace idler gear 464 in order to couple first gear 466 to second gear 468.

Figure 98:
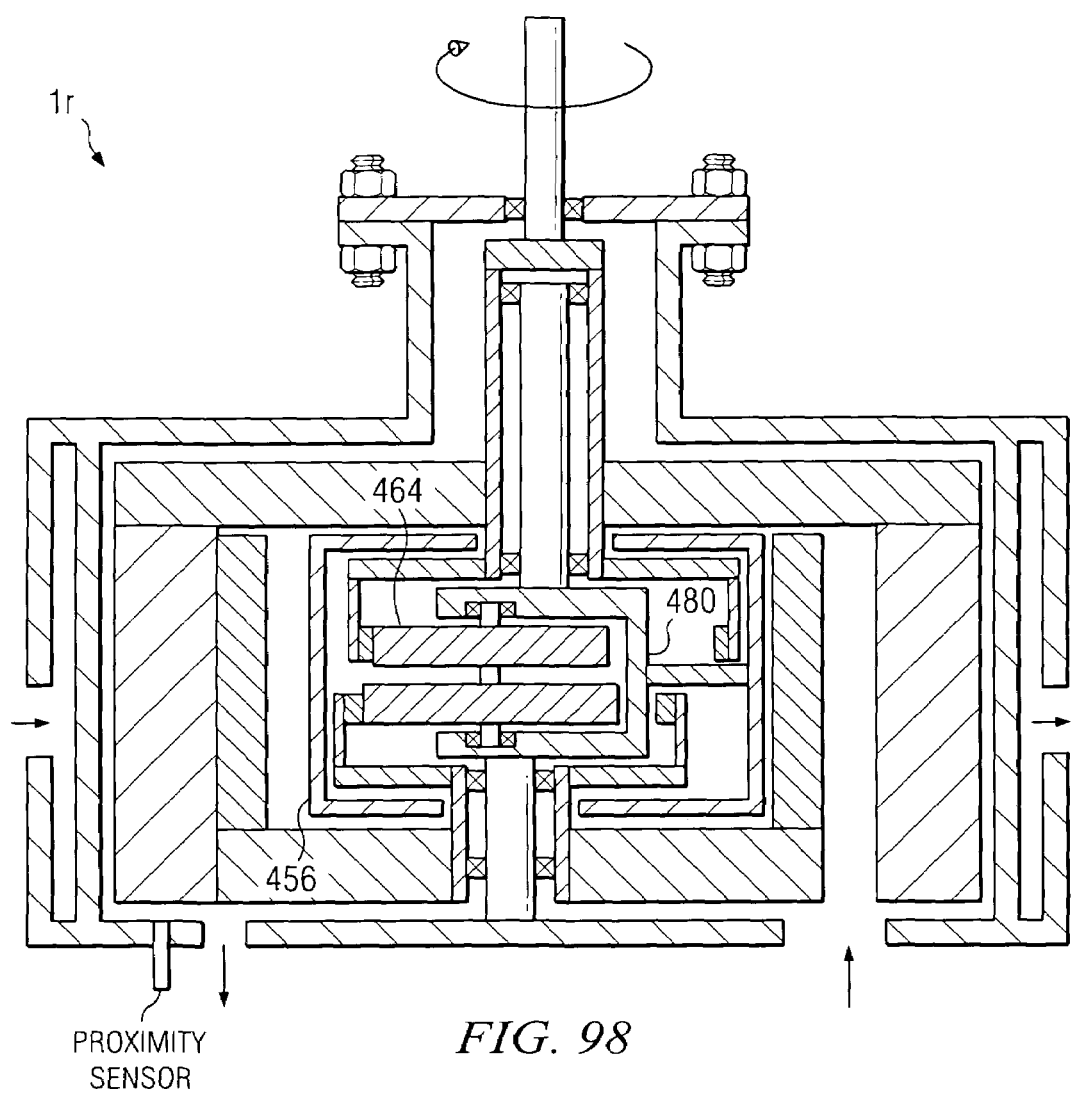

FIG. 98 illustrates an additional embodiment of gerotor apparatus 1r. The embodiment illustrated in FIG. 98 is substantially similar to the embodiment illustrated in FIG. 96; however, in the embodiment of FIG. 98, idler gear 464 is rotatably coupled to gear housing 456 with a U-shaped bracket 480. An advantage of using U-shaped bracket 480 is that it allows idler gear 464 to be relatively large, which aids in slowing its rotational speed.

Figure 99:
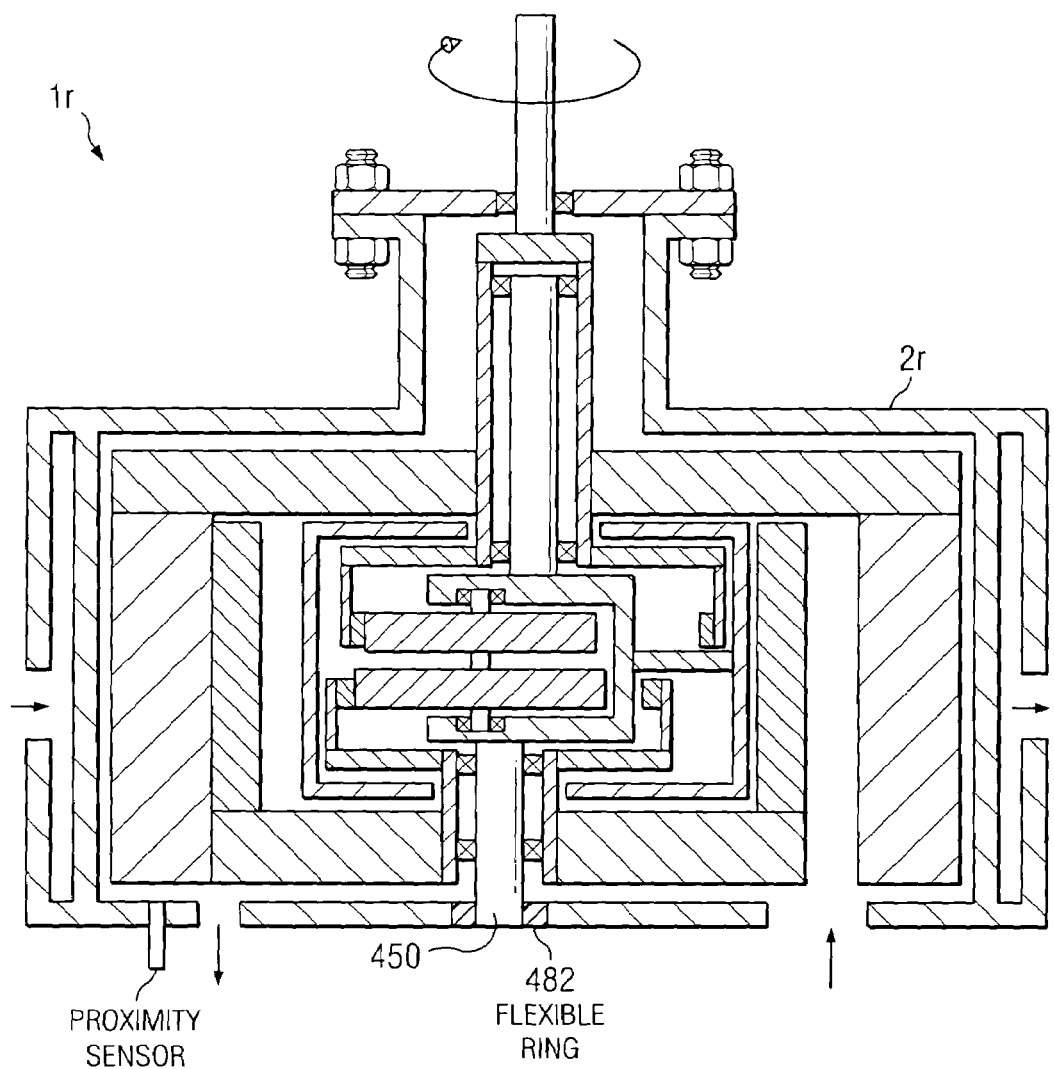
Figure 100:
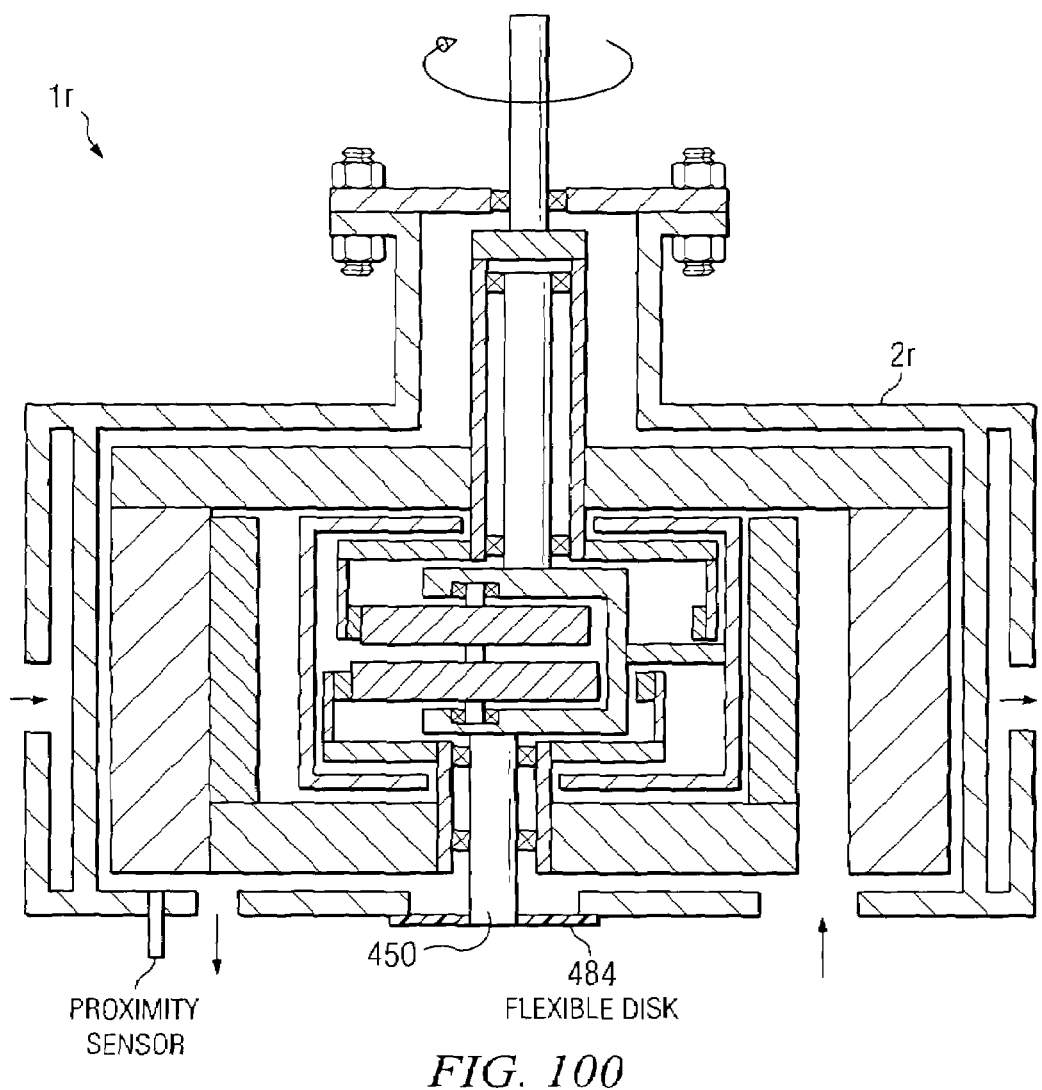

FIGS. 99 and 100 illustrate additional embodiments of gerotor apparatus 1r. The embodiments illustrated in FIGS. 99 and 100 are substantially similar to the embodiment illustrated in FIG. 98; however, in the embodiment of FIGS. 99 and 100, lower shaft 450 is coupled to housing 2r with a flexible mount to allow the entire drive shaft assembly to pivot slightly. As illustrated in FIG. 99, the flexible mount is a flexible ring 482 formed from any suitable material, such as rubber or plastic. As illustrated in FIG. 100, the flexible mount is a flexible disk 484 formed from any suitable material, such as rubber of plastic.

FIG. 101 illustrates an additional embodiment of gerotor apparatus 1r. The embodiment illustrated in FIG. 101 is substantially similar to the embodiment illustrated in FIGS. 99 and 100; however, in the embodiment of FIG. 101, lower shaft 450 is coupled to housing 2r with a suitable pivot 486. For example, lower shaft 450 may have a rounded end that engages a rounded hole formed in housing 2r. An anti-rotation pin 488 loosely couples to the bottom of housing 2r to prevent lower shaft 450 from rotating during operation. To ensure that a relatively tight fit exists at pivot 486, a collar 490 may be coupled to shaft 460 and a collar 491 may be coupled to upper shaft 458. Collar 490 is engaged with a bearing 492 that is hard mounted to retaining ring 476 and collar 491 is engaged with a bearing 493 hard mounted to hollow shaft 462. Therefore, adjustment screws 477 may be utilized to ensure a tight fit at pivot 486.

Although embodiments of the invention and their advantages are described in detail, a person skilled in the art could make various alterations, additions, and omissions without departing from the spirit and scope of the present invention.

What is claimed is:

1. A gerotor apparatus, comprising:
   a housing;
   a first shaft coupled to a first end of the housing;
   a second shaft associated with a second end of the housing and rotatably coupled at a first end to the first shaft by a first bearing;
   an outer gerotor rigidly coupled to the second shaft;

a first synchronizing mechanism rigidly coupled to the outer gerotor; and an inner gerotor rotatably coupled to the first shaft with a second bearing and a third bearing, the inner gerotor having a second synchronizing mechanism; and a hollow shaft rigidly coupled to the second end of the housing and wherein the second shaft is rotatably coupled within the hollow shaft by a fourth bearing.

2. The gerotor apparatus of claim 1, wherein the first synchronizing mechanism is an outer gear and the second synchronizing mechanism is an inner gear.

3. The gerotor apparatus of claim 1, wherein the first synchronizing mechanism is an alignment guide and the second synchronizing mechanism is an alignment member, the alignment member and the alignment guide working in conjunction with one another to control the rotation of the inner gerotor relative to the outer gerotor.

4. The gerotor apparatus of claim 1, wherein the first end of the housing includes a gas inlet for the gerotor apparatus.

5. The gerotor apparatus of claim 1, wherein the second shaft is rotatably coupled to the second end of the housing by a fourth bearing.

6. The gerotor apparatus of claim 1, wherein the first bearing is positioned in a circumferential plane that is substantially the same as a circumferential plane passing through the axial centers of both the inner and outer gerotors.

7. The gerotor apparatus of claim 1, wherein the first shaft is pivotally coupled to the first end of the housing and wherein an anti-rotation pin that is coupled to the first end of the housing is configured to prevent the first shaft from rotating during rotation of the inner and outer gerotors.

8. The gerotor apparatus of claim 1, wherein the first shaft is coupled to the first end of the housing with a rubber mount.

9. The gerotor apparatus of claim 1, wherein the second shaft is coupled at the first end on the outside of the first shaft by the first bearing.

10. The gerotor apparatus of claim 1, wherein the first shaft is rigidly coupled to the second end of the housing and further comprising:

a driven gear rigidly coupled to the second shaft;

a drive gear meshing with the driven gear; and a third shaft rotatably coupled to the second end of the housing, the third shaft rigidly coupled to the drive gear.

11. The gerotor apparatus of claim 1, further comprising a proximity sensor coupled to the housing, the proximity sensor operable to sense a gap between an end of the outer gerotor and an inside surface of the housing.

12. The gerotor apparatus of claim 1, further comprising a pressurized air source coupled to a port formed in a perimeter of the housing, the pressurized air source operable to deliver pressurized air through the port and into the housing.

13. The gerotor apparatus of claim 1, further comprising a jacket disposed around a circumference of the housing, the jacket comprising an inlet port and an outlet port to allow fluid to flow through the jacket.

14. The gerotor apparatus of claim 1, wherein the inner gerotor comprises a cross-sectional shape based on an epicycloid.

15. The gerotor apparatus of claim 1, wherein the inner gerotor comprises a cross-sectional shape based on an hypocycloid.

16. The gerotor apparatus of claim 1, wherein the first shaft is rigidly coupled to the first end of the housing.

17. The gerotor apparatus of claim 1, wherein the second shaft is rotatably coupled to the second end of the housing by a fourth bearing, and the first bearing is disposed between the second bearing and the fourth bearing.

18. The gerotor apparatus of claim 1, wherein the second shaft is rotatably coupled to the second end of the housing by a fourth bearing and a fifth bearing, and the fourth bearing and the fifth bearing are disposed above the second bearing and the third bearing.

* * * * *